(12) United States Patent
Nguyen

(10) Patent No.: US 11,434,109 B2
(45) Date of Patent: Sep. 6, 2022

(54) CLAMPING DEVICE FOR LIFTING AND TRANSFER OBJECTS

(71) Applicant: Nhon Hoa Nguyen, Bankstown (AU)

(72) Inventor: Nhon Hoa Nguyen, Bankstown (AU)

( * ) Notice: Subject to any disclaimer, the term of this patent is extended or adjusted under 35 U.S.C. 154(b) by 0 days.

(21) Appl. No.: 17/410,306

(22) Filed: Aug. 24, 2021

(65) Prior Publication Data
US 2022/0081260 A1   Mar. 17, 2022

Related U.S. Application Data

(63) Continuation-in-part of application No. 17/201,474, filed on Mar. 15, 2021, which is a continuation-in-part of application No. 16/876,480, filed on May 18, 2020, now Pat. No. 10,947,090, which is a continuation of application No. 16/381,378, filed on Apr. 11, 2019, now Pat. No. 10,654,690.

(60) Provisional application No. 63/069,276, filed on Aug. 24, 2020, provisional application No. 62/692,676, filed on Jun. 30, 2018.

(51) Int. Cl.
| B66C 1/34 | (2006.01) |
| F16B 2/12 | (2006.01) |
| B25B 5/04 | (2006.01) |
| B65G 7/12 | (2006.01) |
| B66C 1/44 | (2006.01) |
| B66F 9/06 | (2006.01) |

(52) U.S. Cl.
CPC ............... B66C 1/34 (2013.01); F16B 2/12 (2013.01); *B25B 5/04* (2013.01); *B65G 7/12* (2013.01); *B66C 1/442* (2013.01); *B66F 9/06* (2013.01)

(58) Field of Classification Search
CPC ... B66C 1/34; B66C 1/442; F16B 2/12; B25B 5/04; B66F 9/06; B65G 7/12; B65G 47/90
See application file for complete search history.

(56) References Cited

U.S. PATENT DOCUMENTS

| 1,506,827 | A | * | 9/1924 | Gellert | B66C 1/54 |
| | | | | | 294/106 |
| 3,768,853 | A | * | 10/1973 | Rennie | B66C 1/585 |
| | | | | | 294/110.1 |
| 4,358,145 | A | * | 11/1982 | Svensson | B66C 1/663 |
| | | | | | 294/68.3 |
| 2006/0012196 | A1 | * | 1/2006 | Wooten | A63B 29/02 |
| | | | | | 294/82.1 |
| 2010/0237641 | A1 | * | 9/2010 | Drent | B66C 1/34 |
| | | | | | 294/82.11 |
| 2014/0205420 | A1 | * | 7/2014 | Newth | B66C 1/48 |
| | | | | | 414/800 |

* cited by examiner

*Primary Examiner* — Stephen A Vu
(74) *Attorney, Agent, or Firm* — Tue Nguyen

(57) ABSTRACT

A clamping device configured to handle large and fragile objects can include large jaws extended outside a smaller jaw support. The extended areas of the second jaw can be up to 4× of the jaw support, and can contain reinforced ridges configured so that a force applied from the second body portion to the second jaw spreads to the extended areas of the second jaw outside the second body portion, for example, to at least 80%. The clamping device can include an automatic locking mechanism for open and close the jaws from an operator far away from the clamping device.

20 Claims, 49 Drawing Sheets

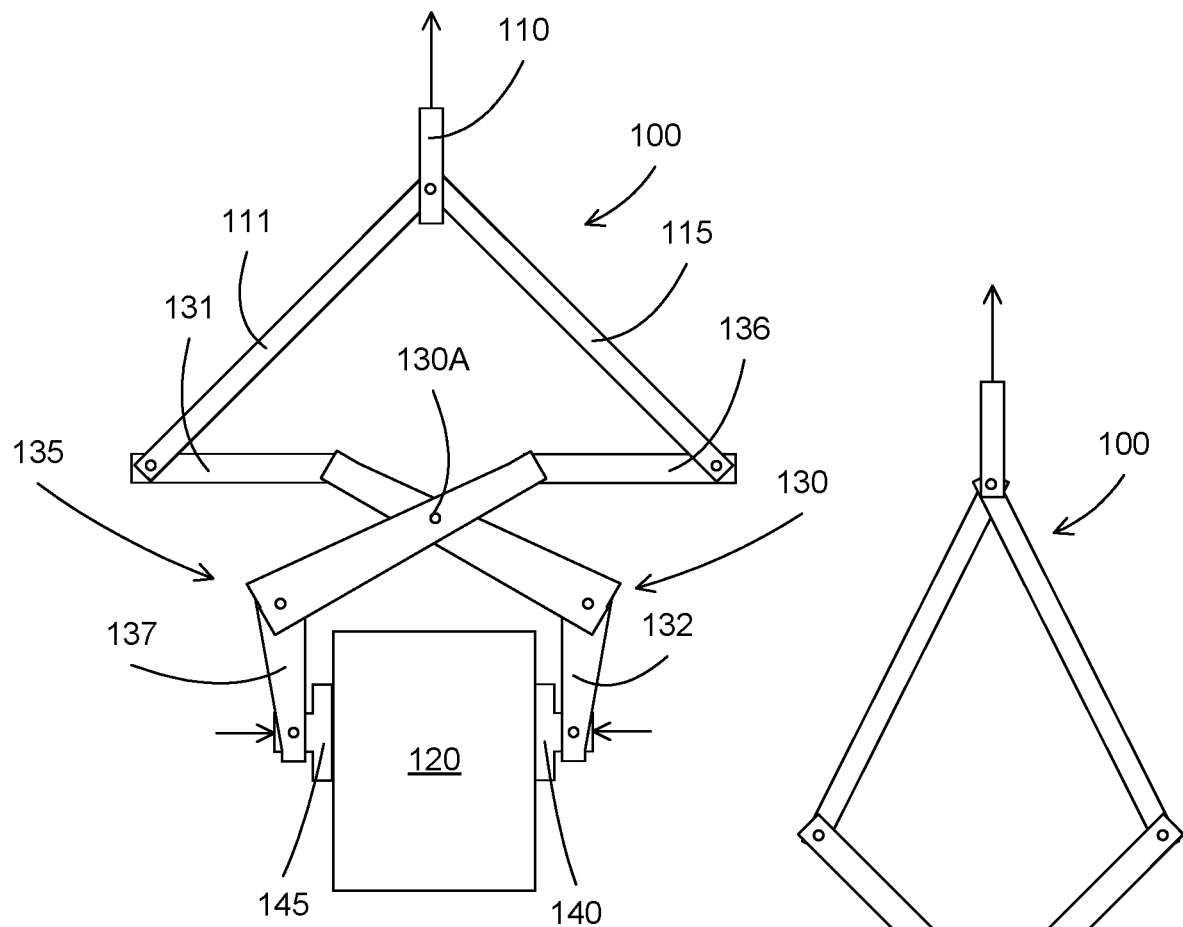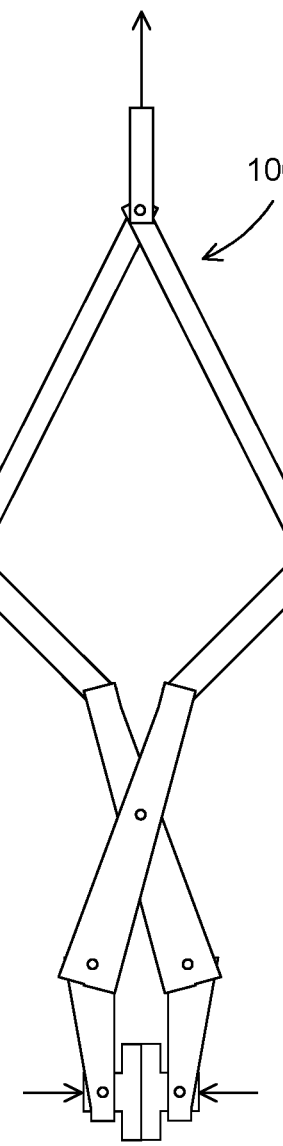
FIG. 1A
FIG. 1B
FIG. 1 (Prior Art)

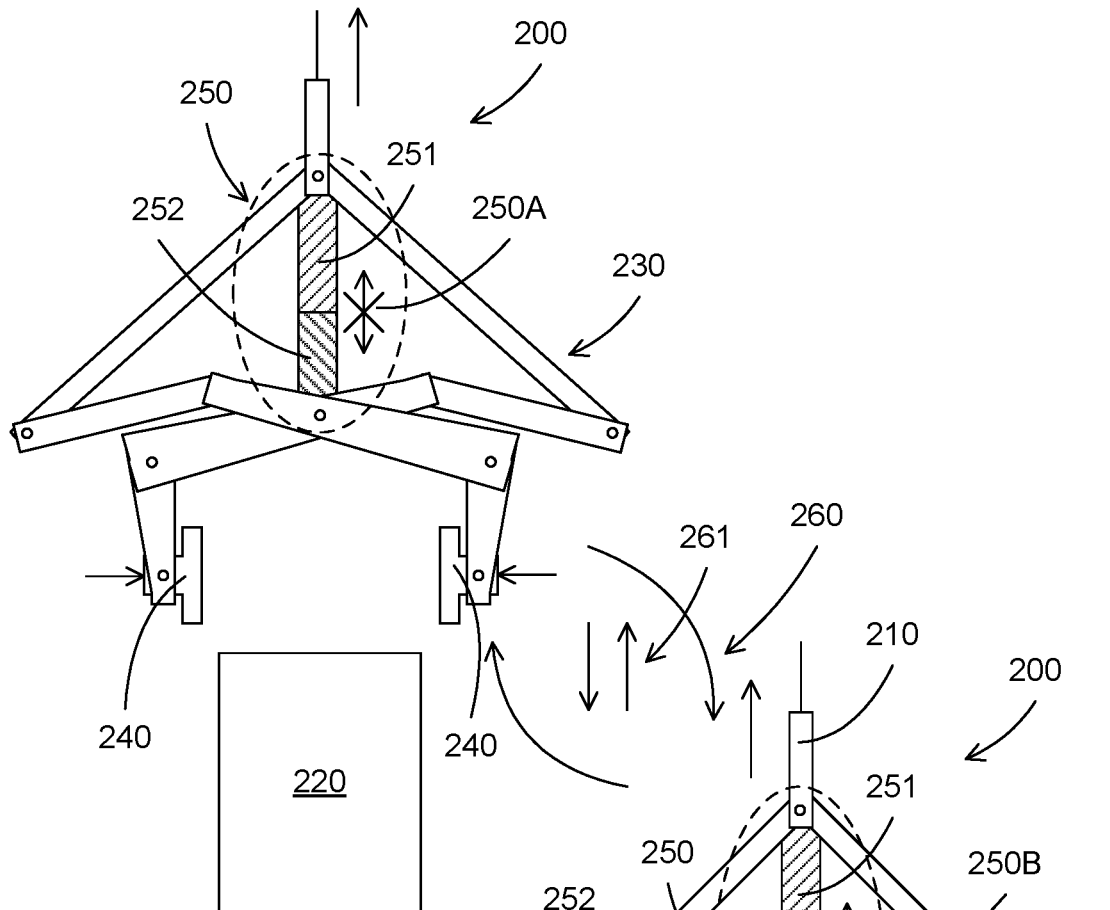
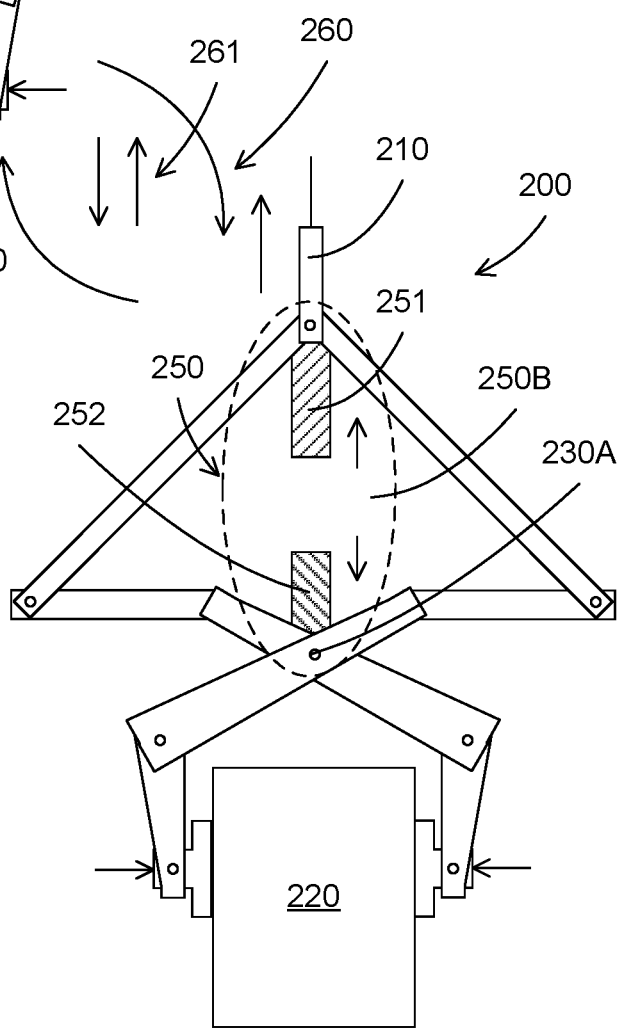
FIG. 2A
FIG. 2B

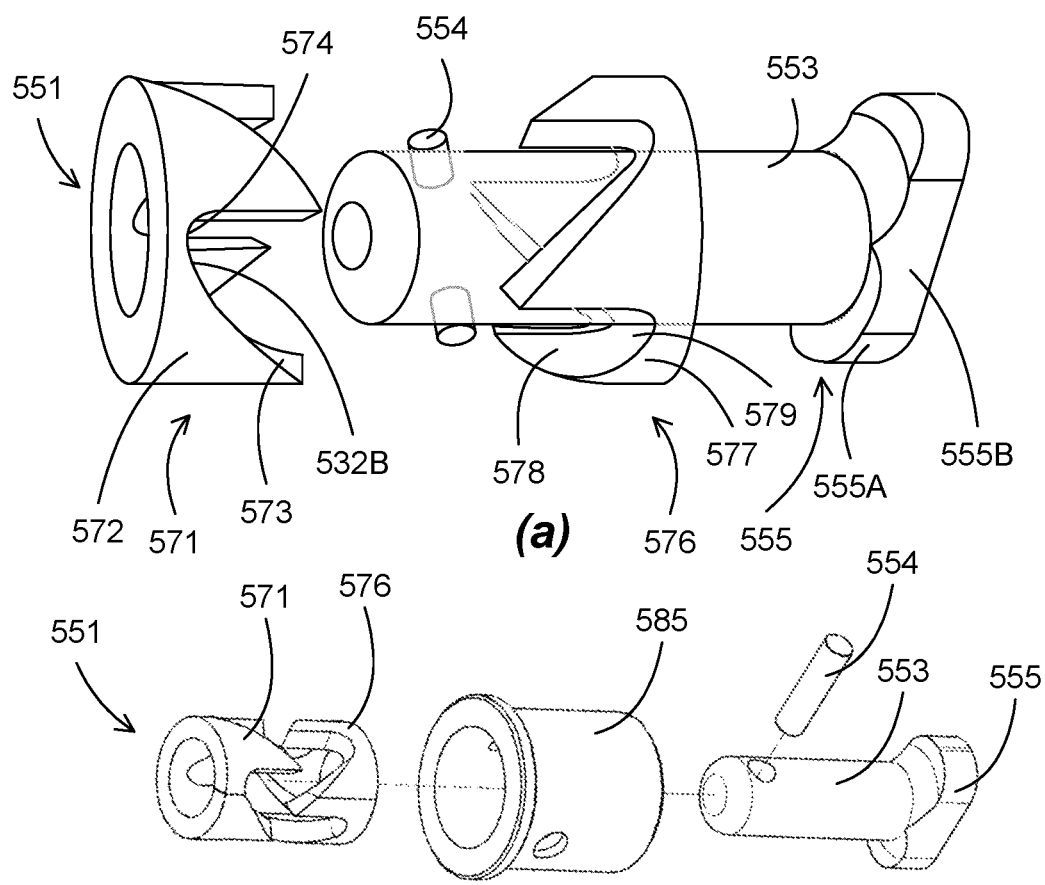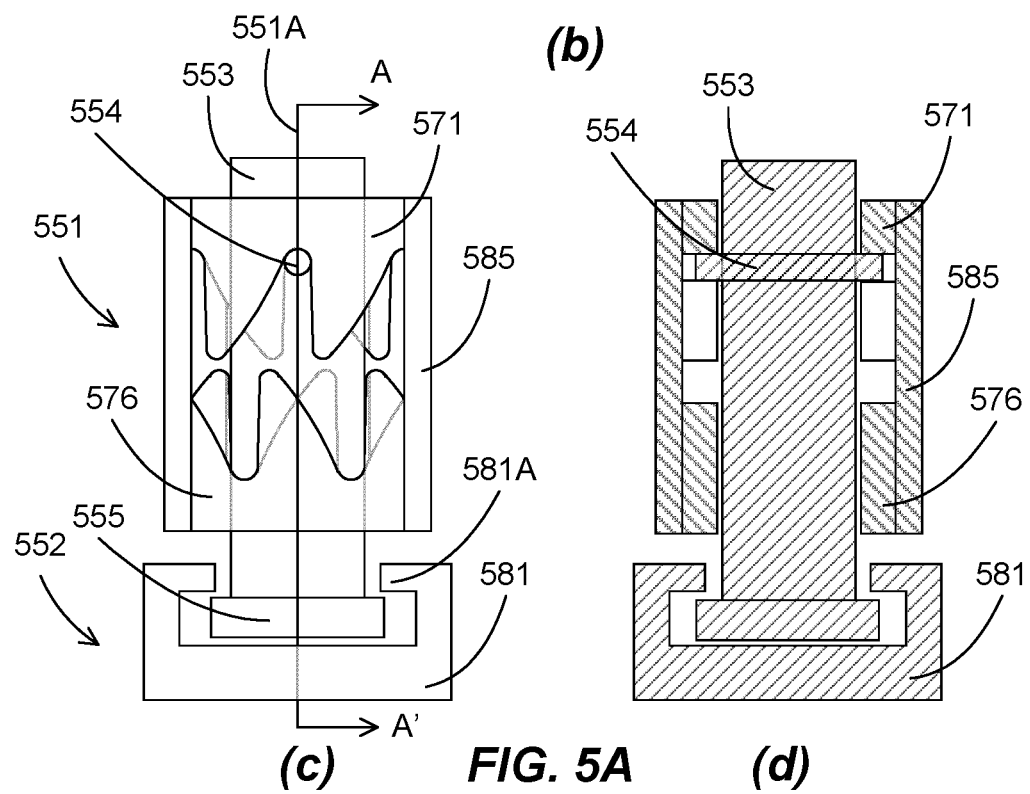
FIG. 5A

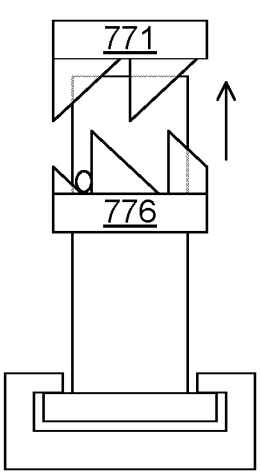 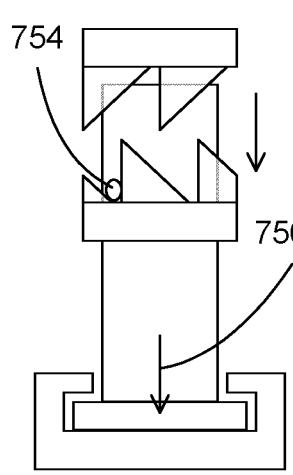 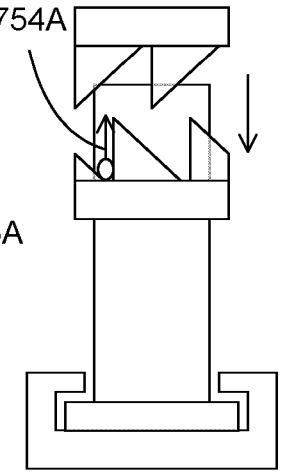 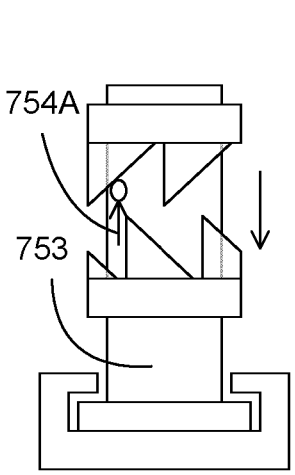
FIG. 7A    FIG. 7B    FIG. 7C    FIG. 7D
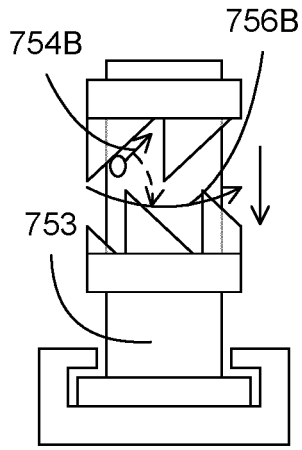 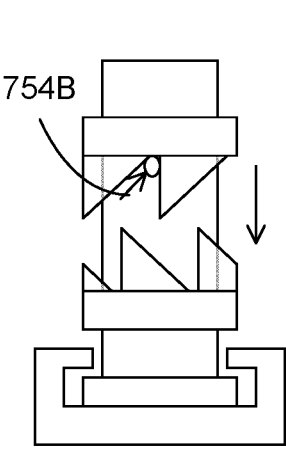 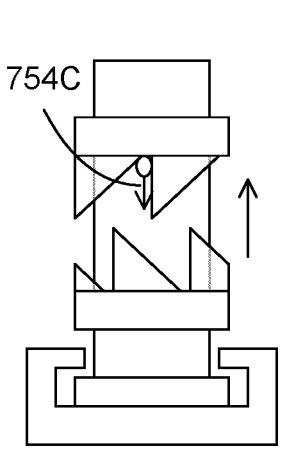 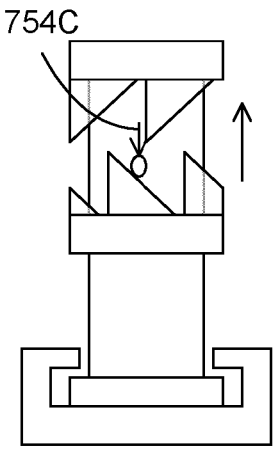
FIG. 7E    FIG. 7F    FIG. 7G    FIG. 7H
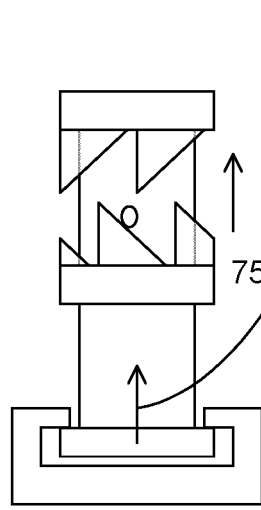 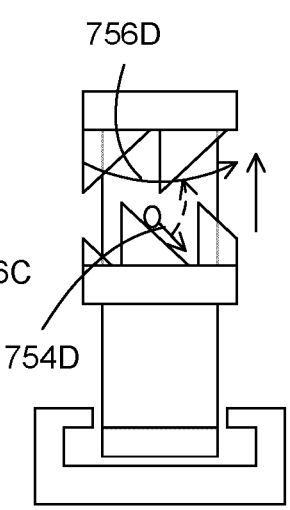 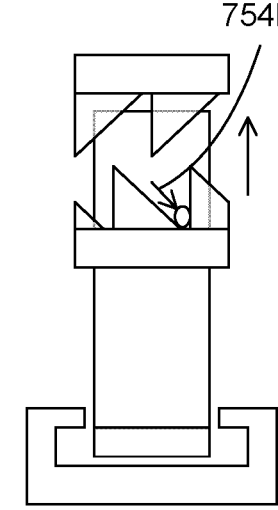 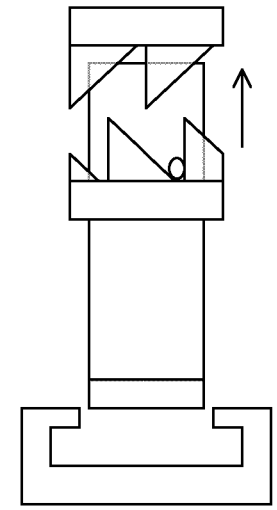
FIG. 7I    FIG. 7J    FIG. 7K    FIG. 7L

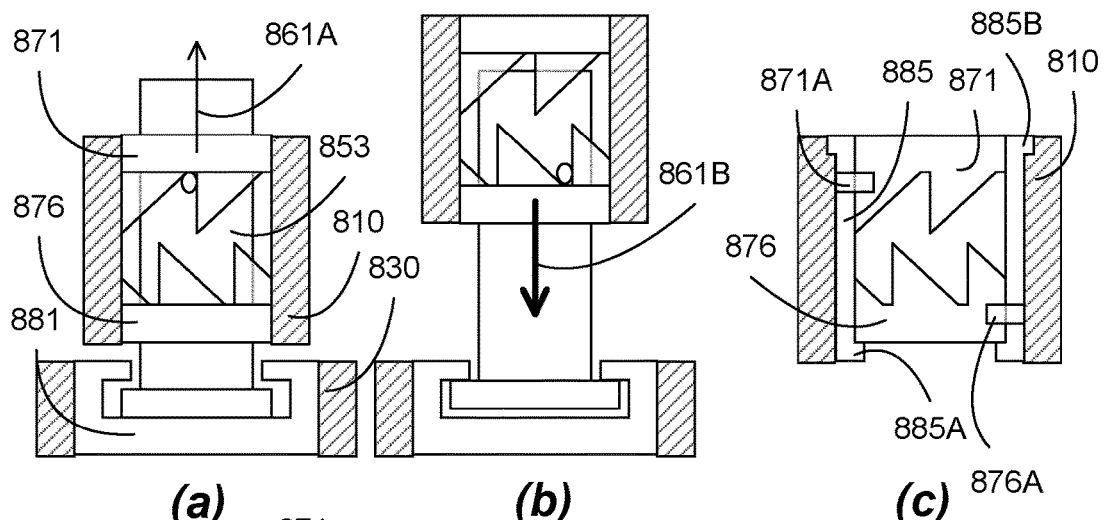
FIG. 8A
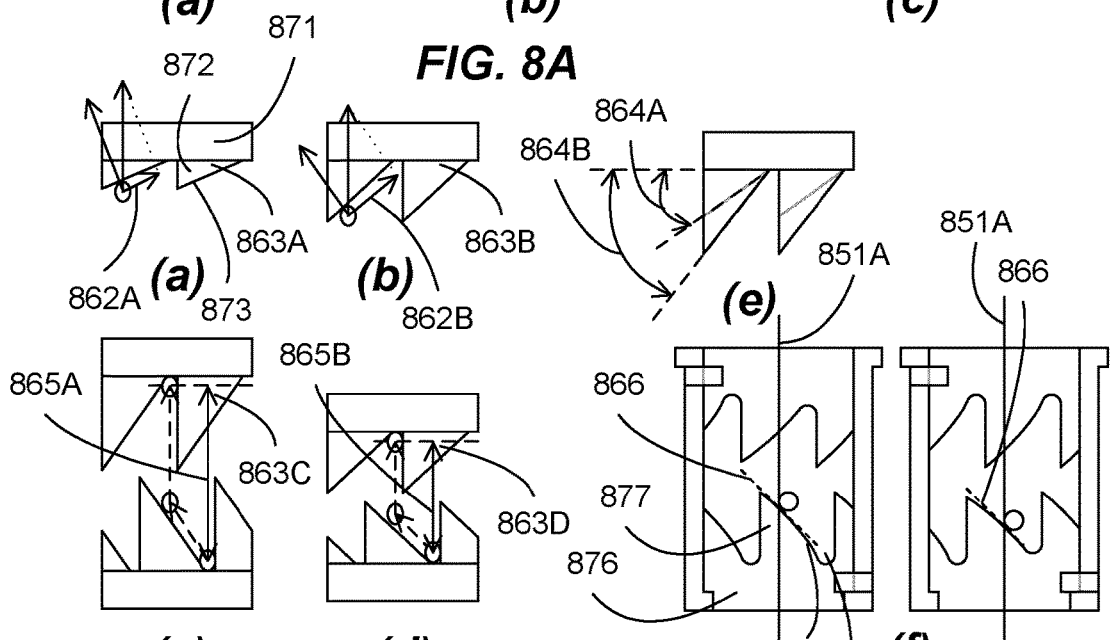
FIG. 8B
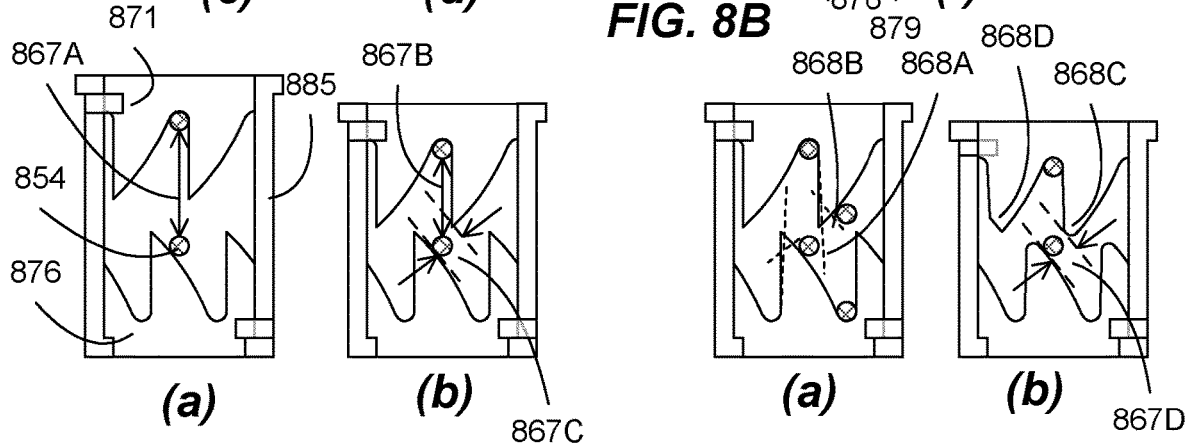
FIG. 8C
FIG. 8D

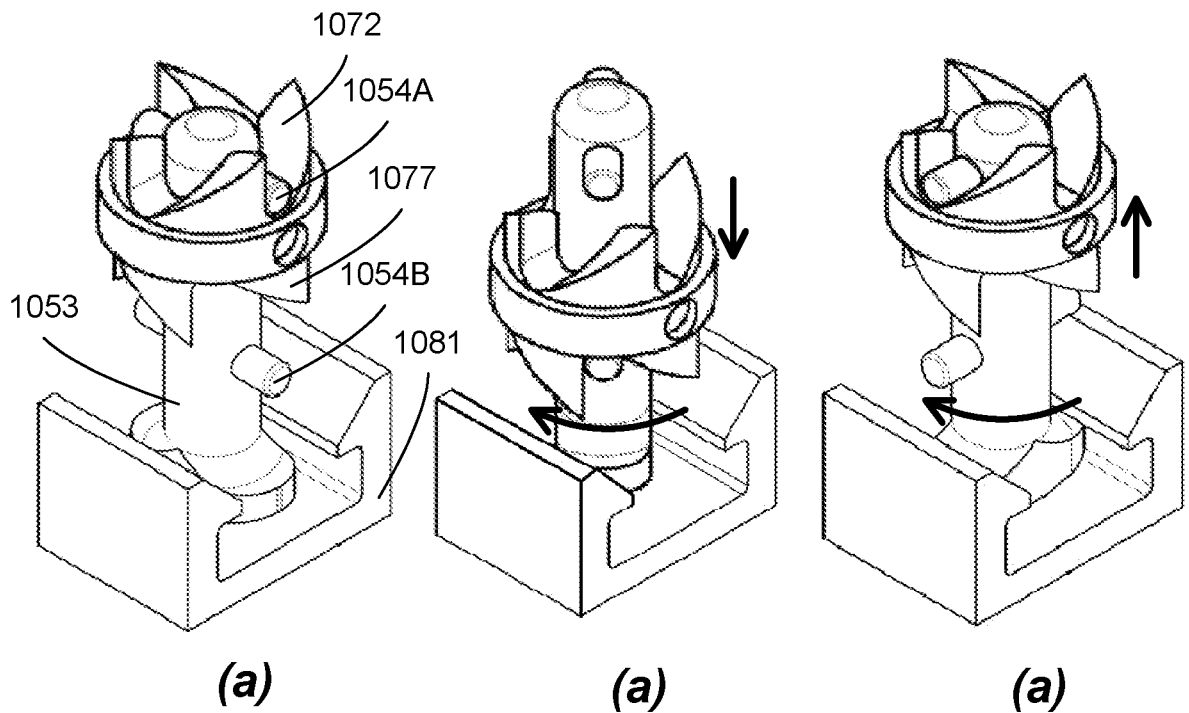
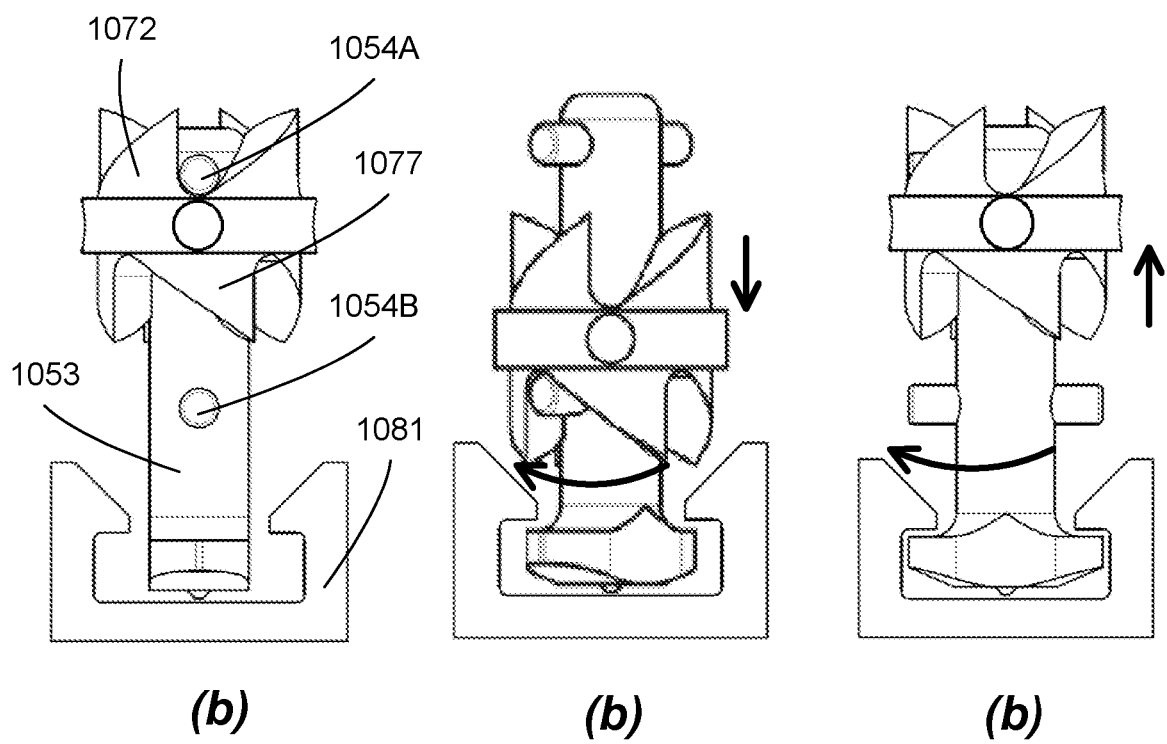
FIG. 10A  FIG. 10B  FIG. 10C

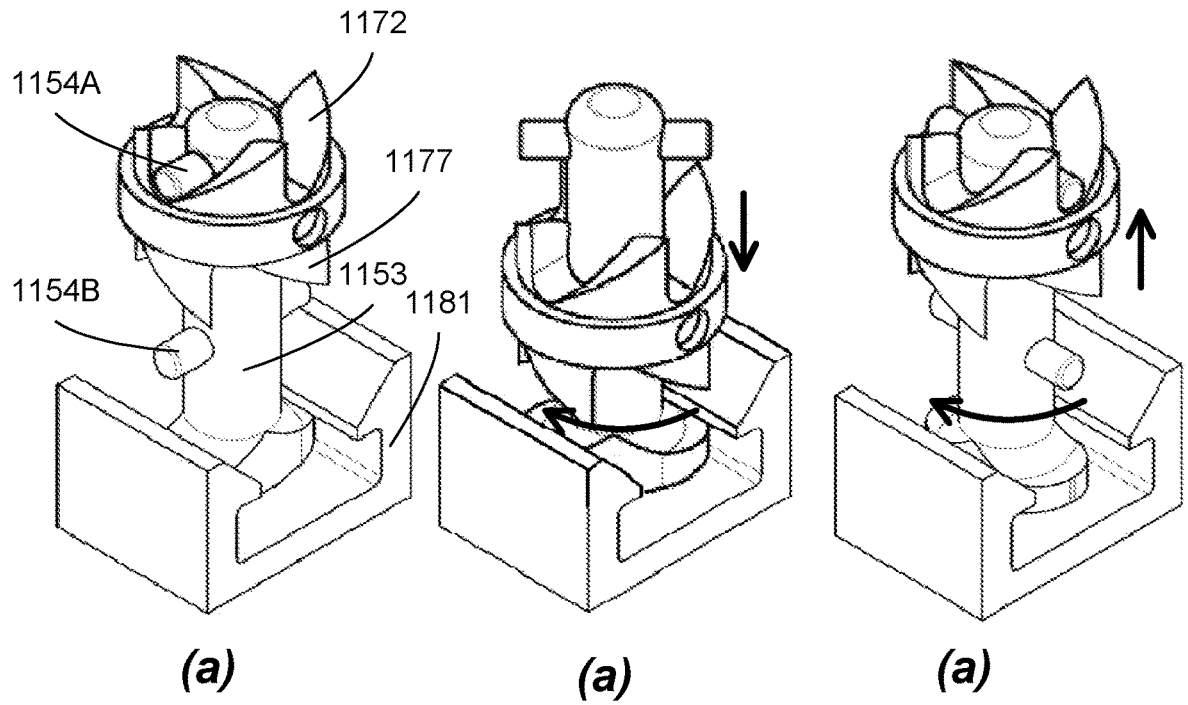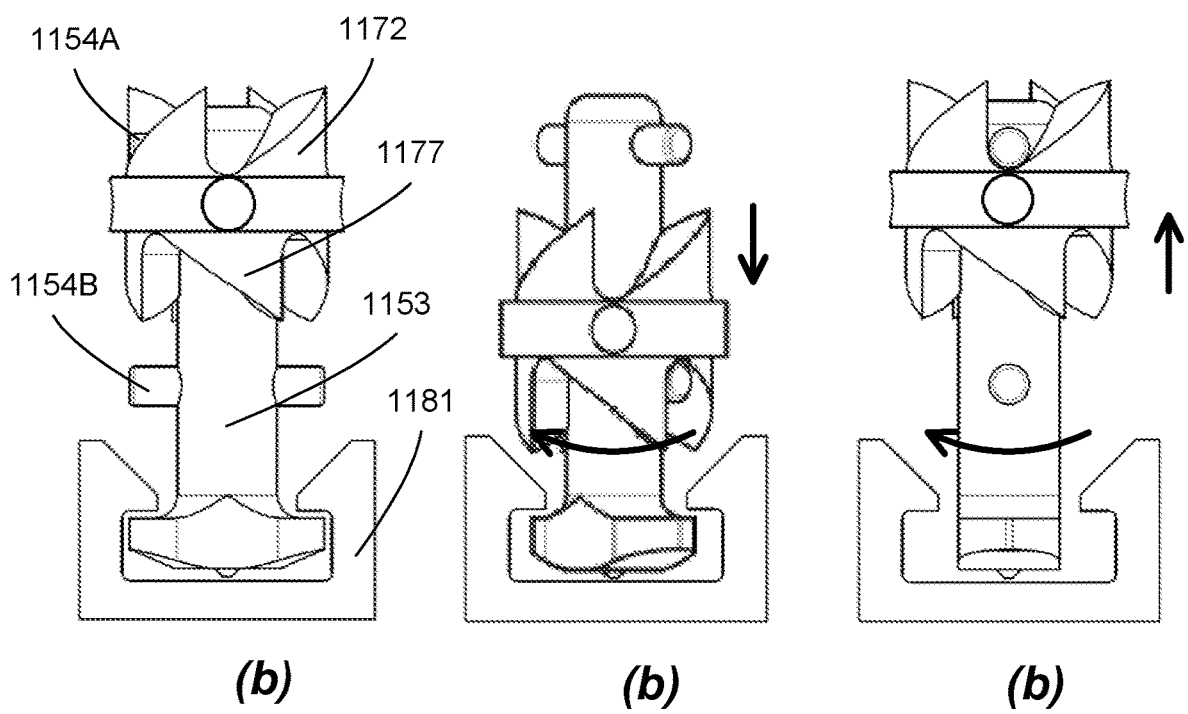
FIG. 11A  FIG. 11B  FIG. 11C

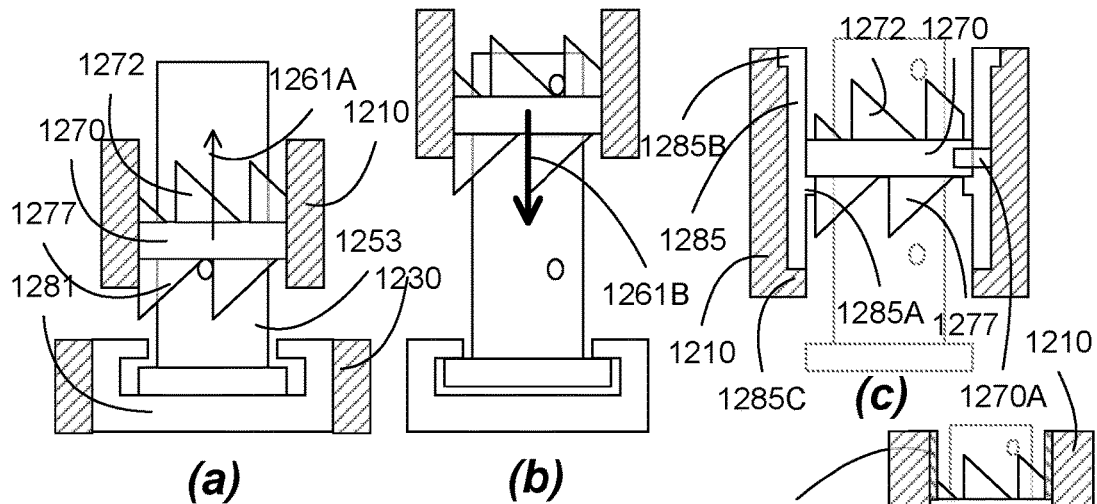
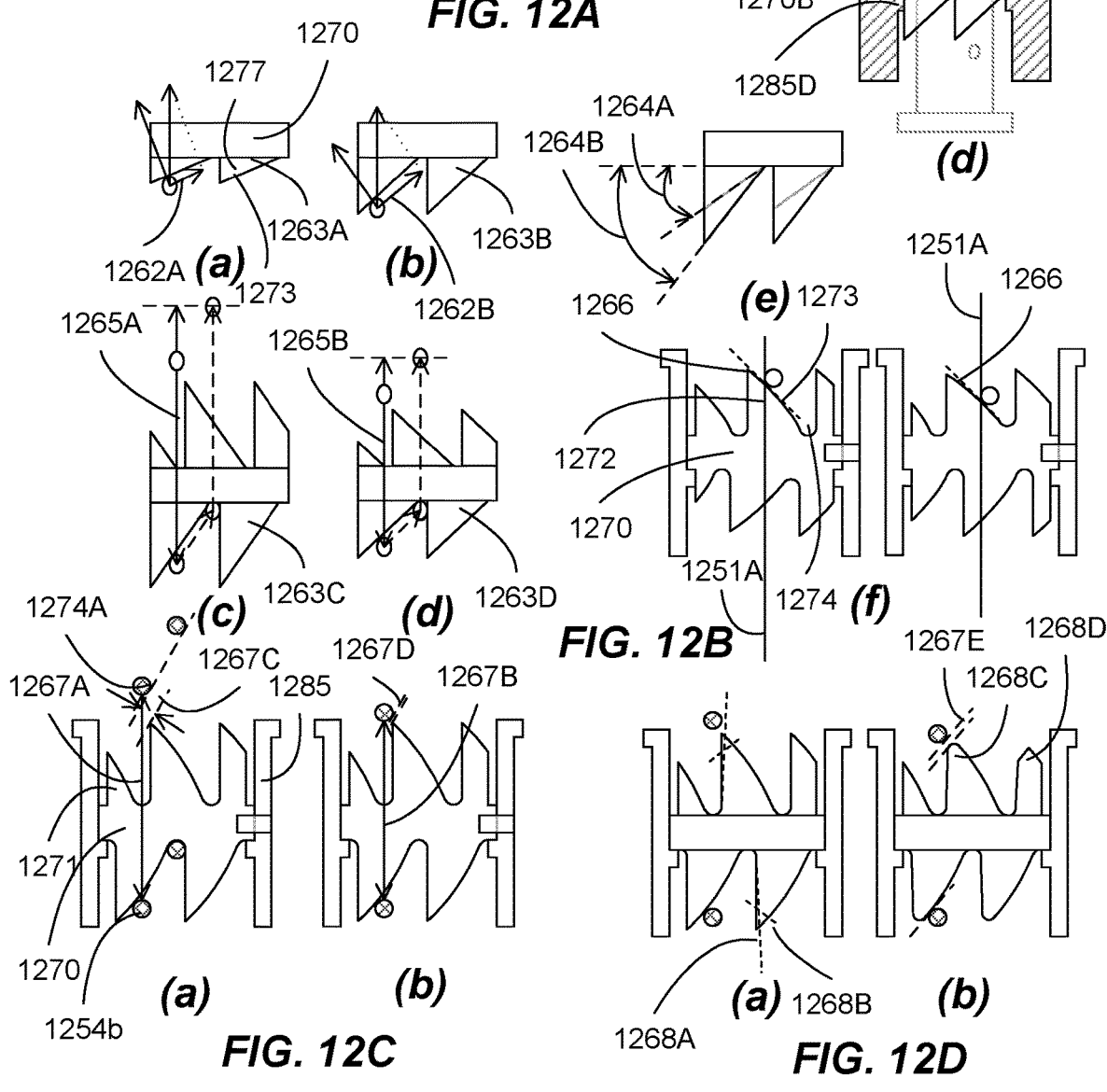
FIG. 12A
FIG. 12B
FIG. 12C
FIG. 12D

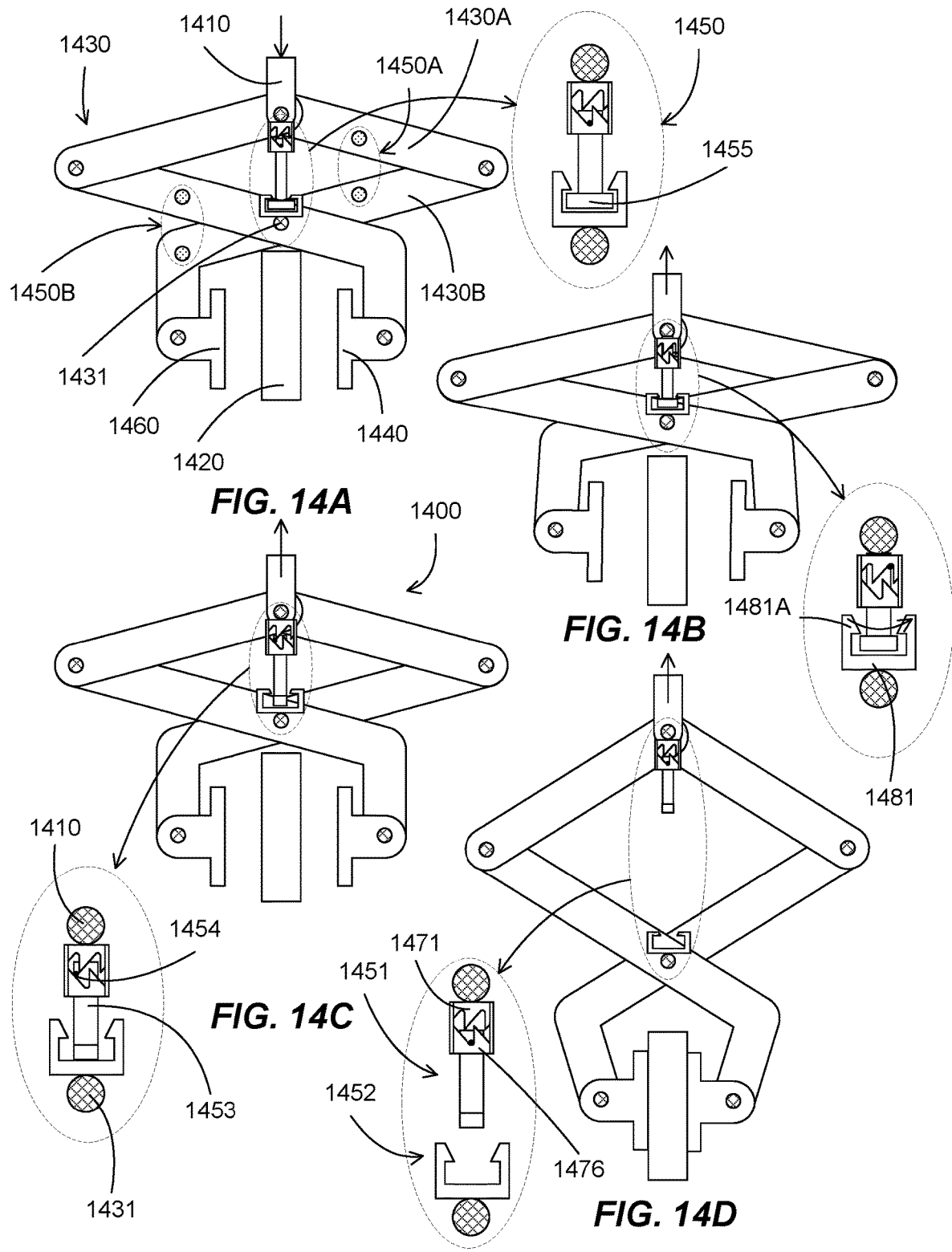

Toggling between a movable status and an unmovable status for a component of a clamping mechanism of a clamping device, wherein the toggling process is activated when at least one of the jaws of the clamping device is in a vicinity of an opening distance from the other jaw, wherein in the movable status, the component is configured to allow jaws of the clamping device to be movable toward each other to clamp on an object, wherein in the unmovable status, the component is configured to have the jaws remaining opened
1600

*FIG. 16A*

Moving a component of a clamping mechanism of a clamping device downward, wherein when the component reaches a position, a toggling mechanism is activated to toggle between a movable status and an unmovable status for at least a jaw of the clamping device, wherein in the movable status, the jaw is configured to be movably reachable toward an object disposed between the jaw and another jaw of the clamping device, wherein in the unmovable status, the jaws are configured to remain opened
1620

*FIG. 16B*

Moving a component of a clamping mechanism of a clamping device downward to toggle at least a jaw of the clamping device between movably reachable toward an object disposed between the jaw and another jaw of the clamping device for clamping on the object and remaining opened without clamping on the object
1640

*FIG. 16C*

Moving a hoist coupled to a clamping device downward to contact a surface, wherein the clamping device clamps on an object
1700

Continuing moving the hoist downward to open the jaws to reach an opening distance, wherein when the jaws reach the opening distance, a locking mechanism of the clamping device is toggled from a movable to an unmovable status, wherein in the movable status, the jaws of the clamping device are movable toward each other to clamp on the object, wherein in the unmovable status, the jaws remain opened without clamping on the object
1710

Moving the hoist upward with the jaws opened and not clamping on the object
1720

FIG. 17A

Moving a hoist coupled to a clamping device downward to contact an object, wherein the jaws of the clamping device clamps are separated at a distance larger than a dimension of the object
1740

Continuing moving the hoist downward to toggle a locking mechanism of the clamping device from an unmovable to a movable status, wherein in the movable status, the jaws of the clamping device are movable toward each other to clamp on the object, wherein in the unmovable status, the jaws are opened without clamping on the object
1750

Moving the hoist upward so that the jaws clamp on the object
1760

FIG. 17B

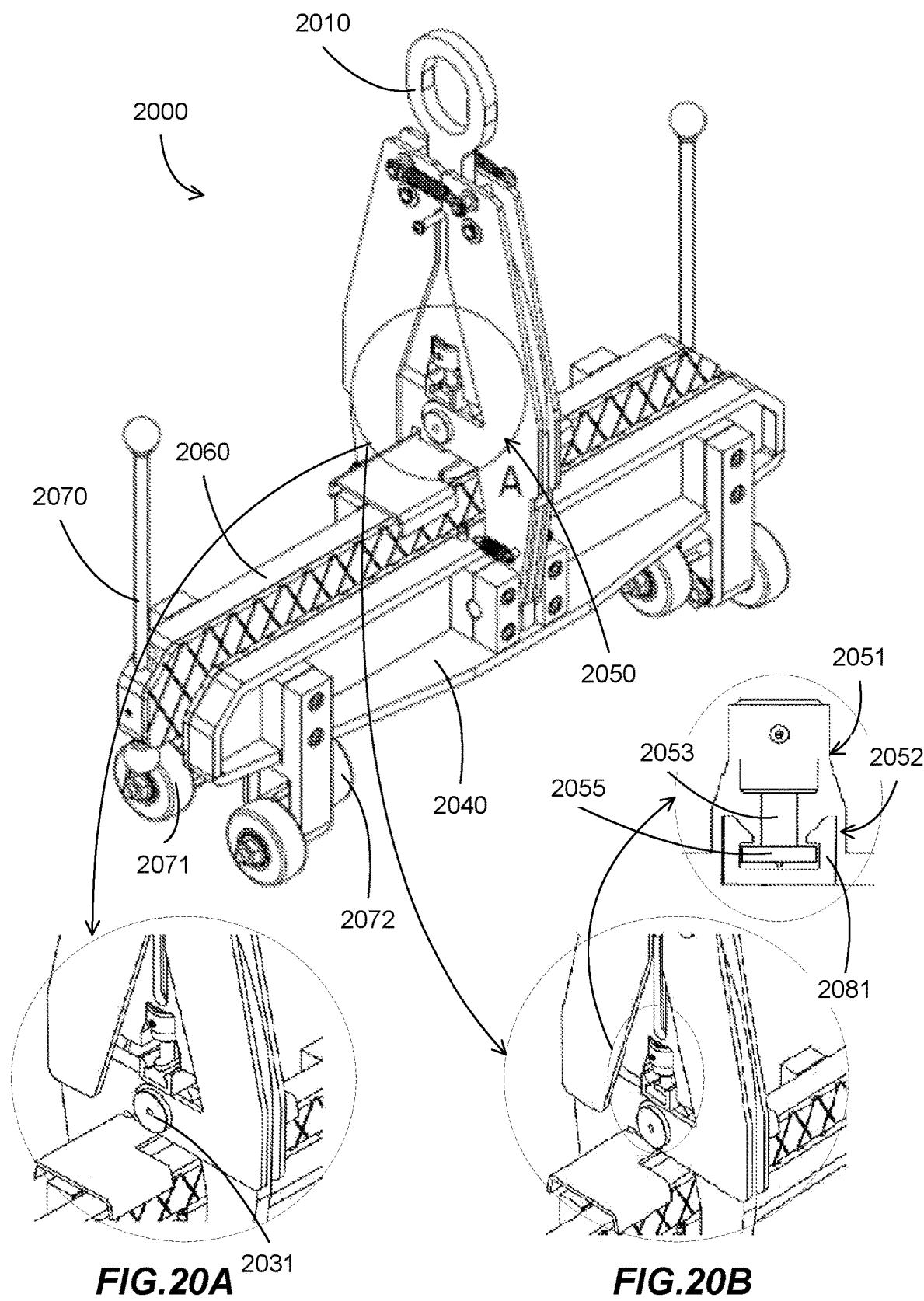
FIG.20A FIG.20B

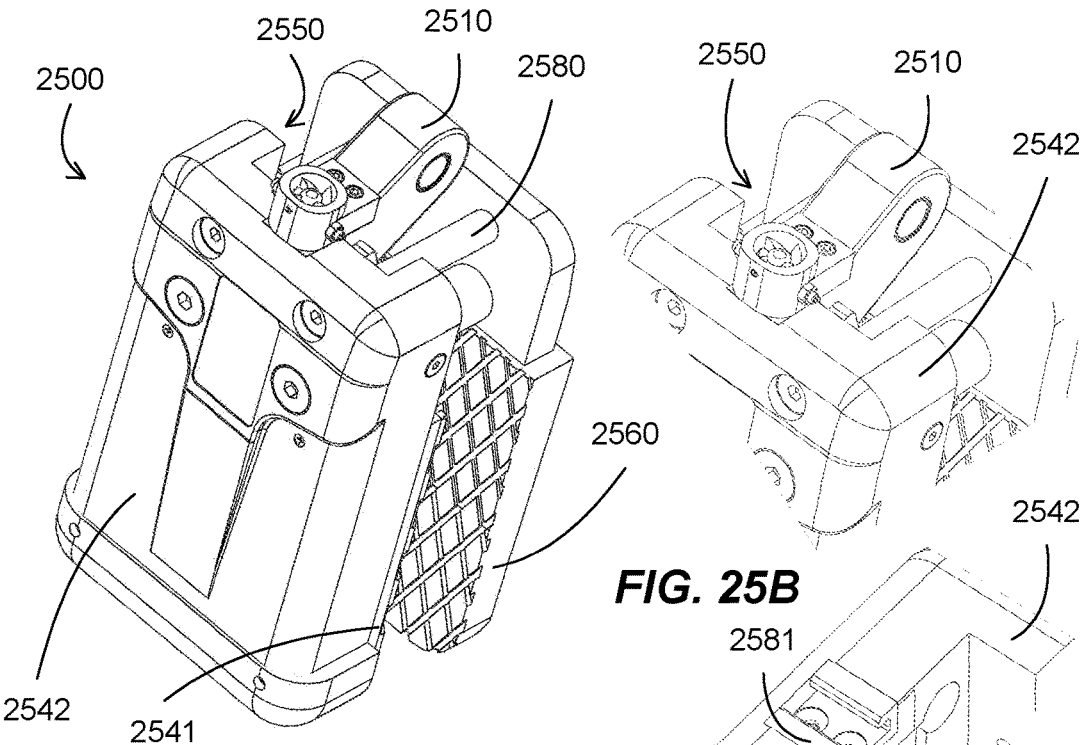
FIG. 25A
FIG. 25B
FIG. 25C
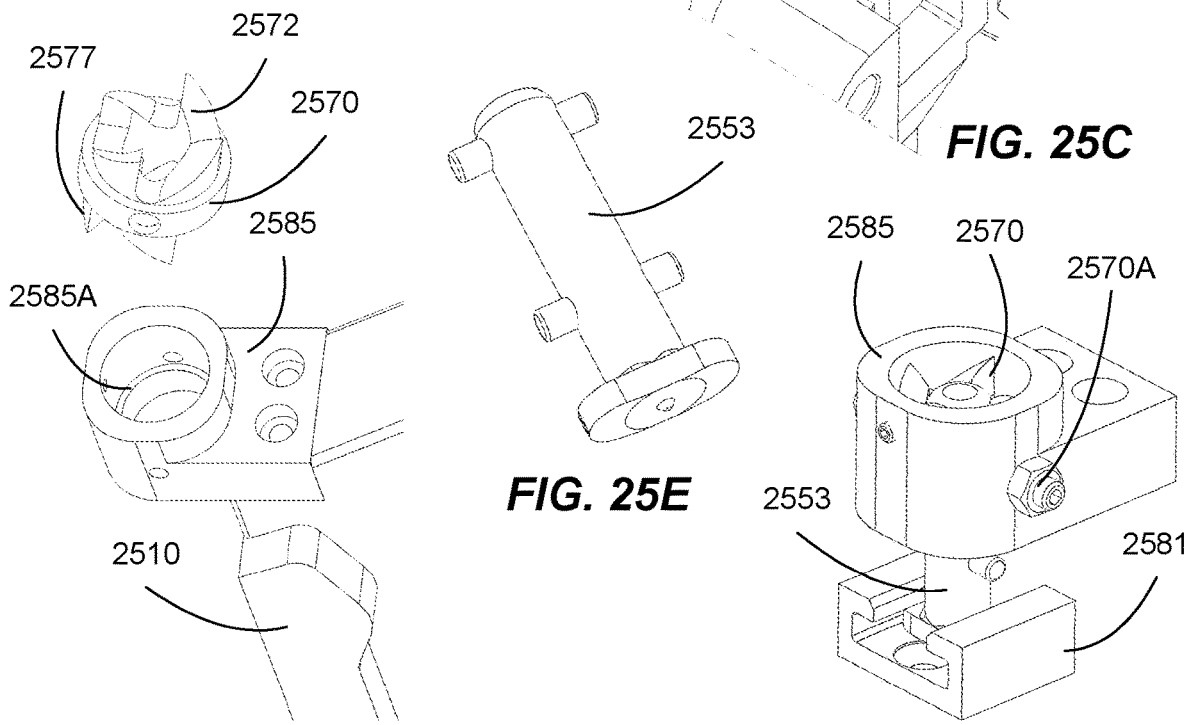
FIG. 25D
FIG. 25E
FIG. 25F

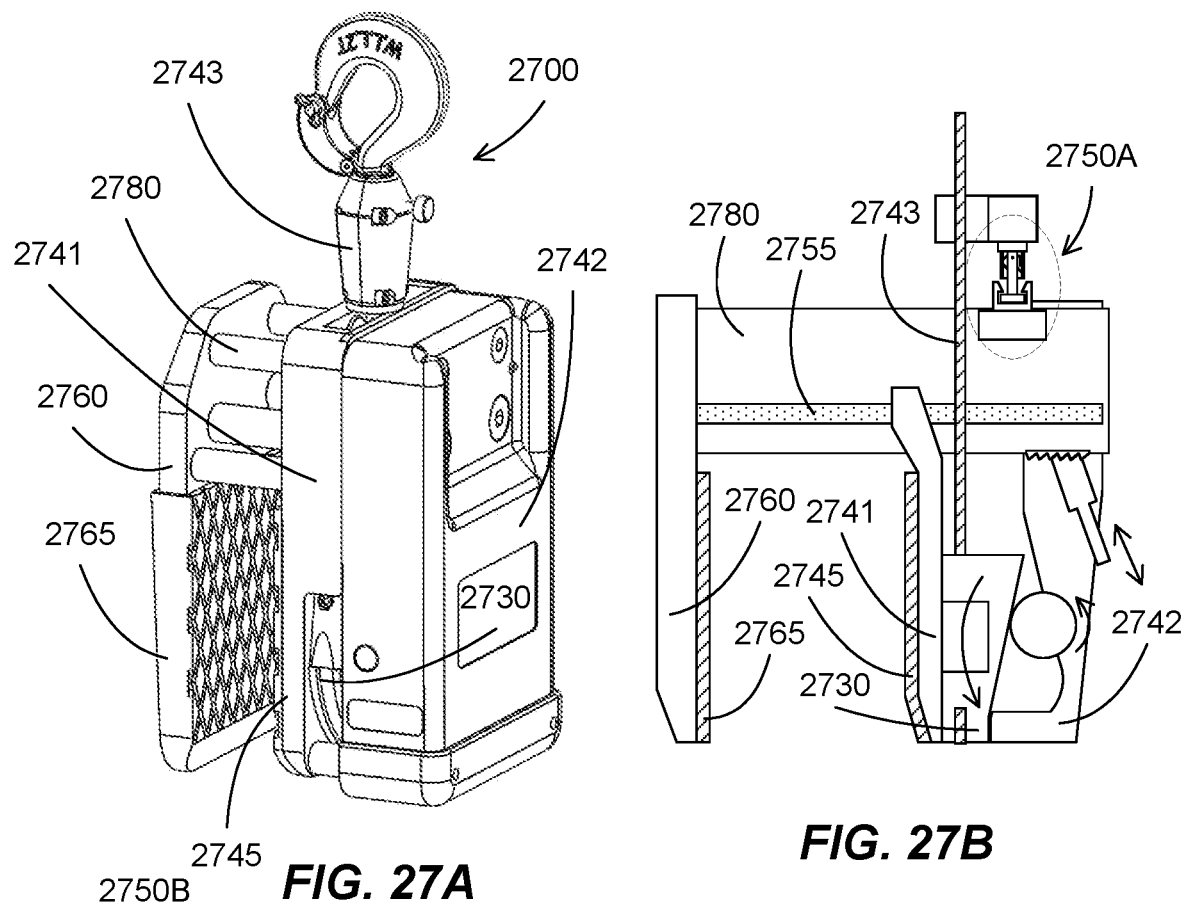
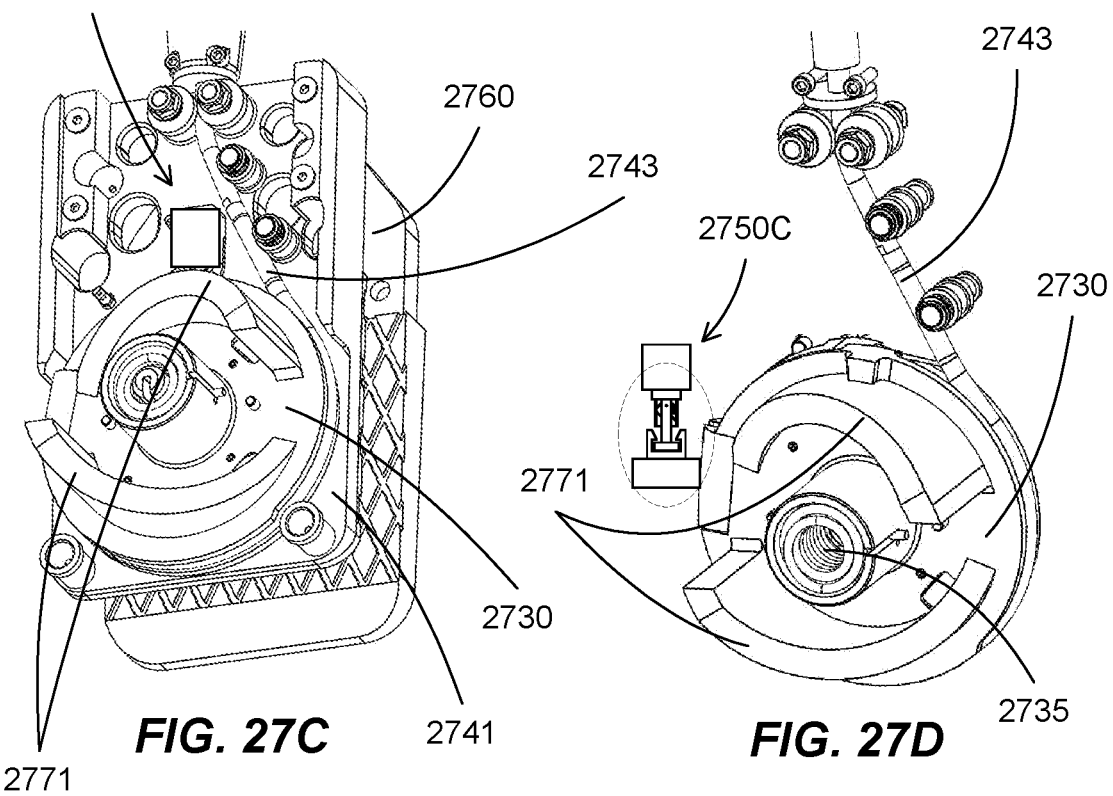
FIG. 27A  FIG. 27B  FIG. 27C  FIG. 27D

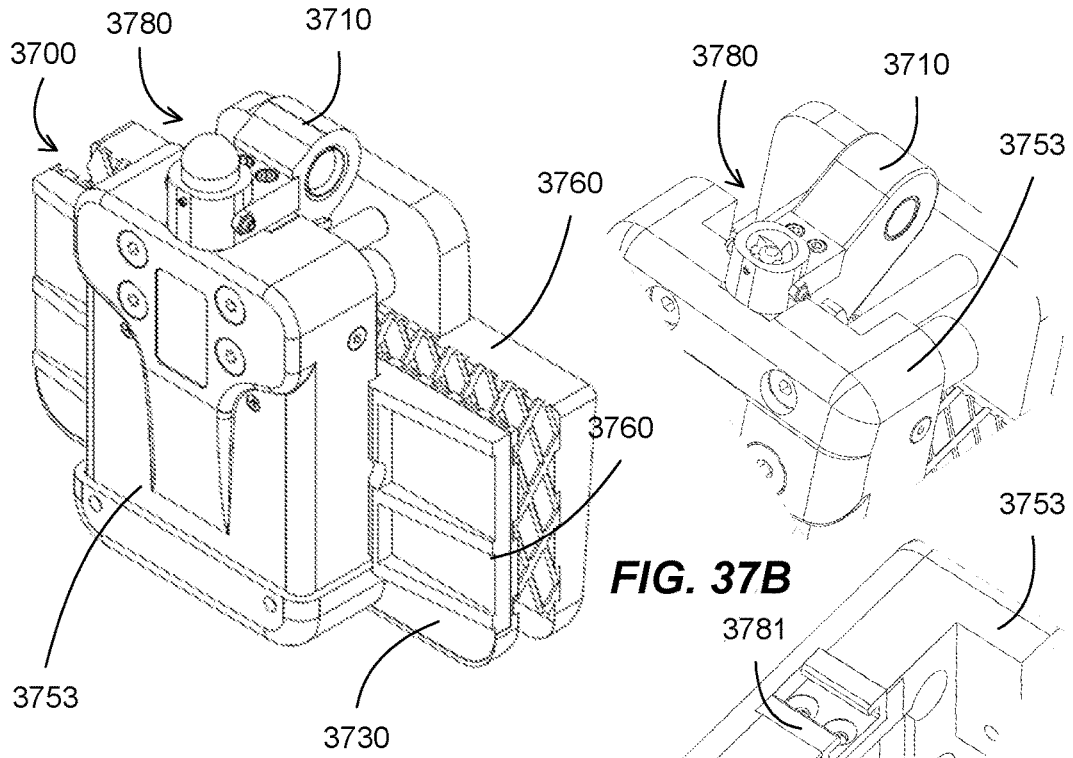
FIG. 37A
FIG. 37B
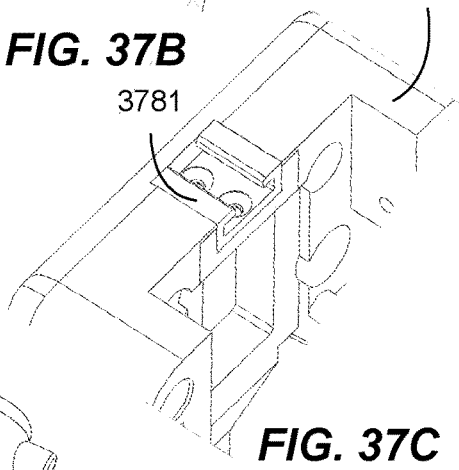
FIG. 37C
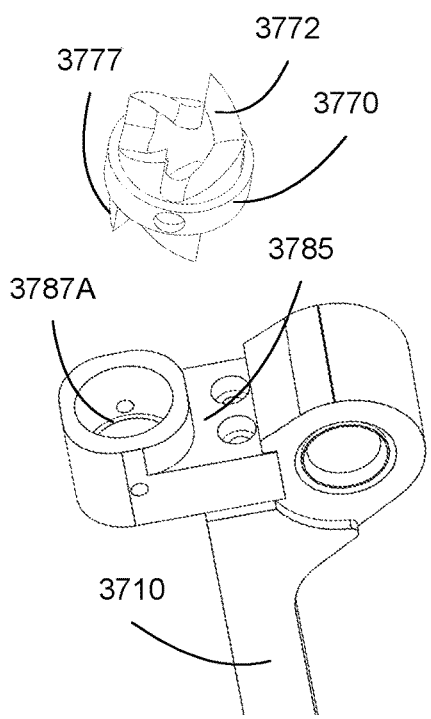
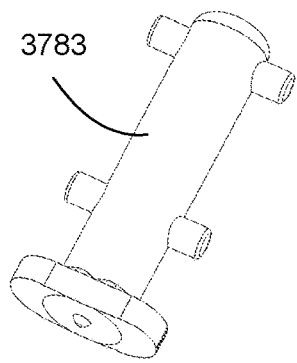
FIG. 37E
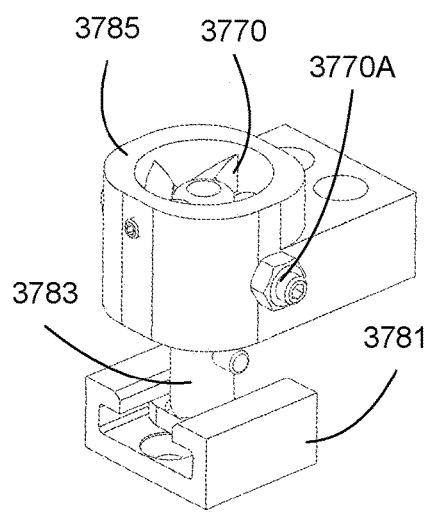
FIG. 37D
FIG. 37F

Forming a clamping device, a first jaw having a first clamping area having a first width; a set of clamp bars; a jaw support having a second width, wherein the first jaw and the jaw support are coupled to the set of clamp bars at both ends of the set of clamp bars, wherein the set of clamp bars is coupled to the first jaw at an area outside the first clamping area, wherein the first width is larger than the second width, such as at least 2X larger, or between 2X and 4X larger, wherein the jaw support comprises a shell body having a flat surface portion along a length of the jaw support; a second jaw having a second clamping area disposed between the jaw support and the first jaw, wherein the second clamping area is similar to the first clamping area, wherein the second jaw comprises two protruded portions each having a slanting surface, wherein the second jaw is coupled to the jaw support through a set of springs, wherein the set of springs is biased to pull the second jaw toward the jaw support; a pulling element disposed between the jaw support and the second jaw, wherein the pulling element comprises a first roller for rolling against the jaw support, such as rolling on the flat surface portion of a shell jaw support, wherein the pulling element comprises two second rollers on two sides of the first roller for rolling on the slanting surfaces of the protruded portions, wherein the slanting surfaces are configured so that when the pulling element moves in a direction from the first and second rollers toward the set of clamp bars, the second jaw moves toward the first jaw, wherein the pulling element is disposed between the two protruded portions for restricting side movements of the pulling element, wherein the pulling element is disposed between the set of clamp bars for restricting the side movements of the pulling element; a locking mechanism, wherein the locking mechanism comprises a first portion coupled to the pulling element, wherein the locking mechanism comprises a second portion coupled to the jaw support, wherein the second portion comprises a receptacle, wherein the first portion comprises a rod having a hook end, wherein the hook end and the receptacle are configured to be rotatably toggled between an unlocked configuration in which the hook end is separable from the receptacle and a locked configuration in which the hook end is not separable from the receptacle, wherein in the unlocked configuration, the pulling element is separable from the jaw support for moving the movable jaw, wherein in the locked configuration, the pulling element is not separatable from the jaw support for keeping the movable jaw from moving to clamp on a panel or to contact the first jaw, wherein the locking mechanism is configured so that the locking mechanism is toggled between the locked and unlocked configurations when an operator moving the clamping device down and up

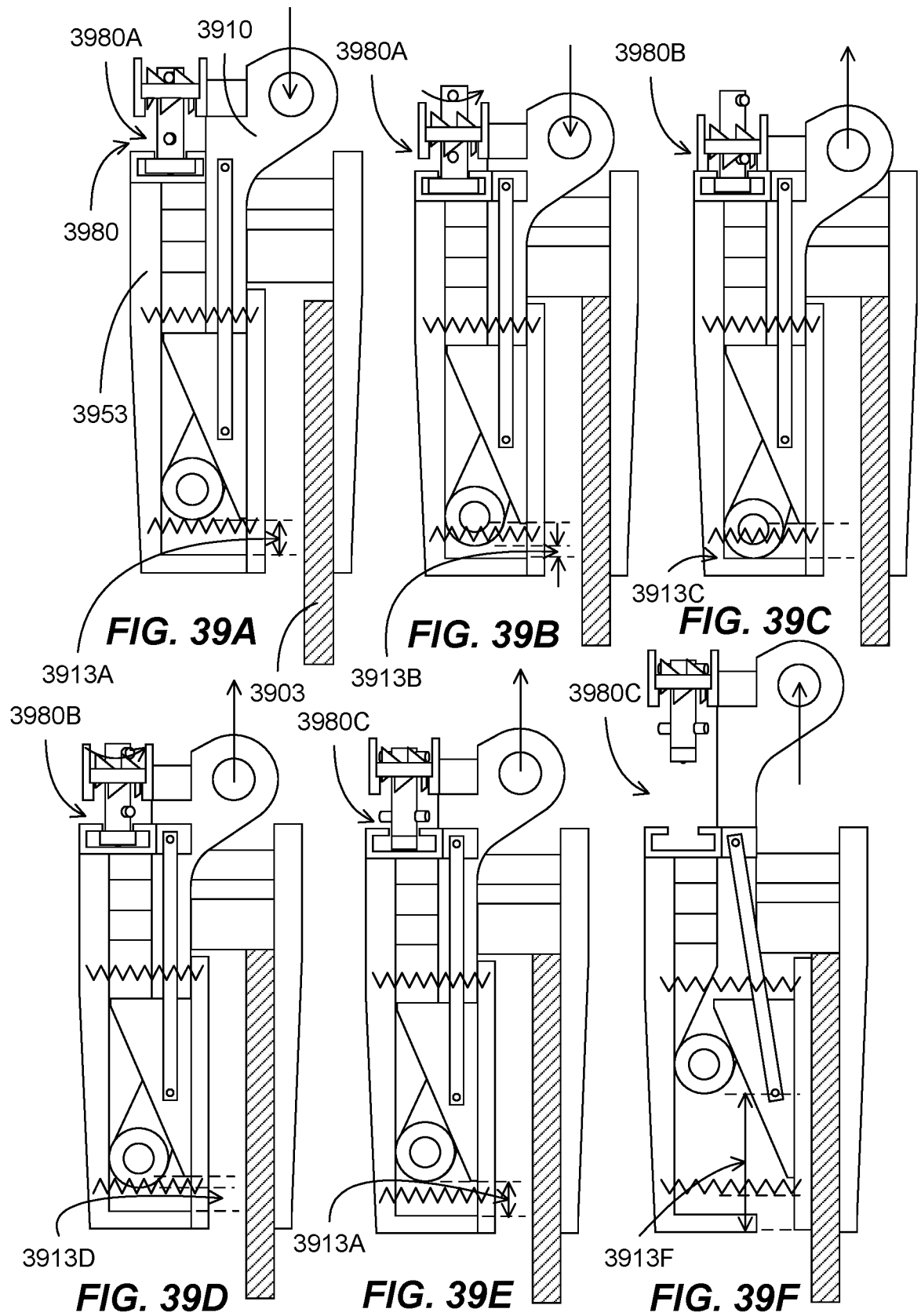

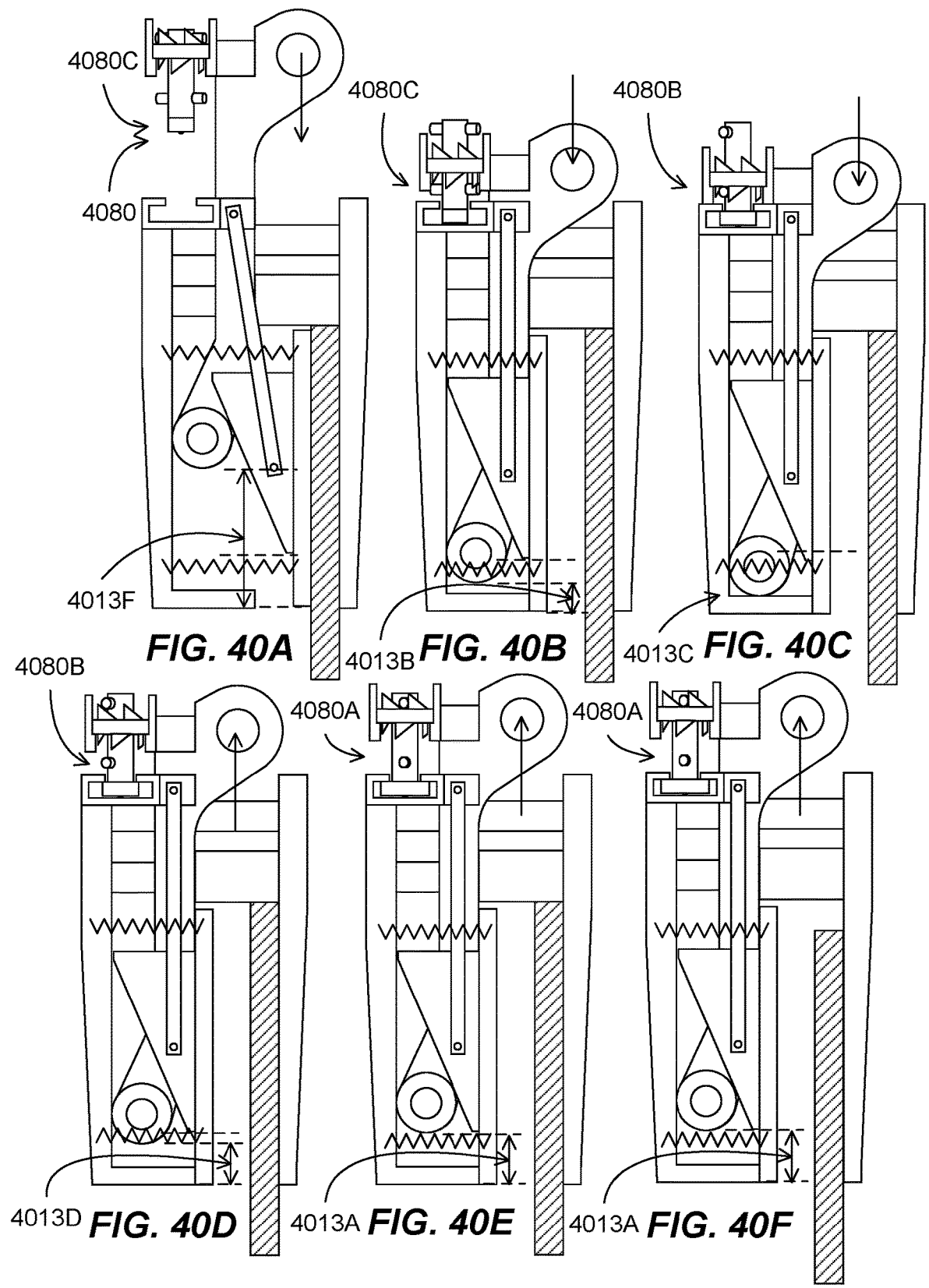

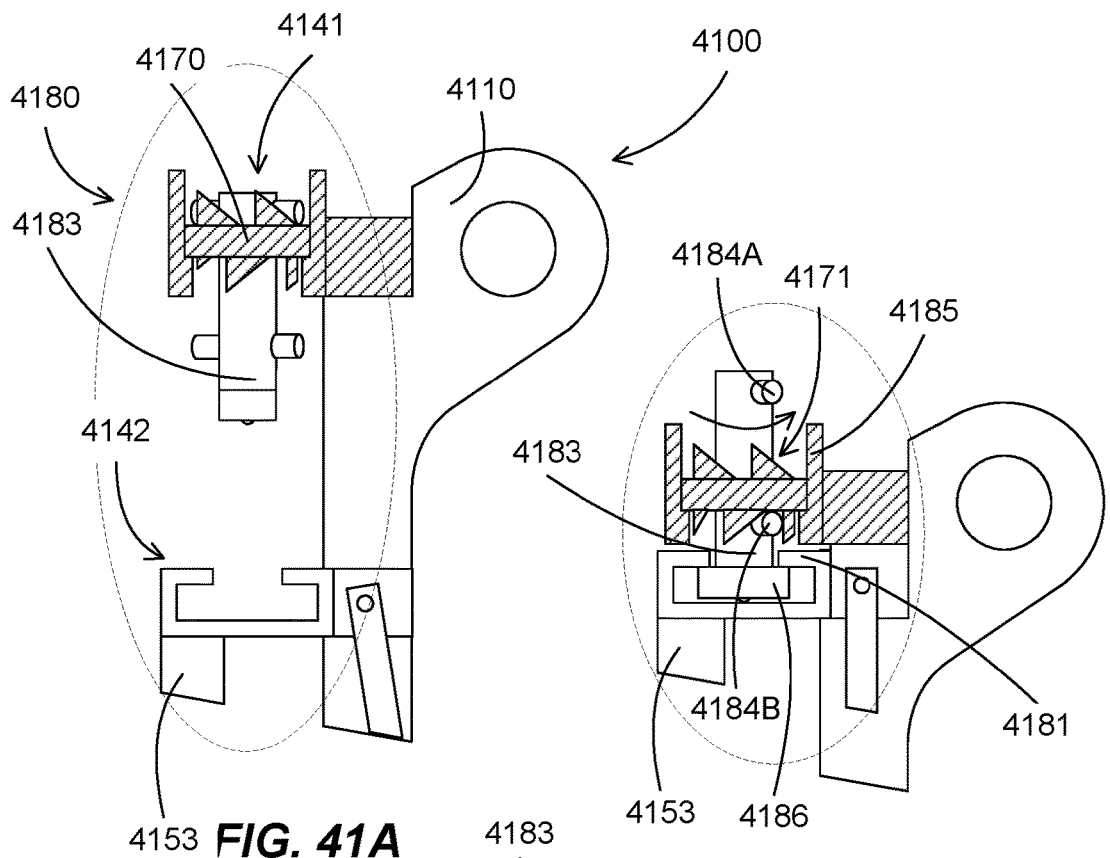
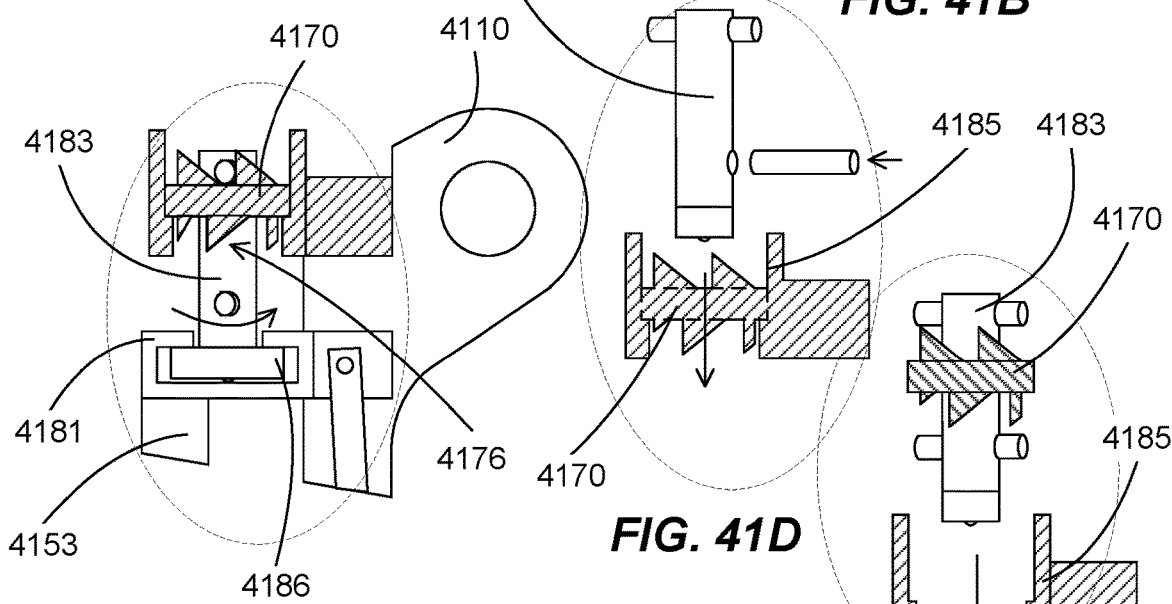
FIG. 41A  FIG. 41B  FIG. 41C  FIG. 41D  FIG. 41E

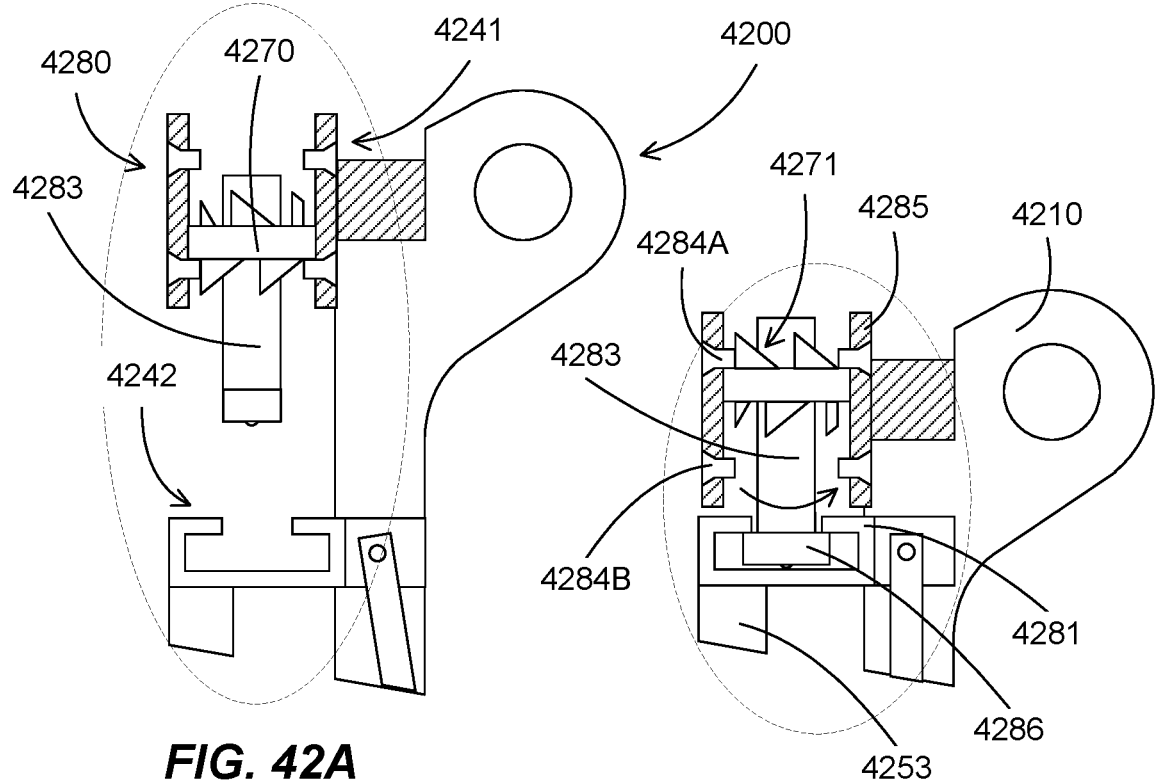
FIG. 42A
FIG. 42B
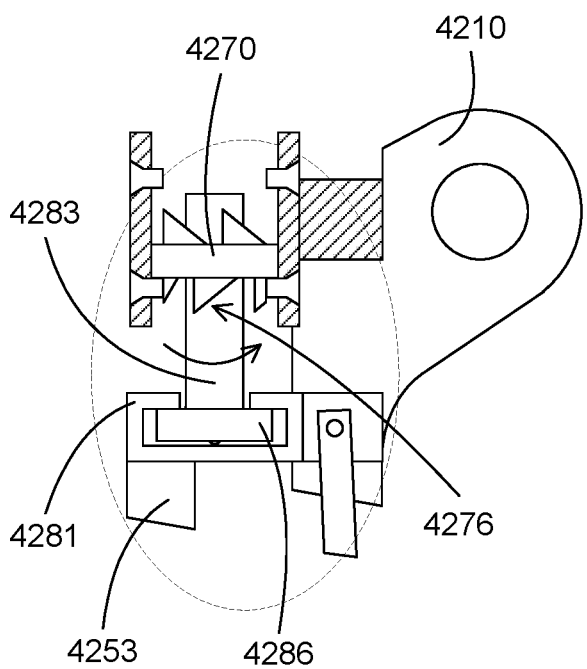
FIG. 42C
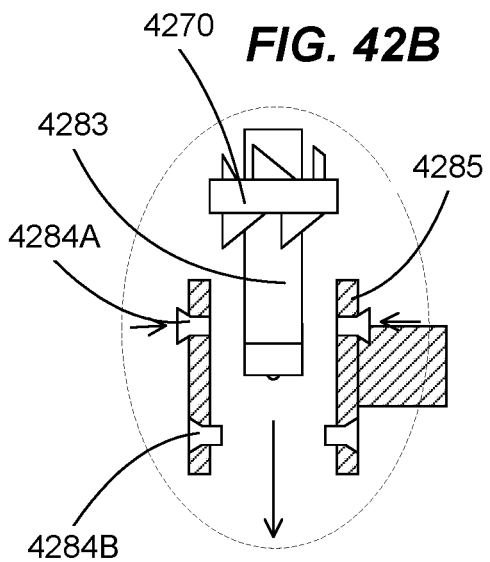
FIG. 42D

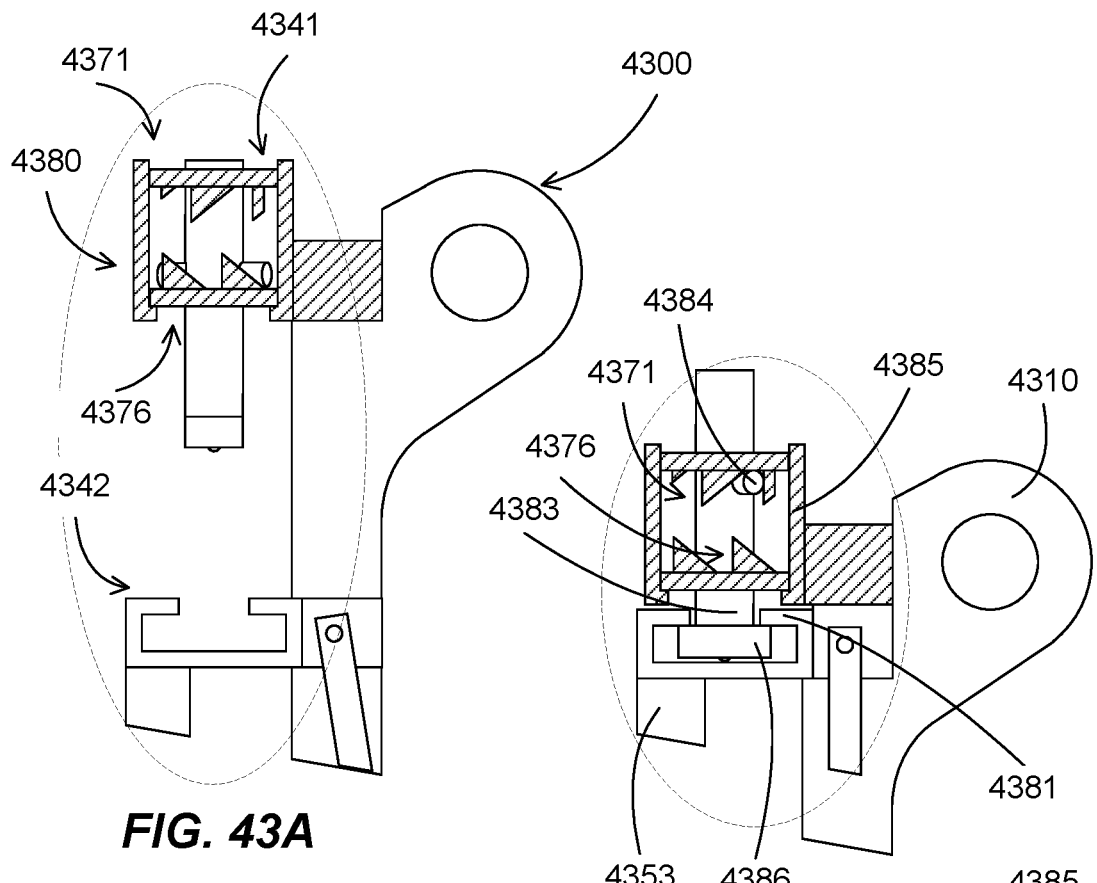
FIG. 43A
FIG. 43B
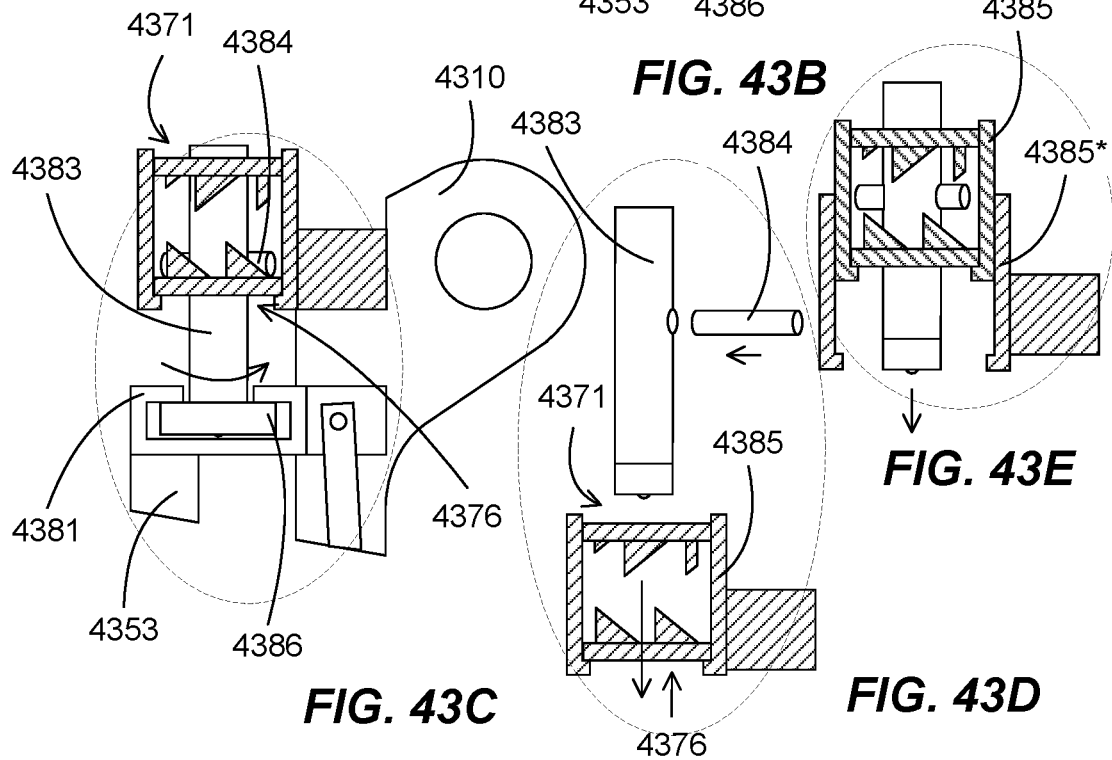
FIG. 43C
FIG. 43D
FIG. 43E

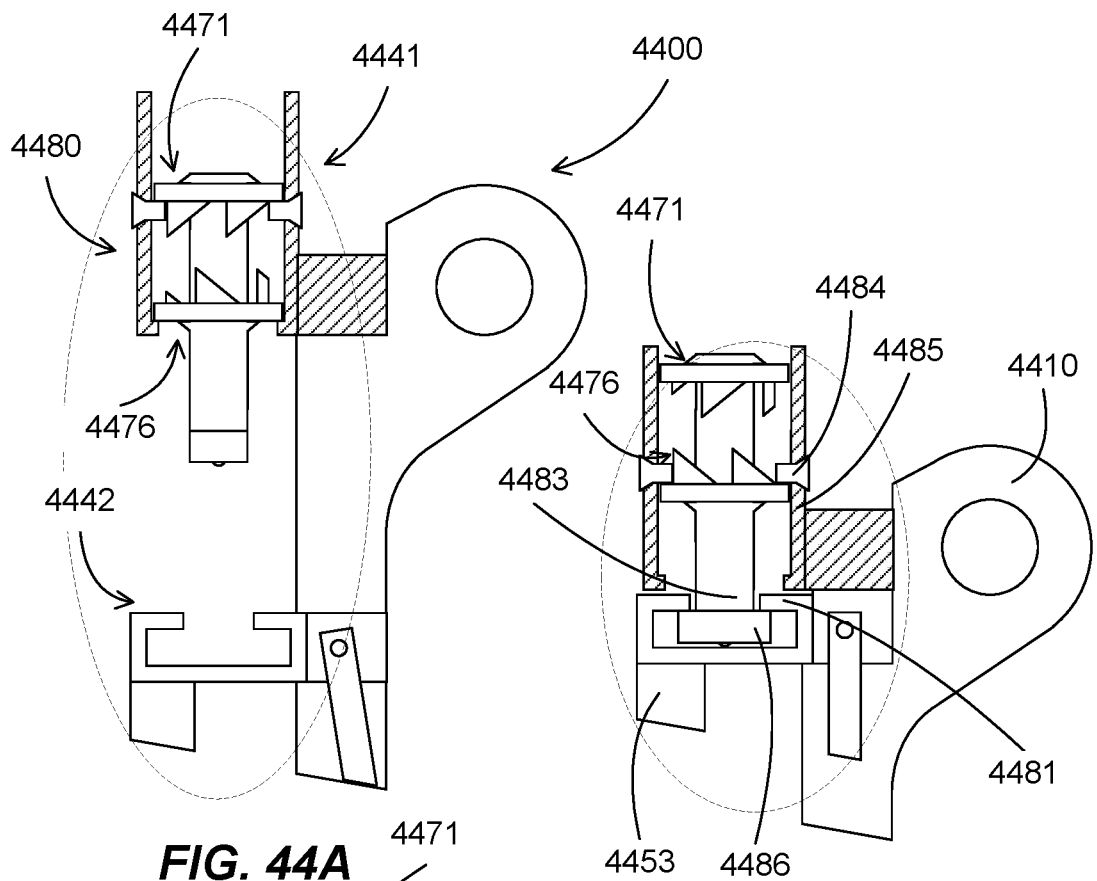
FIG. 44A
FIG. 44B
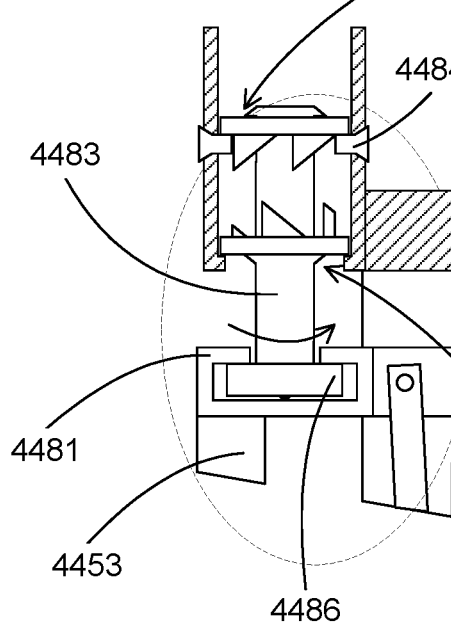
FIG. 44C
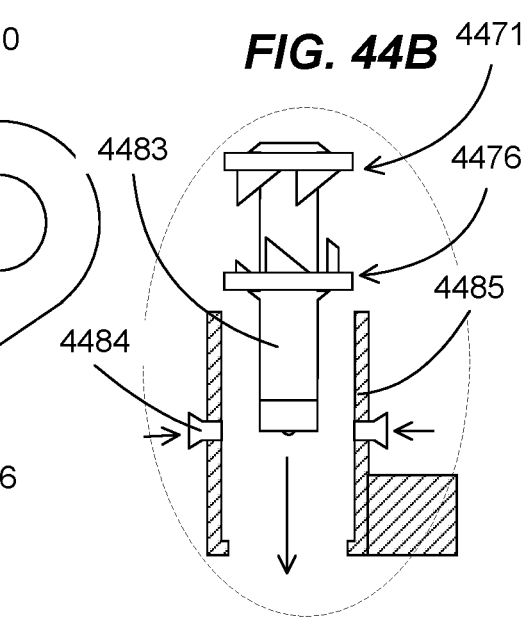
FIG. 44D

CLAMPING DEVICE FOR LIFTING AND TRANSFER OBJECTS

The present patent application claims priority from U.S. Provisional Patent Applicant Ser. No. 63/069,276, filed on Aug. 24, 2020, entitled "Clamping device for lifting and transfer objects", of the same inventors, hereby incorporated by reference in its entirety.

The present patent application is a continuation-in-part of U.S. patent application Ser. No. 17/201,474, filed on Mar. 15, 2021, entitled "Automatic locking mechanism and clamping devices with automatic locking mechanism", which is a continuation-in-part of U.S. patent application Ser. No. 16/876,480, filed on May 18, 2020, entitled "Automatic locking mechanism and clamping devices with automatic locking mechanism", which is a continuation of U.S. patent application Ser. No. 16/381,378, filed on Apr. 11, 2019, entitled "Automatic locking mechanism and clamping devices with automatic locking mechanism", now U.S. Pat. No. 10,654,690, which claims priority from U.S. Provisional Patent Applicant Ser. No. 62/692,676, filed on Jun. 30, 2018, entitled "Automatic locking mechanism and clamping devices with automatic locking mechanism", of the same inventors, hereby incorporated by reference in their entirety.

The present invention relates to U.S. patent application Ser. No. 15/438,735, filed on Feb. 21, 2017, entitled "Clamping device for lifting and transfer objects", now U.S. Pat. No. 9,902,574 (NH001), of the same inventors, hereby incorporated by reference in its entirety.

The present invention relates to U.S. patent application Ser. No. 16/154,734, filed on Oct. 9, 2018, entitled "Clamping device with single movable jaw", now U.S. Pat. No. 10,633,224 (NH006), which claims priority from U.S. Provisional Patent Application Ser. No. 62/570,108, filed on Oct. 10, 2017, entitled "Scissor clamp with single movable jaw" (NH006-PRO), of the same inventors, hereby incorporated by reference in their entirety.

The present invention relates to U.S. patent application Ser. No. 16/593,716, filed on Oct. 4, 2019, entitled "Auto lock cable lifter" (NH012), which claims priority from U.S. Provisional Patent Application Ser. No. 62/741,555, filed on Oct. 5, 2018, entitled "Auto lock cable lifter" (NH012-PRO), of the same inventors, hereby incorporated by reference in their entirety.

The present invention relates to U.S. patent application Ser. No. 11/074,317, filed on Mar. 7, 2005, entitled "Clamping device for lifting slab, panel, or sheet material", now U.S. Pat. No. 7,156,436 (NH013), of the same inventors, hereby incorporated by reference in its entirety.

The present invention relates to U.S. Provisional Patent Application Ser. No. 63/022,724, filed on May 11, 2020, entitled "Clamping device for lifting and transfer objects", (NH029-PRO), of the same inventors, hereby incorporated by reference in its entirety.

The present invention relates to lifting devices. More particularly, it relates to clamping devices for lifting and transferring objects such as metal or ceramic plates.

BACKGROUND OF THE INVENTION

In the heavy industry, large and heavy products can be difficult to handle manually. Thus, a hoist connecting to a clamping device can be used to lift and move heavy objects. An object can be clamped to a clamping device that is coupled to a hoist. The hoist can lift the object to a certain height, and then transfer to a proper location.

The clamping devices can utilize a mechanism that converts the weight of the object into a clamping force, thus the holding force on the object exerted by the clamping devices can be proportional to the weight of the object. A loading and unloading device, such as a crane or a hoist, can be coupled to the clamping device for lifting and transferring the objects.

A basic prior art clamping device can include a rotatable clamping jaw, which can rotate to change a spacing distance to a fixed clamping jaw. Rotation of the rotatable clamping jaw can enlarge or narrow the distance between the two clamp jaws. For example, an object can be placed between the two jaws from a bottom position, and the pushed upward toward the gap between the two jaws. The upward motion of the object can cause a clockwise rotation of the rotatable clamping jaw, which can make the distance between the two jaws larger, to accommodate an object. After the object is placed between the two jaws, the weight of the object can cause the object to move downward. The downward motion of the object can cause a counterclockwise rotation of the rotatable clamping jaw, which can narrow the distance between the two jaws, or to exert a clamping force on the object.

FIGS. 1A and 1B illustrate a prior art clamping device according to some embodiments. The clamping device can include a gripping device normally fabricated from structural steel components, that are designed to securely hold and lift construction materials though a scissor movement. The gripping device can use freely rotating pin connections to create a scissor configuration with two scissor arms.

A first end of the scissor arms is configured to rotate towards each other in reaction to the opposite second end of the scissor arms being lifted vertically. The first end of the scissor arms rotate inwards and generate a compression force clamping on the object to be lifted. Essentially, the weight of the object is used to generate this clamping action.

A clamping device 100 can include two scissor arms 130 and 135, which can freely rotate about a pivot point 130A. The scissor arms 130 and 135 can include upper arms 131 and 136, together with lower arms 132 and 137, respectively, connected at the freely rotating pivot 130A.

The upper arms 131 and 136 can be coupled to pulling elements 111 and 115, respectively. The coupling between the upper arms and the pulling elements can include freely rotating pin connections, e.g., the pulling element 111 and 115 can be rotated relative to the upper arm 131 and 136. The pulling elements 111 and 115 can be coupled to a lift 110, such as a hoist. The coupling between the pulling elements and the lift can include freely rotating pin connections, e.g., the pulling elements 111 and 115 can be rotated relative to the lift 140.

The lower arms 132 and 137 can be coupled to left and right clamps, e.g., holding pads for holding the object, 140 and 145, respectively. The coupling between the lower arms and the holding pads can include freely rotating pin connections, e.g., the holding pads 140 and 145 can be rotated relative to the lower arm 132 and 137.

In operation, an object 120 is placed between the holding pads 140 and 145. The lift 110 is pulled up, which pulls on the pulling elements 111 and 115. The pulling elements 111 and 115 can in turn pull on the upper arms 131 and 136. The scissor movement between the upper arms 131 and 136 and the lower arms 132 and 137 around the pivot point 130A can turn the pulling action on the upper arm 131 and 136 into a pressing action of the lower arm 132 and 137, which presses on the object 120 through the holding pads 140 and 145.

As shown in FIG. 1A, the clamping device 100 operates well to hold the object 120 for lifting and then moving to new location. The weight of the object can be converted to a gripping force from the holding pads for securing the object.

Disadvantages of the clamping devices can include weak handling operations, such as requiring multiple operators for handling. For example, when the empty gripper device is pulled up, the holding pads are pressed together (FIG. 1B). Thus when the empty gripper is lowered to approach the object, another operator might be needed to manually separate the holding pads to place the object between the holding pads.

In the industry, large products, even light weight, can be difficult to handle manually. Thus, a hoist connecting to a clamping device can be used to lift and move large objects. An object can be clamped to a clamping device that is coupled to a hoist. The hoist can lift the object to a certain height, and then transfer to a proper location.

In general, there is a need for a compact clamping device to handle light weight and large panels.

SUMMARY OF THE EMBODIMENTS

In some embodiments, the present invention discloses a clamping device for large, thin and fragile panels. The clamping device can include two opposing jaws configured for clamping on a panel having a width parallel to the ground, a height in the direction of gravity and a thickness. The opposing jaws can include a fixed jaw fixedly coupled to a body of the clamping device and a movable jaw movable relative to the body. The body can include a jaw support, which is fixedly coupled to a set of clamp bars, with the other ends of the set of clamp bars fixedly coupled to the fixed jaw.

The clamping device can include a clamping mechanism for moving the movable jaw, toward or away from the fixed jaw. The clamping mechanism can include a pulling element, disposed between the jaw support and the movable jaw. The interface between the pulling element and either the jaw support or the movable jaw can include a slanting surface, which is configured to move the movable jaw away from the jaw support when the pulling element is moving away from the jaw support, such as when the pulling element moves up relative to the jaw support. The clamping mechanism can include a set of springs, which is coupled between the jaw support and the movable jaw. The set of springs can be biased to pull the movable jaw toward the jaw support.

Thus, the clamping mechanism can move the movable jaw toward the fixed jaw by moving the pulling element up relative to the jaw support, such as in the opposite direction of gravity. When the pulling element moves down, such as in the direction of gravity, the set of springs can pull the movable jaw toward the jaw support.

In some embodiments, the clamping device can have a large clamping surface for reducing the pressure exerted on the clamped panel. The clamping device can be light weight, for ease of handling without damaging the fragile panels. The clamping device can include an autolock mechanism, which can allow a worker to operate the clamping device from a distance, such as at a hoist handle coupled to the clamping device.

In some embodiments, the large clamping area can be formed by having larger jaws, such as wider and/or taller jaws, e.g., in one or two dimensions of the lateral surface of the panel. For example, the jaws can be wide, e.g., in a direction parallel to the ground when the panel is clamped in the clamping device. In some embodiments, the jaws can be tall, e.g., in a direction of gravity.

The fixed jaw can include a coupling portion separate from the clamping portion having the clamping area. The coupling portion can be used for coupling with the set of clamp bars. The movable jaw can include only the clamping portion having the clamping area, with the set of spring coupled to the movable jaw at an opposite surface of the clamping area. The movable jaw can also include protruded portions to provide slanting surfaces for the pulling element.

In some embodiments, the light weight configuration can include a clamping device configured to handle thin panels, e.g., the maximum separation between the clamp jaws of the clamping device can be small, such as less than 200 mm, less than 150 mm, less than 100 mm, or less than 50 mm. The small maximum separation of the clamp jaws in the clamping device can shorten the set of clamp bars, which can make the clamping device more compact and light weight.

The light weight configuration can include a set of small clamp bars, such as four small clamp bars disposed to secure the fixed jaw with the jaw support.

The light weight configuration can include a small size of the clamping mechanism, e.g., smaller than the clamping surface of the clamp jaws. For example, the width of the pulling element can be about the separation of the protruded portions of the movable jaw, so that the pulling element can roll on the slanting surfaces of the protruded portions. Thus, the pulling element can be configured to push only on a middle portion of the clamping area of the movable jaw, with the middle portion defined by the protruded portions having a width less than one third, less than one fourth, or less than one fifth of the width of the clamping area.

The springs can be disposed near each other to form a small clamping mechanism. For example, the springs can be disposed just outside of the pulling element, such as near the protruded portions, e.g., the separation of the springs in the width direction can be slightly larger than the separation of the protruded portions.

With the small clamping mechanism, the jaws can have a thin plate, reinforced with ridges to provide strength to the portions of the jaws outside the area that the pulling element pushes on the movable jaw or outside of the area that the springs pulling on the movable jaw.

The light weight configuration can include using elements of the clamping device with multiple functions. For example, the pulling element and the protruded portions on the movable jaw can be configured so that the protruded portions can function as a guide for the pulling element. Thus, the pulling element can move in the space between the protruded portions, while having two rollers rolling on the slanting surfaces of the protruded portions.

The pulling element can also be disposed between the set of clamp bars. The set of clamp bars can assist the protruded portions to restrict the movements of the pulling element, e.g., preventing the pulling element from rotating around the protruded portions, and thus restricting the pulling element to move in a straight line.

Further, some or all of the clamp bars can have an enlarged portion, which can form an enclosure around the cross sectional area of the pulling element, which can limit the movements of the pulling element in a direction toward or away from the clamping surfaces.

The light weight configuration can include a small and hollow jaw support. The jaw support can be configured to house the clamping mechanism, such as to house the pulling element and the set of springs. Thus, the jaw support can be small, e.g., just slightly larger than the pulling element, e.g., larger than the body of the pulling element together with the rollers at the end of the pulling element body. For example, the jaw support can be about one third of the clamping surface, and can be disposed in the middle of the clamping surface, in order for the clamping mechanism to exert even forces on the clamping surface.

The jaw support can be hollow, e.g., having a thin shell configuration to reduce weight. The thin shell configuration can provide a roller surface at the back of the jaw support for the pulling element to roll against. The hollow jaw support can have reinforced features and additional hollow portions to minimize the weight while providing adequate strength for supporting the clamping mechanism.

In some embodiments, the autolock configuration can automatically keep the jaws separate, for example, when the clamping device is ready to release the panel or when the clamping device is ready to pick up another panel. The automatic operation means that the clamping device can toggle between the state of keeping the jaws separate and the state of clamping the jaws without the presence of a worker at or near the clamping device.

The autolock configuration can include a lock mechanism for the clamping mechanism of the clamping device. For example, the autolock mechanism can include a first locking component, such as a receptacle, coupled to a body of the clamping device, such as to the jaw support. The autolock mechanism can include a second locking component, such as a hook matable to the receptacle, coupled to a moving component of the clamping mechanism, such as to the pulling element. When the lock is engaged, e.g., the hook is hooked with the receptacle, the pulling element is fixedly coupled to the jaw support, which can disable the clamping mechanism, e.g., without the movements of the pulling element, the movable jaw is stationary. When the lock is disengaged, e.g., the hook is released from the receptacle, the pulling element is movable relative to the jaw support, which can enable the clamping mechanism, e.g., the movements of the pulling element can move the movable jaw toward the fixed jaw for clamping on the panel.

The hook can be a rotatable rod, having a hook end that can be hooked with the receptacle in a hooked rotation angle. The hook end can be configured to be releasable from the receptacle in an unhooked rotation angle.

The rotatable rod can include one or more pins interfacing with rotatable slanting surfaces. The interfaces can be configured so that when the rod moves in one direction, such as upward, the pins contact the rotatable slanting surface to rotate the rod. When the rod moves in an opposite direction, such as downward, the pins contact the rotatable slanting surface to further rotate the rod. The combination of the rotation of the rod causes the rod to toggle between the hooked and unhooked rotation angle. Thus, by moving the clamping device up and down, the locking mechanism can toggle between the states of engaged and disengaged, which can make the jaws of the clamping device stationary or moving together to clamp on the panel.

To accommodate the autolock mechanism, there can be a backlash, e.g., a maximum separation distance between the bottom of the rollers and the top surface of the jaw support. The pulling element can move within the maximum separation distance without moving the movable jaw. The maximum separation distance can be at least the vertical distance between the two pins on the rod, minus the vertical distance between the two valleys of the top and bottom slanting surfaces. The maximum distance can at least accommodate the movement of the rod, so that the top pin moves from the valley of the top slanting surface until the bottom pin reaches the valley of the bottom slanting surface.

BRIEF DESCRIPTION OF THE DRAWINGS

FIGS. 1A-1B illustrate a prior art clamping device according to some embodiments.

FIGS. 2A and 2B illustrate operations of a clamping device having an automatic locking mechanism according to some embodiments.

FIGS. 5A-5B illustrate schematic configurations for a locking mechanism or assembly according to some embodiments.

FIGS. 7A-7L illustrate a toggle process from a locked state to an unlocked state according to some embodiments.

FIGS. 8A-8D illustrate optimized configurations for the locking assembly according to some embodiments.

FIGS. 10A-10C illustrate a toggle process from an unlocked state to a locked state according to some embodiments.

FIGS. 11A-11C illustrate a toggle process from a locked state to an unlocked state according to some embodiments.

FIGS. 12A-12D illustrate optimized configurations for the locking assembly according to some embodiments.

FIGS. 14A-14D illustrate a toggling configuration of the locking mechanism according to some embodiments.

FIGS. 16A-16C illustrate flow charts for operating a locking mechanism according to some embodiments.

FIGS. 17A-17B illustrate flow charts for operating a locking mechanism according to some embodiments.

FIG. 20A—20B illustrate a clamping device according to some embodiments.

FIGS. 25A-25F illustrate another clamping device configuration according to some embodiments.

FIGS. 27A-27D illustrate a clamping device according to some embodiments.

FIGS. 37A-37F illustrate another clamping device configuration according to some embodiments.

FIG. 38 illustrates a configuration for a clamping device according to some embodiments.

FIGS. 39A-39F illustrate a clamping operation of a clamping device according to some embodiments.

FIGS. 40A-40F illustrate a release operation of a clamping device according to some embodiments.

FIGS. 41A-41E illustrate a release operation of a clamping device according to some embodiments.

FIGS. 42A-42D illustrate a release operation of a clamping device according to some embodiments.

FIGS. 43A-43E illustrate a release operation of a clamping device according to some embodiments.

FIGS. 44A-44D illustrate a release operation of a clamping device according to some embodiments.

DETAILED DESCRIPTION OF THE EMBODIMENTS

Figure 3A:
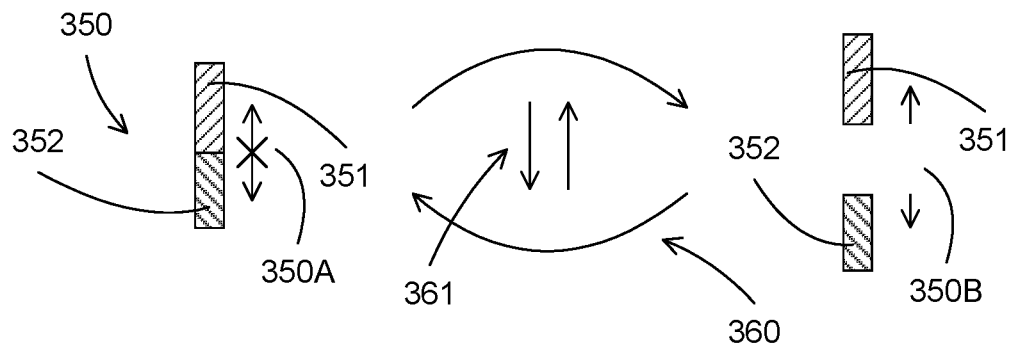
FIGS. 3A-3C illustrate a schematic of a locking mechanism according to some embodiments.

In some embodiments, the present invention discloses an automatic locking mechanism, and clamping devices incorporating the automatic locking mechanism. The automatic locking mechanism can use the up and down movements of the clamping device, e.g., the lowering action and the raising action of a hoist on the clamping device, to toggle the jaws between a locked state in which the jaws are fixedly separated and an unlocked state in which the jaws can move to clamp on an object. The automatic locking mechanism can allow the clamping device to approach an object with the jaws separated for placing the object between the jaws. The automatic locking mechanism can allow the clamping device to keep the jaws separated for leaving the object on the ground when the clamping device is lifted up.

The automatic locking mechanism can employ slanting surfaces, to convert the up and down movements into a rotational movement. The rotational movement can toggle a latch between locked and unlocked states, for example, by a hook end mating with a hook receptacle.

The automatic locking mechanism can include one or more annular elements having teeth facing each other or facing away from each other. The arrangement of the teeth can be cyclic, with each tooth having a curve slanting surface such as a helical surface, followed by an abrupt surface after reaching a peak of the tooth. At the bottom of the abrupt surface, there can be a valley point, which can be the starting point for the next helical surface, e.g., the helical surface of the adjacent tooth.

The automatic locking mechanism can include a rod disposed between the annular elements. The rod can have one or more pins configured to interface with the teeth of the annular elements. When the annular elements move toward the pins, the pins can contact the helical surfaces and then move along the helical surface to rest on the valley point. The moving of the pins along the helical surfaces can rotate the rod, which can toggle the hook end of the rod in a hook receptacle, which can change states of the locking mechanism.

In some embodiments, the automatic locking mechanism can be optimized, for example, having a support element to support the annular elements in a pulling away movement of the annular elements relative to the rod. Other optimizations can include angling the teeth to achieve between 40 and 50 degree helical surface, for high rotational force with low backlash distance. The optimizations can include spacing the annular elements with a pin disposed in between, or spacing the pins sandwiching the annular elements, to minimize the backlash distance. The teeth can be chamfer to prevent catching the pins, and to further minimized the backlash distance.

The automatic locking mechanism can be used in clamping devices using scissor mechanisms, in clamping devices using half scissor mechanisms, in clamping devices using slanting surface mechanisms, and in clamping devices using rotational mechanisms.

In some embodiments, the present invention discloses an automatic locking mechanism, and clamping devices incorporating the automatic locking mechanism. A typical clamping device can operate on force conversion principle, e.g., converting a pulling force on the clamping device into a side force of the jaws for clamping on the object. In other words, there is a linkage between the vertical pulling force for lifting the clamping device and the horizontal force pushing the jaws together. Thus, when the clamping device is pulled up, the linkage can cause the jaws to clamp on the object, securing the object between the jaws for lifting and moving.

However, when the clamping device is empty, e.g., not clamping on an object, pulling the clamping device also activates the linkage to move the jaws together. Without the object, the jaws can be moved together until the distance between the jaws becomes a minimum distance, e.g., the jaws cannot move any closer. This can cause difficulties for an empty clamping device to capture an object, e.g., additional action is needed to separate the jaws before the object can be placed between the jaws.

An automatic locking mechanism can include a mechanism for disengaging the linkage, e.g., locking the linkage so that the jaws of the clamping device can remain stationary when the clamping device is lifted. Thus, when the locking mechanism is engaged, the linkage mechanism is disengaged. The linkage disengagement can be automatic, e.g., activated when the clamping device moves down and up for picking and lifting the object. Thus the automatic locking mechanism can toggle the engagement and disengagement of the linkage during the operation of lifting and releasing the object.

For example, the automatic locking mechanism can be engaged (or the linkage is disengaged) when the clamping device is empty, e.g., without clamping on an object. In this locked status, the jaws remain open, e.g., separated, even when the clamping device is lifted up.

When the clamping device contact an object, the automatic locking mechanism is automatically toggled from the locked status to an unlock status to release the linkage mechanism. In this unlocked status, the jaws move toward each other when the clamping device is lifted up.

In some embodiments, the present invention discloses an automatic locking mechanism that can activate or deactivate a linkage between the pulling action and the side movements of the jaws. When the linkage is deactivated, the pulling element can lift the clamping device without moving the jaws. When the linkage is activated, lifting the pulling element can move the jaws toward each other.

In some embodiments, the deactivation of the linkage can be performed by immobilizing a movable element of the linkage, for example, when the clamping device, after bringing an object to the destination, is ready to leave. Thus when the jaws are opened at a maximum distance, the movable element of the linkage is immobilized, disconnecting the linkage between the pulling element and the jaws, which can keep the jaws widely separated even when the clamping device is lifted up.

The linkage can be re-activated when the clamping device, with the jaws separated at a maximum distance, is positioned so that a new object is between the jaws. Thus, when the clamping device is pulled up, for example, by pulling on the pulling element, the jaws move to clamp on the object.

In some embodiments, the activation and deactivation of the linkage can be performed automatically, for example, when a clamping device carrying the object has finished delivering the object, and when the empty clamping device contacts the object for clamping.

In some embodiments, the activation and deactivation of the linkage can be provided by a locking assembly, which can toggle the linkage between being activated and deactivated, for example, through an automatic locking mechanism.

In some embodiments, the present invention discloses a clamping device incorporating the automatic locking mechanism. The clamping device can be used for lifting and/or transferring objects, such as metal, granite, ceramic, glass, quartz, or concrete plates.

The clamping device can include a pulling element, which can be configured to be coupled to a hoist for moving the clamping device up and down. The clamping device can include a jaw assembly that has two opposite jaws. The jaw assembly can be configured for clamping on an object. The clamping device can include a linkage mechanism between the pulling element and the jaw assembly. The linkage mechanism can be configured so that when the pulling element moves up, the jaws move toward each other for clamping on the object.

The automatic locking mechanism can prevent the jaws from moving toward each other when the clamping device is lifted up. The locking mechanism can allow the jaws to remain open when desired, even during the lifting and moving of the clamping device. Normally, the clamping device is configured so that when one end of the clamping arm is pulled up, the jaws of the clamping device will clamp on the object. Thus when the empty clamping device is lifted up, the jaws are clamped together. This can be detrimental, since the clamped jaws will need to be open to accept the object. The locking mechanism can force the jaws open when there is no clamped object. Thus the empty clamping device with the open jaws can be lifted up and moved to the location of the object, at which the open jaws can accept the object. The mechanism is then released, and the jaws can be clamped together when lifted up to hold the object for moving.

The locking mechanism can secure the top arm portion, e.g., to prevent the top arm portion from moving up/down or sideways. For example, the top arm portion can be locked to the pivotal point between the top arm portion and the bottom arm portion, or to any element fixedly coupled to the pivotal point. The top arm portion can be locked to an intermediate pivot within the top arm portion.

In some embodiments, the locking mechanism, e.g., the mechanism that can lock the jaws into the open state until being released, can include a mechanism that couples a hoist portion of the clamping device, e.g., the portion of the clamping device that is coupled to a hoist for pulling the clamping device, with a fixed component such as the fixed jaws or a pivot bar connecting the pivot points of the scissor mechanisms. Thus, the mechanism can be configured so that if being locked, the hoist portion can move together with the pivot points, so that the scissor mechanisms cannot function. In this configuration, the hoist portion is then decoupled from the scissor mechanisms, and thus when lifted up, the jaws remain open. If the mechanism is released, the hoist portion can be separated from the pivot points, so that the scissor mechanisms can function, e.g., clamping on the object. In this configuration, the hoist portion is then coupled to the scissor mechanisms, and thus when lifted up, the jaws can clamp on the object.

The locking mechanism can be automatic, meaning the mechanism can be locked or engaged, e.g., locking the jaws to keep the jaws separated, or unlocked or disengaged, e.g., unlocking the jaws to allow the jaws to move toward each other. The automatic mechanism can be triggered or activated when the clamping device touches the object, and can be toggled between engaging and disengaging the lock. For example, the locking mechanism can be engaged, meaning the jaws can be widely separated and prevented from moving toward each other when the clamping device is lifted up. The clamping device can be lowered toward the object, and after touching the object, the locking mechanism can be disengaged, meaning the jaws can move toward each other when the clamping device is lifted up. The clamping device can be lifted up, which moves the jaws together to clamp on the object. The clamping device can move to a new location. The clamping device can lower the object. When the object reaches the ground, the clamping device can lower further to touch the object, to trigger or activate the locking mechanism to change the state of the locking mechanism. The locking mechanism then can be engaged, meaning the jaws can be widely separated and prevented from moving toward each other when the clamping device is lifted up. The clamping device can then move up to move another object. Since the locking mechanism is engaged, the clamping device can lift up without moving the jaws.

The locking mechanism can be a hand-free or operator-free mechanism, which can allow switching between a clamping action of the jaws for clamping the object and non-clamping action of the jaws for inserting the object. The hand-free mechanism can allow a single operator to operate the clamping device for lifting and moving the object. For example, the locking mechanism can be activated or released by a pushing action, for example, when the clamping device touches the object.

FIGS. 2A and 2B illustrate operations of a clamping device having an automatic locking mechanism according to some embodiments. A clamping device 200 can include a pulling element 210, which can be coupled to a hoist for lifting and moving the clamping device. The clamping device 200 can include two opposite facing jaws 240, which can clamp on an object. The clamping device 200 can include a linkage mechanism 230, which couples the pulling element 210 with the jaws 240. The clamping device 200 can include an automatic locking mechanism 250, for locking or unlocking the linkage mechanism 230.

FIG. 2A shows a locking configuration 250A, e.g., the automatic locking mechanism is engaged or locked, which can lock the linkage mechanism from moving, such as disengaging the linkage mechanism between two components of a clamping device 200. In this locking configuration, the jaws remain widely separated even when the empty clamping device is lifted up and moved to approach an object 220 for picking up. For example, the automatic locking mechanism 250 can include two locking elements 251 and 252. Locking element 251 can be coupled to the pulling element 210. Locking element 252 can be coupled to the pivot point 230A of the linkage mechanism 230. Other coupling locations can be used, such as coupling two arms of the linkage mechanism 250.

In the locking configuration 250A, the two elements are coupled together, e.g., one element cannot move relative to the other element. Thus, the pulling element cannot move relative to the pivot point, and the jaws remain as they were when the clamping device is lifted up. Thus the clamping device can approach an object 220 with the jaws widely separated. The clamping device can be positioned above the object, and then lowered to place the object between the jaws.

In the unlocking configuration 250B, the two elements are separatable, e.g., one element can move relative to the other element. Thus, the pulling element can move relative to the pivot point, and the jaws clamp together when the clamping device is lifted up. Thus the clamping device can be lifted and then moved to a new location with the object securely clamped between the two jaws.

The locking and unlocking configurations can be automatically toggled 260 by up and down movements 261 of the clamping device. For example, the locking mechanism can be activated after the jaws are separated. In that way, the jaws are locked into a separate configuration, which can allow the clamping device to accept an object. For example, after bringing an object to a destination, a pulling element of the clamping device can be lowered while the clamping device is stationary, e.g., the pulling element moves down relative to the clamping device. The lowering of the pulling element can move the jaws opened, e.g., separating the jaws apart. Thus the locking mechanism can be activated when the jaws are separated at a predetermined distance, such as a maximum separation distance or a distance close to the maximum distance. For example, the jaws can be separated to a maximum distance to partially activate the locking mechanism. When the pulling element reverses direction, e.g., starts pulling up, the jaws can move closer together. The closing movement of the jaws can complete the locking mechanism, preventing the jaws from moving further toward each other, and essentially keeping the jaws opened at a distance less than the maximum distance.

The locking mechanism can be partially deactivated by lowering the pulling element relative to the clamping device. The lowering of the pulling element can separate the jaws a little. Then the pulling element can be pulled up, complete the deactivation process. The jaws can move toward each other, for clamping on the object.

In some embodiments, the automatic locking mechanism can be accomplished by a two-step activation. The automatic locking mechanism can first be partially activated (or deactivated) by a lowering action of the pulling element (which can be accomplished by lowering the hoist). The automatic locking mechanism can complete the activation (or deactivation) process by a lifting action on the pulling element (which can also be accomplished by lifting the hoist). Thus the automatic locking mechanism can be automatic, e.g., performed by the same action of lowering and lifting the hoist for accepting, clamping, and transferring the object.

A typical activation of the automatic locking mechanism can include a partially activation by lowering the pulling element so that the jaws can pass a certain separation distance. The pulling element is lowered relative to other elements of the clamping device, thus in some embodiments, the clamping device is rested against something, such as on the object that the clamp device is carried and the object is placed on the ground. Thus, the automatic locking mechanism can be partially activated by lowering a hoist coupled to the clamping device carrying the object so that the object contacts the ground. The hoist can then be further lowered so that the jaws can be separated passing a certain separation distance, for example, by moving a pulling element down relative to the rest of the clamping device.

The automatic locking mechanism can then be completely activated by pulling up the pulling element, which can secure the jaws open, at the previously separation distance or at a separation distance smaller or slightly smaller than the previously separation distance, for example, due to the possibility that the jaws can move together a little after the pulling element is pulled up.

A typical deactivation of the automatic locking mechanism can include a partially deactivation by lowering the pulling element. The pulling element can be previously not pullable up, due to the activation of the automatic locking mechanism. Thus, the pulling element can partially be released from the activation of the automatic locking mechanism by reversing the movement, e.g., by lowering the pulling element. The lowering of the pulling element can keep the jaws at the previous separation distance, or can enlarge the separation distance, such as increasing the separation distance by a small amount, for example, due to the possibility that the jaws can move away from each other a little after the pulling element is lowered.

The pulling element is lowered relative to other elements of the clamping device, thus in some embodiments, the clamping device is rested against something, such as on the object that the clamp device is ready to pick up and the object is placed on the ground. Thus, the automatic locking mechanism can be partially deactivated by lowering a hoist coupled to the empty clamping device so that the clamping device contacts the object. The hoist can then be further lowered so that the pulling element can move down relative to the rest of the clamping device.

The automatic locking mechanism can then be completely deactivated by pulling up the pulling element, which can allow the jaws to move toward each other.

The automatic locking mechanism can be incorporated in different clamping devices. For example, the clamping device can include two pivoting arms moving two opposite jaws. The clamping device can include one pivoting arm moving a movable jaw, and one stationary arm supporting a stationary jaw. The clamping device can include two slanting surfaces moving two opposite jaws. The clamping device can include one slanting surface moving one movable jaw, and one stationary jaw. The clamping device can include a rotatable slanting surface moving one movable jaw, and one stationary jaw.

Other configurations for the locking mechanism can be used, which can secure any two components between the pulling element, the jaw, and the linkage between the pulling element and the jaw. For example, a locking mechanism can be between the pulling element and the jaw, or between the jaw and a component of the linkage mechanism.

Figure 3B:
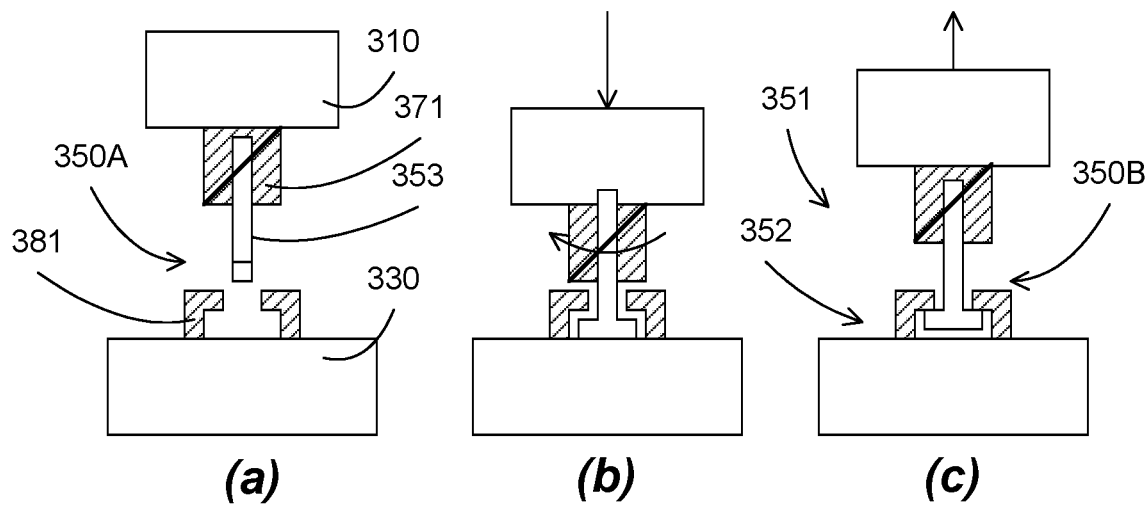
Figure 3C:
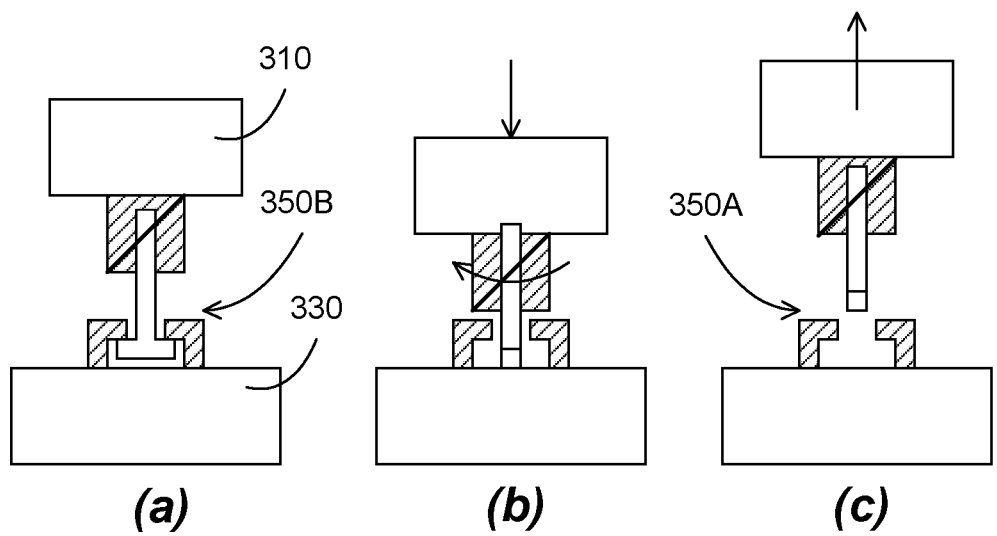

FIGS. 3A-3C illustrate a schematic of a locking mechanism according to some embodiments. FIG. 3A shows a schematic of a locking mechanism 350 toggling between a locked (or engaged) state 350A and an unlocked (or disengaged) state 350B.

The locking mechanism 350 can include 2 portions 351 and 352, which can be secured together (in locked or engaged stated 350A), or can be separatable from each other (in unlocked or disengaged state 350B). The locking mechanism can be a toggle mechanism, which can change states using a same set of activation mechanism. For example, the activation mechanism for the toggling operation 360 can include a set of up and down forces 361 acting on one or both portions 351 and 352 of the locking mechanism.

The toggling operation can include a conversion of a vertical force to a rotational force, for example, through a slanting surface such as a helical surface. The vertical force can be accomplished by the clamping device moving up or down. The rotational force can be used to activate a rotational latch, which can be toggled between a latch position and an unlatch position.

FIGS. 3B(a)-(c) show a schematic process for automatically activating the locking mechanism. A locking mechanism can be configured to couple two movable components of a clamping device, such as a pulling element 310 and a pivot point 330. The locking mechanism 350 can include a first portion 351 which is coupled to the pulling element. The locking mechanism can include a second portion 352 which is coupled to the pivot point.

The first portion can include annular elements 371 which are coupled to the pulling element. The annular elements can be fixedly coupled to the pulling element. The first portion can include a rod 353, which is disposed in the annular elements. The rod can move up and down along the axis of the annular elements. The rod can also rotate around the same axis. The rod can have one or more pins, which can prevent the rod from being separated from the annular elements. Thus the rod can move up/down and rotate while subjected to be constrained by the pins. The rod can have a hookable element at or near an end. The hookable element can be mated with the second portion.

The second portion can include a receptacle 381, which can have a mated hookable element, such as parallel hook features for removably coupling with the hookable element of the rod. The removable coupling can be toggled by a rotation, such as a rotation of 90 degrees.

In FIG. 3C(a), the locking mechanism is in an unlocked status 350A, with the hookable element of the rod configured to be parallel with the parallel hook feature of the receptacle. Thus the rod (and the annular elements) and the receptacle are separatable, so the pulling element can move a large distance relative to the pivot point.

In FIG. 3C(b), the pulling element moves toward the pivot point. The movement is relative, meaning the two components move toward each other, such as one component moving and the other component stationary, or both components moving. The rod can contact the receptacle and then rotate. The rotation can cause the rod to engage with the receptacle, e.g., the hookable element in the rod is no longer parallel with the parallel hook feature of the receptacle, resulting in the rod being coupled to the receptacle, e.g., the rod cannot be separated from the receptacle. Due to tolerance, the rod can move slightly relative to the receptacle, but since the hookable element is hooked with the parallel hook feature, the rod cannot be separated or removed from the receptacle.

In FIG. 3C(c), the pulling element relatively moves away from the pivot point. The rod can still be coupled to the receptacle. The locking mechanism is activated, e.g., the locking mechanism is in a locked status 350B, securing the pulling element with the pivot point. The term securing means that the pulling element and the pivot point are not separatable, and move as a unit. The pulling element thus will move as a unit with the pivot point, e.g., with the clamping device. The linkage mechanism is now disable, meaning the pulling element cannot influence the movements of the jaws.

In FIG. 3D(a), the locking mechanism is in a locked status 350B, with the hookable element of the rod configured to be hooked with the parallel hook feature of the receptacle. Thus the rod (and the annular elements) and the receptacle are coupled together, e.g., move together as a unit, so the pulling element cannot move any large distance relative to the pivot point. The pulling element can still move a small distance, for example, dictated by the tolerance of the components.

In FIG. 3D(b), the pulling element relatively moves toward the pivot point. The rod can be pushed against the annular elements and then rotate. The rotation can cause the rod to disengage from the receptacle, e.g., the hookable element in the rod is now parallel with the parallel hook feature of the receptacle, resulting in the rod being separatable or removable from the receptacle.

In FIG. 3D(c), the pulling element relatively moves away from the pivot point. The rod is now separatable from the receptacle. The locking mechanism is deactivated, e.g., the locking mechanism is in an unlocked status 350A, releasing the pulling element from the pivot point. The linkage mechanism is now enable, meaning movements of the pulling element can move the jaws toward each other.

Figure 4A:
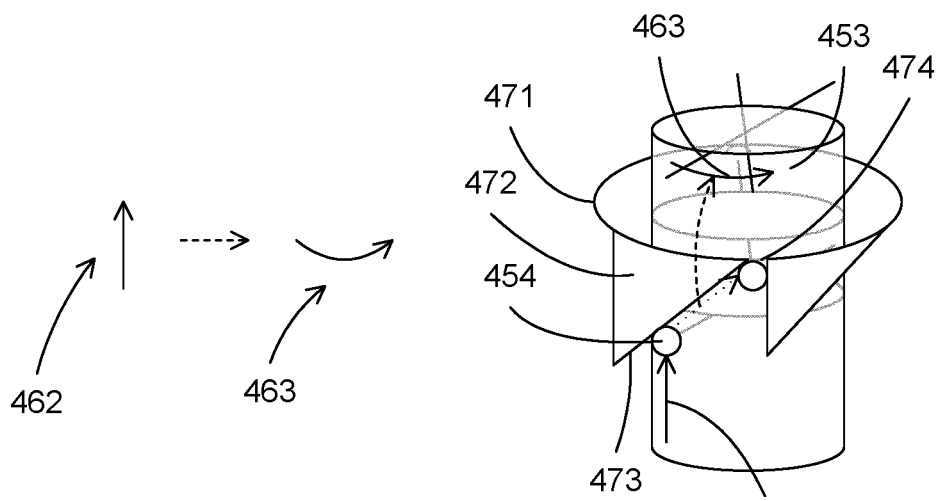
FIGS. 4A-4C illustrate a configuration of the locking mechanism according to some embodiments.
Figure 4B:
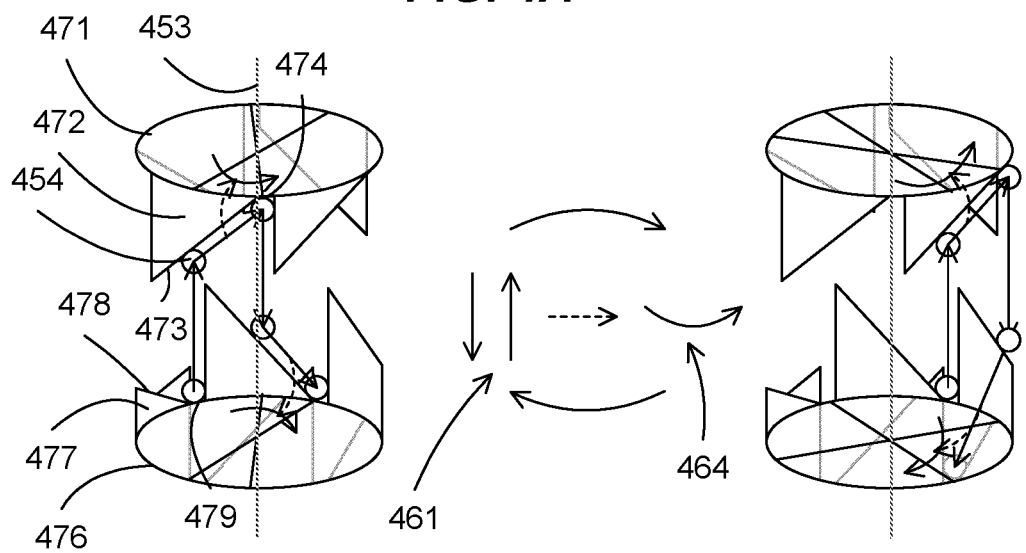
Figure 4C:
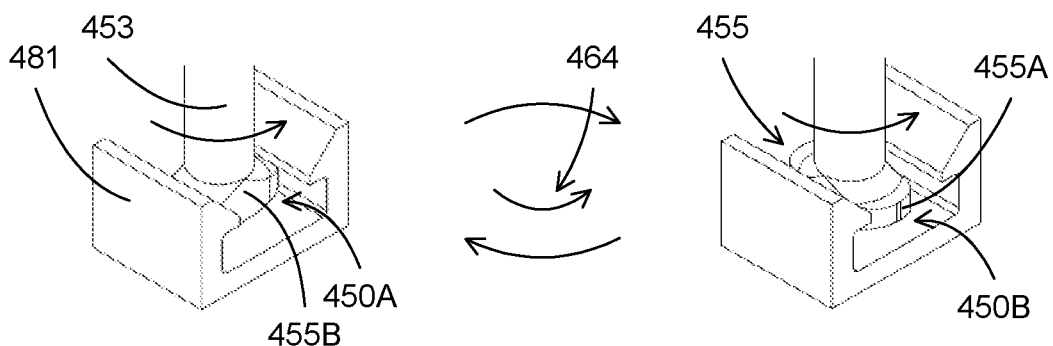

FIGS. 4A-4C illustrate a configuration of the locking mechanism according to some embodiments. FIG. 4A shows a schematic of a force conversion, using a slanting surface, such as a portion of a helical surface. The slanting surface can convert a vertical force to a force parallel to the surface of the slanting surface. Further, by using a helical surface, the parallel force can be a tangential force, e.g., a rotational force around the axis of the helix. Thus, by using a curve slanting surface, such as a helical surface, a vertical force 462 can be converted to a rotational force 463 around the axis of the helix.

An annular element 471 can have multiple teeth 472 arranging around the annular element 471. Each tooth can have a curve slanting surface 473, such as a portion of a helical surface. Each tooth can have a valley point 474, e.g., the connection between an end of the tooth slanting surface and the beginning of a rise of a next tooth.

A rod 453 can be disposed within the annular element 471. A pin 454 can be coupled to the rod 453, such as protruding from a surface of the rod. The pin can penetrate the rod at a center of the rod, thus can be protruded from both sides of the rod. The rod thus can be constrained to move in the vertical direction, e.g., along the axis of the rod, subjected to the constraint of the pin. For example, the pin can contact the slanting surface, and thus prevent the rod from continuing moving in a straight vertical direction. The rod can also rotate in the annular element, subjected to the constraint of the pin. For example, the pin can contact the valley point, and thus prevent the rod from continuing rotating.

Thus, under a vertical force 462, the rod can move in a vertical direction, until the pin 454 contacts the slanting surface 473. The pin then moves along the slanting surface to stop at the valley point 474. The moving of the pin 454 along the slanting surface 473 can rotate 463 the rod 453. The angle of rotation is from the location of the vertical force to the valley point.

FIG. 4B shows a first portion, such as portion 451, of a locking mechanism 450. The first portion can function to convert vertical forces 461, such as forces caused by the clamping device lifted up and moved down during the picking and releasing of objects, to a rotational force 464.

The first portion can include two annular elements 471 and 476 arranged concentrically. Each annular element can have a number of teeth arranged around the circumference of the annular element. The teeth can be arranged in a cyclic fashion, for example, there can be 4 teeth in one annular element. Each tooth can have a curve slanting surface moving along a circumference of the annular element, such as a portion of a helical surface. Each tooth can have a valley point at an end of the tooth, e.g., at the end of the curve slanting surface. Each tooth can have a sharp rise, for example, from the valley point of an adjacent tooth.

For example, the annular element 471 can have multiple teeth, such as 4 teeth 472, arranged cyclically around a circumference of the annular element 471. Each tooth 472 can have a curve slanting surface 473, which ends at a valley point 474. At the valley point 474, an adjacent tooth can be positioned, having a sharp rise, and followed by a new slanting surface.

Similarly, the annular element 476 can have multiple teeth, such as 4 teeth 477, arranged cyclically around a circumference of the annular element 476. Each tooth 477 can have a curve slanting surface 478, which ends at a valley point 479. At the valley point 479, an adjacent tooth can be positioned, having a sharp rise, and followed by a new slanting surface.

A rod 453 can be disposed in the annular elements 471 and 476. The rod outer circumference can be about the same as the inner circumference of the annular elements, so that the rod can fit snuggly within the annular elements. Thus the rod can move along the axis of the rod (which is the same as the axis of the annular elements), as well as can rotate around the rod axis.

A pin 454 can pass through a center of the rod, perpendicular to the rod axis. The pin can be protruded from the rod outer circumference. The pin can be positioned as to be between the annular elements. The pin can constrain the rod movements within the annular elements. For example, the rod can move vertically, but within the confinement of the two annular elements, e.g., the rod can move relative to the annular elements, but the rod cannot be separated from the annular elements, e.g., the rod cannot be removed from the annular elements. The rod can also rotate, but within the confinement of the teeth, e.g., the rod can rotate, and when the pin hits a tooth, the rod can move vertically to avoid the tooth, before continuing rotating.

The annular elements can be arranged so that a combination of a set of vertical movements or forces, e.g., an up movement followed by a down movement or a down movement followed by an up movement, can rotate the rod to toggle the locking mechanism between a locked state and an unlocked state. The annular elements can be fixedly positioned with respect to each other, e.g., the two annular elements can move as a unit.

For example, the annular elements can be arranged so that the teeth on the annular elements are facing each other, e.g., the teeth on one annular element face the teeth on another annular element. Further, the teeth are arranged in opposite directions, for example, the slanting surfaces of the teeth in one annular element form an angle different from zero angle (e.g., not parallel) with the slanting surfaces of the teeth in another annular element. The angle can be between 70 and 110 degrees, or between 75 and 105 degrees, or between 80 and 100 degrees, or between 85 and 95 degrees. In addition, the valley points of the teeth in one annular element are configured to face the slanting surfaces of the teeth in the opposite annular element.

In operation, the rod can move up, relative to the annular elements. For example, the annular elements can be fixedly coupled to a component of the clamping device. The component can move down while the rod is stationary. The pin 454, originally positioned at a valley point 479 of a tooth 477 of the bottom annular element 476, can move up to contact the slanting surface 473 of a tooth 472 of the top annular element 471. Further vertical movement of the rod can make the pin moving along the slanting surface 473, and resting at the valley point 474. The movement of the pin along the slanting surface can rotate the rod, for example, at an angle corresponded to the traveled distance of the pin along the slanting surface.

The rod can then move down, relative to the annular elements. For example, the component in which the annular elements is fixedly coupled to, can move up while the rod is stationary. The pin 454, originally positioned at a valley point 474 of a tooth 472 of the top annular element 471, can move up down contact the slanting surface of a tooth of the bottom annular element. Further vertical movement of the rod can make the pin moving along the slanting surface, and resting at the valley point. The movement of the pin along the slanting surface can rotate the rod, for example, at an angle corresponded to the traveled distance of the pin along the slanting surface.

A combination of the rod moving up and then down can rotate the rod an angle corresponded to the movement of the pin from one valley point to an adjacent valley point, for example, of the bottom annular element. Thus, if there are 4 teeth at an annular element, the spacing of two valley points can correspond to an angle of 90 degrees, e.g., the rod rotates a 90 degree angle when the rod moves up and down, e.g., the clamping device component in which the annular elements is fixedly coupled to, moves down and up.

Further movements of the rod (or the component of the clamping device) can rotate the rod another 90 degrees, e.g., vertical movements 461 of the rod or the clamping device component can be converted to a rotational movement 464 of the rod.

FIG. 4C shows a second portion, such as portion 452, of a locking mechanism 450. The second portion can function to convert a rotation, e.g., the rotation of a rod disposed within two annular elements having teeth with curve slanting surfaces, to a toggling mechanism between a locked state and an unlocked state.

The second portion 452 can include a receptacle 481, which is configured to be securable to the rotatable rod 453. For example, at the end, or near the end, of the rod 453, there can be an asymmetric hook 455, including an elongated portion 455A and a shortened portion 455B, such as an oval or a rectangular shape. The receptacle 481 can have a parallel hook feature that is configured to hook or secure on the elongated portion of the rod 453.

Thus, when the rod rotates, the rod can be locked with the receptacle, e.g., in a locked state between the rod and the receptacle, or the rod can be separable from the receptacle, e.g., in an unlocked state between the rod and the receptacle. The locking and unlocking states can be toggled by continuing rotating the rod. For example, the rod can be positioned so that the elongated portion engaged 450A with the parallel hook feature of the receptacle, locking the rod 453 with the receptacle 481. In the locked state, the rod can move a small distance elative to the receptacle, but the rod cannot be separated or removed from the receptacle.

When the rod rotates 90 degrees, the elongated portion is now parallel with the parallel hook feature of the receptacle, and the shortened portion does not engage with the receptacle. This releases the rod from the receptacle, forming the unlocked state in which the rod can be separated or removed from the receptacle. Rotating the rod 90 degrees again, in either rotation direction, can re-engage the locking mechanism by mating the elongated portion with the parallel hook feature of the receptacle. Thus the locked and unlocked states can be toggled by rotating the rod, such as rotating 90 degrees.

A locking mechanism including the annular elements having cyclic teeth configuration, the rod having the asymmetric hook, and the receptacle having parallel hook feature can be toggled between locked and unlocked states, through set of up and down movements.

In some embodiments, the present invention discloses an automatic locking assembly having an automatic locking mechanism that can be incorporated in a clamping device. The automatic locking assembly can use up and down movements of the clamping device to toggle a lock, e.g., switching between locked and unlocked states, of two movable components of the clamping device. In the locked state, the two movable components of the clamping device are coupled together, e.g., not removable or separatable from each other, thus keeping the jaws in a stationary configuration when the clamping device moves. In the unlocked state, the two movable components of the clamping device are separable, e.g., one component can move relative to the other component, thus imposing a force on the jaws for clamping on an object when the clamping device is lifted up.

In some embodiments, the automatic locking assembly can include a slanting surface, such as a curve slanting surface or a helical slanting surface, mating with a cylindrical element, such as a rotatable pin, e.g., a roller. The slanting surface can change a force direction, such as changing an up/down movement to a rotational movement. The interface between a slanting surface and a cylindrical element can reduce friction, e.g., the cylindrical can run easier on the slanting surface than a flat surface runs on the slanting surface, due to the minimum contact area. Further, a bearing can be incorporated, to further reduce friction between the cylindrical element and the slanting surface.

The automatic locking assembly can be coupled to a clamping device for automatic disabling or enabling a linkage mechanism of the clamping device. The linkage mechanism is configured to transfer a pulling force on the clamping device to a clamping force from the jaws of the clamping device. The linkage mechanism can include linkage arms, joints and/or elements connecting together, and movable with respect to the body of the clamping device.

In some embodiments, the automatic locking assembly can include two lockable elements that can be secured together, e.g., locked together, and can be removed from each other, e.g., separated from each other. The two lockable elements can include a hook and an eye, in which the hook can be coupled to the eye for securing the hook with the eye. The two lockable elements can include a rod and a receptacle, in which the rod can enter the receptacle to prevent the rod or the receptacle from moving sideway. The two lockable elements can include a rod having a hookable element such as an elongated end and a parallel hook receptacle, e.g., two hooks running parallel to each other. The hookable element can be inserted into the parallel hook receptacle, such as the elongated end positioned parallel to the parallel hook receptacle. In this configuration, the hookable element can enter and leave the receptacle, e.g., the two lockable elements are free to move relative to each other.

After the hookable element is inserted into the parallel hook receptacle, the hookable element can be rotated so that the elongated end can position perpendicular to the parallel hook receptacle. In this configuration, the hookable element is secured with the receptacle, since the hook ends of the parallel hook of the receptacle can prevent the elongated end from leaving the receptacle.

In some embodiments, the automatic locking assembly can include two slanting surfaces together with one or more curve shape elements for interacting with the slanting surfaces. The curve shape elements can include a curved surface such as a cylindrical or elliptical rod, or a partial cylindrical or elliptical rod. The curved surface can reduce friction with the slanting surfaces, for example, due to reduced surface contact area. The curve shape element can include a roller such as a ball bearing or a rod bearing. The roller can further reduce friction with the slanting surface, for example, due to the rollable action of the roller.

The slanting surfaces can change a direction of a movement of the curve shape element, such as rotating the curve shape element when the curve shape element moves toward and interacting with the slanting surfaces. The rotation of the curve shape element can coupled to a lockable configuration of the automatic locking assembly, such as the rotation of a rod having an elongated end in a parallel hook receptacle.

The automatic locking assembly can be configured so that two slanting surfaces can face each other, and also face the curve shape element, such as protruded pins from a rod. The first slanting surface can be configured to accept the protruded pins in a first moving direction of the pins, and then move the protruded pins along the slanting surface. The slanting surface can be a curve slanting surface, such as a helical surface. The movements of the protruded pins along the slanting surface can rotate the rod, e.g., when the pins run along the helical surface.

The second slanting surface can be configured to accept the protruded pins, e.g., the same protruded pins or new additional protruded pins from the rod. The second slanting surface can move the protruded pins along the slanting surface, for example, a helical surface, such as rotating the rod by the protruded pins running along the helical surface.

Figure 5B:
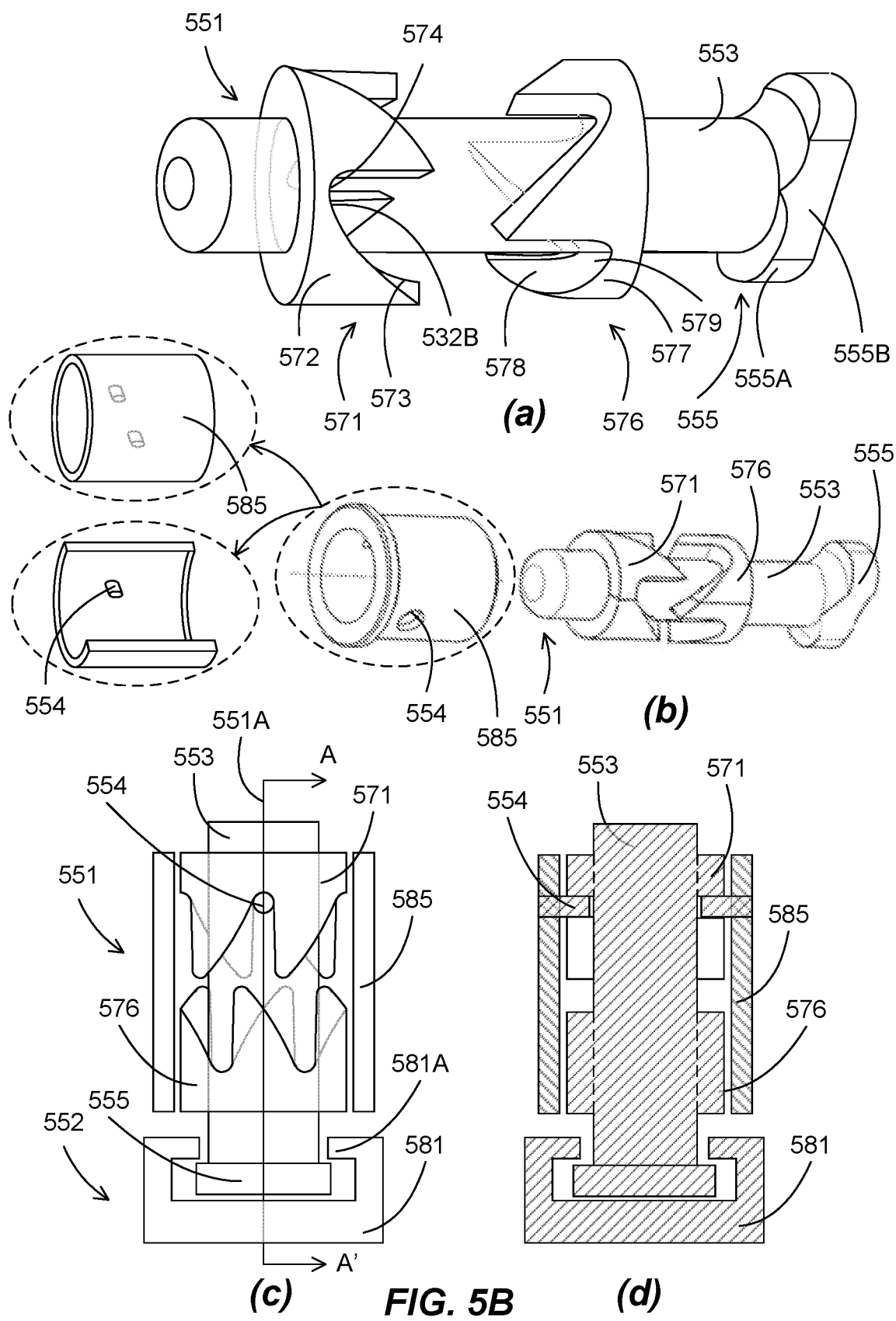

FIGS. 5A-5B illustrate schematic configurations for a locking mechanism or assembly according to some embodiments. The locking mechanism can employ a slanting interface for repeatedly rotating a rod through a repeatedly set of vertical forces. If the rod has a rotational symmetry, e.g., the rod geometry remains the same after rotating a certain angle, a set of vertical forces on the rod can rotate the rod half the rotational symmetry angle. Two successive sets of vertical forces will return the rod to its original configuration, e.g., rotating the rod the rotational symmetry angle.

In some embodiments, the locking mechanism can include two lockable elements, such as a rod with a hook end, e.g., a hookable element at or near an end of the rod, and a hook receptacle, e.g., a receptacle having a hookable feature that can be mated to the hookable element of the rod. Depending on the orientation of the hook end, the rod can be secured in the hook receptacle to move as a same unit with the receptacle, or the rod can move independent of the receptacle, e.g., the rod can be separated or removed from the receptacle, and thus operating as two separate units.

For example, the hookable element can have an elongated shape, such as a rectangle or an ellipse. The rod thus can have a perpendicular elongated end, for example, the rod with the hookable element can look line a hammer. The perpendicular elongated end can have the shape of a head of a square sledge hammer, coupled to a rod as a handle of the hammer. The longer side of the elongated shape can be secured to a hookable feature of the hook receptacle, while the shorter end can be released or movable from the hook receptacle. A rotation of the rod can toggle between the secured state, e.g., the longer side hooked to the hook receptacle, and the loose state, e.g., the shorter side faced the hookable feature of the hook receptacle.

FIGS. 5A(a)-5A(d) shows a configuration for a locking assembly having two portions 551 and 552, forming two lockable elements. The first portion 551 can include a rod 553 having a hook end 555 for mating with a hookable feature or a hookable element 581 of the second portion 552. The rod 553 can be movably disposed in another element of the first portion, such as slanting surface elements 571 and 576, each having at least a slanting surface, e.g., the rod can move along an axis of rotation of the slanting surface elements 571 and 576. A sleeve 585 can be used to support the slanting surface elements 571 and 576. The rod 553 can have a protruded element 554, disposed between the slanting surfaces of the slanting surface elements 571 and 576. The protruded element can restrict the movement of the rod, e.g., the rod can move one way so that the protruded element can contact a slanting surface of a slanting surface element, and the rod can move an opposite way so that the protruded element can contact a slanting surface of another slanting surface element. By moving the rod 553 so that the protruded element 554 contacts the slanting surfaces in sequence, the rod can rotate to toggle between a coupled configuration and a separatable configuration with the hookable feature 581.

FIG. 5A(a) shows a schematic detail of a first portion 551 of a locking assembly using slanting interfaces. The locking assembly can include two portions 551 and 552, forming two lockable elements. A first portion 551 can include a slanting surface interacting element 553, such as a rod, together with slanting surface elements 571 and 576, each having at least a slanting surface, such as two annular elements having cyclic teeth. A second portion, or a second lockable element can include a hook receptacle 581, which can include a hookable feature 581A, such as parallel hook ends (shown in FIG. 5A(c)).

The first portion, or the first lockable element of a locking assembly can include a slanting surface interacting element, such as a rod 553. One end of the rod can include a hook end or a hookable element 555, which can include a perpendicular elongated portion having a longer side 555A and a shorter side 555B. The longer side can be latched in the hook receptacle, with the longer side mated with the hook ends 581A of the hook receptacle 581. When the longer side 555A of the rod end 555 is mated with the hooks 581A of the hook receptacle 581, the hook receptacle 581 can be hooked to the rod and cannot be released from the rod, e.g., the locking mechanism is enable.

The shorter side can allow the rod to be free to move in out of the hook receptacle. The longer side 555A can be parallel with the parallel hook ends 581A, and the shorter side 555B can be clear from the parallel hook ends. Thus the rod 553 can be separated or removed from the hook receptacle 581, since the separation between the parallel hook ends 581A is bigger than the shorter side 555B of the rod 553.

By rotating the rod, such as a 90 degree angle for this elongated hook element 555, the status of the lock can be toggle between locked and unlocked, e.g., the rod is hooked to the hook receptacle, and the rod is free to move in and out of the hook receptacle. When the shorter side of the rod 553 is clear of the parallel hook ends of the hook receptacle, the hooks do not capture the rod, and thus the rod 553 and the hook receptacle 581 can be separated, e.g., the locking mechanism is disable.

The rod 553 can include a protruded element 554, such as a pin, which can be a pin passing through the rod and protruded from both sides of the rod, together with optional ball bearings or rollers coupling to the ends of the pin or to the portion of the pin in the rod. The optional bearings can allow the pin to rotate easily with respect to the rod. The protruded pin can include cylindrical pins, rollers, elliptical pins, or any shape protrusions that can slide along the slanting surfaces of the first and second annular elements. Multiple pins can also be used. The protruded element can interface with the slanting surfaces of the elements 571 and 576 having slanting surfaces.

The elements 571 and 576 having slanting surfaces can include ring-like elements, such as annular elements, which can have slanting surfaces in the form of helical or spiral surfaces. The annular elements can have a hollow cylindrical shape, such as a ring or a hollow cylinder, with an axis of rotation 551A. For example, the annular elements can have cyclic teeth, e.g., teeth configured around the circumference of the annular elements. The number of teeth can be dividable by 2 or by 4, such as 4 teeth or 8 teeth. The teeth can have helical surfaces rising from a base of the annular elements, followed by abrupt surfaces going back down to the base, after reaching peaks of the teeth. The other end of the helical surfaces can reach valley points, before followed by the abrupt surfaces of the adjacent teeth.

Annular element 571 can have multiple teeth 572, such as 4 teeth arranged cyclically around a circumference of the base of the annular element 571. Each tooth can have a helical surface 573. At the end of the helical surface 573 near the base, there can be a valley point 574, which can be followed by an adjacent tooth, e.g., an abrupt surface of the adjacent tooth.

Similarly, annular element 576 can have 4 teeth 577, arranged cyclically around a circumference of the base of the annular element 576. Each tooth can have a helical surface 578. At the end of the helical surface 578 near the base, there can be a valley point 579, which can be followed by an adjacent tooth, e.g., an abrupt surface of the adjacent tooth.

The two annular elements can be concentric around an axis of rotation 551A, with the helical surfaces 573 and 578 facing each other. Further, the teeth of the annular elements can be configured so that peaks of the teeth of one annular element face helical surfaces of another annular element, and valley points of one annular element face helical surfaces of another annular element.

The rod 553 can be disposed in the annular elements, such as the axis of the rod coincides with the axes of the annular elements. The rod can be constrained inside the annular elements, e.g., the rod can move along the axis, and can rotate around the axis, without the protruded element.

With the protruded element such as the pin 554, the rod 553 is further constrained. For example, the pin can be inserted after the rod has been placed in the annular element, so that the pin is disposed between the two annular elements. Thus the pin can prevent the rod from being removed or separated from the annular elements.

The pin can further limit the movements of the rod, beside the constraint of limited movements along the axis, due to the teeth of the annular elements preventing the pin from going pass the teeth. The rod can have limited rotational movements, constrained by the abrupt surfaces or the helical surfaces of the teeth. The rod can rotate a complete cycle, but only accompanied by axis movements, e.g., when the rotational movement is blocked by the teeth, the rod can move along the axis so that the pin is clear of the teeth before resuming the rotational movement.

The helical surfaces of the first and second annular elements can be facing each other, and can be configured to provide a torque to rotate the rod through the protruded pin. For example, the rod can be pushed into the first annular element, with the protruded pin then contacting the helical surfaces of the first annular element. Due to the helical surfaces, the protruded pin can slide or roll on the helical surfaces, effectively rotating the rod an angle corresponded to the amount of the protruded pin sliding or rolling on the helical surfaces, from the point of contact to the point of rest at the bottom of the helical surfaces.

The rod can be retracted, e.g., a force can be applied for pulling on the rod. The protruded pin then can be configured to contact the helical surfaces of the second annular element. Due to the helical surfaces, the protruded pin can slide or roll on the helical surfaces, effectively rotating the rod another angle corresponded to the amount of the protruded pin sliding or rolling on the helical surfaces, from the point of contact to the point of rest at the bottom of the helical surfaces. Thus, by pushing and pulling, the rod can rotate an angle, such as a 90 degrees angle.

For example, the pin 554 can be facing the helical surfaces 573 and 578, e.g., sandwiching between the helical surface 573 of the first annular element 571 and the helical surface 578 of the second annular element 576.

The rod can be pushed, so that the pin 554 contacts the helical surface 573 of the first annular element 571. The pin can then run along the helical surface 573 to the valley point 574. The movement of the pin 554 can cause the rod 553 to rotate an angle corresponded to the length of the movement, e.g., the distance that the pin travels on the helical surface 573.

The rod can be pulled, so that the pin 554 contacts the helical surface 578 of the second annular element 576. The pin can run along the helical surface 578 to the valley point 579 of the second annular element 576. The movement of the pin 554 can cause the rod 553 to rotate an angle corresponded to the length of the movement, e.g., the distance that the pin travels on the helical surface 578.

FIG. 5A(b) shows a schematic construction of a first portion 551 of a locking assembly. The first portion, or the first lockable element can include a first annular element 571 and a second annular element 576. The annular elements 571 and 576 can be placed inside a sleeve 585.

The first portion can include a rod 553. One end of the rod can include a hook end or a hookable element 555, which can include a perpendicular elongated portion having a longer side and a shorter side. A pin 554 can be inserted into the rod, such as after the rod has been placed inside at least the second annular element 576. Since the second annular element 576 is constrained by the pin 554 and the hook end 555, the second annular element and the rod are coupled together, e.g., cannot be removed from each other.

The pin can be at any configuration with the regard to the hook end. As shown, the pin is parallel to the hook end. As such, the pin is configured so that when the pin is rested at the valley point of the second annular element 576, the hook end is either parallel (unlocked state) or perpendicular (locked state) to the parallel hook ends of the hook receptacle.

FIG. 5A(c) shows an assembled first portion 551 of the locking assembly partially locked with a second portion 552 of the locking assembly. The annular elements 571 and 576 are assembled inside a sleeve 585. A rod 553 can be assembled inside the first and second annular elements, with a pin 554 between the annular elements. As such, the pin is configured so that when the pin is rested at the valley point of the first annular element 571, the hook end is partially locked to the parallel hook ends of the hook receptacle, e.g., forming a 45 degrees. That way, when the rod is further rotated another 45 degrees, the pin is to be rested at the valley point of the second annular element 576, the hook end is either parallel (unlocked state) or perpendicular (locked state) to the parallel hook ends of the hook receptacle.

FIG. 5A(d) shows a cross section AA' of an assembled first portion 551 of the locking assembly partially locked with a second portion 552 of the locking assembly. The cross section is through the pin 554.

FIGS. 5B(a)-5B(d) shows another configuration for a locking assembly having two portions 551 and 552, forming two lockable elements. The first portion 551 can include a top element having a hook end 555 for mating with a hookable feature or a hookable element 581 of the second portion 552. The top element can include a rod 553 fixedly coupled to slanting surface elements 571 and 576, each having at least a slanting surface. Thus, the rod 553 and the slanting surface elements 571 and 576 are configured to be as a single unit of the top element, such as an integrated top element including the rod 553 and the slanting surface elements 571 and 576.

A sleeve 585 can be used to support the top element, e.g., the top element can be disposed in the sleeve 585 so that the slanting surface elements 571 and 576 can slide in the sleeve 585. The sleeve 585 can have one or more protruded elements 554, which can be protruded inward from the inner surface of the sleeve. The protruded elements 554 can be disposed between the slanting surfaces of the slanting surface elements 571 and 576, e.g., the protruded elements can be installed after the top element is already disposed inside the sleeve. In this configuration, the protruded elements can restrict the movement of the top element inside the sleeve, e.g., the top element can move one way so that the protruded elements can contact a slanting surface of a slanting surface element, and the top element can move an opposite way so that the protruded elements can contact a slanting surface of another slanting surface element. By moving the top element so that the protruded element 554 contacts the slanting surfaces in sequence, the hook end of the top element can rotate to toggle between a coupled configuration and a separatable configuration with the hookable feature 581.

FIG. 5B(a) shows a schematic detail of a first portion 551 of a locking assembly using slanting interfaces. The locking assembly can include two portions 551 and 552, forming two lockable elements. A first portion 551 can include a top element, which can include a rod 553 coupled with slanting surface elements 571 and 576, each having at least a slanting surface, such as two annular elements having cyclic teeth. A second portion 552 can include a hook receptacle 581, which can include a hookable feature 581A, such as parallel hook ends (shown in FIG. 5B(c)).

The first portion 551, or the first lockable element of a locking assembly, can include a top element having a rod 553 fixedly coupled to two slanting surface element 571 and 576. One end of the top element, e.g., at one end of the rod 553, can include a hook end or a hookable element 555, which can include a perpendicular elongated portion having a longer side 555A and a shorter side 555B. The longer side can be latched in the hook receptacle, with the longer side mated with the hook ends 581A of the hook receptacle 581. When the longer side 555A of the rod end 555 is mated with the hooks 581A of the hook receptacle 581, the hook receptacle 581 can be hooked to the rod and cannot be released from the rod, e.g., the locking mechanism is enable.

The shorter side can allow the rod to be free to move in out of the hook receptacle. The longer side 555A can be parallel with the parallel hook ends 581A, and the shorter side 555B can be clear from the parallel hook ends. Thus the rod 553 can be separated or removed from the hook receptacle 581, since the separation between the parallel hook ends 581A is bigger than the shorter side 555B of the rod 553.

By rotating the top element or the rod, such as a 90 degree angle for this elongated hook element 555, the status of the lock can be toggle between locked and unlocked, e.g., the rod is hooked to the hook receptacle, and the rod is free to move in and out of the hook receptacle. When the shorter side of the rod 553 is clear of the parallel hook ends of the hook receptacle, the hooks do not capture the rod, and thus the rod 553 and the hook receptacle 581 can be separated, e.g., the locking mechanism is disable.

The slanting surface elements 571 and 576 having slanting surfaces can include ring-like elements, such as annular elements, which can have slanting surfaces in the form of helical or spiral surfaces. The annular elements can have a hollow cylindrical shape, such as a ring or a hollow cylinder, with an axis of rotation 551A. For example, the annular elements can have cyclic teeth, e.g., teeth configured around the circumference of the annular elements. The number of teeth can be dividable by 2 or by 4, such as 4 teeth or 8 teeth. The teeth can have helical surfaces rising from a base of the annular elements, followed by abrupt surfaces going back down to the base, after reaching peaks of the teeth. The other end of the helical surfaces can reach valley points, before followed by the abrupt surfaces of the adjacent teeth.

Annular element 571 can have multiple teeth 572, such as 4 teeth arranged cyclically around a circumference of the base of the annular element 571. Each tooth can have a helical surface 573. At the end of the helical surface 573 near the base, there can be a valley point 574, which can be followed by an adjacent tooth, e.g., an abrupt surface of the adjacent tooth.

Similarly, annular element 576 can have 4 teeth 577, arranged cyclically around a circumference of the base of the annular element 576. Each tooth can have a helical surface 578. At the end of the helical surface 578 near the base, there can be a valley point 579, which can be followed by an adjacent tooth, e.g., an abrupt surface of the adjacent tooth.

The two annular elements can be concentric around an axis of rotation 551A, with the helical surfaces 573 and 578 facing each other. Further, the teeth of the annular elements can be configured so that peaks of the teeth of one annular element face helical surfaces of another annular element, and valley points of one annular element face helical surfaces of another annular element.

The rod 553 can be disposed in the annular elements, such as the axis of the rod coincides with the axes of the annular elements. The rod can be fixedly constrained inside the annular elements, e.g., the rod and the annular elements can move as a single unit, e.g., to form the top element of the first portion 551.

The top element can be disposed in a sleeve 585 so that sleeve is configured to house the slanting surface elements 571 and 576, e.g., the inner diameter of the sleeve is the same as the outer diameters of the slanting surface elements 571 and 576. One or more protruded elements 554, such as two pins in opposite sides of the sleeve, with each pin passing through the wall of the sleeve and protruded inward from the inner surface area of the sleeve. The protruded pins can interface with the slanting surfaces of the elements 571 and 576. The protruded pin can include cylindrical pins, rollers, elliptical pins, or any shape protrusions that can slide along the slanting surfaces of the first and second annular elements. Multiple pins can also be used.

With the protruded element such as the pin 554, the top element is constrained to move along the axis of rotation of the sleeve. For example, the pin can be inserted after the top element, e.g., the annular elements, have been placed inside the sleeve, so that the pin is disposed between the two annular elements. Thus the pin can prevent the top element from being removed or separated from the sleeve.

Due to the interaction between the pins and the slanting surfaces, the top element can rotate while moving linearly along the axis of rotation. For example, when the pins contact the helical slanting surface of the slanting surface elements 571 or 576, the pins can slide along the helical slanting surface, which can rotate the top element.

The helical surfaces of the first and second annular elements can be facing each other, and can be configured to provide a torque to rotate the rod through the protruded pin. For example, the top element can be pushed to move in one direction, such as to the right as in FIG. 5B(b). The protruded pins then contact the helical surfaces of the first annular element 571. Due to the helical surfaces, the protruded pins can slide or roll on the helical surfaces, effectively rotating the top element an angle corresponded to the amount of the protruded pin sliding or rolling on the helical surfaces, from the point of contact to the point of rest at the bottom of the helical surfaces.

The top element can be retracted, e.g., the top element can be pulled to move in an opposite direction, such as to the left as in FIG. 5B(b). The protruded pins then can be configured to contact the helical surfaces of the second annular element 576. Due to the helical surfaces, the protruded pins can slide or roll on the helical surfaces, effectively rotating the rod another angle corresponded to the amount of the protruded pins sliding or rolling on the helical surfaces, from the point of contact to the point of rest at the bottom of the helical surfaces. Thus, by pushing and pulling, the rod can rotate an angle, such as a 90 degrees angle.

FIG. 5B(b) shows a schematic construction of a first portion 551 of a locking assembly. The first portion, or the first lockable element, can include a rod 553 fixedly coupled with a first annular element 571 and a second annular element 576. The first portion can be placed inside a sleeve 585.

One end of the rod 553 can include a hook end or a hookable element 555, which can include a perpendicular elongated portion having a longer side and a shorter side. One or more pins 554 can be inserted into the sleeve, such as after the first portion has been placed inside the sleeve. Since the annular elements 571 and 576 are constrained by the pins 554, the top element and the sleeve are coupled together, e.g., cannot be removed from each other.

The pin can be at any configuration with the regard to the hook end. As shown, the pin is parallel to the hook end. As such, the pin is configured so that when the pin is rested at the valley point of the second annular element 576, the hook end is either parallel (unlocked state) or perpendicular (locked state) to the parallel hook ends of the hook receptacle.

FIG. 5B(c) shows an assembled first portion 551 of the locking assembly partially locked with a second portion 552 of the locking assembly. The top element including the rod 553 and the annular elements 571 and 576 is assembled inside a sleeve 585. Pins 554 can be disposed through the sleeve wall between the annular elements. As such, the pin is configured so that when the pin is rested at the valley point of the first annular element 571, the hook end is partially locked to the parallel hook ends of the hook receptacle, e.g., forming a 45 degrees. That way, when the rod is further rotated another 45 degrees, the pin is to be rested at the valley point of the second annular element 576, the hook end is either parallel (unlocked state) or perpendicular (locked state) to the parallel hook ends of the hook receptacle.

FIG. 5B(d) shows a cross section AA' of an assembled first portion 551 of the locking assembly partially locked with a second portion 552 of the locking assembly. The cross section is through the pin 554.

FIGS. 6A-6L illustrate a toggle process from an unlocked state to a locked state according to some embodiments. A locking assembly can include a first portion that can be lockable to a second portion. In an unlocked state of the first to the second portion, the first portion can be removed or separated from the second portion. In a locked state of the first to the second portion, the first portion is coupled to the second portion, so that the first and second portions move together as a unit, e.g., the first portion cannot be removed or separated from the second portion. The first portion can move a short distance relative to the second portion, such as movements due to the fabrication or design tolerance, or due to the tolerance of the lockability of the two portions.

The first portion can be coupled, such as fixedly coupled, to a first movable component of a clamping device. The second portion can be coupled, such as fixedly coupled, to a second movable component of a clamping device.

The first portion can include two annular elements together with a rod disposed in the annular elements. The rod can have a protruded pin (or more than one protruded pin) placed between the two annular elements. The rod can have a hook end, which can be a hookable element at or near an end of the rod. The rod can move a short distance, e.g., constrained by the movements of the pin, which is blocked by the first and second annular elements.

The second portion can include a hook receptacle, which can include a parallel hookable feature, which can be mated with the hook end of the rod.

Using a set of vertical movements, the locking assembly can change states, between the locked and the unlocked state. And using the same set of vertical movements again can change the state again. Thus, the set of vertical movements can toggle the states of the locking assembly. The set of vertical movements can include a downward movement followed by an upward movement of the first portion with respect to the second portion.

The locking assembly can be in an unlocked state, in which the first portion is separated from the second portion. In the unlocked state, the clamping device is working to clamp on an object. The first movable component can move down relative to the second component. The downward movement of the first moveable component can partially accomplish the toggling of the unlocked state to the locked state.

Figures 6A, 6B, 6C, 6D:
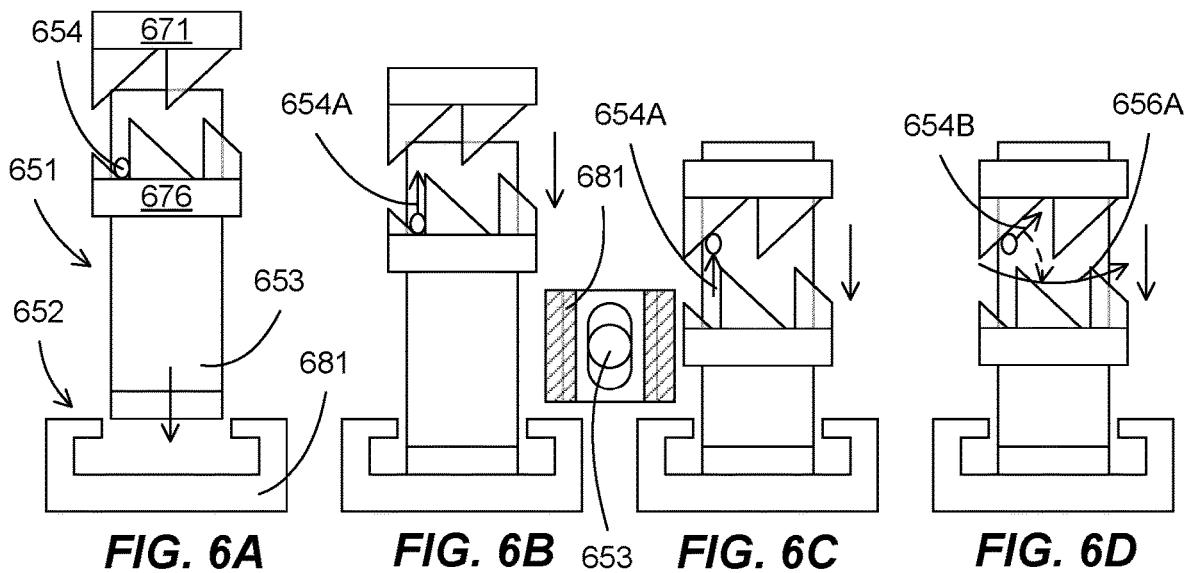
FIGS. 6A-6L illustrate a toggle process from an unlocked state to a locked state according to some embodiments.

In FIG. 6A, the first portion 651 can be brought toward the second portion 652. For example, a hoist can bring the clamping device clamping on the object to a destination. The hoist can be lowered to place the object on the ground. The hoist can further be lowered after the object touches the ground. The first movable component of the clamping device can move toward the second movable component, bringing the first portion of the locking assembly toward the second portion of the locking assembly.

The first portion can be disposed so that the axis of the annular elements and of the rod 653 is perpendicular with the ground, e.g., parallel to the gravitational force. Thus gravitational force can pull the rod 653 downward, so that the pin 654 can move along a helical surface to rest at a valley point of the bottom annular element 676. The pin location can be configured so that when the pin rests at a valley point of the bottom annular element 676.

In FIG. 6B, the first portion 651 can be further lowered toward the second portion 652. For example, the hoist can further lower the first movable component toward the second movable component of the clamping device, until the rod 653 is in contact with the hook receptacle 681. After the rod contacts the hook receptacle, further lowering of the first movable component (or the lowering of the first portion 651 or the lowering of the two annular elements) can move the two annular elements down on the pin, or the pin moves 654A relatively up with respect to the annular elements.

In FIG. 6C, the first portion 651 can be further lowered toward the second portion 652. The annular elements can move down until the pin 654 completely moved 654A to contact with the helical surface of the top annular element 671.

In FIG. 6D, the first portion 651 can be further lowered toward the second portion 652. The annular elements can move down, forcing the pin to move 654B along the helical surface of the top annular element. The movement 654B of the pin can rotate 656A the rod.

Figures 6E, 6F, 6G, 6H:
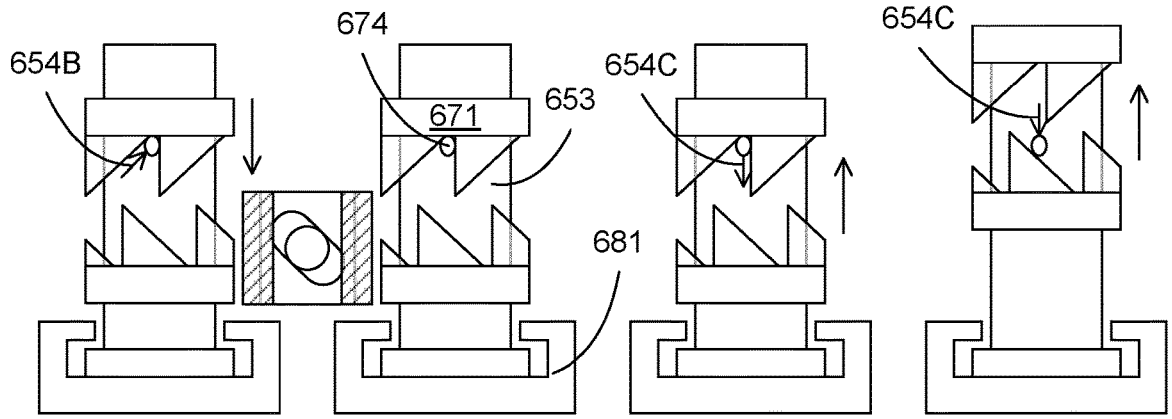

In FIG. 6E, the first portion 651 can be further lowered toward the second portion 652. The annular elements can move down until the pin completely moved 654B along the helical surface of the top annular element, and the rod completes its rotational movement.

The rotational amount of the rod can correspond to the angular distance of the helical surface traveled in the top annular element. For example, the pin can contact a middle portion of the helical surface, and then travel to the valley point, which can correspond to about 45 degrees. Thus the rod can rotate about 45 degrees.

In FIG. 6F, the first portion 651 completes its movement toward the second portion 652, e.g., the two portions cannot move toward each other anymore. The pin is rested at the valley point 674 of the top annular element 671. The rod 653 rotates about 45 degrees, and partially hooked with the hook receptacle 681.

Thus the movement of the first moveable component toward to the second moveable component has partially accomplished the toggling of the unlocked state to the locked state.

The first movable component can then move up relative to the second component. The upward movement of the first moveable component can complete the toggling of the unlocked state to the locked state.

In FIG. 6G, the first portion 651 can start move up from the second portion 652. For example, the hoist can lift the first movable component upward, which can move away from the second movable component of the clamping device. The upward movement of the annular elements can move 654C the pin away from the top annular element.

In FIG. 6H, the first portion 651 can be further moved up from the second portion 652. The annular elements can move up until the pin 654 completes its move 654C to contact with the helical surface of the bottom annular element 676.

Figures 6I, 6J, 6K, 6L:
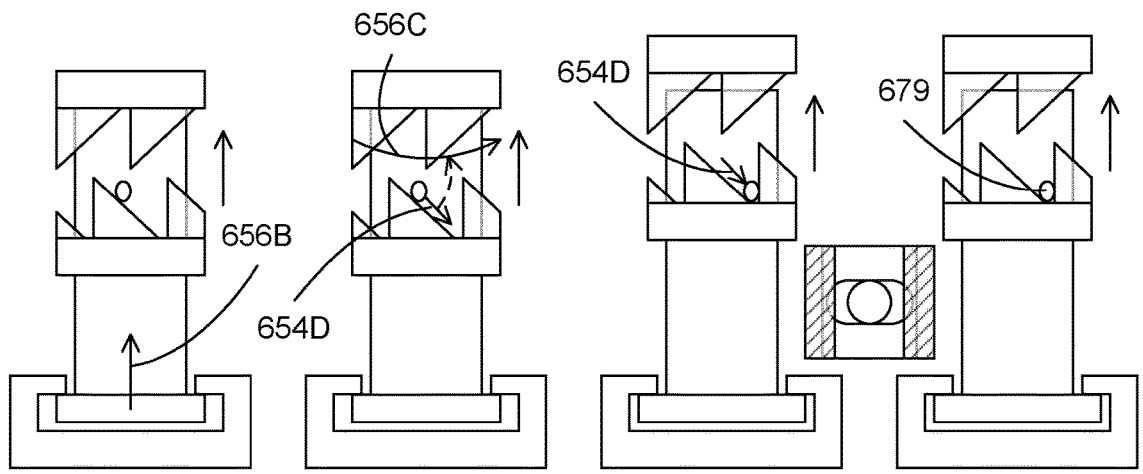

In FIG. 6I, the first portion 651 can be further moved up from the second portion 652. The annular elements can move up, lifting the rod to move 656B (since the pin is in contact with the bottom annular element) until the hookable element of the rod is in contact with the hookable feature of the hook receptacle. This distance can be small, e.g., order of mm, such as 1 mm, 2 mm, 3 mm, 5 mm, or less than 10 mm.

In FIG. 6J, the first portion 651 can be further moved up from the second portion 652. The annular elements can move up until the pin starts to move 654D along the helical surface of the bottom annular element. The movement 654D along the helical surface of the pin can rotate 656C the rod.

In FIG. 6K, the first portion 651 can be further moved up from the second portion 652. The annular elements can move up until the pin completes its move 654D along the helical surface of the bottom annular element, resting at a valley point of the bottom annular element. The rod also completes its rotational movement. The up movement 656B of the rod and the movement 654D of the pin along the helical surface can occur in any order, such as one before the other, or concurrently, e.g., at a same time.

The rotational amount of the rod can correspond to the angular distance of the helical surface traveled in the bottom annular element. For example, the pin can contact a middle portion of the helical surface, and then travel to the valley point, which can correspond to about 45 degrees. Thus the rod can rotate about 45 degrees.

The two rotations 656A and 656C can be about 90 degrees, determined from the separation of a tooth in the bottom annular element. In the beginning of the toggling process (e.g., FIG. 6A), the pin is at a valley point. After the two rotations 656A and 656C, the pin is at an adjacent valley point, separated by a tooth in the bottom annular element. Thus, if the bottom annular element has 4 teeth with equal spacing, the total rotation angle is 360/4=90 degrees.

In FIG. 6L, the first portion 651 completes its movement away from the second portion 652, e.g., the two portions cannot move away from each other anymore. The pin is rested at the valley point 679 of the bottom annular element 676. The rod 653 rotates further about 45 degrees for a complete 90 degrees, and hooked with the hook receptacle 681. Any further up movement can move the first and second portions as a unit, e.g., the top portion is hooked or locked with the bottom portion, and cannot be removed or separated from further up movements.

Thus the movement of the first moveable component away from to the second movable component has accomplished the toggling of the unlocked state to the locked state.

FIGS. 7A-7L illustrate a toggle process from a locked state to an unlocked state according to some embodiments. The toggle process can use a same set of vertical movements, e.g., the set of vertical movements that are used to change states from the unlocked state to the locked state. The set of vertical movements can include a downward movement followed by an upward movement of the first portion with respect to the second portion.

The locking assembly can be in a locked state, in which the first portion is coupled to the second portion. In the locked state, the jaws of the clamping device are widely separated, e.g., the clamping device does not function normally, e.g., in the normal operation that when the clamping device is lifted up, the jaws clamp together, with or without an object between the jaws.

The first movable component can move down relative to the second component. The downward movement of the first moveable component can partially accomplish the toggling of the locked state to the unlocked state.

In FIG. 7A, the first portion 751 can be lifted, which then pulls on the second portion 752. For example, a hoist can bring the empty clamping device, e.g., there is no object between the jaws, to an object location. The jaws can be widely separated, since the first portion is locked to the second portion, which can prevent the jaws from moving toward each other.

In the locked state, the hookable element of the rod is hooked to the hookable feature of the hook receptacle. The rod can be separated a little from the bottom side of the hook receptacle. The pin is rested on a valley point of the bottom annular element.

In FIG. 7B, the first portion 751 can be lowered toward the second portion 752. The rod can move down 756A to make contact with the bottom of the hook receptacle.

For example, the hoist can be lowered to place an object between the open jaws. The hoist can further be lowered until the clamping device contacts the object, which is positioned between the jaws. The hoist can further be lowered until the first movable component of the clamping device moves toward the second movable component, bringing the hooked rod to be in contact with the bottom side of the hook receptacle, e.g., from the contact at the hookable feature at the top side of the hook receptacle.

In FIG. 7C, the first portion 751 can be further lowered toward the second portion 752. The annular elements can move down until the pin 754 starts to move 754A to make contact with the helical surface of the top annular element 771.

In FIG. 7D, the first portion 751 can be further lowered toward the second portion 752. The annular elements can move down until the pin 754 completely moved 754A to contact with the helical surface of the top annular element 771.

In FIG. 7E, the first portion 751 can be further lowered toward the second portion 752. The annular elements can move down, forcing the pin to start to move 754B along the helical surface of the top annular element. The movement 754B of the pin can rotate 756B the rod.

In FIG. 7F, the first portion 751 can be further lowered toward the second portion 752. The annular elements can move down until the pin completely moved 754B along the helical surface of the top annular element, and the rod completes its rotational movement. The pin rests on a valley point of the top annular element. The rod rotates about 45 degrees, and remains partially hooked with the hook receptacle 781.

Thus the movement of the first moveable component toward to the second movable component has partially accomplished the toggling of the locked state to the unlocked state.

The first movable component can then move up relative to the second component. The upward movement of the first moveable component can complete the toggling of the locked state to the unlocked state.

In FIG. 7G, the first portion 751 can start move up from the second portion 752. For example, the hoist can lift the first movable component upward, which can move away from the second movable component of the clamping device. The upward movement of the annular elements can start to move 754C the pin away from the top annular element.

In FIG. 7H, the first portion 751 can be further moved up from the second portion 752. The annular elements can move up until the pin 754 completes its move 754C to contact with the helical surface of the bottom annular element 776.

In FIG. 7I, the first portion 751 can be further moved up from the second portion 752. The annular elements can move up, lifting the rod to move 756C (since the pin is in contact with the bottom annular element) until the hookable element of the rod is in contact with the hookable feature of the hook receptacle. This distance can be small, e.g., order of mm, such as 1 mm, 2 mm, 3 mm, 5 mm, or less than 10 mm.

In FIG. 7J, the first portion 751 can be further moved up from the second portion 752. The annular elements can move up until the pin starts to move 754D along the helical surface of the bottom annular element. The movement 754D along the helical surface of the pin can rotate 756D the rod.

In FIG. 7K, the first portion 751 can be further moved up from the second portion 752. The annular elements can move up until the pin completes its move 754D along the helical surface of the bottom annular element, resting at a valley point of the bottom annular element. The rod also completes its rotational movement. The up movement 756C of the rod and the movement 754D of the pin along the helical surface can occur in any order, such as one before the other, or concurrently, e.g., at a same time.

In FIG. 7L, the first portion 751 can be further moved up from the second portion 752, e.g., the two portions can be separated from each other, since the hookable element of the rod is not engaged with the hookable feature of the hook receptacle. The pin is rested at the valley point of the bottom annular element 776. The rod 753 rotates for a complete 90 degrees, and be separatable from the hook receptacle. A further up movement can move the first portion away from the second portion, allowing the jaws to move toward each other for clamping on the object.

Thus the movement of the first moveable component away from to the second moveable component has accomplished the toggling of the locked state to the unlocked state.

In some embodiments, the locking assembly can be optimized for improved reliability, improved operation, and improved fabrication. For example, a pulling force can be higher than a pushing force on the locking assembly, thus the locking assembly can include a feature for providing higher support in the pulling direction, which can provide better reliability for the locking mechanism. The locking assembly can be configured to increase a force conversion from vertical movements to rotation movements of the rod, to provide better operation of the locking mechanism. The locking assembly can be configured to reduce a free movement distance, e.g., a distance in which a pulling element of the clamping device is pulled up, but without any response from the jaws.

FIGS. 8A-8D illustrate optimized configurations for the locking assembly according to some embodiments. In FIGS. 8A(a)-8A(c), the locking assembly can include support features 885A and 885B, to address an imbalance of forces acting on the locking assembly, such as on the annular elements 871 and 876.

In FIGS. 8A(a) and 8A(b), the locking assembly can be coupled, such as fixedly coupled to two movable components 810 and 830 of the clamping device. For example, the annular elements 871 and 876 can be coupled to a top movable component 810, such as to the pulling element of a clamping device (for example, as in a configuration shown in FIGS. 2A and 2B). The hook receptacle 881 can be coupled to a bottom movable component 830, such as to the pivot point of a clamping device (for example, as in a configuration shown in FIGS. 2A and 2B).

In a first movement, the top movable component can be pushed down on the bottom movable component, for example, by the hoist not pulling or releasing on the pulling element. Thus the force of the top component pushing down on the bottom component can be due to the weight of the pulling element. This pushing down force can push the rod 853 against the top annular element 871, with a force 861A equaled to the pushing down force.

In a second movement, the top movable component can be pulled up from the bottom movable component, for example, by the hoist pulling on the pulling element. Thus the force of the bottom component pulling on the top component can be due to the weight of the jaw assembly. This pulling up force can pull the rod 853 against the bottom annular element 876, with a force 861B equaled to the pulling up force.

The force 861B pulling on the bottom annular element can be higher than the force 861A pushing on the top annular element from the rod. Thus the bottom annular element can be supported from a bottom side.

A sleeve 885 can be used to house the annular elements 871 and 876. The sleeve can have a support element 885A at a bottom side of the sleeve, on an inner surface, to support the bottom annular element. Pin 871A can be used to secure the annular element 871 to the sleeve 885. Pin 876A can be used to secure the annular element 876 to the sleeve 885.

In fabrication, the annular elements can be inserted into the sleeve from a top side, first the bottom annular element inserted first, followed by the second annular element. Pins 871A and 876A can be used to secure the two annular elements with the sleeve.

In operation, the support element 885A can prevent the bottom annular element from moving down, e.g., supporting the bottom annular element against the pulling down force exerted by the rod. The pin 876A can be used to add to the support of the bottom annular element, such as to prevent the bottom annular element from moving up. The pin 871A can prevent the top annular element from moving up, e.g., securing the top annular element against the pushing force exerted by the rod.

The sleeve 885 can further have another support element 885B at a top side of the sleeve, on an outer surface, to support the both annular elements on the top movable component 810. This support element 885B can support the sleeve 885 on the top movable component. In fabrication, the sleeve, with the annular elements installed, can be inserted into the top movable component from a top side, so that the support element 885B rested on a mating feature in the top component. Optional secured elements, such as a pin can be used to secure the sleeve with the top component. Press fit process can also be used.

FIGS. 8B(a)-8B(b) shows configurations for different angles 863A and 863B of the teeth 872 on an annular element 871, such as the angles 863A and 863B of the helical surface 873 of the teeth 872 making with a horizontal surface of the annular element 871, which is a surface perpendicular to the axis of the annular element. A force from the pin pushing on the helical surface 873 can be decomposed into a normal force, and a parallel force 862A or 862B, which is the force for moving the pin along the helical surface for rotating the rod.

For small angle 863A (FIG. 8B(a)), the parallel force 862A can be small, as compared to the parallel force 862B caused by the larger angle 863B (FIG. 8B(b)). From these configurations, a larger angle is preferred for ease of rotating the rod, which can be the activation force for toggling the locking mechanism.

FIGS. 8B(c)-8B(d) shows configurations for different angles 863C and 863D of the teeth on an annular element, e.g., the angles of the helical surface of the teeth making with a horizontal surface of the annular element. A pin can move from a valley point of the bottom annular element, along a helical surface of a tooth on the bottom annular element, and up to rest on a valley point of the top annular element. The total vertical distance 865A or 865B can be the distance that the annular elements move with respect to the rod, e.g., when the rod is locked with the hook receptacle, the movements of the pin with respect to the annular elements can be regarded as the movements of the annular elements while keeping the rod stationary. Thus, the top movable component 810 (which is coupled to the annular elements) can move down a distance 865A or 865B with respect to the bottom movable component 830 (which is coupled to the hook receptacle, which can be locked to the rod). In other words, the distance 865A or 865B can be the backlash distance when the top component reverses directions. The backlash distance can be the distance that the top component moved relative to the bottom component, in order to toggle the states of the locking assembly. The backlash distance 865A or 865B can be as small as possible, in order to improve the operation of the locking mechanism.

For large angle 863C (FIG. 8B(c)), the backlash distance 865A can be large, as compared to the backlash distance 865B caused by the smaller angle 863D (FIG. 8B(d)). From these configurations, a smaller angle is preferred for better operation of the locking mechanism.

As shown in FIG. 8B(e), the locking assembly can be configured so that the teeth of the annular elements can be optimized for large parallel forces and small backlash distances. The angles of the teeth, e.g., the angles between the helical surfaces and the plane perpendicular to the axis of the annular elements, can be between 30 and 60 degrees, or between 35 and 55 degrees, or between 40 and 50 degrees, or can be about 45 degrees.

FIG. 8B(f) shows a configuration of the annular elements, which are embedded in a sleeve. A tooth 877 can have a helical surface 878, rising from a valley point 879 at a base of the annular element 876, and an abrupt surface which is terminated at a valley point of an adjacent tooth. The helical surface can be configured to form a constant angle with the axis 751A of the annular elements.

FIGS. 8C(a) and 8C(b) show configurations for improving backlash distance of the annular elements relative to the rod. If the annular elements are positioned farther apart, e.g., separated by a distance 867A, the backlash distance can be larger, as compared to a closer annular element separation 867B. A minimum backlash distance can be obtained by placing the two annular elements close together, with minimum clearance 867C for the pin 854 to pass the peak of the teeth of an annular element (such as the top annular element as shown) while traveling on the helical surface of the teeth of the other annular element (such as the bottom annular element as shown). The clearance distance can be the distance between the pin and the opposite slanting surface, e.g., the clearance space on the path of the pin while moving on the slanting surface. The clearance distance can be less than 10 mm, less than 5 mm, or less than 2 mm.

FIGS. 8D(a) and 8D(b) show configurations for improving backlash distance and ease of traveling for the pin. For example, if the abrupt surface of the teeth is vertical, e.g., parallel to the path traveled by the pin when moving from the helical surface on one annular element to the valley point of the other annular element, the pin might get caught by the peak of the teeth. Thus, a recess 868A of the teeth abrupt surface can improve a reliability of the operation of the locking assembly, by preventing the peak of the teeth from interfering with the pin. The recess 868A can be a small angle from the vertical distance, such as from the axis of rotation of the annular elements. The angle of the recess 868A can be less than 10 degrees, less than 5 degrees, or less than 2 degrees.

A rounding 868C of the peak of the teeth of the annular elements can further remove the backlash distance, by allowing the annular elements to be positioned closer, e.g., the clearance distance 867D can be smaller than the clearance distance 867C in the case of sharp teeth. Alternatively, the peaks of the teeth can be trimmed 868B at an angle parallel to the angle of the helical surface. The trim 868B can occur on a portion of the helical surface that the pin does not travel, e.g., the peak portion of the teeth away from the location where the pin leaves the helical surface to travel vertically to the valley point of the other annular element. The parallel angle can allow the pin to pass the peaks with a uniform clearance, using a trimmed peak 868D of the teeth.

In some embodiments, the automatic locking assembly can be configured so that two slanting surfaces can face away from each other. There can be two or more curve shape elements that are configured to mate with the slanting surfaces, such as two protruded pins from a rod. The two slanting surfaces can be disposed between the two protruded pins, so that a first protruded pin interfaces with a first slanting surface and a second protruded pin interfaces with a second slanting surface. The slanting surface can be a curve slanting surface, such as a helical surface. The movements of the protruded pins along the slanting surface can rotate the rod, e.g., when the pins run along the helical surface.

The first slanting surface can be configured to accept the first protruded pin in a first moving direction of the pins or of the slanting surface, and then move the first protruded pin along the first slanting surface.

The second slanting surface can be configured to accept the second protruded pin. The second slanting surface can move the second protruded pin along the second slanting surface, for example, a helical surface, such as rotating the rod by the second protruded pin running along the helical surface.

Figure 9A:
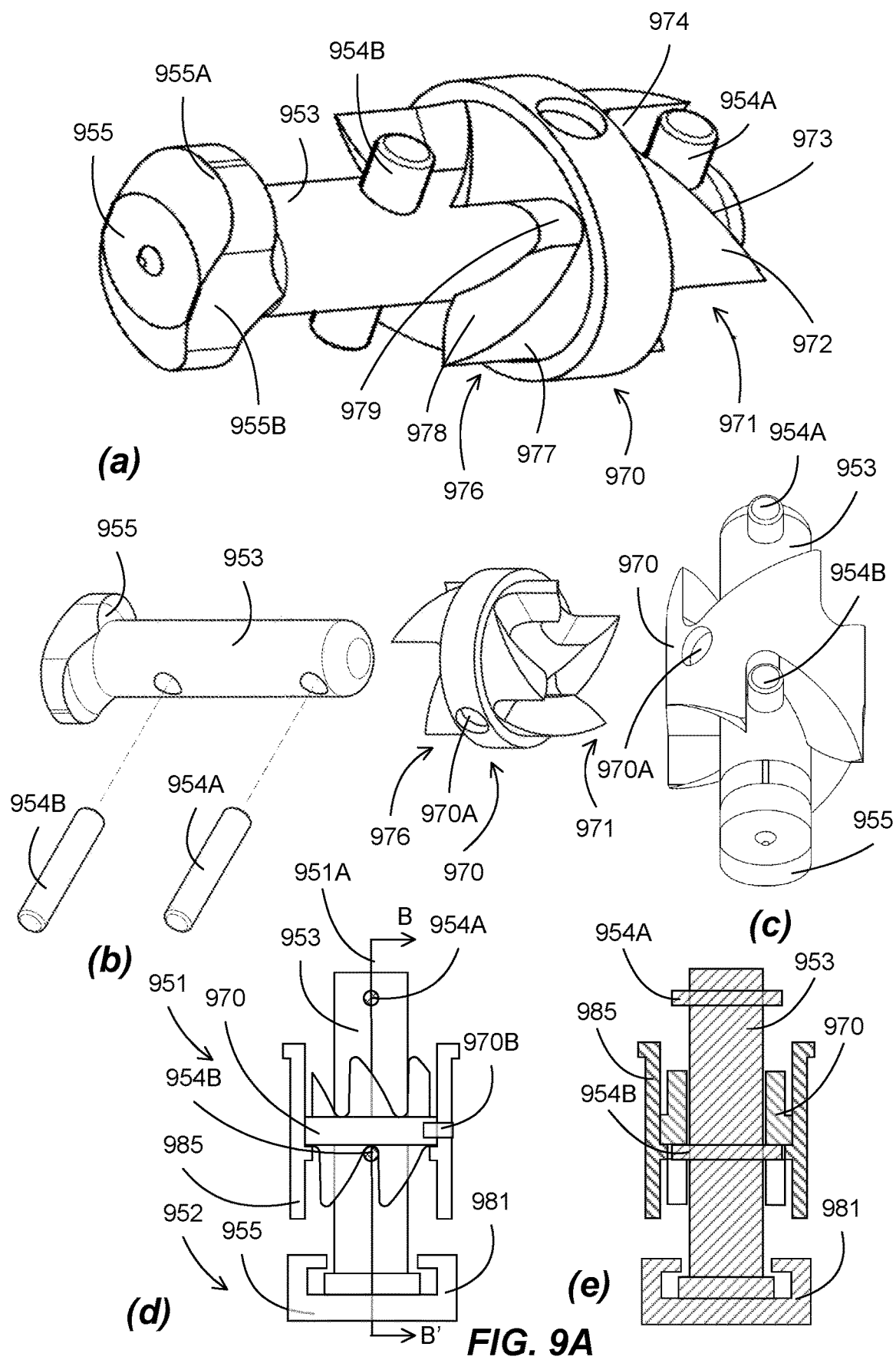
FIGS. 9A-9B illustrate other schematic configurations for a locking mechanism or assembly according to some embodiments.
Figure 9B:
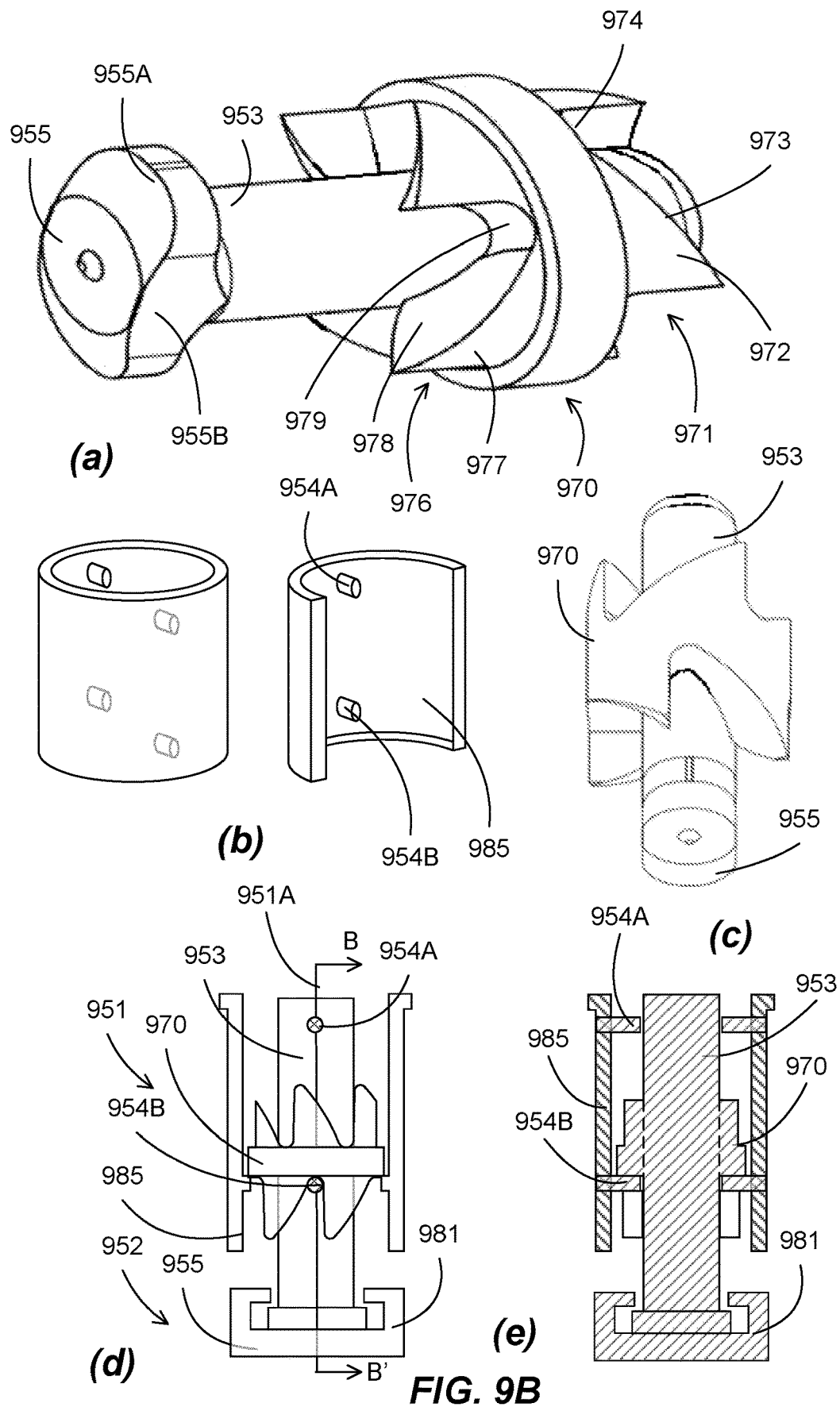

FIGS. 9A-9B illustrate other schematic configurations for a locking mechanism or assembly according to some embodiments. The locking mechanism can employ a slanting interface for repeatedly rotating a rod through a repeatedly set of vertical forces.

In some embodiments, the locking mechanism can include two lockable elements, such as a rod with a hook end and a hook receptacle. Depending on the orientation of the hook end, the rod can be unseparatable from the hook receptacle, or the rod can move independent of the receptacle.

FIGS. 9A(a)-9A(e) shows a configuration for a locking assembly having two portions 951 and 952, forming two lockable elements. The first portion 951 can include a rod 953 having a hook end 955 for mating with a hookable feature or a hookable element 981 of the second portion 952. The rod 953 can be movably disposed in another element of the first portion, such as a slanting surface element 970 having at least a slanting surface, e.g., the rod can move along an axis of rotation of the slanting surface element 970. A sleeve 985 can be used to house the first portion, e.g., the rod 953 and the slanting surface element 970. The rod 953 can have protruded elements 954A and 954B, configured to be on two sides of the slanting surfaces of the slanting surface element 970. The protruded elements can restrict the movement of the rod, e.g., the rod can move one way so that a protruded element can contact a slanting surface of a slanting surface element, and the rod can move an opposite way so that another protruded element can contact a slanting surface of another slanting surface element. By moving the rod 953 so that the protruded elements 954A and 954B contacts the slanting surfaces in sequence, the rod can rotate to toggle between a coupled configuration and a separatable configuration with the hookable feature 981.

FIG. 9A(a) shows a schematic detail of a first portion 951 of a locking assembly using slanting interfaces. The locking assembly can include two portions 951 and 952, forming two lockable elements. A first portion can include a rod 953, placed in an annular element 970 so that the rod can move along the axis of rotation of the annular element. The annular element 970 can have opposite slanting surfaces, such as cyclic teeth on two opposite sides. The annular element 970 can include two annular elements 971 and 976 secured together with the slanting surfaces facing opposite directions. The annular element 970 can be a one piece annular element having slanting surfaces on opposite sides. A second portion can include a hook receptacle 981.

The first portion of a locking assembly can include a slanting surface interacting element, such as a rod 953. One end of the rod can include a hook end or a hookable element 955, which can include a perpendicular elongated portion having a longer side 955A and a shorter side 955B. By rotating the rod, such as a 90 degree angle for this elongated hook element 955, the status of the lock can be toggle between locked and unlocked states.

The rod 953 can include at least two protruded elements, such as two pins 954A and 954B, which can be passing through the rod and protruded from both sides of the rod.

The annular element 970 can include a ring-like element, with slanting surfaces in the form of helical surfaces. The annular element 970 can have a hollow cylindrical shape, such as a ring or a hollow cylinder, with an axis of rotation 951A. The annular element can have cyclic teeth, e.g., teeth configured around the circumference of the annular element. The number of teeth can be dividable by 2 or by 4, such as 4 teeth or 12 teeth. The teeth can have helical surfaces rising from a base of the annular elements, followed by abrupt surfaces going back down to the base, after reaching peaks of the teeth. The other end of the helical surfaces can reach valley points, before followed by the abrupt surfaces of the adjacent teeth.

At one side, the annular element 970 can have multiple teeth 972, such as 4 teeth arranged cyclically around a circumference of the base of the annular element 970. Each tooth can have a helical surface 973. At the end of the helical surface 973 near the base, there can be a valley point 974, which can be followed by an adjacent tooth, e.g., an abrupt surface of the adjacent tooth.

At an opposite side, the annular element 970 can have 4 teeth 977, arranged cyclically around a circumference of the base of the annular element 976. Each tooth can have a helical surface 978. At the end of the helical surface 978 near the base, there can be a valley point 979, which can be followed by an adjacent tooth, e.g., an abrupt surface of the adjacent tooth.

The annular element 970 can have teeth 972 and 977, and helical surfaces 973 and 978, facing each other. Further, the teeth of the annular element can be configured so that peaks of the teeth in one side are aligned along the axis of rotation 951A with helical surfaces of teeth in an opposite side, and valley points of teeth in one side are aligned along the axis of rotation 951A with helical surfaces of teeth in an opposite side.

The rod 953 can be disposed in the annular element, such as the axis of the rod coincides with the axes of the annular element 951A. The rod can be constrained inside the annular elements, e.g., the rod can move along the axis, and can rotate around the axis, in the absence of the protruded elements.

With the protruded elements such as the pins 954A and 954B, the rod 953 is further constrained. For example, the pins can be inserted after the rod has been placed in the annular element, so that the pins are disposed surrounding the annular element. Thus the pins can prevent the rod from being removed or separated from the annular element.

The pins can further limit the movements of the rod, beside the constraint of limited movements along the axis, due to the teeth of the annular element preventing the pins from going pass the teeth. The rod can have limited rotational movements, constrained by the abrupt surfaces or the helical surfaces of the teeth. The rod can rotate a complete cycle, but only accompanied by axis movements, e.g., when the rotational movement is blocked by the teeth, the rod can move along the axis so that the pins are clear of the teeth before resuming the rotational movement.

The helical surfaces on the two sides of the annular element can be facing away from each other, and can be configured to provide a torque to rotate the rod through the protruded pins. For example, the rod can be pushed in one direction toward the annular element, with one protruded pin then contacting the helical surfaces of one side of the annular element. Due to the helical surfaces, the protruded pin can slide or roll on the helical surfaces, effectively rotating the rod an angle corresponded to the amount of the protruded pin sliding or rolling on the helical surfaces, from the point of contact to the point of rest at the bottom of the helical surfaces.

The rod can be retracted, e.g., pushing in an opposite direction toward the annular element. The other protruded pin then can be configured to contact the helical surfaces of the opposite side of the annular element. Due to the helical surfaces, the protruded pin can slide or roll on the helical surfaces, effectively rotating the rod another angle corresponded to the amount of the protruded pin sliding or rolling on the helical surfaces, from the point of contact to the point of rest at the bottom of the helical surfaces. Thus, by pushing and pulling, the rod can rotate an angle, such as a 90 degrees angle.

For example, the pin 954A can be facing the helical surface 973, and the pin 954B can be facing the helical surface 978, e.g., the helical surfaces 973 and 978 of the annular element 970 can be disposed between the two pins 954A and 954B.

The rod can be pushed, so that the pin 954A contacts the helical surface 973 of the annular element 970. The pin can then run along the helical surface 973 to the valley point 974. The movement of the pin 954A can cause the rod 953 to rotate an angle corresponded to the length of the movement, e.g., the distance that the pin travels on the helical surface 973.

The rod can be pulled, so that the pin 954B contacts the helical surface 978 of the annular element 970. The pin can run along the helical surface 978 to the valley point 979 of the annular element 970. The movement of the pin 954B can cause the rod 953 to rotate an angle corresponded to the length of the movement, e.g., the distance that the pin travels on the helical surface 978.

FIG. 9A(b) shows a schematic construction of a first portion 951 of a locking assembly. The first portion can include an annular element 970, placed inside a sleeve 985. A hole 970A can be formed in the annular element 970, which can accept a pin 970B for securing the annular element 970 with the sleeve 985. The first portion can include a rod 953. One end of the rod can include a hookable element 955, which can include a perpendicular elongated portion having a longer side and a shorter side. Pins 954A and 954B can be inserted into the rod, such as after the rod has been placed inside the annular element 970. Since the annular element 970 is constrained by the pins 954A and 954B, the annular element and the rod are coupled together, e.g., cannot be removed from each other.

The pins can be at any configuration with the regard to the hook end. As shown, the pins are parallel to the hook end. As such, the pin is configured so that when the pin is rested at the valley point of the teeth in a bottom side of the annular element 970, the hook end is either parallel (unlocked state) or perpendicular (locked state) to the parallel hook ends of the hook receptacle.

FIG. 9A(c) shows an assembled first portion 951 of the locking assembly. FIG. 9A(d) shows an assembled first portion 951 of the locking assembly partially locked with a second portion 952 of the locking assembly. The annular element 970 is assembled inside a sleeve 985. A rod 953 can be assembled inside the annular element, with pins 954A and 954B sandwiching the annular element. As such, the pins are configured so that when the pin 954B is rested at the valley point of the bottom teeth of the annular element, the hook end is partially locked to the parallel hook ends of the hook receptacle, e.g., forming a 45 degrees. That way, when the pin is further rotated another 45 degrees, to be rested at the valley point of the top teeth of the annular element, the hook end is either parallel (unlocked state) or perpendicular (locked state) to the parallel hook ends of the hook receptacle.

FIG. 9A(e) shows a cross section BB' of an assembled first portion 951 of the locking assembly partially locked with a second portion 952 of the locking assembly. The cross section is through the pins 954A and 954B.

FIGS. 9B(a)-9B(e) shows another configuration for a locking assembly having two portions 951 and 952, forming two lockable elements. The first portion 951 can include a top element having a hook end 955 for mating with a hookable feature or a hookable element 981 of the second portion 952. The top element can include a rod 953 fixedly coupled to a slanting surface element 970 having at least a slanting surface. Thus, the rod 953 and the slanting surface element 970 are configured to be as a single unit of the top element, such as an integrated top element including the rod 953 and the slanting surface element 970.

A sleeve 985 can be used to house the top element, e.g., the top element can be disposed in the sleeve 985 so that the slanting surface element 970 can slide in the sleeve 985. The sleeve 985 can have two or more protruded elements 954A and 954B, which can be protruded inward from the inner surface of the sleeve. The protruded elements 954 can be disposed around the slanting surfaces of the slanting surface element 970, e.g., the protruded elements can be installed on two sides of the slanting surface element 970 after the slanting surface element 970 is already disposed inside the sleeve. In this configuration, the protruded elements can restrict the movement of the top element inside the sleeve, e.g., the top element can move one way so that a protruded element can contact a slanting surface of the slanting surface element, and the top element can move an opposite way so that another protruded element can contact another slanting surface of the slanting surface element. By moving the top element so that the protruded elements 954A and 954B contact the slanting surfaces in sequence, the hook end of the top element can rotate to toggle between a coupled configuration and a separatable configuration with the hookable feature 981.

FIG. 9B(a) shows a schematic detail of a first portion 951 of a locking assembly using slanting interfaces. The locking assembly can include two portions 951 and 952, forming two lockable elements. A first portion can include a rod 953 fixedly coupled to an annular element 970, the rod is disposed along the axis of rotation of the annular element, and the rod and the annular element can move as a unit. The annular element 970 can have opposite slanting surfaces, such as cyclic teeth on two opposite sides. The annular element 970 can include two annular elements 971 and 976 secured together with the slanting surfaces facing opposite directions. The annular element 970 can be a one piece annular element having slanting surfaces on opposite sides. A second portion can include a hook receptacle 981.

The first portion of a locking assembly can include a top element having a rod 953 fixedly coupled to a slanting surface element 970. One end of the rod can include a hook end or a hookable element 955, which can include a perpendicular elongated portion having a longer side 955A and a shorter side 955B. By rotating the rod, such as a 90 degree angle for this elongated hook element 955, the status of the lock can be toggle between locked and unlocked states.

The annular element 970 can include a ring-like element, with slanting surfaces in the form of helical surfaces. The annular element 970 can have a hollow cylindrical shape, such as a ring or a hollow cylinder, with an axis of rotation 951A. The annular element can have cyclic teeth, e.g., teeth configured around the circumference of the annular element. The number of teeth can be dividable by 2 or by 4, such as 4 teeth or 12 teeth. The teeth can have helical surfaces rising from a base of the annular elements, followed by abrupt surfaces going back down to the base, after reaching peaks of the teeth. The other end of the helical surfaces can reach valley points, before followed by the abrupt surfaces of the adjacent teeth.

At one side, the annular element 970 can have multiple teeth 972, such as 4 teeth arranged cyclically around a circumference of the base of the annular element 970. Each tooth can have a helical surface 973. At the end of the helical surface 973 near the base, there can be a valley point 974, which can be followed by an adjacent tooth, e.g., an abrupt surface of the adjacent tooth.

At an opposite side, the annular element 970 can have 4 teeth 977, arranged cyclically around a circumference of the base of the annular element 976. Each tooth can have a helical surface 978. At the end of the helical surface 978 near the base, there can be a valley point 979, which can be followed by an adjacent tooth, e.g., an abrupt surface of the adjacent tooth.

The annular element 970 can have teeth 972 and 977, and helical surfaces 973 and 978, facing each other. Further, the teeth of the annular element can be configured so that peaks of the teeth in one side are aligned along the axis of rotation 951A with helical surfaces of teeth in an opposite side, and valley points of teeth in one side are aligned along the axis of rotation 951A with helical surfaces of teeth in an opposite side.

The rod 953 can be disposed in the annular element, such as the axis of the rod coincides with the axes of the annular element 951A. The rod can be fixedly constrained inside the annular elements, e.g., the rod and the annular elements can move as a single unit, e.g., to form the top element of the first portion 951.

The top element can be disposed in a sleeve 585 so that sleeve is configured to house the slanting surface element 970, e.g., the inner diameter of the sleeve is the same as the outer diameters of the slanting surface element 970. There are two or more protruded elements 954A and 954B, such as two pins in opposite sides of the sleeve, with each pin passing through the wall of the sleeve and protruded inward from the inner surface area of the sleeve. The protruded pins can interface with the slanting surfaces of the element 970.

With the protruded elements such as the pins 954A and 954B, the top element is constrained to move along the axis of rotation of the sleeve. For example, the pins can be inserted after the top element, e.g., the annular elements, have been placed inside the sleeve, so that the pins are disposed surrounding the annular element. Thus the pins can prevent the top element from being removed or separated from the sleeve.

Due to the interaction between the pins and the slanting surfaces, the top element can rotate while moving linearly along the axis of rotation. For example, when the pins contact the helical slanting surface of the slanting surface element 970, the pins can slide along the helical slanting surface, which can rotate the top element.

The helical surfaces on the two sides of the annular element can be facing away from each other, and can be configured to provide a torque to rotate the rod through the protruded pins. For example, the rod can be pushed to move in one direction, such as to the top as in FIGS. 9B(b) and 9B(c). The top protruded pin 954A then contacts the top helical surfaces of the annular element 970. Due to the helical surfaces, the protruded pin can slide or roll on the helical surfaces, effectively rotating the rod an angle corresponded to the amount of the protruded pin sliding or rolling on the helical surfaces, from the point of contact to the point of rest at the bottom of the helical surfaces.

The top element can be retracted, e.g., the top element can be pulled to move in an opposite direction, such as to the bottom as in FIGS. 9B(b) and 9B(c). The other protruded pin 954B then can be configured to contact the helical surfaces of the opposite side of the annular element 970. Due to the helical surfaces, the protruded pin can slide or roll on the helical surfaces, effectively rotating the rod another angle corresponded to the amount of the protruded pin sliding or rolling on the helical surfaces, from the point of contact to the point of rest at the bottom of the helical surfaces. Thus, by pushing and pulling, the rod can rotate an angle, such as a 90 degrees angle.

FIG. 9B(b) shows a schematic of a sleeve 985 of a locking assembly. The sleeve 985 can include 2 sets of protruded pins 954A and 954B. The pins 954A and 954B can be inserted into the sleeve after the top portion, e.g., the annular element 970 has been placed inside the sleeve 985. Since the annular element 970 is constrained by the pins 954A and 954B, the top element including the annular element and the rod is coupled with the sleeve, e.g., the top element can move a short distance relative to the sleeve, but cannot be removed from each other.

FIG. 9B(c) shows a top element of the locking assembly, including a rod 955 fixedly disposed in an annular element 970. The top element can be fabricated to form an integrated element having the rod and the annular element. The top element can be assembled by inserting the rod into the annular element and securing the rod and the annular element together. A hook end can be formed at one end of the rod.

The top element can be assembled in the sleeve, and the protruded pins can be inserted after the top element is inside the sleeve. The pins can be at any configuration with the regard to the hook end, such as parallel to the hook end. As such, the pin is configured so that when the pin is rested at the valley point of the teeth in a bottom side of the annular element 970, the hook end is either parallel (unlocked state) or perpendicular (locked state) to the parallel hook ends of the hook receptacle.

FIG. 9B(d) shows an assembled first portion 951 of the locking assembly partially locked with a second portion 952 of the locking assembly. The top element including the rod 953 and the annular element 970 is assembled inside a sleeve 985. Pins 954A and 954B are assembled sandwiching the annular element. As such, the pins are configured so that when the pin 954B is rested at the valley point of the bottom teeth of the annular element, the hook end is partially locked to the parallel hook ends of the hook receptacle, e.g., forming a 45 degrees. That way, when the pin is further rotated another 45 degrees, to be rested at the valley point of the top teeth of the annular element, the hook end is either parallel (unlocked state) or perpendicular (locked state) to the parallel hook ends of the hook receptacle.

FIG. 9B(e) shows a cross section BB' of an assembled first portion 951 of the locking assembly partially locked with a second portion 952 of the locking assembly. The cross section is through the pins 954A and 954B.

FIGS. 10A-10C illustrate a toggle process from an unlocked state to a locked state according to some embodiments. FIGS. 10A(a)-10C(a) show perspective views, and FIGS. 10A(b)-10C(b) show side views, of the toggle process. A locking assembly can include a first portion that can be lockable to a second portion. The first portion can include an annular element together with a rod disposed in the annular element. The rod can have two protruded pins (or more than two protruded pins) placed surrounding the annular element. The rod can have a hook end. The second portion can include a hook receptacle, which can include a parallel hookable feature, which can be mated with the hook end of the rod.

In FIGS. 10A(a)-10A(b), the first portion can be removable from the second portion, with the hook end 1055 of the rod 1053 parallel with the parallel hookable feature of the hook receptacle 1081. Top pin 1054A can be rested on a valley point of the top teeth 1072 of the annular element 1070.

In FIGS. 10B(a)-10B(b), the first portion can be brought down on the second portion. Bottom pin 1054B contacts helical surface of bottom teeth 1077 of the annular element 1070. Bottom pin 1054B further moves along the helical surface to rest on a valley point of the bottom teeth 1077 of the annular element 1070. Rod 1053 is rotated a 45 degree angle, so that the hook end 1055 is partially hooked on the hook receptacle.

In FIGS. 10C(a)-10C(b), the first portion can be brought up away from the second portion. Top pin 1054A contacts helical surface of top teeth 1072 of the annular element 1070. Top pin 1054A further moves along the helical surface to rest on a valley point of the top teeth 1072 of the annular element 1070. Rod 1053 is rotated another 45 degree angle, for a total of 90 degrees, so that the hook end 1055 is hooked on the hook receptacle. The locking assembly has completed its toggling process from an unlocked state to a locked state.

FIGS. 11A-11C illustrate a toggle process from a locked state to an unlocked state according to some embodiments. FIGS. 11A(a)-11C(a) show perspective views, and FIGS. 11A(b)-11C(b) show side views, of the toggle process. The toggle process can use a same set of vertical movements, e.g., the set of vertical movements that are used to change states from the unlocked state to the locked state, which includes a downward movement followed by an upward movement of the first portion with respect to the second portion.

In FIGS. 11A(a)-11A(b), the first portion can be locked with the second portion, with the hook end 1155 of the rod 1153 hooked with the parallel hookable feature of the hook receptacle 1181. Top pin 1154A can be rested on a valley point of the top teeth 1172 of the annular element 1170.

In FIGS. 11B(a)-11B(b), the first portion can be brought down on the second portion. Bottom pin 1154B contacts helical surface of bottom teeth 1177 of the annular element 1170. Bottom pin 1154B further moves along the helical surface to rest on a valley point of the bottom teeth 1177 of the annular element 1170. Rod 1153 is rotated a 45 degree angle, so that the hook end 1155 is partially hooked on the hook receptacle.

In FIGS. 11C(a)-11C(b), the first portion can be brought up away from the second portion. Top pin 1154A contacts helical surface of top teeth 1172 of the annular element 1170. Top pin 1154A further moves along the helical surface to rest on a valley point of the top teeth 1172 of the annular element 1170. Rod 1153 is rotated another 45 degree angle, for a total of 90 degrees, so that the hook end 1155 is separatable from the hook receptacle, e.g., the hook end is parallel with the parallel hookable feature of the hook receptacle. The locking assembly has completed its toggling process from a locked state to an unlocked state.

In some embodiments, the locking assembly can be optimized for improved reliability, improved operation, and improved fabrication.

FIGS. 12A-12D illustrate optimized configurations for the locking assembly according to some embodiments. In FIGS. 12A(a)-12A(d), the locking assembly can include support features 1285A and 1285B, to address an imbalance of forces acting on the locking assembly, such as on the annular element 1270.

In FIGS. 12A(a) and 12A(b), the locking assembly can be coupled, such as fixedly coupled to two movable components 1210 and 1230 of the clamping device. For example, the annular element 1270 can be coupled to a top movable component 1210, such as to the pulling element of a clamping device (for example, as in a configuration shown in FIGS. 2A and 2B). The hook receptacle 1281 can be coupled to a bottom movable component 1230, such as to the pivot point of a clamping device (for example, as in a configuration shown in FIGS. 2A and 2B).

In a first movement, the top movable component can be pushed down on the bottom movable component, for example, by the hoist not pulling or releasing on the pulling element. Thus the force of the top component pushing down on the bottom component can be due to the weight of the pulling element. This pushing down force can push the rod 1253 against the top teeth 1272 of the annular element 1270, with a force 1261A equaled to the pushing down force.

In a second movement, the top movable component can be pulled up from the bottom movable component, for example, by the hoist pulling on the pulling element. Thus the force of the bottom component pulling on the top component can be due to the weight of the jaw assembly. This pulling up force can pull the rod 1253 against the bottom teeth 1277 of the annular element 1270, with a force 1261B equaled to the pulling up force.

The force 1261B pulling up on the annular element can be higher than the force 1261A pushing down on the annular element from the rod. Thus the annular element can be supported from a bottom side.

A sleeve 1285 can be used to house the annular element 1270. The sleeve can have a support element 1285A at a bottom side of the sleeve, on an inner surface, to support the bottom side of the annular element. Pin 1270A can be used to secure the annular element 1270 to the sleeve 1285.

In fabrication, the annular element can be inserted into the sleeve from a top side. Pins 1270A can be used to secure the annular element with the sleeve.

In operation, the support element 1285A can prevent the annular element from moving down, e.g., supporting the annular element from a bottom side against the pulling down force exerted by the rod. The pin 1270A can be used to add to the support of the annular element, such as to prevent the annular element from moving up.

The sleeve 1285 can further have another support element 1285B at a top side of the sleeve, on an outer surface, to support the annular element on the top movable component 1210. This support element 1285B can support the sleeve 1285 on the top movable component. The top movable component 1310 can have a support element 1285C at a bottom side, on an inner surface, to support the sleeve.

In assembling, the sleeve, with the annular element installed and secured with the pin 1270A, can be inserted into the top movable component from a top side, so that the support element 1285B rested on a mating feature in the top component. Optional secured elements, such as a pin or a top plate, can be used to secure the sleeve with the top component. Press fit process can also be used.

The locking assembly, including the annular element, the protruded pins installed to the rod, and the rod installed within the annular element, can be installed in a top movable component, e.g., without a sleeve. In assembling, the rod can be inserted to the annular element, followed by the pins inserted into the rod. The locking assembly can be inserted into the top movable component from a top side, to rest on the support element 1285D. Optional secured element, such as sleeve 1270B, can be inserted to prevent the locking assembly from moving out of the top movable element.

FIGS. 12B(a)-12B(b) shows configurations for different angles 1263A and 1263B of the teeth 1277 on an annular element 1270, such as the angles 1263A and 1263B of the helical surface 1273 of the teeth 1277 making with a horizontal surface of the annular element 1270, which is a surface perpendicular to the axis of the annular element. A force from the pin pushing on the helical surface 1273 can be decomposed into a normal force, and a parallel force 1262A or 1262B, which is the force for moving the pin along the helical surface for rotating the rod.

For small angle 1263A (FIG. 12B(a)), the parallel force 1262A can be small, as compared to the parallel force 1262B caused by the larger angle 1263B (FIG. 12B(b)). From these configurations, a larger angle is preferred for ease of rotating the rod, which can be the activation force for toggling the locking mechanism.

FIGS. 12B(c)-12B(d) shows configurations for different angles 1263C and 1263D of the teeth on an annular element, e.g., the angles of the helical surface of the teeth making with a horizontal surface of the annular element. A bottom pin can move from a valley point of the bottom teeth of the annular element, along a helical surface of a tooth on the bottom teeth of the annular element, and up to rest on a valley point. The total vertical distance 1265A or 1265B can be the distance that the annular elements move with respect to the rod, e.g., when the rod is locked with the hook receptacle, the movements of the pin with respect to the annular elements can be regarded as the movements of the annular elements while keeping the rod stationary. Thus, the top movable component 1210 (which is coupled to the annular elements) can move down a distance 1265A or 1265B with respect to the bottom movable component 1230 (which is coupled to the hook receptacle, which can be locked to the rod). In other words, the distance 1265A or 1265B can be the backlash distance when the top component reverses directions. The backlash distance can be the distance that the top component moved relative to the bottom component, in order to toggle the states of the locking assembly. The backlash distance 1265A or 1265B can be as small as possible, in order to improve the operation of the locking mechanism.

For large angle 1263C (FIG. 12B(c)), the backlash distance 1265A can be large, as compared to the backlash distance 1265B caused by the smaller angle 1263D (FIG. 12B(d)). From these configurations, a smaller angle is preferred for better operation of the locking mechanism.

As shown in FIG. 12B(e), the locking assembly can be configured so that the teeth of the annular elements can be optimized for large parallel forces and small backlash distances. The angles of the teeth, e.g., the angles between the helical surfaces and the plane perpendicular to the axis of the annular elements, can be between 30 and 100 degrees, or between 35 and 95 degrees, or between 40 and 90 degrees, or can be about 45 degrees.

FIG. 12B(f) shows a configuration of the annular elements, which are embedded in a sleeve. A tooth 1272 can have a helical surface 1273, rising from a valley point 1274 at a base of the annular element 1270, and an abrupt surface which is terminated at a valley point of an adjacent tooth. The helical surface can be configured to form a constant angle with the axis 1151A of the annular elements.

FIGS. 12C(a) and 12C(b) show configurations for improving backlash distance of the annular elements relative to the rod. If the annular elements are positioned farther apart, e.g., separated by a distance 1267A, the backlash distance can be larger, as compared to a closer annular element separation 1267B. A minimum backlash distance can be obtained by placing the two pins close together, with minimum clearance 1267D for the pin 1254A to pass the peak of the teeth of an annular element (as compared to a larger clearance 1267C) while traveling on the helical surface of the teeth of the other annular element. The clearance distance can be the distance between the pin and the opposite slanting surface, e.g., the clearance space on the path of the pin while moving on the slanting surface. The clearance distance can be less than 10 mm, less than 5 mm, or less than 2 mm.

FIGS. 12D(a) and 12D(b) show configurations for improving backlash distance and ease of traveling for the pin. For example, if the abrupt surface of the teeth is vertical, e.g., parallel to the path traveled by the pin when moving from the helical surface on one annular element to the valley point of the other annular element, the pin might get caught by the peak of the teeth. Thus, a recess 1268A of the teeth abrupt surface can improve a reliability of the operation of the locking assembly, by preventing the peak of the teeth from interfering with the pin. The recess 1268A can be a small angle from the vertical distance, such as from the axis of rotation of the annular elements. The angle of the recess 1268A can be less than 10 degrees, less than 9 degrees, or less than 2 degrees.

A rounding 1268C of the peak of the teeth of the annular elements can further remove the backlash distance, by allowing the annular elements to be positioned closer, e.g., the clearance distance 1267E can be smaller than the clearance distance 1267D in the case of sharp teeth. Alternatively, the peaks of the teeth can be trimmed 1268B at an angle parallel to the angle of the helical surface. The trim 1268B can occur on a portion of the helical surface that the pin does not travel, e.g., the peak portion of the teeth away from the location where the pin leaves the helical surface to travel vertically to the valley point of the other annular element. The parallel angle can allow the pin to pass the peaks with a uniform clearance, using a trimmed peak 1268D of the teeth.

In some embodiments, the hook end of the rod in the locking assembly can be optimized for improved reliability and improved operation.

Figure 13A:
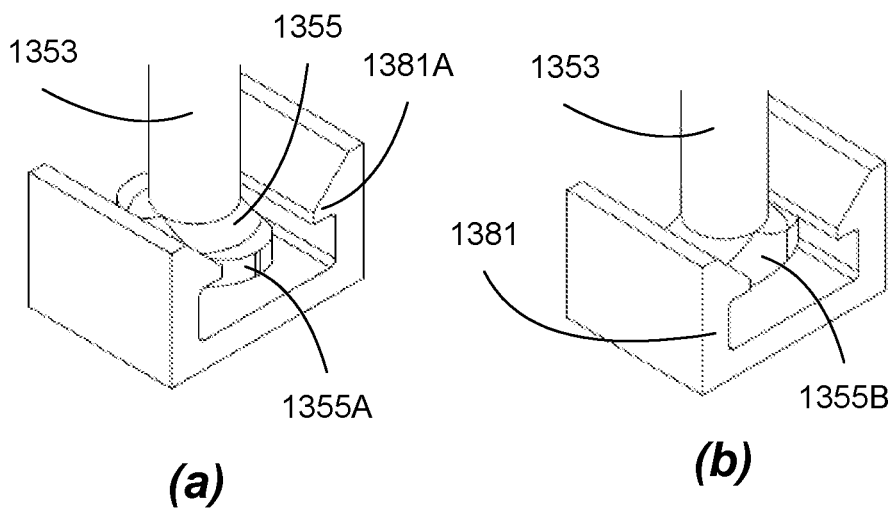
FIGS. 13A-13C illustrate a locking feature of the hook end of a rod with a hookable feature of a hook receptacle according to some embodiments.
Figure 13B:
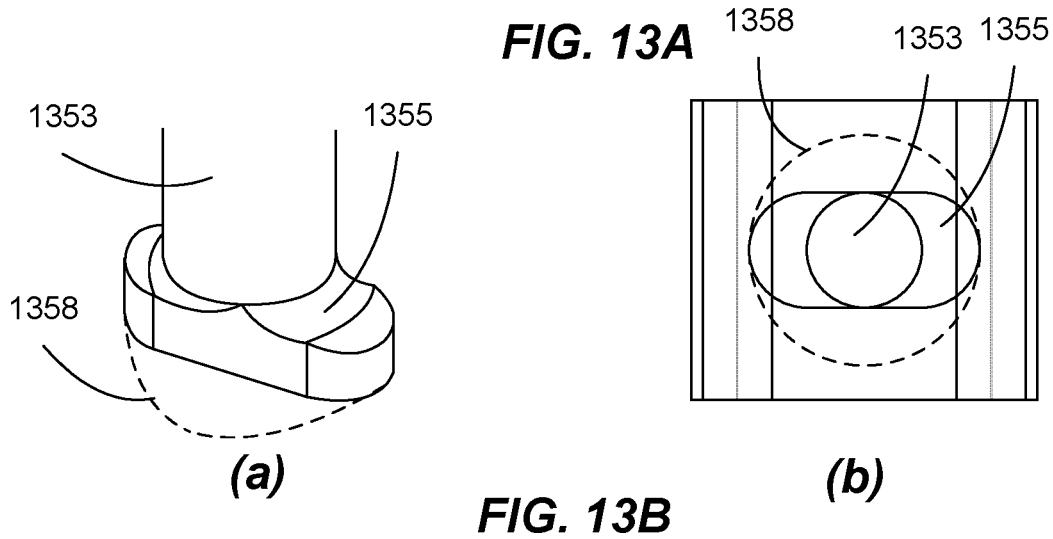
Figure 13C:
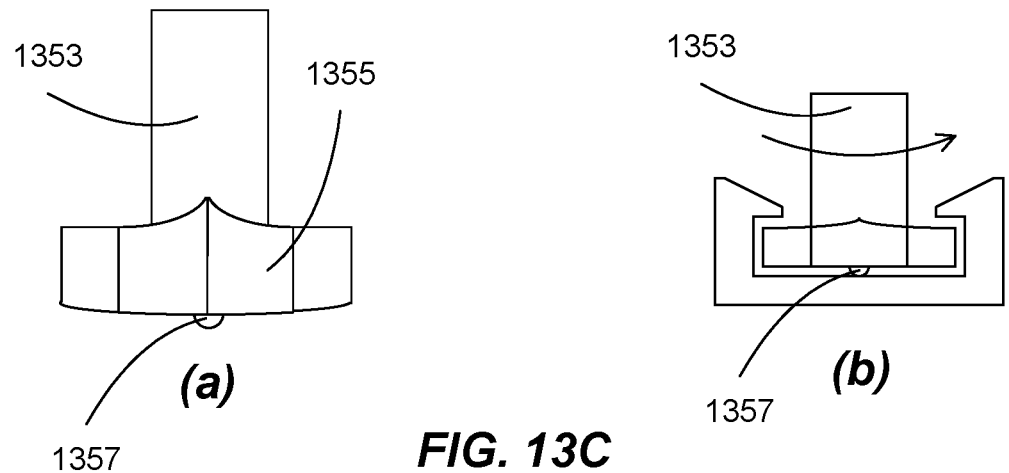

FIGS. 13A-13C illustrate a locking feature of the hook end of a rod with a hookable feature of a hook receptacle according to some embodiments. FIGS. 13A(a) and 13A(b) show unlocked and locked states of the locking feature. The hook end 1355 can have an elongated portion 1355A and a short portion 1355B. In the unlocked state (FIG. 13A(a)), the hook end 1355 of the rod 1353 can have the elongated portion 1355A parallel with the parallel hookable feature 1381A of the hook receptacle 1381. In the locked state (FIG. 13A(b)), the hook end 1355 of the rod 1353 can have the elongated portion 1355A perpendicular to the parallel hookable feature 1381A of the hook receptacle 1381.

In FIGS. 13B(a) and 13B(b), the elongated portion 1355A of the hook end 1355 can be rounded to be less than a circle 1358, which is defined by the farthest point of the elongated portion with respect to the axis of rotation. That way, when the rod rotates, the circle 1358 represents a largest that the hook end occupies.

In FIGS. 13C(a) and 13C(b), the bottom portion 1357 of the hook end 1355 can be rounded, such as to present a minimum contact with the bottom side of the hook. The bottom portion 1357 can include an arc having a small radius, protruded from the bottom side of the hook end. The length or diameter of the arc can be less than 50%, less than 40%, less than 30%, less than 20%, or less than 10% of the dimension of the rod. That way, when the rod rotates, the rod can experience a minimum friction due to the minimization of contact surface area.

FIGS. 14A-14D illustrate a toggling configuration of the locking mechanism according to some embodiments. A clamping device 1400 can be used for lifting and transferring objects, using a linkage mechanism between a pulling element coupled to a hoist and the jaws of the clamping device. The linkage mechanism can include a scissor mechanism in which two scissor arms 1430 can pivot around a pivot point 1431. One ends of the scissor arms can be coupled together to the pulling element 1410. The other ends of the scissor arms can be coupled to two jaws 1460 and 1440. When the pulling element is pulled up with respect to the pivot point, the pulling force on the ends of the scissor arms can move the jaws together for clamping on an object 1420 disposed between the jaws. When the pulling element is lowered down with respect to the pivot point, the lowering force on the ends of the scissor arms can move the jaws away from each other to separate the distance between the jaws, effectively releasing the object.

An automatic locking mechanism can be installed in the clamping device. The automatic locking mechanism can be configured to enable and disable the linkage mechanism, such as the scissor mechanism in the scissor clamping device. For example, the locking mechanism can secure a component of the linkage mechanism to a body of the clamping device, thus can effectively prevent the linkage mechanism from moving. In this state, the clamping device cannot actuate the jaws by pulling or lowering the pulling device. Alternatively, the locking mechanism can secure components of the linkage mechanism, such as securing two portions 1430A and 1430B of scissor arm 3530. When the portion 1430A is fixed with portion 1430B, one end of the scissor arms cannot move when the pulling element is pulled up or lowered down, effectively disable the linkage mechanism.

A scissor clamping device can have an automatic locking mechanism 1450, which can include 2 portions 1451 and 1452, which can be secured together (in locked or engaged stated), or can be separated from each other (in unlocked or disengaged state). The locking mechanism can be a toggle mechanism, which can change between locked and unlocked states after being triggered or activated. The trigger or activation can be a force acting on one or both portions 1451 and 1452 of the locking mechanism. With the locking mechanism incorporated into the scissor clamping device, a force on the pulling element can activate the toggling process between the locked and unlocked states.

The locking mechanism can include a hook rod 1453 and a mating hook receptacle 1481. The hook rod can have a hook end 1455, such as an asymmetric shape, e.g., a shape having an elongated portion and a shortened portion, such as an oval or a rectangular shape. The hook receptacle can have a mating hook end 1481A that is configured to hook/secure or unhook/release on the hook end of the hook rod. Thus, when the rod rotates, the locking (hooked) and unlocking (released) states can be toggled. For example, the rod can be positioned so that the elongated portion of the hook end engaged with the mating hook end of the hook receptacle, locking the rod with the hook receptacle. When the rod rotates 90 degrees, the elongated portion is now parallel with the hook receptacle, and the shortened portion does not engage with the hook end of the hook receptacle. This releases the rod from the hook receptacle. Rotating the rod 90 degrees again, in either rotation direction, can re-engage the lock by mating the elongated portion with the hook.

The automatic locking mechanism can include two slanting surface elements, such as annular elements 1471 and 1476 each having one or more slanting surface in the form of helical surfaces. The hook rod can be disposed between the annular elements and can travel along an axis of the annular elements. One or more slanting surface interacting element, such as protruded pin 1454, can be disposed facing the slanting surfaces of the annular elements.

As shown, the annular elements can be configured so that the slanting surfaces are facing each other, with the protruded element disposed between the slanting surfaces. The protruded pin can move toward the first annular element, in a first direction, for interacting with the slanting surfaces of the first annular element. The protruded pin can move toward the second annular element, in an opposite direction with the first direction, for interacting with the slanting surfaces of the second annular element. The locking mechanism can be similar to the configuration shown in FIGS. 5A-5D.

Alternatively, the annular elements can be configured so that the slanting surfaces are facing away from each other. There can be two protruded pins, with a first protruded pin disposed facing the slanting surfaces of the first annular element, and a second protruded pin disposed facing the slanting surfaces of the second annular element. The first protruded pin can move toward the first annular element, in a first direction, for interacting with the slanting surfaces of the first annular element. The second protruded pin can move toward the second annular element, in an opposite direction with the first direction, for interacting with the slanting surfaces of the second annular element. The first and second annular elements can be integrated together, to form an annular element having slanting surfaces protruded from both sides of the annular element. The locking mechanism can be similar to the configuration shown in FIGS. 9A—9D.

FIG. 14A shows a scissor clamping device having an automatic locking mechanism 1450, such as the locking mechanism shown in FIGS. 5A-5D. Other locking mechanism can be used, such as the locking mechanism shown in FIGS. 9A-9D. The top portion 1451 of the locking mechanism is coupled to a first portion 1410 of a scissor arm of the clamping device, such as to the pulling element. The bottom portion 1452 of the locking mechanism is coupled to a second portion 1431 of the scissor arm, such as the pivot point. The automatic locking mechanism can be coupled to different portions of the clamping device, such as automatic locking mechanism 1450A coupled to two portions 1430A and 1430B of one side of the scissor arm, or automatic locking mechanism 1450B coupled to two portions 1430B of two sides of the scissor arm.

As shown, the locking mechanism is in an engaged state, e.g., the top portion 1451 is secured to the bottom portion 1452. Thus, the pulling element is secured to the pivot point 1431, e.g., to the body of the clamping device, with only limited movements as configured by the locking mechanism. For example, since the rod 1453 can move between the slanting surfaces of the first and second annular elements 3571 and 1476, for toggling the locking status of the locking mechanism, the pulling element can move with respect to the body of the clamping device for activating or deactivating the locking mechanism. Thus, in the present specification, components are secured together does not mean that the components are rigidly and fixedly attached to each other. The term "components are secured together" can mean that a component of the components cannot move freely relative to another component of the components, such as being removed or separated from each other, and can mean that the components can have limited movements relative to each other.

Due to the locked status of the locking mechanism, the pulling element is secured to the clamping device body. The coupling of the pulling element to the clamping device body can keep the jaws immobilized at a large separation, in order to accept an object between the jaws.

The clamping device can be brought down, for example, by lowering a hoist coupled to the pulling element. The object 1420 can be positioned between the open jaws of the clamping device.

The hoist can lower further, after the clamping device has contacted the object. Since the clamping device has contacted the object, lowering the hoist does not move down the body of the clamping device. Instead, lowering the hoist can move the pulling element down. The first portion 1430A of the scissor arm can move down with respect to the second portion 1430B of the scissor arm. The movement of the first portion 1430A can move the annular element assembly down, until the protruded pin in the rod contact the slanting surface of the top (or second) annular element. The rod can rotate an angle such as 45 degrees.

In FIG. 14B, the hoist can lift up. The first portion 1430A of the scissor arm can move up with respect to the second portion 1430B of the scissor arm. The movement of the first portion 1430A can move the annular element assembly up, until the protruded pin in the rod contact the slanting surface of the bottom (or first) annular element. The rod can rotate another angle such as 45 degrees. The rod can thus rotate a complete angle of 90 degrees, which can switch the locked status to the unlocked status, since the hook end of the rod is no longer be constrained by the hook end of the hook receptacle after a 90 degree rotation.

In FIG. 14C, the hoist can further lift up. Since the locking mechanism is now disabled, pulling on the pulling element can activate the jaws for clamping on the object.

In FIG. 14D, after the jaws clamp on the object, the hoist can further lift up and move to a destination at which the object can be released.

Thus, by bring down and then bring up the pulling element, the locking mechanism changes state from a locked state to an unlock state. There can be pauses between the steps.

FIGS. 15A-15D illustrate another toggling configuration of the locking mechanism according to some embodiments. A clamping device 1500 can have scissor arms 1530 pivotable around a pivot point 1531, linking pulling element 1510 to two jaws 1560 and 1540.

The clamping device can have an automatic locking mechanism 1550, which can include a first portion 1551 and a second portion 1552. The locking mechanism can include a hook rod 1553 having a hook end 1555 and a mating hook receptacle 1581 having a hook end 1581A. The locking mechanism can include two slanting surface elements, such as annular elements 1571 and 1576. One or more slanting surface interacting element, such as protruded pin 1554 in the hook rod, can be disposed facing the slanting surfaces of the annular elements.

Figures 15A, 15B, 15C, 15D:
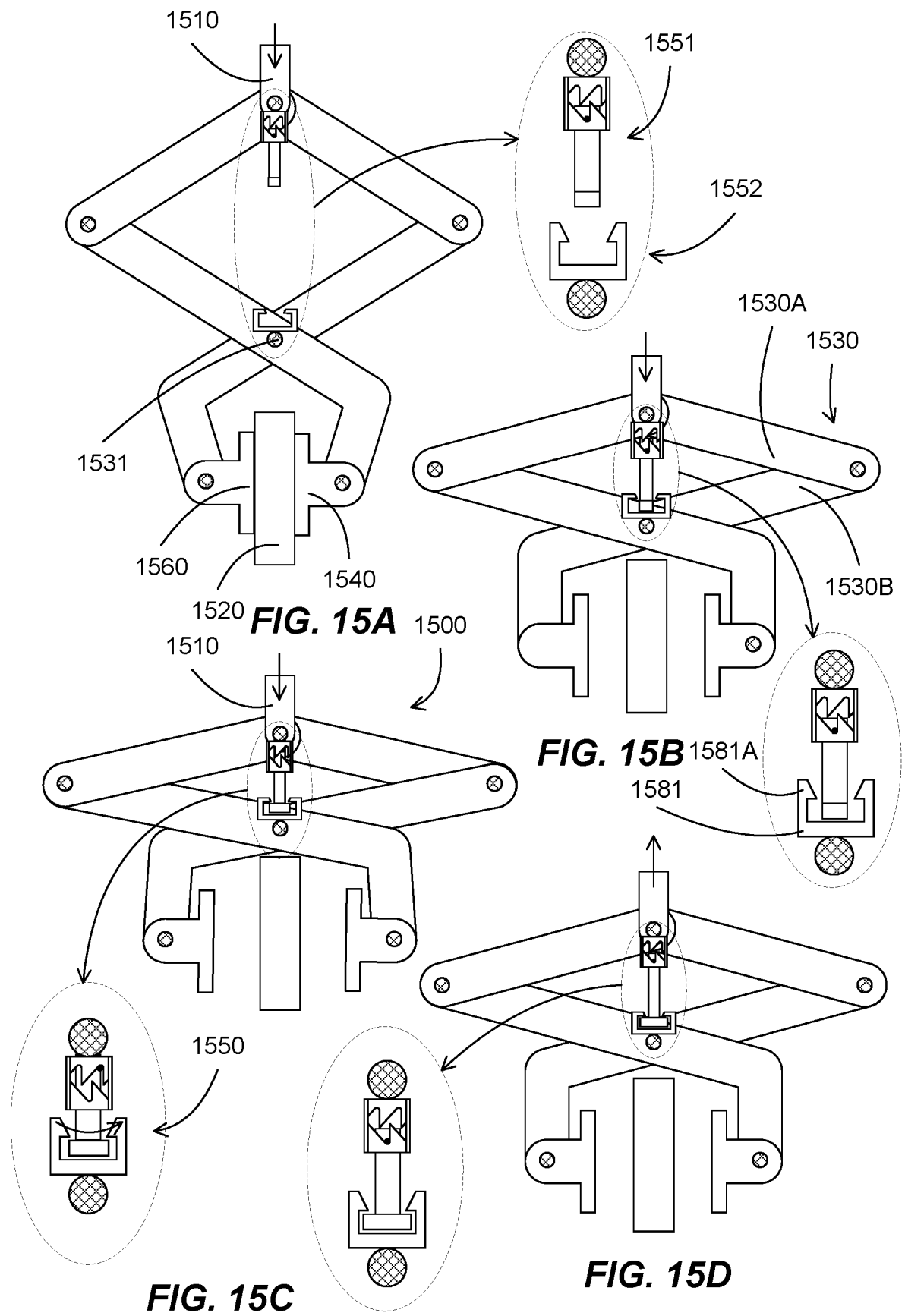
FIGS. 15A-15D illustrate another toggling configuration of the locking mechanism according to some embodiments.

FIG. 15A shows a scissor clamping device having an automatic locking mechanism 1550, such as the locking mechanism shown in FIGS. 5A-5D. Other locking mechanism can be used, such as the locking mechanism shown in FIGS. 9A-9D. The top portion 1551 of the locking mechanism is coupled to a first portion 1510 of a scissor arm of the clamping device. The bottom portion 1552 of the locking mechanism is coupled to a second portion 1531 of the scissor arm. As shown, the locking mechanism is in a disengaged state, e.g., the top portion 1551 is loose from the bottom portion 1552. Thus, the pulling element is free to move with respect to the pivot point 1531, e.g., to the body of the clamping device.

Due to the unlocked status of the locking mechanism, a hoist coupled to the pulling element can lift the clamping device with the jaws clamped on object 1520. The clamping device can be brought down, for example, by lowering the hoist. Without touching the ground, the clamping device and the object move as a unit, through the action of the hoist.

In FIG. 15B, the hoist can bring the clamping device, together with the clamped object, to a destination. The hoist can be lowered to place the object on the ground.

The hoist can lower further, after the object has contacted the ground. Since the object has contacted the ground, lowering the hoist does not move down the body of the clamping device. Instead, lowering the hoist can move the pulling element down. The first portion 1510 of the scissor arm can move down with respect to the second portion 1531 of the scissor arm. The movement of the first portion 1510 can move the first portion 1551 of the locking mechanism down, until the rod contact the mating hook receptacle. Since the locking mechanism is in unlocked state, lowering the pulling element can separate the jaws to release the clamping action on the object. Further, the hook end of the hook rod can enter the hook end of the hook receptacle.

In FIG. 15C, the hoist can lower further, after the hook end of the hook rod has contacted the bottom surface of the hook receptacle. The pulling element is further lowered down, bringing the annular element assembly (the first annular element 1571 and the second annular element 1576, which is coupled as a unit) down with respect to the hook rod, until the protruded pin in the rod contacts the slanting surface of the top (or second) annular element. The rod can rotate 45 degrees, partially securing the hook end of the hook rod with the hook end of the hook receptacle.

In FIG. 15D, the hoist can lift up. The first portion 1510 of the scissor arm can move up with respect to the second portion 1531 of the scissor arm. The movement of the first portion 1510 can move the annular element assembly up, until the protruded pin in the rod contacts the slanting surface of the bottom (or first) annular element. The rod can rotate another angle such as 45 degrees. The rod can thus rotate a complete angle of 90 degrees, which can switch the unlocked status to the locked status, since the hook end of the rod is now fully constrained by the hook end of the hook receptacle after a 90 degree rotation.

The hoist can further lift up and move to a new object for pick up. Since the locking mechanism is locked, the jaws remain separated for ease of accepting the object.

Thus, by bring down and then bring up the pulling element, the locking mechanism changes state from an unlocked state to a lock state. In combination with the process of changing the state from a locked state to an unlock state, an operator can toggle the locking mechanism between locked and unlocked states by bringing down followed by bringing up the pulling element or by the hoist coupled to the pulling element. There can be pauses between the step of bringing down and the step of bringing up.

FIGS. 16A-16C illustrate flow charts for operating a locking mechanism according to some embodiments. In FIG. 16A, operation 1600 toggles between a movable status and an unmovable status for a component of a clamping mechanism of a clamping device. The toggling process is activated when at least one of the jaws of the clamping device is in a vicinity of an opening distance from the other jaw. In the movable status, the component is configured to allow jaws of the clamping device to be movable toward each other to clamp on an object. In the unmovable status, the component is configured to have the jaws remaining opened.

In FIG. 16B, operation 1620 moves a component of a clamping mechanism of a clamping device downward. When the component reaches a position, a toggling mechanism is activated to toggle between a movable status and an unmovable status for at least a jaw of the clamping device. In the movable status, the jaw is configured to be movably reachable toward an object disposed between the jaw and another jaw of the clamping device. In the unmovable status, the jaws are configured to remain opened.

In FIG. 16C, operation 1640 moves a component of a clamping mechanism of a clamping device downward to toggle at least a jaw of the clamping device between movably reachable toward an object disposed between the jaw and another jaw of the clamping device for clamping on the object and remaining opened without clamping on the object.

FIGS. 17A-17B illustrate flow charts for operating a locking mechanism according to some embodiments. In FIG. 16C, operation 1700 moves a hoist coupled to a clamping device downward to contact a surface. The clamping device clamps on an object.

Operation 1710 continues moving the hoist downward to open the jaws to reach an opening distance. When the jaws reach the opening distance, a locking mechanism of the clamping device is toggled from a movable to an unmovable status. In the movable status, the jaws of the clamping device are movable toward each other to clamp on the object. In the unmovable status, the jaws remain opened without clamping on the object. Operation 1720 moves the hoist upward with the jaws opened and not clamping on the object.

In FIG. 17B, operation 1740 moves a hoist coupled to a clamping device downward to contact an object. The jaws of the clamping device clamps are separated at a distance larger than a dimension of the object. Operation 1750 continues moving the hoist downward to toggle a locking mechanism of the clamping device from an unmovable to a movable status. In the movable status, the jaws of the clamping device are movable toward each other to clamp on the object. In the unmovable status, the jaws are opened without clamping on the object. Operation 1720 moves the hoist upward so that the jaws clamp on the object.

In some embodiments, the present invention discloses an automatic locking mechanism for a clamping device, with the clamping device using a clamping mechanism to clamping on an object. The automatic locking mechanism can activate and deactivate, e.g., toggling clamping mechanism between an operational state, in which the clamping mechanism is operational, and an inoperational state, in which the clamping mechanism is disable.

The automatic locking mechanism can include three elements, which can include a first element which can be fixedly coupled to a first component of the clamping device, a second element which can be fixedly coupled to a second component of the clamping device, and a third element movably but not separably coupled to the first element. The first and second components can be movable components of the clamping mechanism, such as two components of a linkage that couples a pulling element of the clamping device to the jaws of the clamping device. When the linkage is movable, e.g., the first component is movable relative to the second component, the linkage is enable, e.g., the jaws follow the movements of the pulling element. For example, when the pulling element is lifted up, such as by a hoist coupled to the pulling element, the jaws can move toward each other, for clamping on an object.

The automatic locking mechanism can activate the linkage of the clamping mechanism, by allowing the first and second components movable relative to each other. The automatic locking mechanism can deactivate the linkage of the clamping mechanism, by coupling the first and second components together, such as securing the first component with the second component, with an optional backlash distance of movements between the first and second components.

The activation and deactivation of the linkage can be accomplished by toggling the automatic locking mechanism between a coupling configuration, in which the automatic locking mechanism causes the first component to be coupled to and not separatable from, the second component, and a separatable configuration, in which the automatic locking mechanism causes the first component to be separatable from the second component.

The first element can include a toggle element, which can function to toggle the automatic locking mechanism between the coupling configuration and a separatable configuration. The toggle element can include slanting surfaces for converting vertical movements or forces to a rotational movement or force. The vertical movements or forces can be provided by the clamping device, for example, by an operator operating a hoist coupled to the clamping device. A downward movement or force can be accomplished by the hoist lowering the clamping device on an object, including actions of the clamping device contacting the object. An upward movement or force can be accomplished by the hoist raising the clamping device.

The downward and upward movements or forces can be used by the toggle element to rotatably activate and deactivate a latching element, which can deactivate and activate, respectively, the locking mechanism. The latching element can include the third element, which can be coupled or separated from the second element of the locking mechanism, by the rotational movements.

The toggle element can include one or more annular elements, having two sets of teeth, which can be configured to face each other, or to face away from each other. Each tooth can include a valley area, a slanting surface rising from the valley area, and an abrupt surface going down toward a valley area of an adjacent tooth. The slanting surface and the abrupt surface can join at a peak of the tooth.

Each set of teeth can be arranged around the annular element, such as cyclically arranged. For example, there can be 4 teeth for the first set of teeth surrounding a base of the annular element. The second set of teeth can also include 4 teeth surrounding a base of the same annular element, with the first and second sets of teeth are configured to face away from each other. Alternatively, the second set of teeth can also include 4 teeth surrounding a base of another annular element. The two annular elements can be spaced apart, so that the two sets of teeth are facing each other.

The first and second sets of teeth can be configured so that a valley area of a tooth in the first set of teeth is aligned with a slanting surface of another tooth in the second set of teeth. The alignment can be along an axis of rotation of the annular element. The first and second sets of teeth can be configured so that a valley area of a tooth in the second set of teeth is aligned with a slanting surface of another tooth in a first set of teeth. The alignment can be along an axis of rotation of the annular element.

Thus, the valley area of each tooth can be facing the slanting surface of another tooth (in the case of two annular elements, spaced apart with the two sets of teeth facing each other), or the valley area can be facing away from the slanting surface of another tooth (in the case of only one annular element having two sets of teeth facing in opposite directions).

The second element can include a portion of the latch element, e.g., one component of the latch element that can be latched to or released from another component of the latch element. The portion of the latch element can include a receptacle element, which has a hookable feature, such as two parallel hooks facing each other and disposed in two sides of the receptacle element. The hookable feature, e.g., the parallel hooks, can be configured to be coupled to another component of the latch element, such as the third element of the automatic locking mechanism.

The third element can include the other portion of the latch element, the component of the latch element that can be configured to be latched to or released from the receptacle element, e.g., the parallel hooks. The third element can include a rod, with a hook end at or near an end of the rod for latching to the second element, e.g., to the receptacle or the parallel hooks. For example, the hook end can include an elongated end portion disposed perpendicular to the axis of the rod. The elongated end portion can have an ellipse or rectangular shape, e.g., having a long side and a short side perpendicular to the rod. The hook end can be configured to toggle to with the receptacle, e.g., with the parallel hooks. The hook end can be toggled between the coupling configuration and the separatable configuration.

In the coupling configuration, the hook end is coupled to the receptacle so that the long side of the hook end is perpendicular to the parallel hooks, thus the rod is coupled to the receptacle, and cannot be separated from the receptacle.

In the separatable configuration, the hook end faces the receptacle in such a way so that the long side of the hook end is parallel to the parallel hooks, thus the hook end can be removed from the parallel hooks, e.g., the rod can be separated from the receptacle.

The third element can be disposed in the annular elements. For example, the third element can have a rod shape, such as a rod with a hook end. The rod can be inserted in the hollow portions of the annular elements. For example, in the case of two annular elements spaced from each other, the annular elements can be concentric, with the rod also concentric with the annular elements, e.g., the axes of the rod and the annular elements are the same axes. In the case of one annular element, the rod and the annular element can be concentric.

The rod can have one or more protruded elements, such as one or more pins passing through the rod. The pins can be configured to interface with the slanting surfaces of the teeth, such as moving on the slanting surface. The pins can have a length of the same size as the width of the slanting surface. Since the pins pass through the rod, such as passing through a center of the rod, the pins can protruded at both sides of the rod. The teeth thus can be configured so that both sides of the pins, e.g., two portions of the pins that protruded from two sides of the rod, rest on two slanting surfaces of two opposite teeth, e.g., two teeth across the axis of the annular elements.

The pins can interface with the slanting surfaces of the first and second sets of teeth in such as way so that under a force causing the pins to contact a slanting surface, e.g., a slanting surface of a tooth of the first or second set of teeth, the pins move along the slanting surface to rest at the valley area at the bottom of the slanting surface. The movement of the pins along the slanting surface can cause the rod to rotate an angle, such as between 40 and 50 degrees, such as 45 degrees.

The force can be a vertical force, such as a downward force or an upward force. A combination of a downward force and an upward force can cause the pins to first contact a slanting surface of a tooth in a first set of teeth, followed by contacting a slanting surface of another tooth in a second set of teeth. The combination can cause the rod to rotate twice, forming a rotation of about 90 degrees, and thus toggling the hook end between the separatable configuration and the coupling configuration with the hookable feature.

In some embodiments, the hook end can have a contact point with minimum area, such as a sharp point, or a round point at a center end of the rod. Thus the rod can rotate on the contact point, for example, that contacts a surface of the receptacle. The rod can be perpendicular to the receptacle. The rod can be separated from the receptacle, and then brought in to contact a surface of the receptacle, such as a contact between the parallel hooks. The rod can then be rotate, on the minimum area contact point, to toggle between the coupling configuration and the separatable configuration. The rotation of the rod on the minimum area contact point can have reduced friction, due to the minimum contact area.

In some embodiments, the automatic locking mechanism can include a sleeve for housing the annular elements. For example, the annular elements can include two annular spaced apart, and disposed in a sleeve. The sleeve can serve to keep the two annular elements at a fixed separation. The annular elements can be fixed to the sleeve, for example, by using pins, or screws to secure the annular elements with the sleeve.

The sleeve can include a support feature, such as a step in the inner surface of the sleeve. The support feature can be configured to support one annular element, such as to prevent the annular elements from moving in one direction, such as the downward direction. The support feature can serve to balance a force acting on the annular elements by the rod. Since the rod can exert a large force downward on the annular element, as compared to a smaller force upward, the support feature can assist in helping the annular element against the downward force.

In the case of two annular elements facing each other and spaced apart from each other, the support feature can support one annular element, such as the bottom annular element, e.g., the annular element closer to the receptacle. In the case of one annular element having two sets of teeth facing in opposite directions, the support feature can support the annular element. There can be two annular elements that are touching each other, instead of one annular element. The support feature can support the bottom annular element.

In some embodiments, the clamping device can have a support feature in a housing of the sleeve. For example, the sleeve can be coupled to the first component of the clamping device. The first component can have a housing, such as a recess, to house the sleeve. Alternatively, the sleeve can be housed in a housing, and the housing can be coupled to the first component. The housing can have a support feature to support the sleeve in a downward direction, such as a step in an inner surface of the housing on which the sleeve is rested, in order to support the sleeve and to prevent the sleeve from moving downward, e.g., toward the receptacle.

In some embodiments, the clamping device can have a support feature in a housing of the annular element. For example, the annular element can be one piece annular element or two piece annular elements that are coupled together. The annular element can be coupled to the first component of the clamping device, without a sleeve. The first component can have a housing, such as a recess, to house the annular element. Alternatively, the annular element can be housed in a housing, and the housing can be coupled to the first component. The housing can have a support feature to support the annular element in a downward direction, such as a step in an inner surface of the housing on which the annular element is rested, in order to support the annular element and to prevent the annular element from moving downward, e.g., toward the receptacle.

In some embodiments, the slanting surfaces of the teeth in the two sets of teeth can be helical curves, such as sections of helical curves, around the annular elements. A tooth can have a helical curve, rising from a valley area, and stopping at a peak of the tooth. The helical curve can have tangent lines forming a constant angle, for example, with the axis of the annular element. The tangent line of the slanting surface, e.g., of the helical curve, can make an angle between 40 and 50 degrees, or 35 and 55 degrees.

In some embodiments, in the case of two annular elements having the two sets of teeth facing each other with a protruded pin disposed in between, the spacing of the two sets of teeth can be configured to have a minimum clearance distance, e.g., the clearance between the two opposite teeth (in two sets of teeth) for the protruded pin to pass through.

In the case of one annular element having the two sets of teeth facing in opposite directions, with two protruded pins sandwiching the two sets of teeth, the spacing of the two protruded pins can be configured to have a minimum clearance distance, e.g., when a protruded pin moves along the slanting surface of a tooth, the clearance on an opposite tooth for an opposite protruded pin to pass through the opposite tooth.

In some embodiments, a tooth of the two sets of teeth is chamfered or rounded. The chamfered or rounded tooth can provide a smaller clearance distance, either between two annular elements sandwiching a protruded pin, or between two protruded pins sandwiching an annular element. The chamfered plane of one tooth can be parallel to the tangent of the opposite tooth to obtain the minimum clearance distance.

In some embodiments, the abrupt surface can be formed or chamfered to form an angle greater than zero with the axis of rotation.

In some embodiments, the automatic locking mechanism can be used in a clamping device using a half scissor mechanism with at least a stationary jaw coupled to a body, and at least a movable jaw coupled to a scissor arm. A first part of the automatic locking mechanism can be coupled to a first arm of the scissor arm. A second part of the automatic locking mechanism can be coupled to the body or to a second arm of the scissor arm.

The automatic locking mechanism can be used in a clamping device using a scissor mechanism comprising two arm assemblies for moving two opposite jaws. A first part of the automatic locking mechanism can be coupled to the slanting surface element or to a first arm of an arm assembly of the two arm assemblies. A second part of the automatic locking mechanism can be coupled to a second arm of the arm assembly of the two arm assemblies or to a third arm of another arm assembly of the two arm assemblies.

The automatic locking mechanism can be used in a clamping device using a scissor mechanism comprising two arm assemblies for moving two opposite jaws. A first part of the automatic locking mechanism can be coupled to a first arm of an arm assembly of the two arm assemblies. A second part of the automatic locking mechanism can be coupled to a second arm of the arm assembly of the two arm assemblies or to a third arm of another arm assembly of the two arm assemblies.

The automatic locking mechanism can be used in a clamping device having a puling element having a roller to roll on a slanting surface element to move a movable jaw against a stationary jaw. A first part of the automatic locking mechanism can be coupled to the pulling element or to the roller. A second part of the automatic locking mechanism can be coupled to a body of the clamping device.

In some embodiments, the frit element of the automatic locking mechanism can include two annular elements or one annular element. In the case of two annular elements, the two annular elements each can have a set of teeth arranged on a circumference of the annular element. The two annular elements can be configured to be spaced apart, with the two sets of teeth facing each other. Alternatively, the two annular elements can be coupled together, with the two sets of teeth facing opposite directions.

In the case of one annular element, the annular element can have two sets of teeth arranged on one or two circumferences of the annular element. The two sets of teeth can be configured to face opposite directions.

For the configurations in which the two sets of teeth face each other, there can be a protruded pin disposed between the two sets of teeth. The protruded pin can be coupled to a rod.

For the configurations in which the two sets of teeth face in opposite directions, there can be two protruded pins sandwiching the two sets of teeth. The protruded pins can be coupled to a rod.

Figure 18:
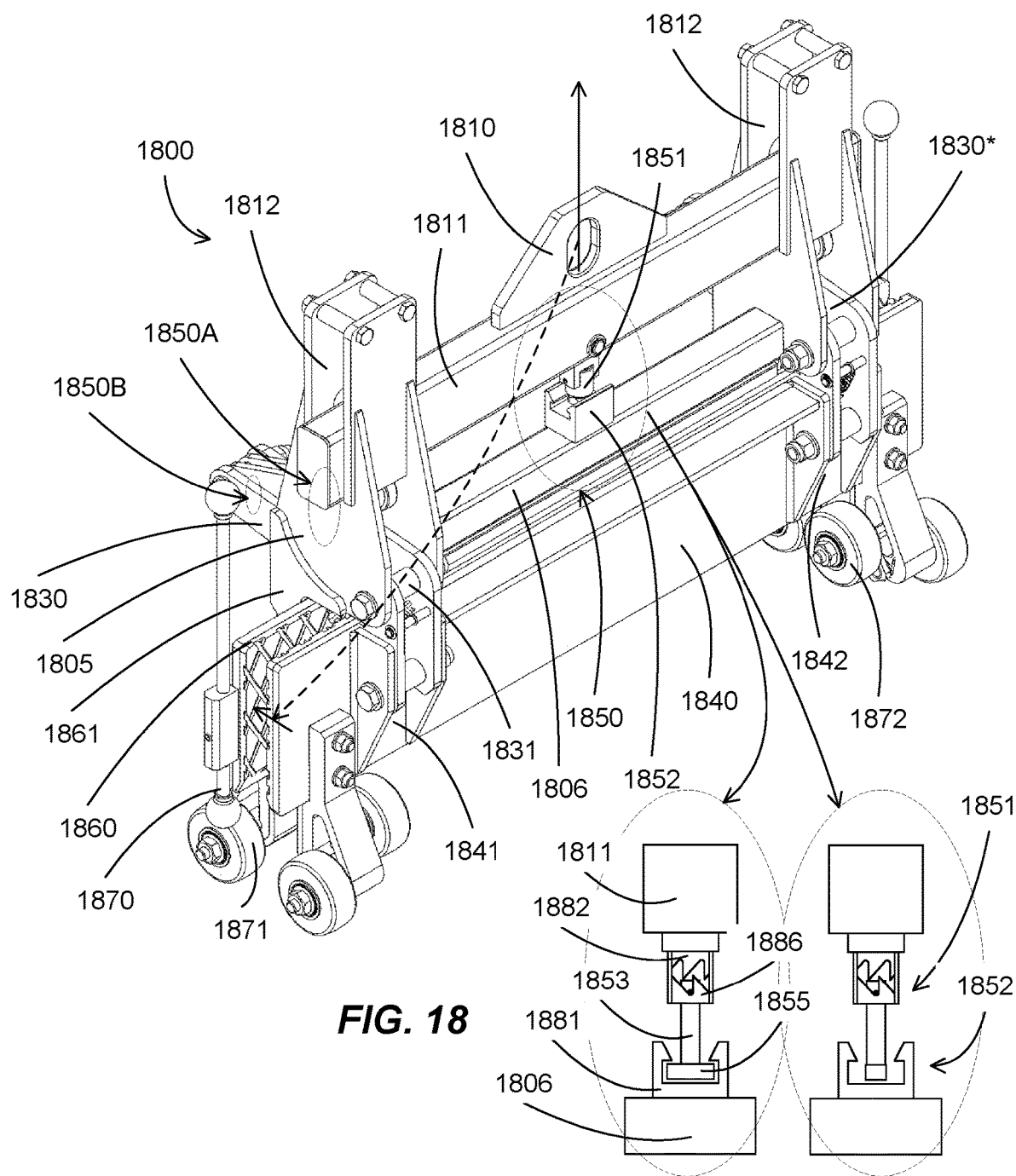
FIG. 18 illustrates a clamping device according to some embodiments.

FIG. 18 illustrates a clamping device according to some embodiments. The clamping device 1800 can use a half scissor mechanism, e.g., one jaw is fixed, and the opposite jaw is coupled by a scissor mechanism to a pulling element. For example, a half scissor mechanism 1830 can couple a movable jaw 1841 to move against a stationary jaw 1861.

The clamping device can include multiple half scissor mechanisms 1830 and 1830*, with each half scissor mechanism coupled to a movable jaw opposite a stationary jaw. Optional elongated jaw plates 1840 and 1860 can be coupled to multiple jaws at a same side, such as jaw plate 1840 is coupled to the moving jaws 1841 and 1842.

The stationary jaws, such as jaw 1861, can be fixed coupled to a body 1805 of the clamping device. The half scissor mechanism can include a pivot point 1831, also fixedly coupled to the body 1805. A jaw arm coupled to the pivot point can be coupled to the movable jaw 1841. An activation arm coupled to the pivot point can include a scissor joint. Thus, when the activation arm is pulled up, the scissor joint is activated. Due to the pivot point, the jaw arm is moved when the activation arm is moved, which can move the jaw 1831 toward the opposite jaw 1861.

A connecting bar 1811 can be connected to ends of the activation arms of the multiple half scissor mechanisms 1830 and 1830*, for example, to actuating all the half scissor mechanisms together. The scissor mechanism 1830 can include multiple guides 1812 to guide the connecting bar 1811 into proper movements for actuating the half scissor mechanisms. A pulling element 1810 can be coupled to the connecting bar 1811. When the pulling element is pulled up, the connecting bar also moves up, pulling on the activation arms of the half scissor mechanisms. Through the pivot points, the movable jaws move toward the opposite jaws, pressing the movable jaw plate 1840 toward the stationary jaw plate 1860.

Thus the clamping device can have a linkage mechanism, linking the pulling element 1810 with the jaw plate 1840. Pulling on the pulling element can move the movable jaw plate toward the stationary opposite jaw plate. Releasing the pull on the pulling element can move the movable jaw plate in the opposite direction, for example, due to gravitation. The linkage mechanism can include the connecting bar, coupled to the activation arms, coupled to the pivot points, and coupled to the jaw arms.

A locking mechanism 1850 can be included, for hand-free actuating the clamping device using the multiple half scissor mechanisms. The locking mechanism can allow or prevent the engagement of the half scissor mechanisms, e.g., allowing or prevent the linkage mechanism between the pulling element and the jaw plate. When the locking mechanism is activated or locked, the linkage mechanism is prevented or disable, meaning pulling on the pulling element does not move the jaw plate. When the locking mechanism is deactivated or unlocked, the linkage mechanism is allowed or enable, meaning pulling on the pulling element move the jaw plate toward the opposite jaw plate.

The locking mechanism can include a top part 1851, which can be locked to or release from the bottom part 1852. The top part 1851 can be secured to the pulling element 1810 through the connecting bar 1811, e.g., the top part can be secured to the connecting bar, and since the connecting bar is secured to the pulling element, the top part can move as a unit together with the pulling element. The bottom part 1852 can be secured to the body 1805 of the clamping device, such as to a connecting bar 1806 coupling two portions of the body. The top part can include a movable rod having an elongated head, which can be locked to or released from a mated hook in the bottom part.

The automatic locking mechanism can be coupled to different portions of the clamping device, such as automatic locking mechanism 1850A coupled to the connecting bar 1811 and the body 1805 of one side of the scissor arm, or automatic locking mechanism 1850B coupled to two portions 1830 of one side of the scissor arm.

The top part 1851 can include a rod 1853 having an elongated head 1855. The elongated head can have one side longer than a side perpendicular to it, such as an ellipse shape or a rectangular shape. If the elongated head has the longer side disposed within the hook 1881 of the bottom part 1852, the rod can be secured to the hook, forming a lock status in which the top part is secured to the bottom part. If the elongated head has the shorter side disposed within the hook 1881 of the bottom part 1852, the rod can be movable out of the hook, forming an unlock status in which the top part can be moved from the bottom part.

The top part can include annular elements 1882 and 1886 having slanting surfaces, which can be mated with protruded pin on the rod. The annular elements and the protruded pin can be configured so that when the rod is pushed into and released out of the annular elements, the rod can rotate an angle such as 90 degrees, to toggle between longer side and shorter side, e.g., toggle between a lock status and an unlock status.

When the locking mechanism is engaged, meaning the top part is locked into the bottom part, the pulling element is fixedly coupled to the body of the clamping device. Thus the pulling element cannot move to activate the half scissor mechanisms, and the movable jaw plate is stationary when pulling on or lowering the pulling element.

When the locking mechanism is disengaged, meaning the top part is unlocked from the bottom part, the pulling element is freely to move with respect to the body of the clamping device. Thus the pulling element can move to activate the half scissor mechanisms, and the movable jaw plate can move toward or away from the opposite jaw plate when pulling on or lowering the pulling element, respectively.

The clamping device can have other options, such as a contact mechanism 1870 to visually detecting the object, for example, when the clamping device moves toward the object for clamping. The contact mechanism can be particular useful for transparent objects, such as glass plates, which can be difficult for the operator to see the edge of the plates. The clamping device can include roller feet 1871 for rolling the scissor clamp, for example, for moving between places on the ground. The clamping device can include a guiding mechanism 1872 for guiding objects toward the space between the stationary jaw and the movable jaw.

Figure 19A:
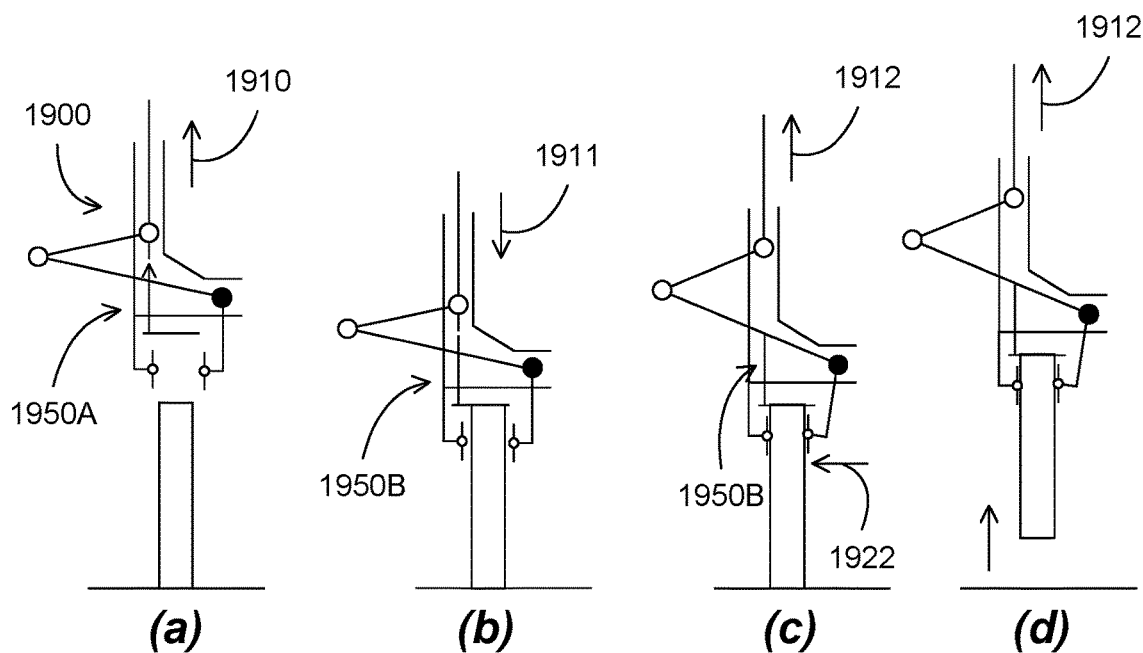
FIGS. 19A-19B illustrate processes for operating a clamping device according to some embodiments.
Figure 19B:
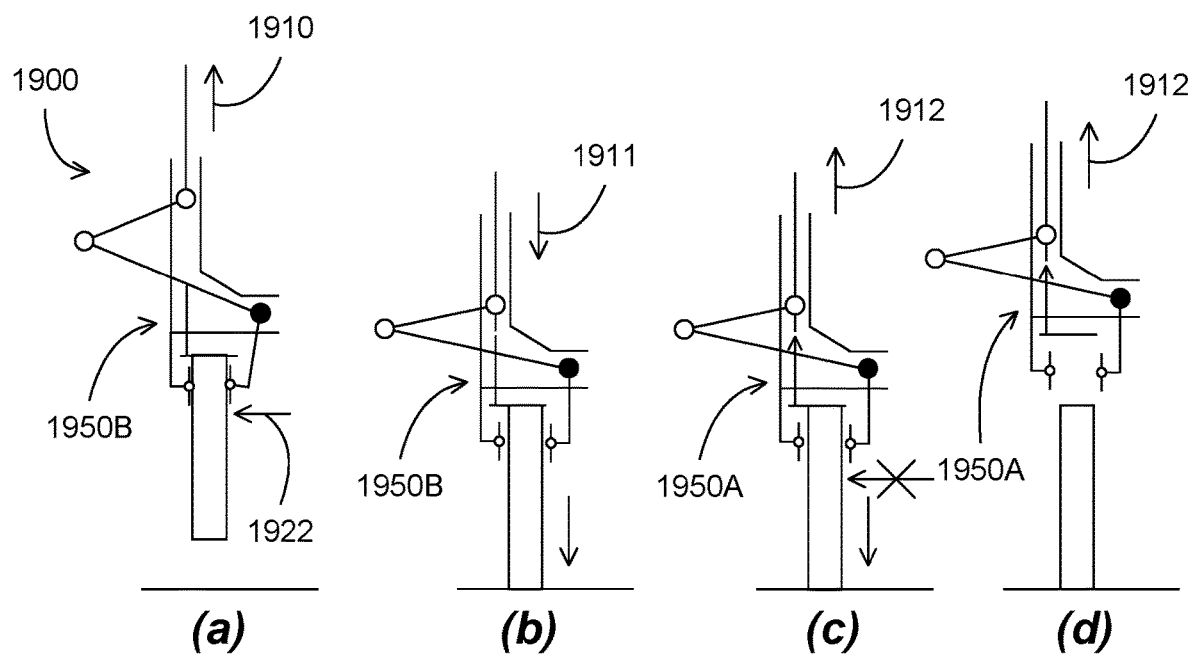

FIGS. 19A-19B illustrate processes for operating a clamping device according to some embodiments. The clamping device 1900 can include a locking mechanism that can automatically lock and release the jaws.

FIGS. 19A(a)-19A(d) show a process for an empty clamping device to pick an object.

In FIG. 19A(a), the locking mechanism is engaged 1950A, securing the opening of the jaws, e.g., the jaws are separated at a fixed distance, regardless of movements of the clamping device. Thus, when the clamping device is lifted up 1910 and moved to approaching the object, the distance between the jaws is unchanged.

In FIG. 19A(b), the clamping device is moved to be positioned on the object. Since the locking mechanism is engaged, the space between the jaws is large to accommodate the object. The clamping device then can be lowered so that the object is disposed between the jaws.

The clamping device is lowered 1911 enough to touch the object. A pulling element can then be further lowered, with respect to the body of the clamping device, to partially unlock the locking mechanism. For example, a top part of the locking mechanism can move down (since the top part is secured to the pulling element), so that a rod is moved up. Annular elements with slanting surfaces in the top part can partial rotate the rod, for example, through protruded pins coupled to the rod.

In FIG. 19A(c), the pulling element is lifted up 1912. At the beginning, the top part of the locking mechanism can move up (since the top part is secured to the pulling element), so that the rod is moved down. Annular elements with slanting surfaces in the top part can partial rotate the rod again through protruded pins coupled to the rod. The complete rotation can be 90 degrees, thus can release the rod from a hook in a bottom part of the locking mechanism.

The pulling element is then further lifted up. Since the locking mechanism is unlocked, the linkage mechanism is activated, and the jaws move toward each other for clamping 1922 on the object.

In FIG. 19A(d), the lifting of the pulling element will also lift the object after the jaws clamp on the object. The clamping device can lift and move the clamped object to a destination.

FIGS. 19B(a)-19B(d) show a process for a clamping device clamping on an object to release the object at a destination.

In FIG. 19B(a), the locking mechanism is disengaged 1950B, allowing the jaws to move when the clamping device is lifted up. Thus, when the clamping device is lifted up 1910 and moved, the jaws clamp on the object to secure the object to the clamping device.

In FIG. 19B(b), the clamping device is moved to a destination for dropping the object. The clamping device can be lowered 1911 until the object touches the ground. The pulling element can be further lowered while the body of the clamping device is stationary by contacting the object. The lowering of the pulling element can enlarge the distance between the jaws, e.g., increasing the separation between the jaws.

When the jaws are separated at a predetermined distance, such as a maximum distance, the top part of the locking mechanism can contact the bottom part of the locking mechanism, such as the elongated head of the rod can contact the hook of the bottom part. Since the locking mechanism is disable, the shorter side of the elongated head is facing the hook, thus the elongated head can enter the hook without any obstacle.

The lowering of the pulling element can lower the top part, thus moving the rod upward. The contact of the protruded pins with the slanting surfaces of the annular elements can partially rotate the rod.

In FIG. 19B(c), the pulling element is lifted up 1912. At the beginning, the top part of the locking mechanism can move up (since the top part is secured to the pulling element), so that the rod is moved down. The contact of the protruded pins with the slanting surfaces of the annular elements can partially rotate the rod again. The complete rotation can be 90 degrees, thus can secure the rod to the hook in a bottom part of the locking mechanism, e.g., the rod is rotated so that the longer side mates with the hook to secure the rod with the hook.

The pulling element is then further lifted up. Since the locking mechanism is locked, the linkage mechanism is deactivated, and the jaws are stationary, e.g., fixed in the separated state.

In FIG. 19B(d), the clamping device is lifted up. Since the jaws are separated, the object is left at the destination, and only the empty clamping device is moved. The clamping device is ready to move for approaching a new object for pick up.

FIG. 20A—20B illustrate a clamping device according to some embodiments. The clamping device 2000 can use a slanting interface mechanism, e.g., a pulling element having a slanting surface can be coupled to scissor arms to move clamping jaws. For example, a triangle pulling element can employ the slanting sides to extend or retract two scissor arms, which can pivot around a pivot point 2031 to move opposite jaws (FIG. 20A).

The clamping device can include elongated jaws 2040 and 2060. The clamping device can include a pulling element 2010, which can activate scissor arms around a pivot point. Thus, when the pulling element is pulled up, the scissor arms can extend. Due to the pivot point, the jaw arm can move when the scissor arms extend, which can move the jaws for clamping on an object.

Thus the clamping device can have a linkage mechanism, linking the pulling element 2010 with the jaws 2040 and 2060. Pulling on the pulling element can move the jaws together. Releasing the pull on the pulling element can separate the jaws, for example, due to gravitation.

A locking mechanism 2050 can be included, for hand-free actuating the clamping device. The locking mechanism can allow or prevent the engagement of the linkage mechanism between the pulling element and the jaws. When the locking mechanism is activated or locked, the linkage mechanism is prevented or disable, meaning pulling on the pulling element does not move the jaws. When the locking mechanism is deactivated or unlocked, the linkage mechanism is allowed or enable, meaning pulling on the pulling element move the jaws together.

The locking mechanism can include a top part 2051, which can be locked to or release from the bottom part 2052 (FIG. 20B). The top part 2051 can be secured to the pulling element 2010. The bottom part 2052 can be secured to the pivot point 2031. The top part can include a movable rod having an elongated head, which can be locked to or released from a mated hook 2081 in the bottom part.

The top part 2051 can include a rod 2053 having an elongated head 2055. The top part can include annular elements having slanting surfaces, which can be mated with protruded pins on the rod. The annular elements and the protruded pins can be configured so that when the rod is pushed into and released out of the annular elements, the rod can rotate an angle such as 90 degrees, to toggle between longer side and shorter side, e.g., toggle between a lock status and an unlock status.

When the locking mechanism is engaged, meaning the top part is locked into the bottom part, the pulling element is fixedly coupled to the body of the clamping device. Thus the pulling element cannot move to activate the linkage mechanism, and the jaws are stationary when pulling on or lowering the pulling element.

When the locking mechanism is disengaged, meaning the top part is unlocked from the bottom part, the pulling element is freely to move, e.g., separatable with respect to the body of the clamping device. Thus the pulling element can move to activate the linkage mechanism, and the jaws can move toward or away from each other when pulling on or lowering the pulling element, respectively.

The clamping device can have other options, such as a contact mechanism 2070 to visually detecting the object, for example, when the clamping device moves toward the object for clamping. The contact mechanism can be particular useful for transparent objects, such as glass plates, which can be difficult for the operator to see the edge of the plates. The clamping device can include roller feet 2071 for rolling the scissor clamp, for example, for moving between places on the ground. The clamping device can include a guiding mechanism 2072 for guiding objects toward the space between the stationary jaw and the movable jaw.

Figure 21A:
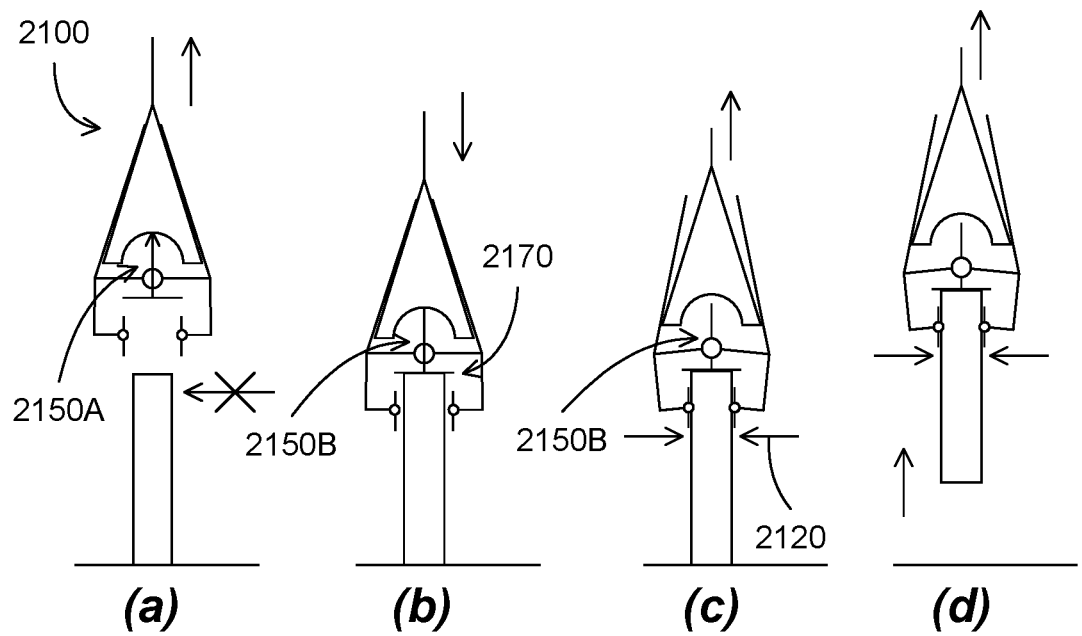
FIGS. 21A-21B illustrate processes for operating a clamping device according to some embodiments.
Figure 21B:
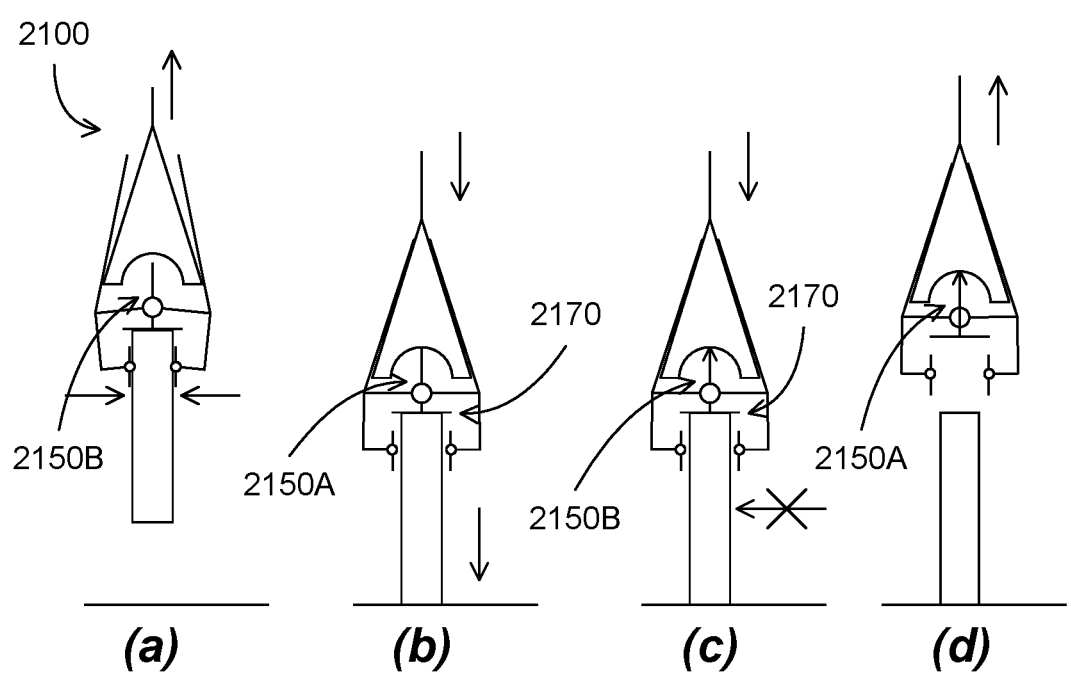

FIGS. 21A-21B illustrate processes for operating a clamping device according to some embodiments. The clamping device 2100 can include a locking mechanism that can automatically lock and release the jaws.

FIGS. 21A(a)-21A(d) show a process for an empty clamping device to pick an object.

In FIG. 21A(a), the locking mechanism is engaged 2150A, securing the opening of the jaws. In FIG. 21A(b), the clamping device is moved to place an object between the jaws. A pulling element can then be further lowered, with respect to the body of the clamping device, to partially unlock the locking mechanism. For example, a rod in the locking mechanism can partially rotate.

In FIG. 21A(c), the pulling element is lifted up, and can partial rotate the rod again. The complete rotation can release the rod from a hook in the locking mechanism. The pulling element is then further lifted up to move the jaws for clamping on the object. In FIG. 21A(d), the lifting of the pulling element will also lift the object after the jaws clamp on the object.

FIGS. 21B(a)-21B(d) show a process for a clamping device clamping on an object to release the object at a destination.

In FIG. 21B(a), the locking mechanism is disengaged 2150B. In FIG. 21B(b), the clamping device moves to a destination, and lowers the object to the ground. The pulling element can be further lowered to increase the separation between the jaws. The pulling element can be lowered until the rod pressing on the hook, which can partially rotate the rod.

In FIG. 21B(c), the pulling element is lifted up, and can partial rotate the rod again. The complete rotation can lock the rod to the hook. In FIG. 21B(d), the pulling element is lifted up to move for approaching a new object for pick up.

Figure 22A:
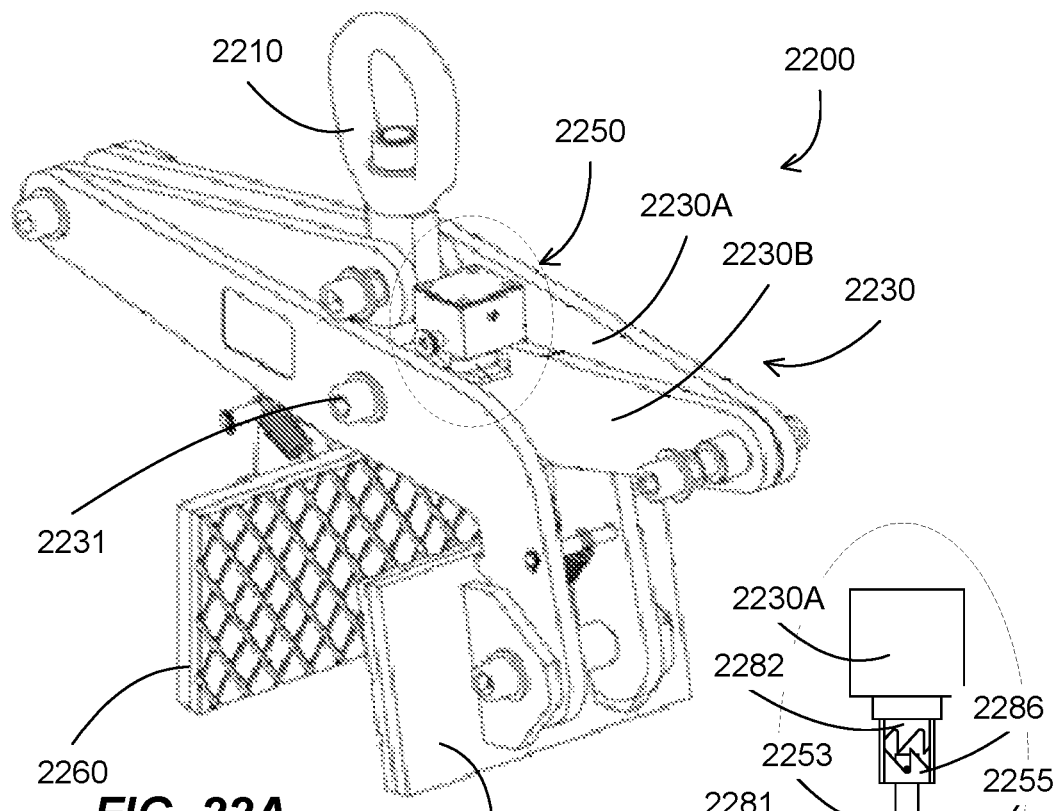
FIGS. 22A-22B illustrate a clamping device according to some embodiments.
Figure 22B:
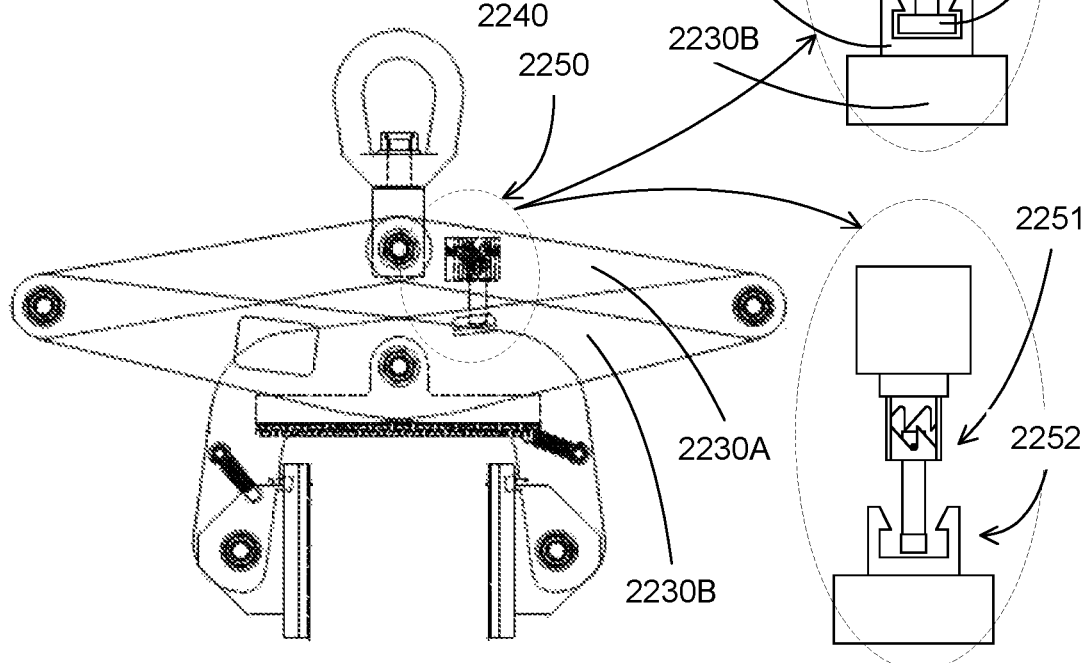

FIGS. 22A-22B illustrate a clamping device according to some embodiments. The clamping device 2200 can use a scissor mechanism, e.g., two jaws are coupled to a scissor mechanism to a pulling element. For example, a scissor mechanism 2230 can couple to jaws 2240 and 2260, so that when a pulling element 2210 is pulled up or released, the jaws move toward each other or away from each other, respectively.

The scissor mechanism can include a pivot point 2231, which is fixedly coupled to the body of the clamping device. The scissor mechanism can include a pulling element arm, which is connected to the pulling element, and a jaw arm, which is connected to the jaw, and rotatable over the pivot joint 2231.

Thus, when the pulling element is pulled up, the scissor mechanism is activated. Due to the pivot point, the jaw arm is moved when the pulling element arm is moved, which can move the jaws together or away from each other.

Thus the clamping device can have a linkage mechanism, linking the pulling element 2210 with the jaws 2240 and 2260. Pulling on the pulling element can move the jaws toward each other. Releasing the pull on the pulling element can move the jaws away from each other, for example, due to gravitation. The linkage mechanism can include the pulling element arms, coupled to the jaw arms through the pivot points.

A locking mechanism 2250 can be included, for hand-free actuating the clamping device using the scissor mechanism. The locking mechanism can allow or prevent the engagement of the scissor mechanism, e.g., allowing or prevent the linkage mechanism between the pulling element and the jaws. When the locking mechanism is activated or locked, the linkage mechanism is prevented or disable, meaning pulling on the pulling element does not move the jaws. When the locking mechanism is deactivated or unlocked, the linkage mechanism is allowed or enable, meaning pulling on the pulling element move the jaws away from each other.

The locking mechanism can include a top part 2251, which can be locked to or release from the bottom part 2252. The top part 2251 can be secured to a pulling element arm 2230A. The bottom part 2252 can be secured to a jaw arm 2230B. The top part can include a movable rod having an elongated head, which can be locked to or released from a mated hook in the bottom part.

The top part 2251 can include a rod 2253 having an elongated head 2255. The elongated head can have one side longer than a side perpendicular to it, such as an ellipse shape or a rectangular shape. If the elongated head has the longer side disposed within the hook 2281 of the bottom part 2252, the rod can be secured to the hook, forming a lock status in which the top part is secured to the bottom part. If the elongated head has the shorter side disposed within the hook 2281 of the bottom part 2252, the rod can be movable out of the hook, forming an unlock status in which the top part can be moved from the bottom part.

The top part can include annular elements 2282 and 2286 having slanting surfaces, which can be mated with protruded pins on the rod. The annular elements and the protruded pins can be configured so that when the rod is pushed into and released out of the annular elements, the rod can rotate an angle such as 90 degrees, to toggle between longer side and shorter side, e.g., toggle between a lock status and an unlock status.

When the locking mechanism is engaged, meaning the top part is locked into the bottom part, the pulling element arm is fixedly coupled to the jaw arm. Thus the pulling element cannot move to activate the scissor mechanism, and the jaws are stationary when pulling on or lowering the pulling element.

When the locking mechanism is disengaged, meaning the top part is unlocked from the bottom part, the pulling element is freely to move, e.g., separatable with respect to the body of the clamping device. Thus the pulling element can move to activate the scissor mechanism, and the movable jaws can move toward or away from each other when pulling on or lowering the pulling element, respectively.

Figure 23A:
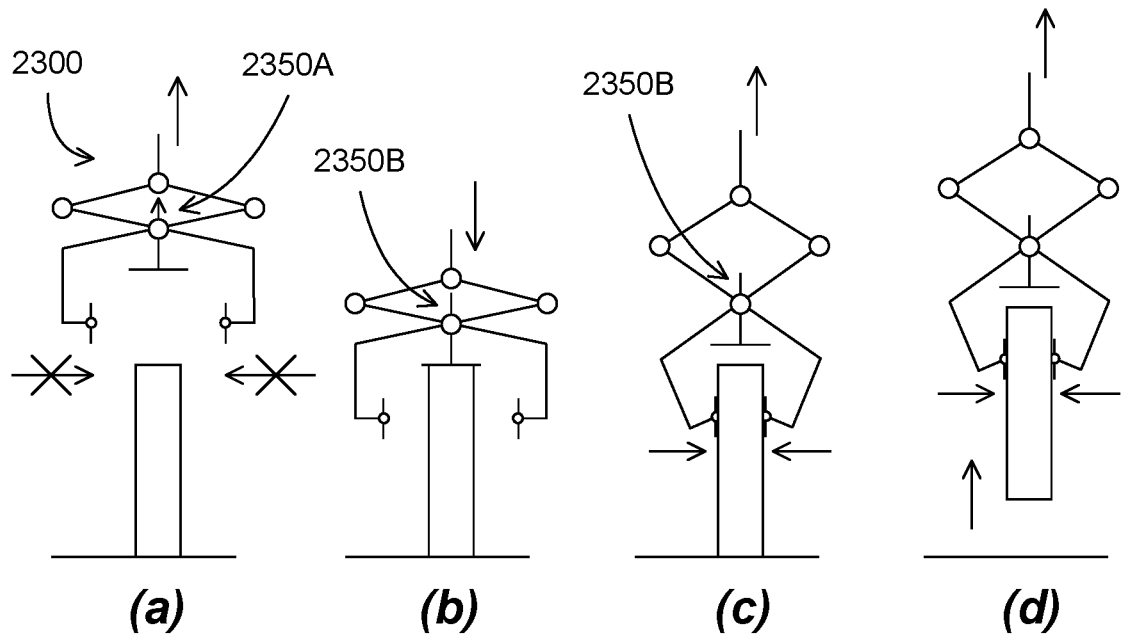
FIGS. 23A-23B illustrate processes for operating a clamping device according to some embodiments.
Figure 23B:
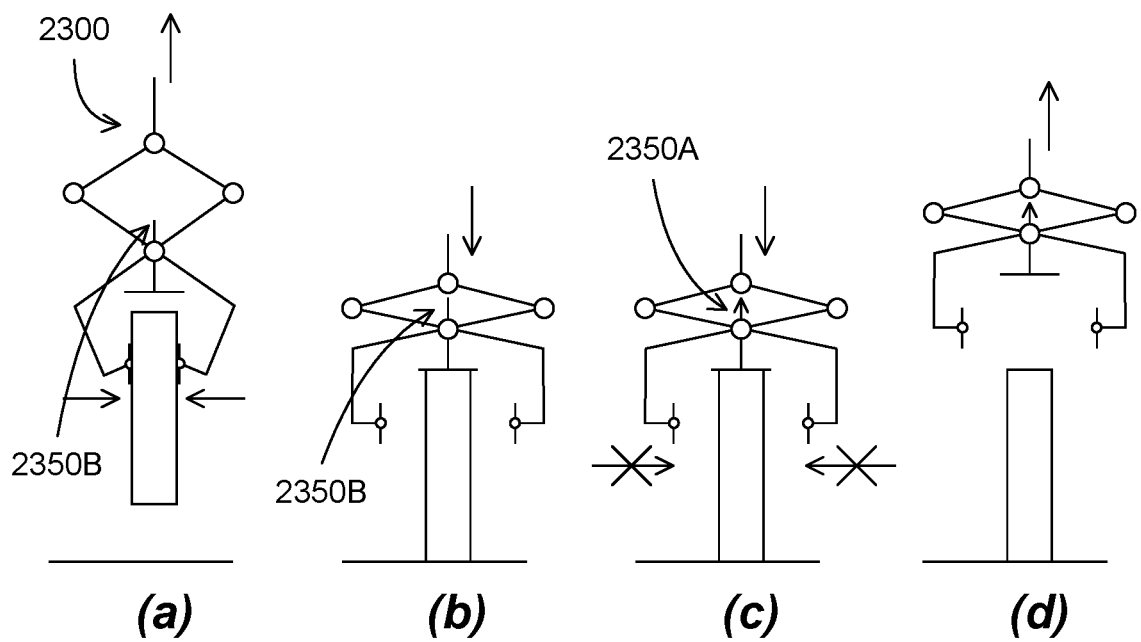

FIGS. 23A-23B illustrate processes for operating a clamping device according to some embodiments. The clamping device 2300 can include a locking mechanism that can automatically lock and release the jaws.

FIGS. 23A(a)-23A(d) show a process for an empty clamping device to pick an object.

In FIG. 23A(a), the locking mechanism is engaged 2350A, securing the opening of the jaws. In FIG. 23A(b), the clamping device is moved to place an object between the jaws. A pulling element can then be further lowered, with respect to the body of the clamping device, to partially unlock the locking mechanism. For example, a rod in the locking mechanism can partially rotate.

In FIG. 23A(c), the pulling element is lifted up, and can partial rotate the rod again. The complete rotation can release the pin from a hook in the locking mechanism. The pulling element is then further lifted up to move the jaws for clamping on the object. In FIG. 23A(d), the lifting of the pulling element will also lift the object after the jaws clamp on the object.

FIGS. 23B(a)-23B(d) show a process for a clamping device clamping on an object to release the object at a destination.

In FIG. 23B(a), the locking mechanism is disengaged 2350B. In FIG. 23B(b), the clamping device moves to a destination, and lowers the object to the ground. The pulling element can be further lowered to increase the separation between the jaws. The pulling element can be lowered until the rod pressing on the hook, which can partially rotate the rod.

In FIG. 23B(c), the pulling element is lifted up, and can partial rotate the rod again. The complete rotation can lock the rod to the hook. In FIG. 23B(d), the pulling element is lifted up to move for approaching a new object for pick up.

Figures 24A, 24B:
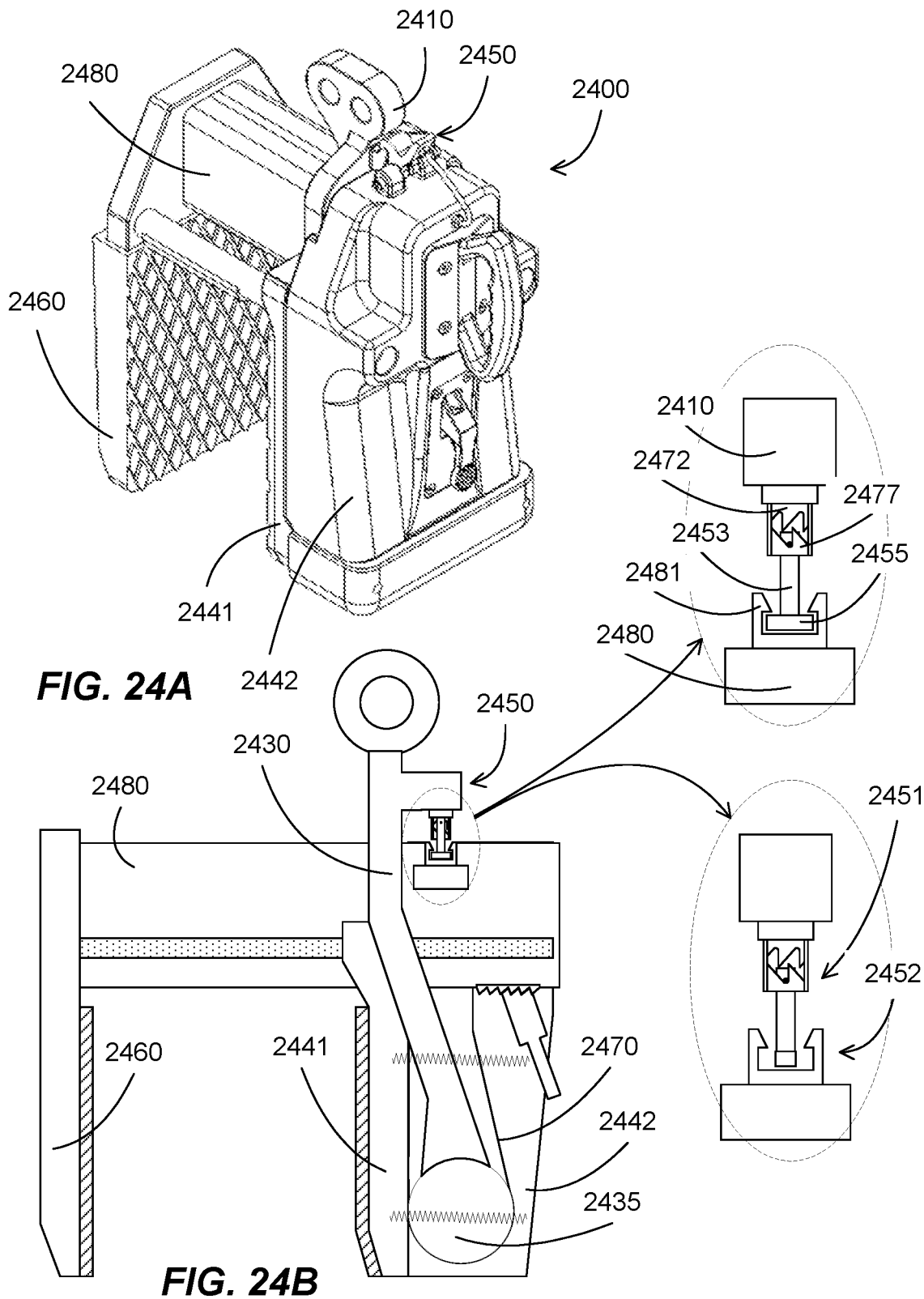
FIGS. 24A-24B illustrate a clamping device according to some embodiments.

FIGS. 24A-24B illustrate a clamping device according to some embodiments. The clamping device 2400 can use a slanting interface mechanism, e.g., a pulling element having a roller for rolling on a slanting surface of a jaw support. For example, the pulling element can be disposed between a jaw and a jaw support. When the pulling element rolls of the slanting surface of the jaw support, the jaw can move away from or toward the jaw support.

The clamping device 2400 can be configured for lifting heavy objects. The clamping device can include a first jaw 2460 coupled to a clamp bar 2480. The clamping device can include a second jaw assembly, which can be movably and lockably coupled to the clamp bar. The second jaw assembly can include a second jaw 2441 disposed opposite the first jaw. The second jaw assembly can include a jaw support 2442, which can slide along the clamp bar for movably coupled to the clamp bar. The second jaw assembly can be lockable to the clamp bar. The second jaw assembly can include stretchable elements, such as springs, which can be coupled to the second jaw and the jaw support, for pulling the second jaw toward the jaw support. The stretchable elements can allow the second jaw to move away from the jaw support, for a limited distance, such as a distance equal or smaller than a distance between the discrete locking locations of the discrete locking mechanism.

The clamping device can include a pulling element 2410, which can be configured to be pulled on for lifting the clamped object. The pulling element can freely move in an up direction. The pulling element can be configured to exert a clamping force on the object when being pulled, for example, by rolling through roller 2435 on slanting surface 2470 of the jaw support.

A locking mechanism 2450 can be included, for hand-free actuating the slanting interface mechanism. The locking mechanism can allow or prevent the engagement of the linkage mechanism between the pulling element and the jaw. When the locking mechanism is activated or locked, the linkage mechanism is prevented or disable, meaning pulling on the pulling element does not move the pulling element. When the locking mechanism is deactivated or unlocked, the linkage mechanism is allowed or enable, meaning pulling on the pulling element move the pulling element for moving the jaw toward the other jaw.

The locking mechanism can include a top part 2451, which can be locked to or release from the bottom part 2452. The top part 2451 can be secured to the pulling element 2410. The bottom part 2452 can be secured to the clamp bar 2480. The top part can include a movable rod having an elongated head, which can be locked to or released from a mated hook in the bottom part.

The automatic locking mechanism can be coupled to different portions of the clamping device, such as another automatic locking mechanism coupled to the roller 2435 and the jaw support body 2442.

The top part 2451 can include a rod 2453 having an elongated head 2455. The top part can include annular elements 2472 and 2476 having slanting surfaces, which can be mated with protruded pins on the rod. The annular elements and the protruded pins can be configured so that when the rod is pushed into and released out of the annular elements, the rod can rotate an angle such as 90 degrees, to toggle between longer side and shorter side, e.g., toggle between a lock status and an unlock status.

When the locking mechanism is engaged, meaning the top part is locked into the bottom part, the pulling element is fixedly coupled to the body of the clamping device. Thus the pulling element cannot move to activate the linkage mechanism, and the jaws are stationary when pulling on or lowering the pulling element.

When the locking mechanism is disengaged, meaning the top part is unlocked from the bottom part, the pulling element is separatable with respect to the body of the clamping device. Thus the pulling element can move to activate the linkage mechanism, and the jaws can move toward or away from each other when pulling on or lowering the pulling element, respectively.

FIGS. 25A-25F illustrate another clamping device configuration according to some embodiments. The clamping device 2500 can use a slanting interface mechanism, e.g., a pulling element 2510 having a roller for rolling on a slanting surface of a jaw support (FIG. 25A).

The clamping device can include a first jaw 2560 coupled to clamp bars 2580. The clamping device can include a second jaw assembly, which can be movably and lockably coupled to the clamp bar. The second jaw assembly can include a second jaw 2541 disposed opposite the first jaw. The second jaw assembly can include a jaw support 2542, which can slide along the clamp bars for movably coupled to the clamp bar. The second jaw 2541 can be movable relative to the jaw support 2542, such as a function of the pulling element positions (FIG. 25B).

A locking mechanism 2550 can be included, for hand-free actuating the slanting interface mechanism.

The locking mechanism can include a top part, which can be locked to or release from the bottom part. The bottom part can include a hook receptacle 2581, which can be secured to a stationary portion of the clamping device, such as to the body of the clamping device, for example, to the jaw support 2542 (FIG. 25C).

The top part can include a shell 2585, which can be secured to a movable portion of clamping device, such as to the pulling element 2510. An annular element 2570 can be disposed inside the shell 2585, and can be secured to the shell, for example, by a set of nuts and bolts 2570A. The shell 2585 can have a support 2585A, such as a step, to support the annular element 2570, e.g., against a downward force acting on the annular element. The annular element 2570 can include teeth 2572 and 2577, disposed on two opposite sides. A movable rod 2553 with protruded pins can be disposed inside the annular element. The rod 2553 can have an elongated head 2555 for releasably mating with the hook receptacle 2581 (FIG. 25D-25F).

Figure 26A:
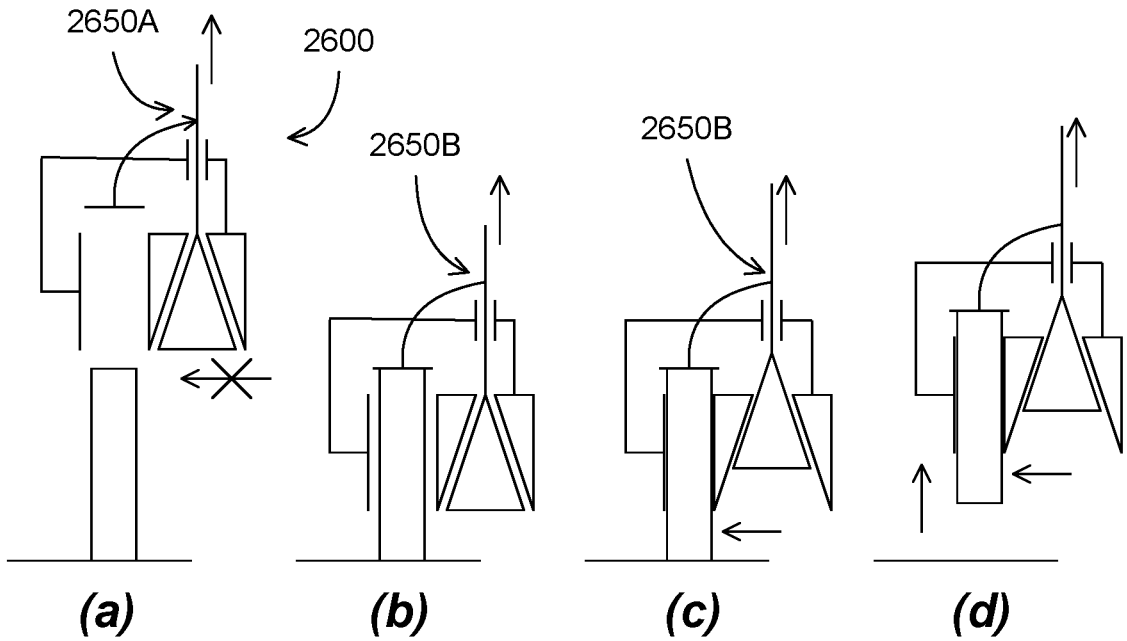
FIGS. 26A-26B illustrate processes for operating a clamping device according to some embodiments.
Figure 26B:
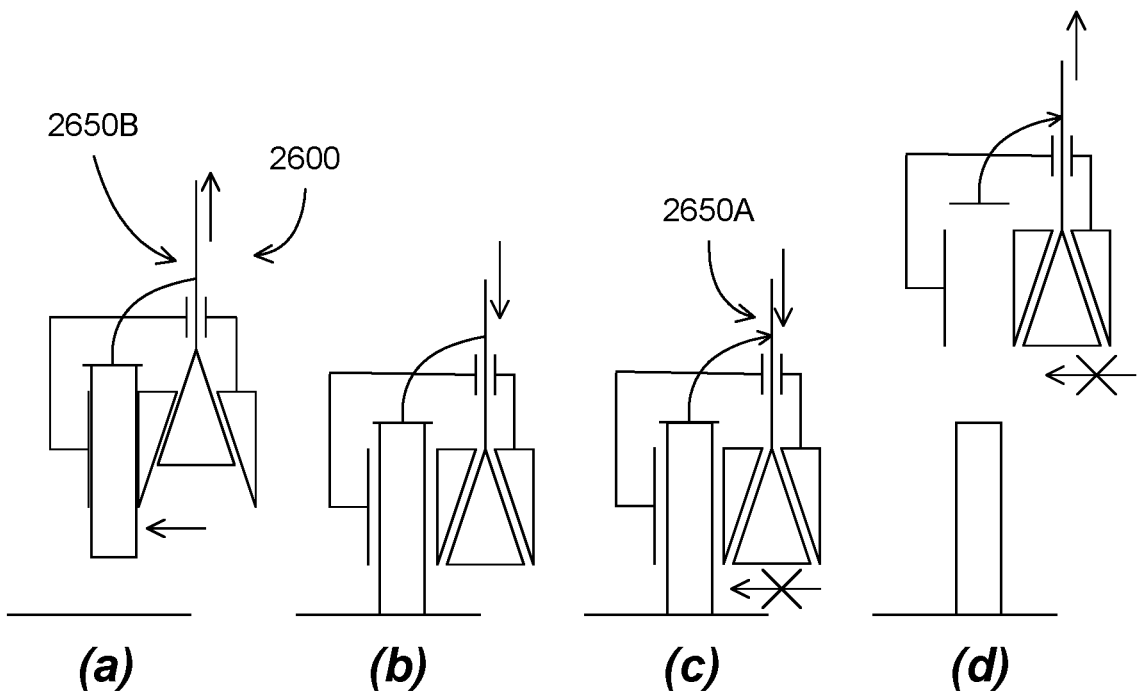

FIGS. 26A-26B illustrate processes for operating a clamping device according to some embodiments. The clamping device 2600 can include a locking mechanism that can automatically lock and release the jaws.

FIGS. 26A(a)-26A(d) show a process for an empty clamping device to pick an object.

In FIG. 26A(a), the locking mechanism is engaged 2650A, securing the opening of the jaws. In FIG. 26A(b), the clamping device is moved to place an object between the jaws. A pulling element can then be further lowered, with respect to the body of the clamping device, to partially unlock the locking mechanism. For example, a rod in the locking mechanism can partially rotate.

In FIG. 26A(c), the pulling element is lifted up, and can partial rotate the rod again. The complete rotation can release the rod from a hook in the locking mechanism. The pulling element is then further lifted up to move the jaws for clamping on the object. In FIG. 26A(d), the lifting of the pulling element will also lift the object after the jaws clamp on the object.

FIGS. 26B(a)-26B(d) show a process for a clamping device clamping on an object to release the object at a destination.

In FIG. 26B(a), the locking mechanism is disengaged 2650B. In FIG. 26B(b), the clamping device moves to a destination, and lowers the object to the ground. The pulling element can be further lowered to increase the separation between the jaws. The pulling element can be lowered until the rod pressing on the hook, which can partially rotate the rod.

In FIG. 26B(c), the pulling element is lifted up, and can partial rotate the rod again. The complete rotation can lock the rod to the hook. In FIG. 26B(d), the pulling element is lifted up to move for approaching a new object for pick up.

FIGS. 27A-27D illustrate a clamping device according to some embodiments. A clamping device can include a first jaw assembly and a second jaw assembly disposed in substantially perpendicular with a clamp bar. The clamp bar can include multiple bars, which can be coupled to the first and second jaw assembly. The first jaw assembly can be fixedly coupled to the clamp bar. The second jaw assembly can also be fixedly coupled to the clamp bar. Alternatively, the second jaw assembly can be movably coupled to the clamp bar, such as moving along the clamp bar, and then secured to the clamp bar, for example, by a locking mechanism.

The clamping device can include a rotatable element, which can be coupled to a jaw assembly. For example, the jaw assembly can include a jaw facing a jaw support. The rotatable element can be disposed between the jaw and the jaw support, and can be rotatably coupled to a component of the jaw assembly, such as to the jaw. A pulling element can be coupled to the rotatable element to rotate the rotatable element in one direction. A return mechanism, such as a spiral spring assembly, can be used to rotate the rotatable element in an opposite direction.

An interface between the rotatable element and a component of the jaw assembly, such as the jaw support can include a slanting surface, which can be configured so that when the rotatable element is rotated in the direction caused by the pulling of the pulling element, the jaw is moving away from the jaw support if there is no obstacle blocking the movement of the jaw. If an object is already present between the jaws of the clamping device, the slanting surface can convert the action of pulling the pulling element to an action, e.g., a force, pushing on the jaw, to clamp on the object.

The slanting interface can include one or more spiral surfaces coupled to the rotatable element, and one or more rollers coupled to a component of the jaw assembly, such as to the jaw support.

FIG. 27A shows a perspective view of the clamping device. A clamping device 2700 can include a first jaw 2760 which is coupled to a clamp bar 2780. A rubber pad 2765 can be coupled to the first jaw to increase friction with clamped objects. A jaw assembly including a second jaw 2741 and a jaw support 2742 can be coupled to the clamp bar. A rubber pad 2745 can be coupled to the second jaw to increase friction with clamped objects.

A rotatable element 2730 can be disposed between the second jaw and the jaw support. The rotatable element can be rotatably coupled to the second jaw, and can have slanting interfaces with the jaw support. The rotatable element can have spiral surfaces, interfacing with rollers in the jaw support. The rollers can roll on the spiral or helical surfaces of the rotatable element.

A pulling element 2743 can have one end fixedly coupled to the rotatable element, and wrapped around the rotatable element. Thus, when the pulling element is pulled up, the rotatable element can rotate, which can rotate the spiral surfaces on the rollers, moving the rotatable element relative to the jaw support. The other end of the pulling element can include a coupled, such as a hook, for coupling with a hoist for moving the clamping device.

The clamping device can include other components, such as an automatic locking mechanism for enabling or disabling a linkage between the pulling element and the second jaw. For example, the automatic locking mechanism can allow or prevent the rotatable element from rotating, thus pulling on the pulling element can rotate or non-rotate the rotatable element.

FIG. 27B shows a cross section of a clamping device, which can include a first jaw 2760 fixedly coupled to a clamp bar 2780, such as a single bar or multiple connection bars. The first jaw can include a rubber pad 2765 to increase a friction with objects to be clamped. In some embodiments, the first jaw can be removably coupled to the clamp bar, together with a locking mechanism for securing the first jaw to the clamp bar. Alternatively, the first jaw can be a part of a first jaw assembly, which can also include a first jaw support. The first jaw of the first jaw support can be coupled to the clamp bar, such as fixedly coupled or removably coupled with a locking mechanism.

The clamping device can include a second jaw assembly, which can be movably and lockably coupled to the clamp bar. The second jaw assembly can include a second jaw 2741 disposed opposite the first jaw. The second jaw can include a rubber pad 2745 to increase a friction with objects to be clamped. The second jaw assembly can include a jaw support 2742, which can slide along the clamp bar for movably coupled to the clamp bar. As shown, the first jaw is fixedly coupled to the clamp bar, and the second jaw assembly is movably coupled to the clamp bar. Other configurations can be used, such as the first jaw is movably coupled to the clamp bar, and the second jaw assembly is fixedly coupled to the clamp bar. Alternatively, the first jaw and the second jaw assembly can both be movably coupled to the clamp bar. A jaw or a jaw assembly, if movably coupled to the clamp bar, can include a locking mechanism for securing the jaw or the jaw assembly to the clamp bar.

There can be flexible couplings between the second jaw and the jaw support. The flexible couplings can allow the second jaw to move in multiple directions with respect to the jaw support, such as down and away from the jaw support. The flexible couplings can include springs having two ends fixedly coupled to the second jaw 2741 and the jaw support 2742. The springs can bend and flex, allowing the second jaw to move relative to the jaw support.

The clamping device can include a pulling element 2743, which can be configured to be pulled on for lifting the clamped object. The pulling element can be coupled to a rotatable element 2730, which is disposed between the second jaw and the jaw support. The pulling element can also be disposed between the clamp bar, e.g., between the multiple connection bars. The pulling element can freely move in an up direction. In the down direction, a spring set can be used to pull the pulling element toward the rotatable element.

The rotatable element can be configured to exert a clamping force on the object when rotating, for example, through a slanting surface on the rotatable element. For example, the jaw support can include a set of rollers, which can provide rolling friction with the slanting surface of the rotatable element. Thus there can be minimum friction when the rotatable element is rotating, pushing the second jaw away from the jaw support due to the slanting surface.

The clamping device can include a locking mechanism 2750A, which can be coupled to either the clamp bar or to the second jaw assembly to prevent the rotatable element from being rotated. The rotatable element can be constrained from rotating, thus the second locking mechanism, when engaged, when secure the rotatable element to the second jaw. The rotatable element can be locked to a position of maximum jaw opening, which can provide that the second jaw is closest to the jaw support.

In operation, the locking mechanism, e.g., the locking mechanism that locks the second jaw assembly to the clamp bar, can be unlocked, for example, by pulling back a second mated component to disengage the second mated component 2772 from a first mated component. This will release the second jaw assembly from the clamp bar, and thus the second jaw assembly can slide along the clamp bar so that the distance between the two jaws can be large enough to accommodate the object.

After putting the object within the first and second jaw, the locking mechanism can be engaged, e.g., the second mated component can be pushed up to engage with the first mated component, locking the second jaw assembly to the clamp bar. If the locking mechanism is a discrete locking mechanism, there can be gaps between the object and the jaws.

This process can be optional. In some embodiments, the second jaw assembly can be secured to the clamp bar, and the clamping device can be configured to handle objects having a range of thicknesses, determined by the movements of the second jaw.

Next, the locking mechanism 2750A can be unlocked, so the pulling element can be pulled up. Due to the rollers, the rotatable element can easily rotate against the jaw support. The second jaw can move away from the jaw support, until the second jaw is in contact with the object. If there is a gap between the object and the first jaw, the second jaw can keep moving to narrow that gap. The second jaw then continue to move until the first and second jaws all contact the object.

FIGS. 27C-27D show internal views of the rotatable clamping device. A clamping device can include a first jaw 2760 facing a second jaw 2741. A rotatable element 2730 can be rotatably coupled to the second jaw, for example, through ball bearings. A pulling element 2743 can be coupled to the rotatable element, and can rotate the rotatable element, when pulled, in one direction, such as counter-clockwise as shown. Spring assembly 2735 can be coupled between the rotatable element and the second jaw to rotate the rotatable element in an opposite direction, for example, when the pulling element is not pulled or released.

The rotatable element can include slanting surface, such as spiral or helical surfaces 2771, which can change a distance between the rotatable element and a jaw support (not shown). An automatic locking mechanism 2750B or 2750C can be coupled to the rotatable element at different locations. The automatic locking mechanism can be fixedly coupled to the second jaw, and can function to allow or to prevent the rotatable element from rotating.

A pulling element 2743 can be coupled to a rotatable element 2730. For example, one end of the pulling element can be fixedly coupled to the rotatable element. Thus, when the pulling element is pulled up, the rotatable element can rotate, such as in a clockwise direction as shown. A spring assembly 2735 can be used to rotate the rotatable element in an opposite direction, when the pulling element is relaxed.

A limiter can be used to limit the amount of rotation. For example, as shown, the rotatable element can rotate at most about 180 degrees. Rollers can be included to reduce friction between the rotatable element and a jaw support (not shown). The rotatable element can include slanting surface, such as spiral or helical surfaces 2771. There can be 2 spiral or helical surfaces, thus the rotatable element can obtain a maximum separation with the jaw support when rotating about 180 degrees.

Figure 28A:
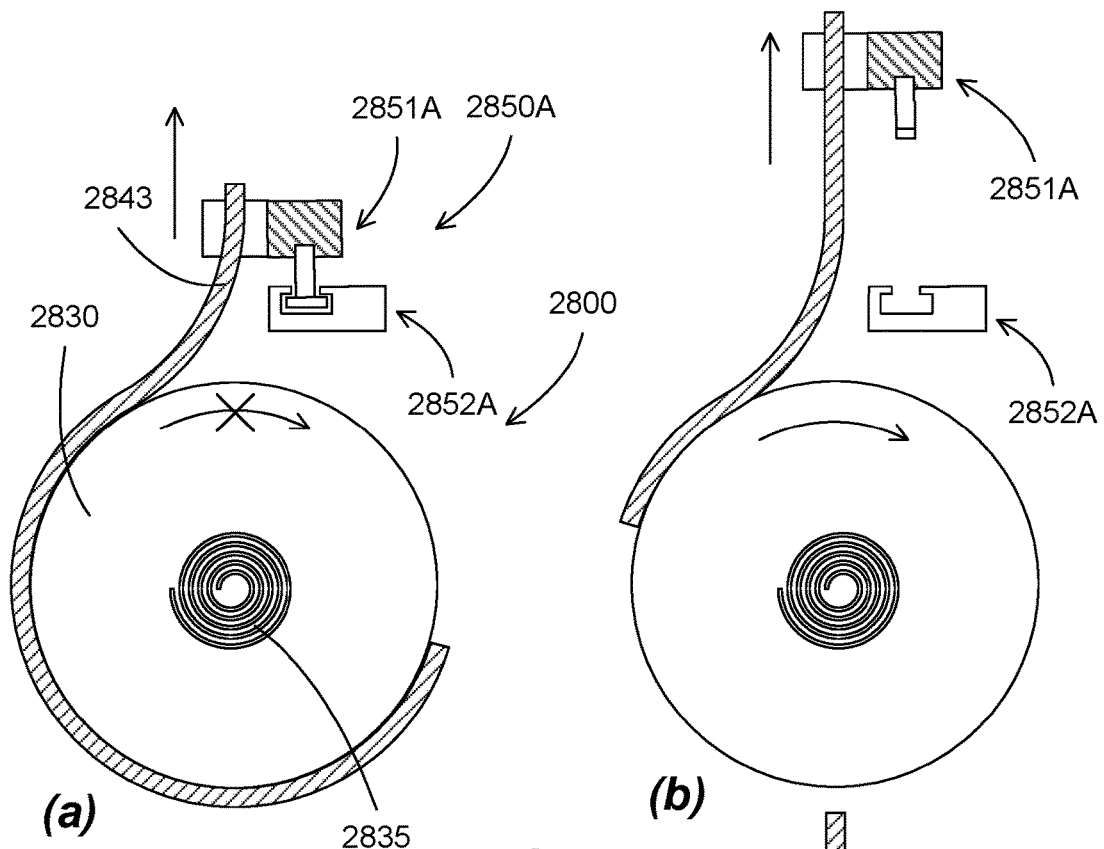
FIGS. 28A-28B illustrate locking mechanisms for a clamping device according to some embodiments.
Figure 28B:
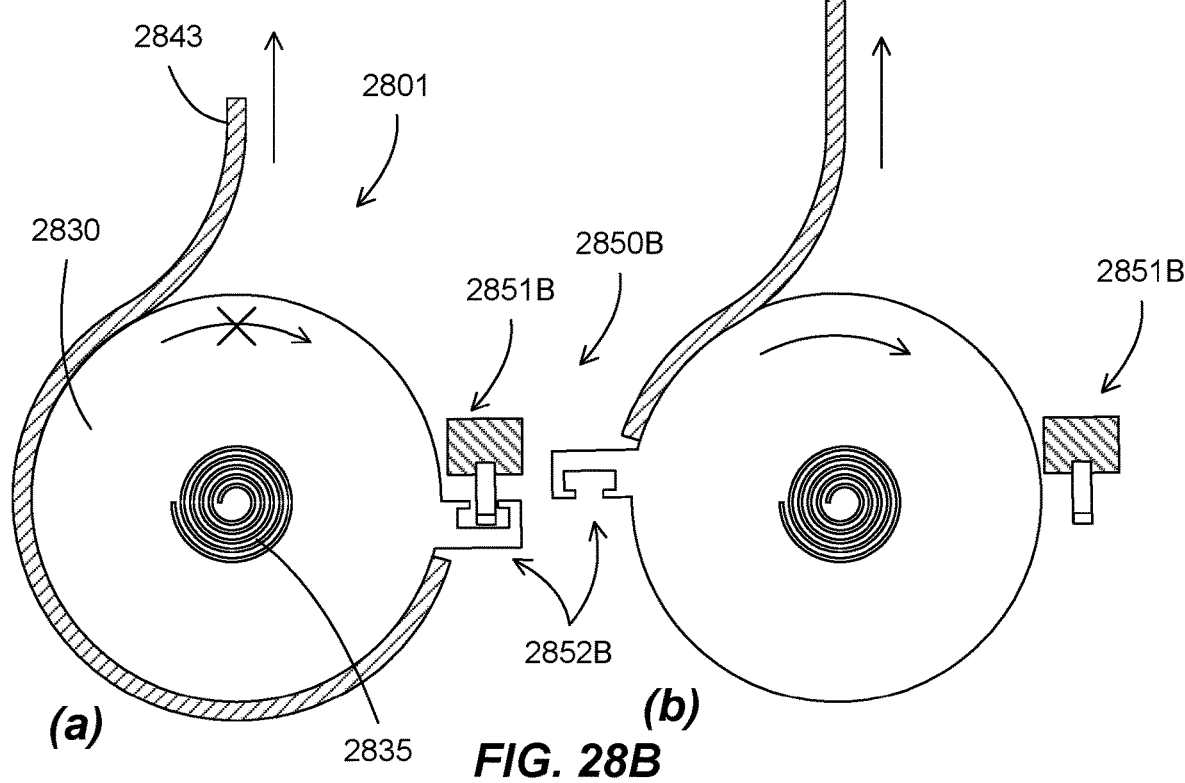

FIGS. 28A-28B illustrate locking mechanisms for a clamping device according to some embodiments. A clamping device can use a slanting interface mechanism, such as a rotatable element having spiral or helical surfaces coupling with rollers of a jaw support. For example, the rotatable element can be disposed between a jaw and a jaw support.

When the rotatable element rotates, the rollers can roll on the spiral or helical surfaces of the rotatable element to push the jaw away from or pull the jaw toward the jaw support.

A pulling element can be coupled to the rotatable element for rotating the rotatable element. When the pulling element is pulled up, the rotatable element can rotate, and the second jaw can move toward the first jaw for clamping on an object. When the pulling element is released, e.g., not pulling up, a return mechanism such as a spiral spring can rotate the rotatable element in an opposite direction, which can move the second jaw away from the first jaw.

A locking mechanism can be included, for hand-free actuating the slanting interface mechanism. The locking mechanism can allow or prevent the rotation of the rotatable element.

FIGS. 28A(a) and 28A(b) show locked and unlocked states for a locking mechanism of a clamping device 2800 employing a rotatable mechanism. A top part 2851A of a locking mechanism 2850A is coupled to the pulling element, such as coupled to a flexible element 2843 (e.g., a rope, a belt, or a chain) which is configured to rotate a rotatable element 2830 (e.g., a disk or a round plate). A bottom part 2852A of the locking mechanism 2850A is coupled to a body of the clamping device.

When the top part is locked with the bottom part (FIG. 28A(a)), the pulling element 2843 is coupled with the body of the clamping device. Thus the pulling element cannot move up freely, e.g., the pulling element can be fixedly coupled to the body (except maybe a small backlash distance caused by the operation of the locking mechanism). The fixed pulling element can stop the rotatable element from rotating, and the jaws are fixed in position, e.g., the jaws are not movable toward each other for clamping.

When the top part is unlocked with the bottom part (FIG. 28A(b)), the pulling element 2843 is free to move with respect to the body of the clamping device. Thus the top part can move away from the bottom part. The rotatable element can rotate in one direction when the pulling element is pulled up. The rotation of the rotatable element in this direction can cause the jaws to move toward each other, for clamping on an object. The rotatable element can rotate in an opposite direction when the pulling element is released, due to the presence of a spring configuration 2835. The rotation of the rotatable element in this opposite direction can cause the jaws to move away from each other, for releasing the object.

The locking mechanism can be automatically toggled due to a set of vertical movements, which can include a lowering movement of the pulling element, followed by a raising movement of the pulling element. The set of vertical movements can rotate a rod having a hook end, which can be toggled between hooked and unhooked to a mating hook receptacle.

FIGS. 28B(a) and 28A(b) show locked and unlocked states for another locking mechanism of a clamping device 2801 employing a rotatable mechanism. A top part 2851B of a locking mechanism 2850B is coupled to a body of the clamping device. A bottom part 2852B of the locking mechanism 2850B is coupled to the rotatable element 2830 (e.g., a disk or a round plate).

When the top part is locked with the bottom part (FIG. 28B(a)), the rotatable element 2830 is coupled with the body of the clamping device. Thus the rotatable element cannot rotate freely, e.g., the rotatable element can be fixedly coupled to the body (except maybe a small backlash distance caused by the operation of the locking mechanism). The fixed rotatable element can stop the jaws from moving, e.g., the jaws are not movable toward each other for clamping.

When the top part is unlocked with the bottom part (FIG. 28B(b)), the rotatable element 2830 is free to move with respect to the body of the clamping device. Thus the top part can move away from the bottom part. The rotatable element can rotate in one direction when the pulling element is pulled up. The rotation of the rotatable element in this direction can cause the jaws to move toward each other, for clamping on an object. The rotatable element can rotate in an opposite direction when the pulling element is released, due to the presence of a spring configuration 2835. The rotation of the rotatable element in this opposite direction can cause the jaws to move away from each other, for releasing the object.

The locking mechanism can be automatically toggled due to a set of vertical movements, which can include a lowering movement of the pulling element, followed by a raising movement of the pulling element. The set of vertical movements can rotate a rod having a hook end, which can be toggled between hooked and unhooked to a mating hook receptacle.

Figure 29A:
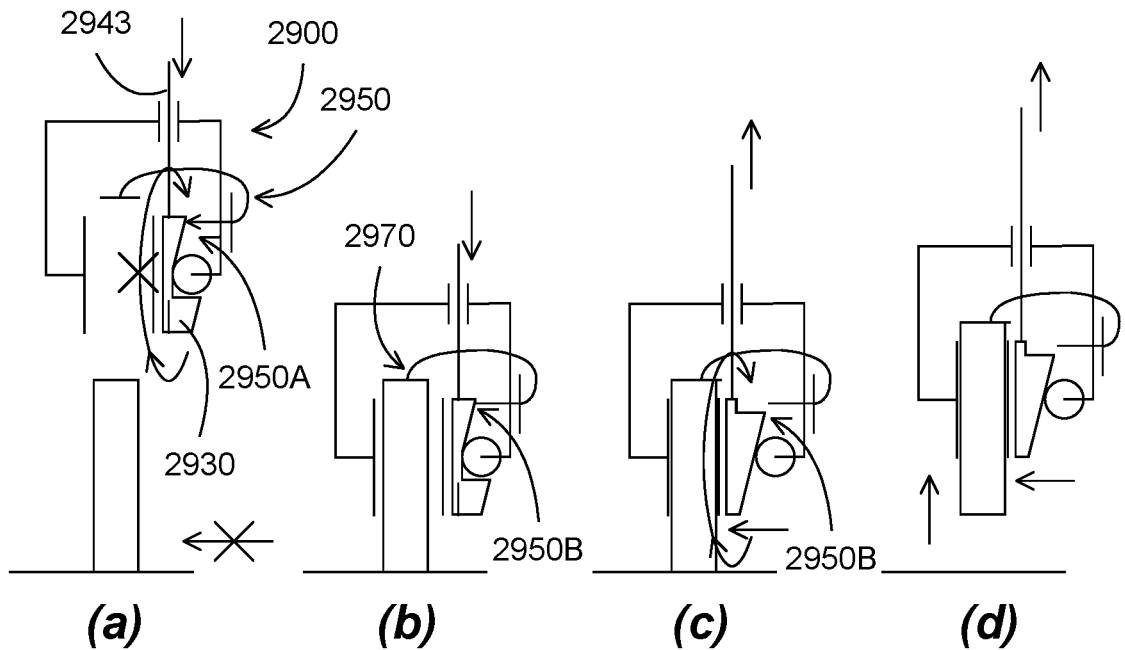
FIGS. 29A-29B illustrate operating processes for the automatic locking mechanism according to some embodiments.
Figure 29B:
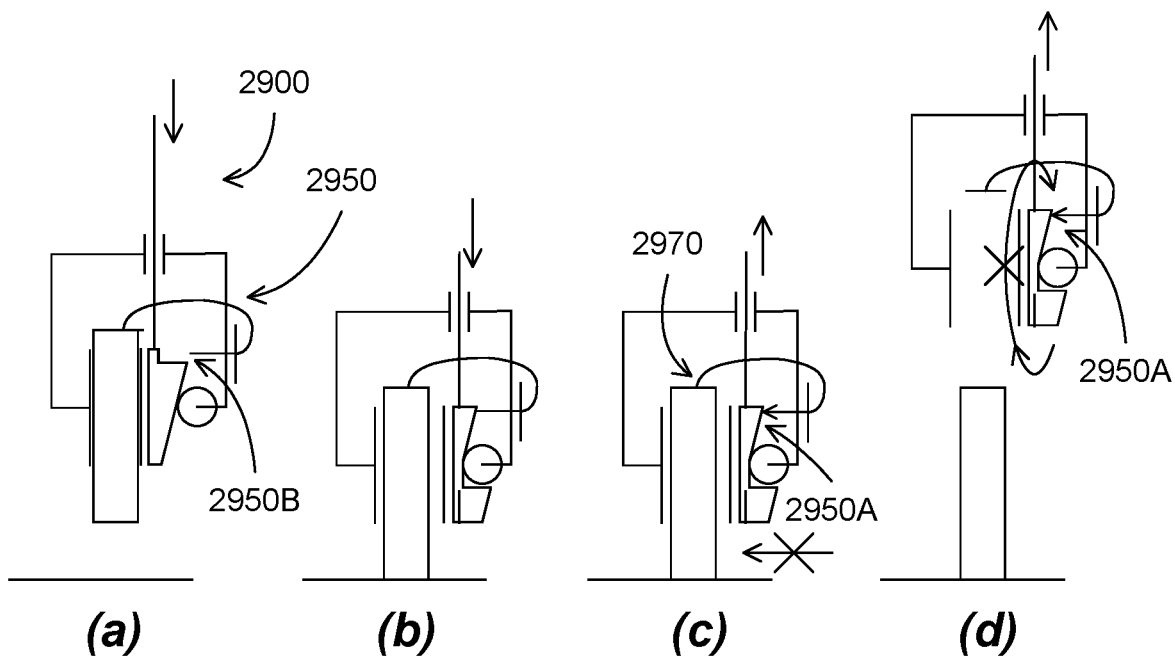

FIGS. 29A-29B illustrate operating processes for the automatic locking mechanism according to some embodiments. FIGS. 29A(a)-(d) show a process for an empty clamping device 2900 to pick up an object. The clamping device is supported by a hoist coupled to the pulling element 2943 of the clamping device. In FIG. 29A(a), the clamping device is brought to the object, e.g., positioned above the object with the object located between the two jaws of the clamping device. The clamping device can have the automatic locking mechanism 2950 activated 2950A, e.g., to be in a locked state, meaning the rotatable element 2930 is locked, for example, to a body part or a jaw, which can prevent the rotatable element from rotating. The fixed rotatable element can disable the linkage between the pulling element and the jaw, thus the jaws can be separated, for example, at a maximum distance in order to accommodate the getting of the object between the opening of the jaws. The activation of the locked state of the automatic locking mechanism can be accomplished after the clamping device finishes delivering the object, as discussed in subsequent processes.

In FIG. 29A(b), the clamping device is lowered to place the object between the two jaws. The clamping device can touch the object, for example, by a mechanism 2970 that links to the automatic locking mechanism. The contacting of the mechanism 2970 can partially toggle the automatic locking mechanism, e.g., partially activating the automatic locking mechanism if the automatic locking mechanism is deactivated, and partially deactivating the automatic locking mechanism if the automatic locking mechanism is activated. Since the locking mechanism is activated, the contacting of the mechanism by the clamping device when lowering to capture the object can partially deactivate 2950B the automatic locking mechanism. The rotatable element can be still coupled to the body, e.g., not yet free to rotate when the pulling element is pulled up.

In FIG. 29A(c), the pulling element is pulled up, for example, by the hoist that is coupled to the pulling element. The pulling up movement can first complete the toggling process, e.g., completing the activation process if the automatic locking mechanism is partially activated, or completing the deactivation process if the automatic locking mechanism is partially deactivated. Since the automatic locking mechanism is partially deactivated, pulling the pulling element can complete the deactivation process, allowing the rotatable element to freely rotate with respect to the body. With the rotatable element free to rotate, the jaws can also free to move.

Further pulling on the pulling element can rotate the rotatable element, which can move the jaws toward each other for clamping on the object. When the jaws contact the object, the rotation of the rotatable element can stop, and further pulling on the pulling element can exert a clamping force on the object by the jaws.

In FIG. 29A(d), further pulling on the pulling element can lift the clamping device and the object clamped between the jaws of the clamping device. The clamping device can then be moved to a new location for disposing the object.

FIGS. 29B(a)-(d) show a process for a clamping device 2900 holding an object to release the object. In FIG. 29B(a), the clamping device with the object clamped between the jaws is brought to a destination, e.g., to a location that the object is to be placed. The clamping device can have the automatic locking mechanism 2950 deactivated 2950B, meaning the rotatable element 2930 is free to rotate, and thus the linkage between the pulling element and the jaw is enabled to move the jaws together for clamping on the object. The deactivation of the automatic locking mechanism can be accomplished after the clamping device finishes picking the object, as discussed in the previous processes.

In FIG. 29B(b), the clamping device is lowered to place the object on the ground or any surface at the destination. The lowering of the clamping device can be accomplished by lowering the hoist coupled to the pulling element. After the object touches the ground, the hoist can continue to lower, thus lowering the pulling element without lowering the clamping device. Since the automatic locking mechanism is deactivated, a spring mechanism in the rotatable element, such as a spiral spring coupled to the rotatable element, can rotate the rotatable element and thus pull the pulling element down when the hoist is lowered. The rotation of the rotatable element can cause the jaws to be separated.

The pulling element can be further moved down, for example, by the lowering of the hoist that is coupled to the pulling element, which causes the rotatable element to continue to rotate. When the rotatable element rotates to a certain position, such as to a position that achieve a maximum separation of the jaws (or when the rotatable element encounters a limit stop), the top and bottom portions of the locking mechanism can make contact, which can stop the rotational movement of the rotatable element. For example, the top portion can be coupled to the pulling element, and thus when the pulling element is lowered to the position that provides the maximum jaw separation, the top portion can make contact with the bottom portion, which is coupled to the body. Alternatively, the bottom portion can be coupled to the rotatable element, and thus when the rotatable element is rotated to the position that provides the maximum jaw separation, the bottom portion can make contact with the top portion, which is coupled to the body.

The contacting of the two portions of the locking mechanism can partially toggle the automatic locking mechanism, e.g., partially activating the automatic locking mechanism if the automatic locking mechanism is deactivated, and partially deactivating the automatic locking mechanism if the automatic locking mechanism is activated. Since the locking mechanism is deactivated, the contacting of the mechanism by the clamping device when lowering to release the object can partially activate 2950A the automatic locking mechanism. The pulling element of the rotatable element can be partially coupled to the body due to the partial activation process.

In FIG. 29B(c), the pulling element is pulled up, for example, by the raising of the hoist that is coupled to the pulling element. The pulling up movement can first complete the toggling process, e.g., completing the activation process if the automatic locking mechanism is partially activated, or completing the deactivation process if the automatic locking mechanism is partially deactivated. Since the automatic locking mechanism is partially activated, pulling the pulling element can complete the activation process, locking the rotatable element, e.g., the rotatable element is not free to rotate with respect to the body. With the rotatable element not free to rotate, the jaws can also fixed at the maximum separation.

Further pulling on the pulling element cannot rotate the rotatable element, thus keeping the jaws separated at the maximum separation distance.

In FIG. 29B(d), the pulling element can be further pulled up, for example, by the hoist that is coupled to the pulling element. Since the automatic locking mechanism is activated, pulling the pulling element cannot rotate the rotatable element, thus the jaws are still separated at the maximum separation, e.g., the previous separation when the automatic locking mechanism is activated. The clamping device can be lifted up. Since the jaws are separated, the object can be left on the ground, and the empty clamping device with the open jaws can be move to another location to pick up another object.

The process can be continued, e.g., with moving the empty clamping device to approach an object for pick up.

In some embodiments, the present invention discloses a clamping device configured to handle large and fragile objects. A clamping devices can utilize a mechanism that converts the weight of the object into a clamping force, thus the holding force on the object exerted by the clamping devices can be proportional to the weight of the object. A loading and unloading device, such as a crane or a hoist, can be coupled to the clamping device for lifting and transferring the objects. In general, a compact clamping device can have two opposite facing flat jaws connected through a clamp bar. As such, the clamping device is configured to handle flat panels.

Figure 30A:
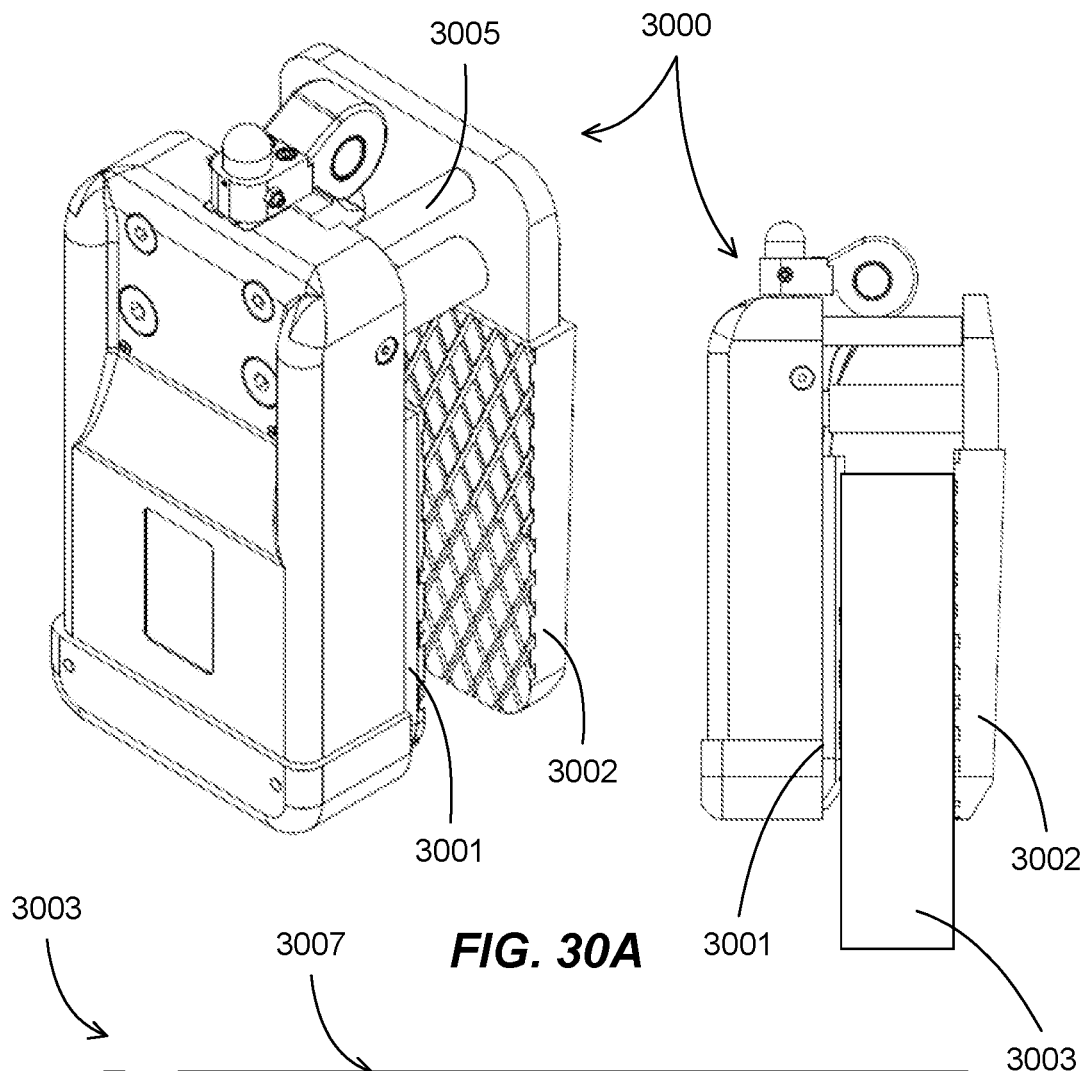
FIGS. 30A-30B illustrate a compact clamping device configured to handle flat panels according to some embodiments.
Figure 30B:

FIGS. 30A-30B illustrate a compact clamping device configured to handle flat panels according to some embodiments. In FIG. 30A, a clamping device 3000 can have a first jaw 3001 disposed facing a second jaw 3002. The two jaws are connected through a clamp bar 3005. When the clamping device is lifted up, a moving mechanism can be asserted on a portion of a jaw, such as on jaw 3001, to shorten the space between the two jaws, such as by moving the jaws together, in effect clamping on a flat panel 3003 placed between the two jaws. The clamping device 3000 can be compact, with the jaws and the clamp bar disposed surrounding the flat panel.

The compactness of the clamping device 3000 can make it difficult to handle thin and fragile panels, such as glass panels or sheetrock panels, for example, due to a concentrated force exerted on the compact jaws. Further, the compact clamping device can be configured to lift and move heavy panels, thus can be heavy, and can cause problem for workers when being used for handling fragile and light weight panels.

For example, FIG. 30B shows a fragile, thin, and light weight panel 3003, having a small thickness 3008, such as less than 20 mm, less than 10 mm, less than 5 mm, or less than 2 mm. The panel can be large, such as having a large height and width 3007. The large size of the panels can cause difficulty in handling, especially with fragile panels.

In some embodiments, the present invention discloses a clamping device configured to handle thin, light weight, and fragile flat panels, such as flat panels of metal, granite, ceramic, glass, quartz, concrete, wood, or sheetrock plates.

The clamping device can have jaws having a large contact area, e.g., larger than the clamping mechanism, in order to distribute the clamping force to the large area, and thus reducing the clamping pressure on the panels. The large contact area jaws can allow the clamping device to handle fragile objects by using low pressure.

The clamping device can be light weight, e.g., made from hollow or shell components. Materials can be removed from the components of the clamping device to reduce the weight of the clamping device, while not affecting the structure integrity of the clamping device. Further, the clamping device can have a small maximum separation between the jaws, to reduce the weight and to make the clamping device easy to handle by the worker. The maximum separation can be less than 150 mm, less than 100 mm, less than 75 mm, or less than 50 mm.

The clamping device can be configured so minimize the number of components, such as a component can be configured to operate in more than one capacity, in order to lower the weight of the clamping device. For example, a pulling element in the clamping device can be configured to roll on slanting surfaces to move the jaw together. A motion guiding assembly can be used to guide the pulling element movements. To reduce the number of components, the slanting surfaces and a clamp bar connecting the two jaws can be configured as the motion guiding assembly, instead of forming a separate motion guiding assembly.

The clamping device can be configured for automatically locking the jaws at a maximum separation, to allow the clamping device to capture the object, e.g., to place the object between the opened two jaws of the clamping device. After the object is properly positioned, the jaws can then automatically unlocked, to allow the jaws to move together for clamping on the object. The automatic locking configuration can simplify the operation of the clamping device, such as allowing the clamping device to be operated with a single operator, operating the clamping device from a position away from the object.

Figure 31A:
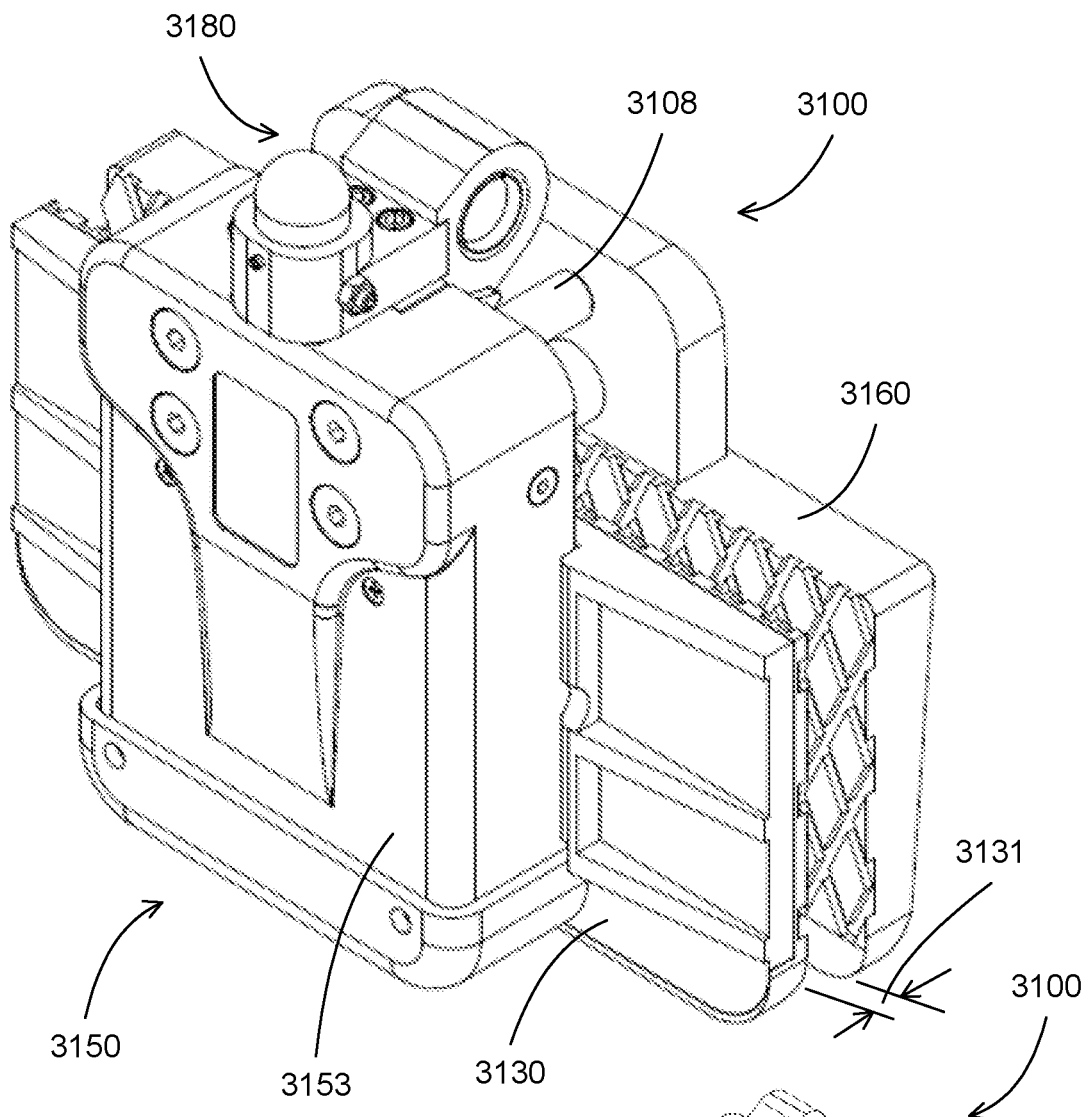
FIGS. 31A-31B illustrate a clamping device according to some embodiments.
Figure 31B:
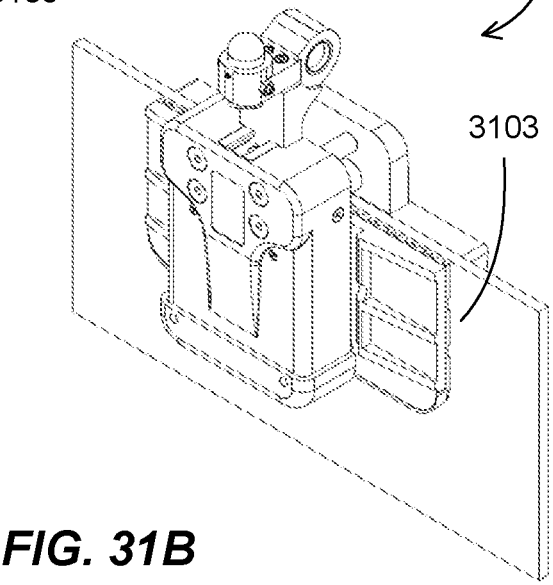

FIGS. 31A-31B illustrate a clamping device according to some embodiments. FIG. 31A shows a clamping device 3100 having two jaws 3130 and 3160 separated. FIG. 31B shows the clamping device 3100 clamped on an object 3103.

The clamping device can include a compact clamping mechanism 3150, which is coupled to jaw 3130. The jaw 3130 can be much larger than the compact clamping mechanism 3150, such as between 2 and 3 times larger. The clamping mechanism 3150 can include a linkage mechanism, which can move the jaw 3130 toward the jaw 3160 to clamp on the panel 3103, or away from the jaw 3160 to release the panel 3103. The larger area of the jaws 3130 and 3160 can reduce the pressure on the clamped object, with the same clamping force.

The clamping device can have a small maximum gap 3131 between jaws 3130 and 3160, such as between 4-6 times smaller than the total thickness of the clamping device 3100. The small maximum gap can be less than 200 mm, less than 150 mm, less than 100 mm, less than 75 mm, or less than 50 mm. The small maximum gap can be configured to clamp on thin panels, such as panels with thicknesses less than 150 mm, less than 100 mm, less than 75 mm, less than 50 mm, less than 20 mm, or less than 10 mm.

The clamping device can have an automatic locking mechanism 3180, which can be configured to automatically keep the jaws separated when the clamping device is ready to pick up the object, and which can be configured to automatically moving the jaws together for clamping on the object when the clamping device is lifted up.

In some embodiments, the clamping device can have a jaw 3130 movable along a clamp bar 3108 to be closer to an opposite jaw 3160 for clamping on an object 3103. The jaw 3160 can be fixed coupled to the clamp bar 3108. A large fragile object can require low clamping pressure, such as a large contact area with the object. With small contact area, the clamping device might exert too high a pressure on the object, which can damage the object. Thus, the jaws 3130 and 3160 can have a larger contact area, e.g., larger than the clamping mechanism 3150, to reduce the pressure that the clamping device imposes on the object when clamping. The large area jaws can be used to increase the contact area between the jaws and the object, e.g., providing large surface area on the object or on the jaws.

Figure 32A:
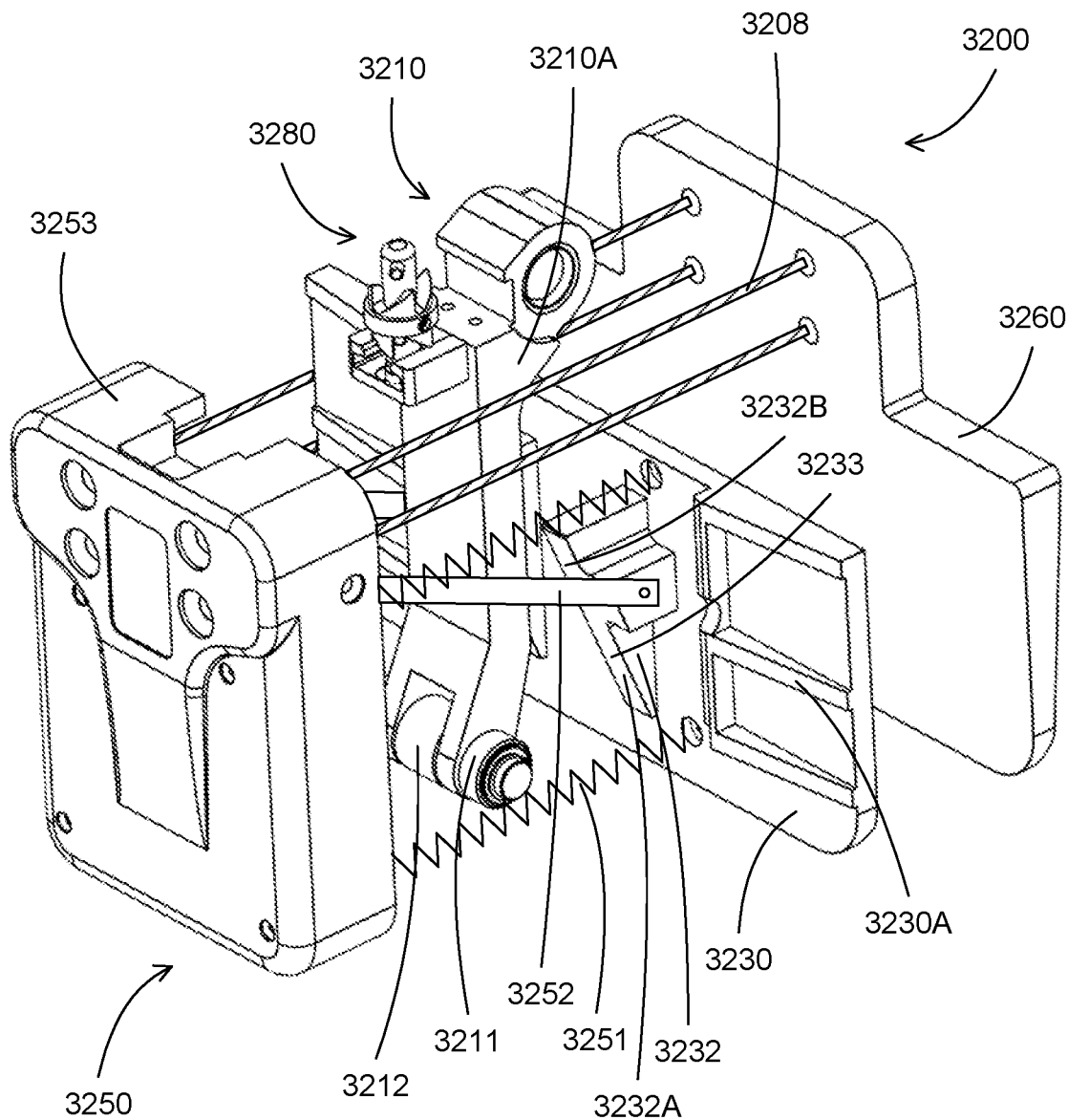
FIGS. 32A-32B illustrate exploded perspective views of a clamping device according to some embodiments.
Figure 32B:
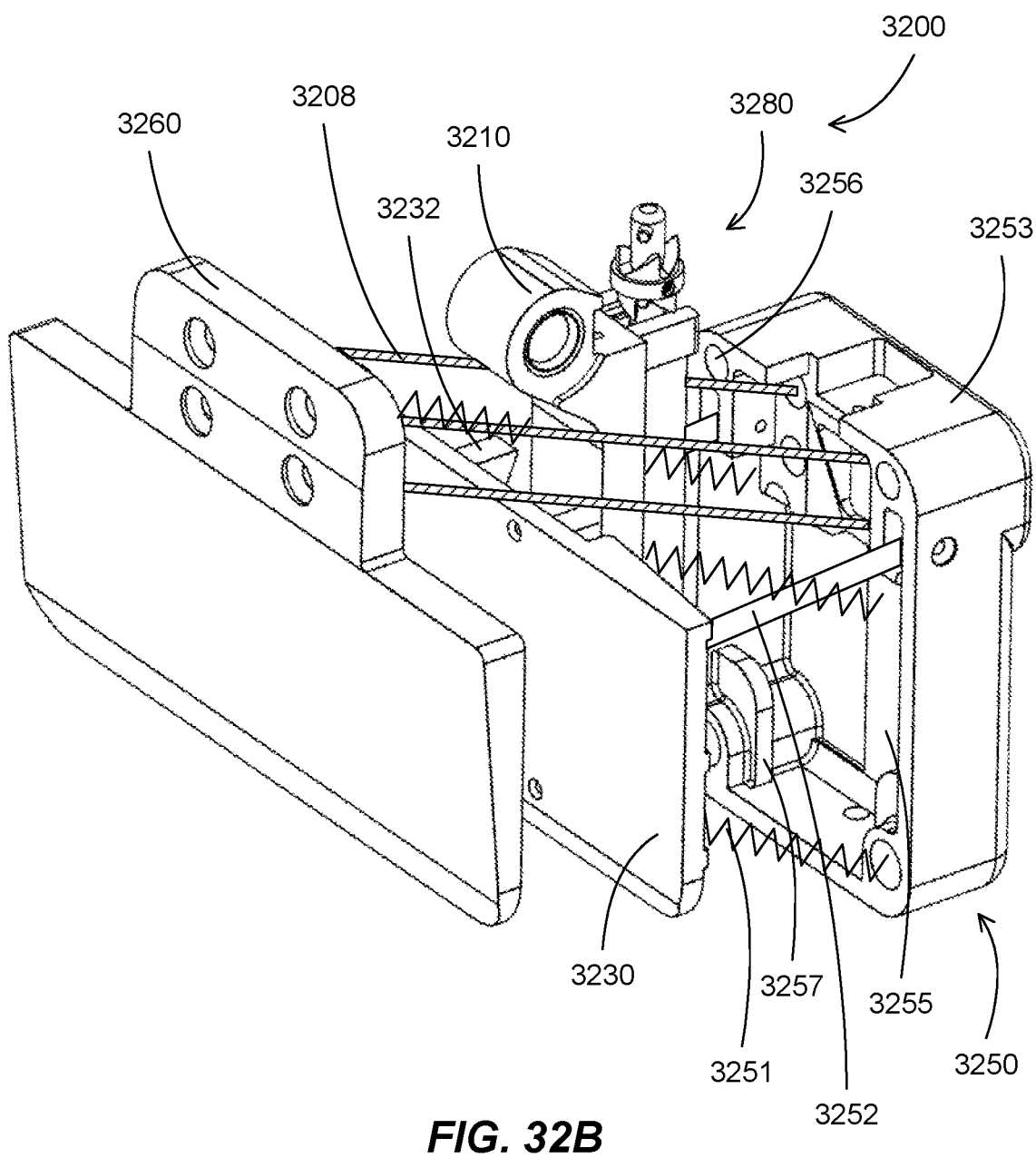

FIGS. 32A-32B illustrate exploded perspective views of a clamping device according to some embodiments. FIG. 32A shows a view from a jaw support. FIG. 32B shows a view from the fixed jaw. The clamping device can be configured for handling fragile, large and light weight panels, having features of large clamping surface and light weight clamping device. The clamping device 3200 can include a fixed jaw 3260 fixedly coupled to a jaw support 3253 of a clamping mechanism (or linkage mechanism for the clamping device) 3250 through one or more clamp bars 3208. The fixed jaw 3260 can have a small portion for coupling with the clamp bars, and a larger portion for clamping on an object. The large portion of the fixed jaw can reduce pressure on the object, which can allow the clamping device to handle fragile panels. The small portion of the fixed jaw can reduce the weight of the clamping device, which can provide ease of handling. The multiple clamp bars can provide strength to the clamping device with reduced weight. The jaw support 3253 can have a small portion, together with a shell body for light weight, while providing strength for the clamping mechanism.

The clamping device 3200 can include a movable jaw 3230 disposed opposite the fixed jaw 3260. The movable jaw 3230 can have an area having the same size as the large portion of the fixed jaw 3260, e.g., the jaw movable 3230 and the large portion of the fixed jaw 3260 are configured for clamping on the object. The movable jaw 3230 can include a flat plate for reducing weight, together with reinforced ridges 3230A for strength.

The movable jaw 3230 can be movably coupled to the jaw support 3253. For example, the movable jaw 3230 can be coupled to the jaw support 3253 through a set of springs 3251. The springs can be biased to pull the movable jaw 3230 toward the jaw support 3253. In operation, a force from a pulling element 3210 can push the movable jaw 3230 away from the jaw support toward the fixed jaw 3260, for clamping on an object disposed between the two jaws. When the force from the pulling element is released, the springs can pull the movable jaw 3230 back toward the jaw support and away from the fixed jaw 3260.

The movable jaw 3230 can be rotatably coupled to the jaw support 3253 through a set of connecting bars 3288. The connecting bars 3288 can be rotatably coupled to the jaw support at a top portion, and also rotatably coupled to the movable jaw at a lower portion. Thus, the movable jaw 3230 can swing away from the jaw support when the pulling element 3210 pushing on the movable jaw, and can swing back to the jaw support when the springs pulling the movable jaw back to the jaw support. The springs and the connecting bars can couple the movable jaw to the jaw support in a light weight configuration, in order to provide a light weight clamping device with structure integrity.

The movable jaw can include protruded elements 3232. The protrude elements 3232 can include slanting surfaces 3233 for rollers 3211 in the pulling element 3210. The protruded elements can also be configured as a linear guide for the pulling element, e.g., the pulling element can be disposed between the two protruded elements, so that when being pulled up, the pulling element can be constrained as to move in a straight line. The protruded elements can include coupling features for coupling with the connecting bars 3288, to limit the movements of the movable jaw.

The jaw support 3253 can be configured to house the clamping mechanism, including the linkage mechanism between a pulling element 3210 and the movable jaw 3230. The jaw support can have a smaller surface area than that of the movable jaw, in order to reduce the weight of the clamping device. Thus, the clamping mechanism can be configured to push on a middle portion of the movable jaw, with the movable jaw including reinforced ridges 3230A for distributing the clamping force to all areas of the movable jaw.

The jaw support can be formed with a shell body, e.g., the inside of the jaw support can be hollow to reduce weight. Reinforced features 3253A together with hollowed portions 3253B of the jaw support can also be used.

The clamping device 3200 can include a pulling element 3210 disposed between the jaw support 3253 and the movable jaw 3230. The pulling element 3210 can include a handle 3210A coupled to rollers 3211 and 3212. Two outer rollers 3211 of the pulling element are configured to roll on slanting surfaces of the protruded elements of the movable jaw. One inner roller 3212 is configured to roll on a shell surface 3255 of the jaw support.

When the pulling element moves away relative to the jaw support, such as being pulled up, the rollers 3211 can roll from a smaller protruded portion 3232A to a higher protruded portion 3232B of the protruded elements 3232. With the roller 3212 rolls on a flat surface of the jaw support, the difference in height of the portions 3232A and 3232B of the protruded portion 3232 can push the moveable jaw away from the jaw support and toward the fixed jaw 3260.

The pulling element 3210 can be shaped to accept the protruded elements 3232 as a linear guide, e.g., the pulling element, when being pulled, follows the direction set by the protruded elements.

When the pulling element moves toward the jaw support, such as being lowered when the jaw support (and the jaws) contacts the ground or the object, the springs 3251 can pull the movable jaw toward the jaw support.

The clamping device 3200 can include an automatic locking mechanism 3280, which is configured to enable or to disable the clamping mechanism or the linkage between the pulling element and the jaw support. The automatic locking mechanism can toggle between an unlocked state in which the pulling element is separatable from the jaw support and a locked state in which the pulling element is not separatable from the jaw support. When the pulling element is separatable from the jaw support, the pulling element can roll on the slanting surfaces 3233, and can move the movable jaw toward the fixed jaw for clamping on an object. When the pulling element is not separatable from the jaw support, the pulling element cannot roll on the slanting surfaces 3233, and thus the movable jaw remains at a fixed distance from the fixed jaw.

Figure 33A:
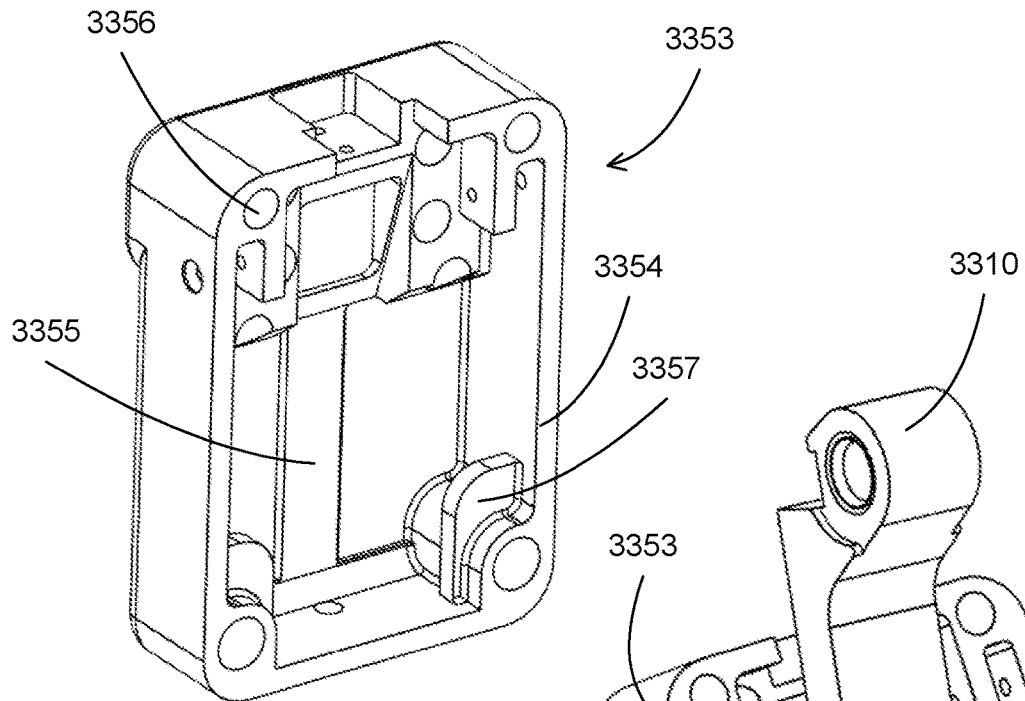
FIGS. 33A-33C illustrate a configuration of the interaction between a pulling element and a jaw support according to some embodiments.
Figure 33C:
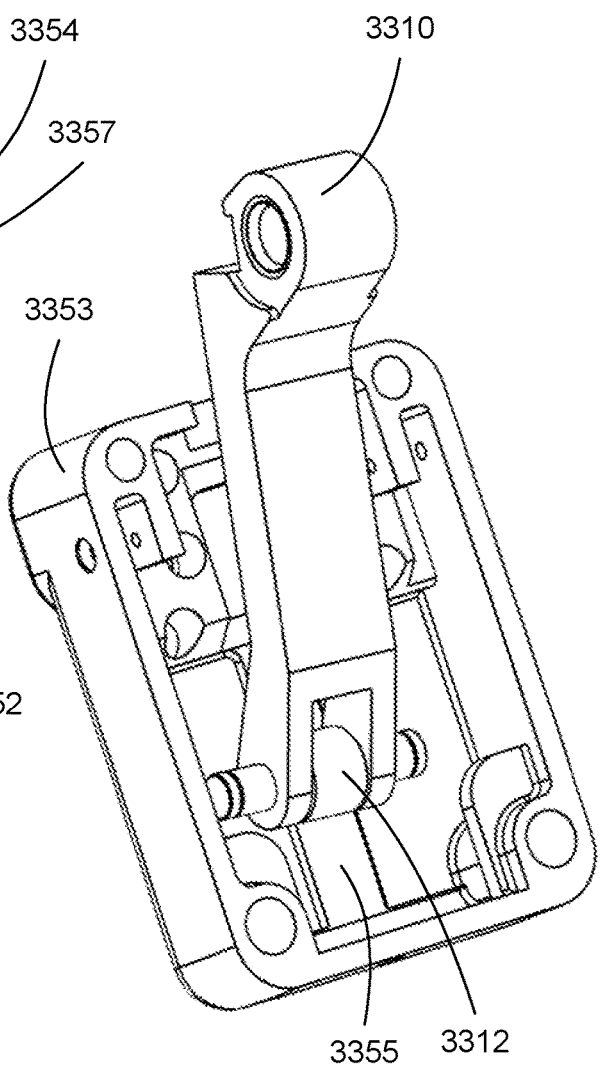
Figure 33B:
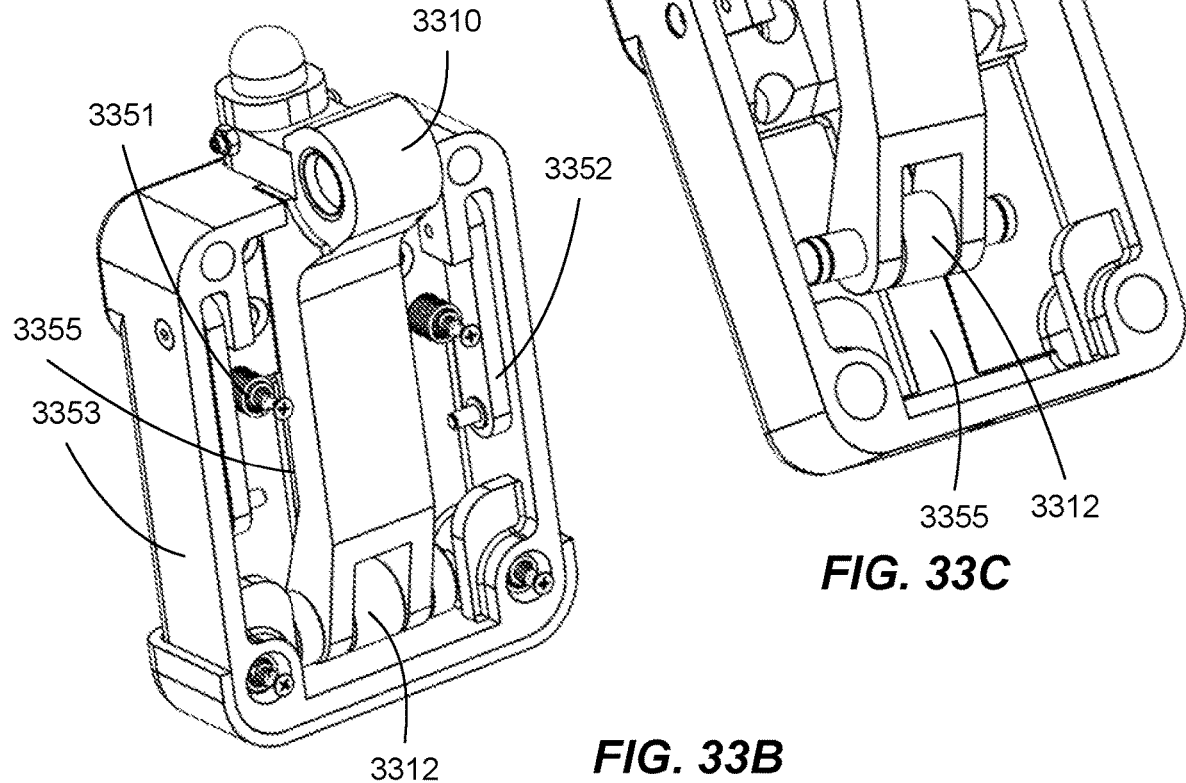

FIGS. 33A-33C illustrate a configuration of the interaction between a pulling element and a jaw support according to some embodiments. In FIG. 33A, a jaw support 3353 can be large to house the pulling element. The jaw support can include a shell body 3354, e.g., the inside of the jaw support can be hollow to reduce the weight of the clamping device. Reinforced portions 3357 in the hollow body of the jaw support can be included in areas requiring strength. Hollow portions 3356 can also be used to reduce weight. A flat surface 3355 can be formed in the shell body 3354 as rolling surface for roller 3312 of the pulling element 3310.

In FIG. 33B, a pulling element 3310 is coupled with a jaw support 3353. Roller 3312 is positioned to be rolled on the flat surface 3355 when the pulling element is pulled up relative to the jaw support. Springs 3351 and connection bars 3388 can be used to couple the jaw support with the movable jaw.

In FIG. 33C, the pulling element 3310 is shown with the roller 3312 rolling on the flat surface 3355. When the pulling element moves from one end of the jaw support to an opposite end, the roller 3312 can roll on the flat surface 3355.

Figure 34A:
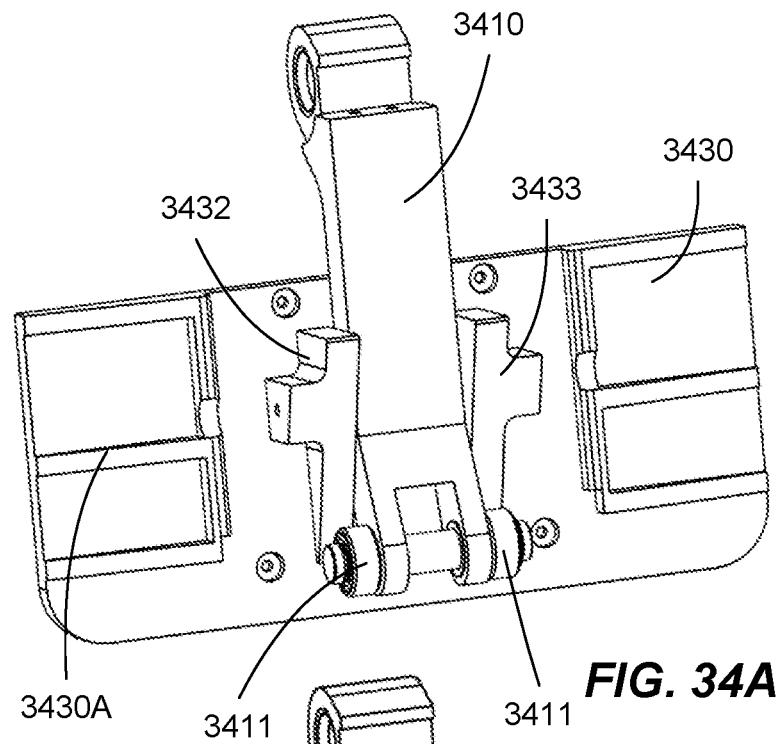
FIGS. 34A-34B illustrate a configuration of the interaction between a pulling element and a movable jaw according to some embodiments.
Figure 34B:
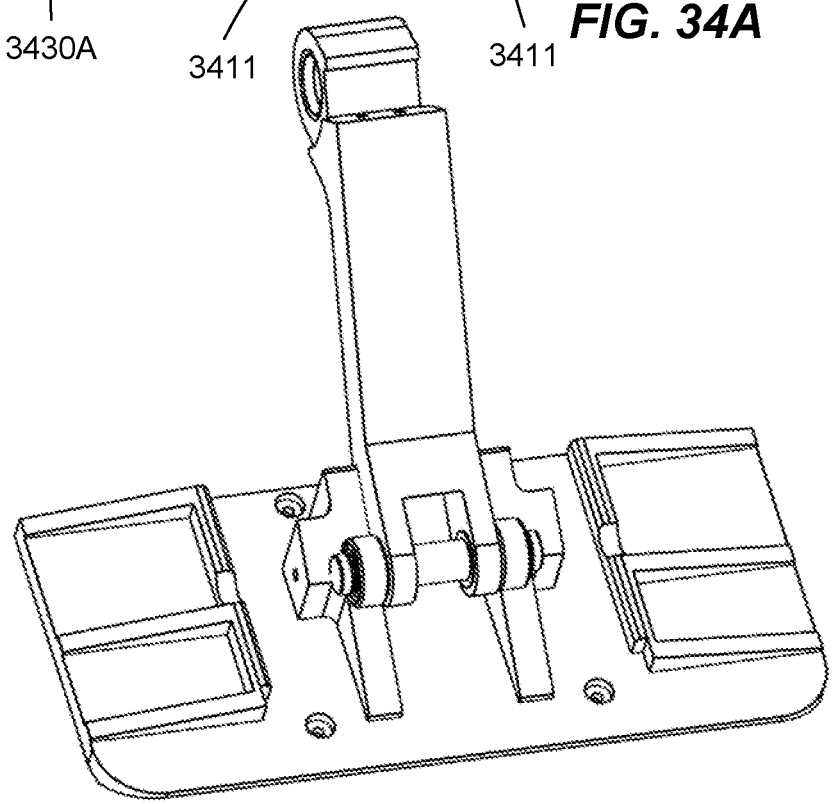

FIGS. 34A-34B illustrate a configuration of the interaction between a pulling element and a movable jaw according to some embodiments. A movable jaw 3430 can have a large surface area for clamping on an object. The large movable jaw can be thin with reinforced ridges 3430A to reduce weight. The movable jaw can have protruded elements 3432 having slanting surface 3433. The pulling element 3410 can have rollers 3411 configured to roll on the slanting surfaces 3433. The protruded elements 3432 can be configured to guide the pulling element 3410, e.g., constraining the pulling element so that the pulling element moves in a predetermined direction when the rollers 3411 roll on the slanting surface 3433.

Figure 35A:
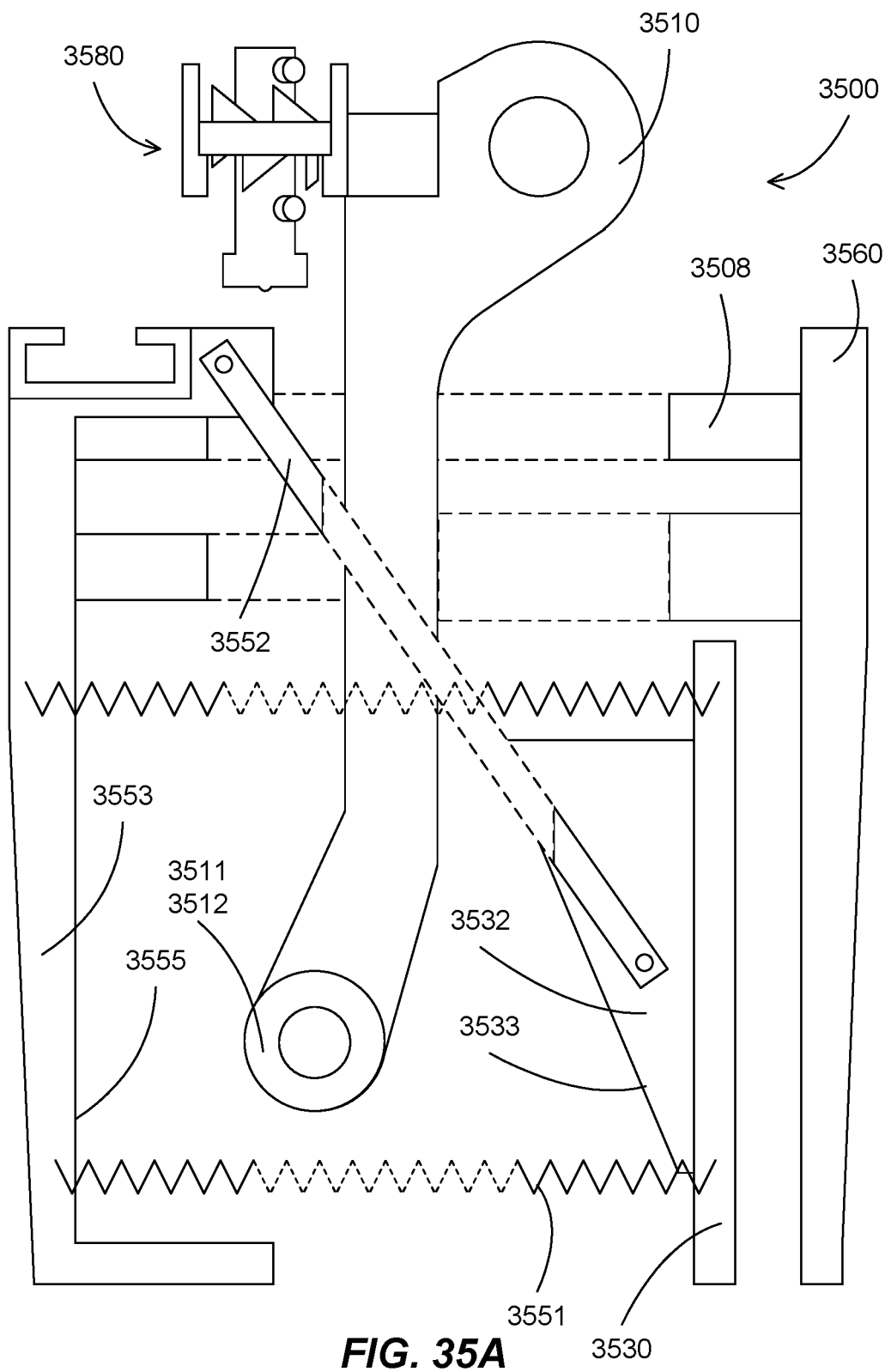
FIGS. 35A-35B illustrate cross section views of a clamping device according to some embodiments.
Figure 35B:
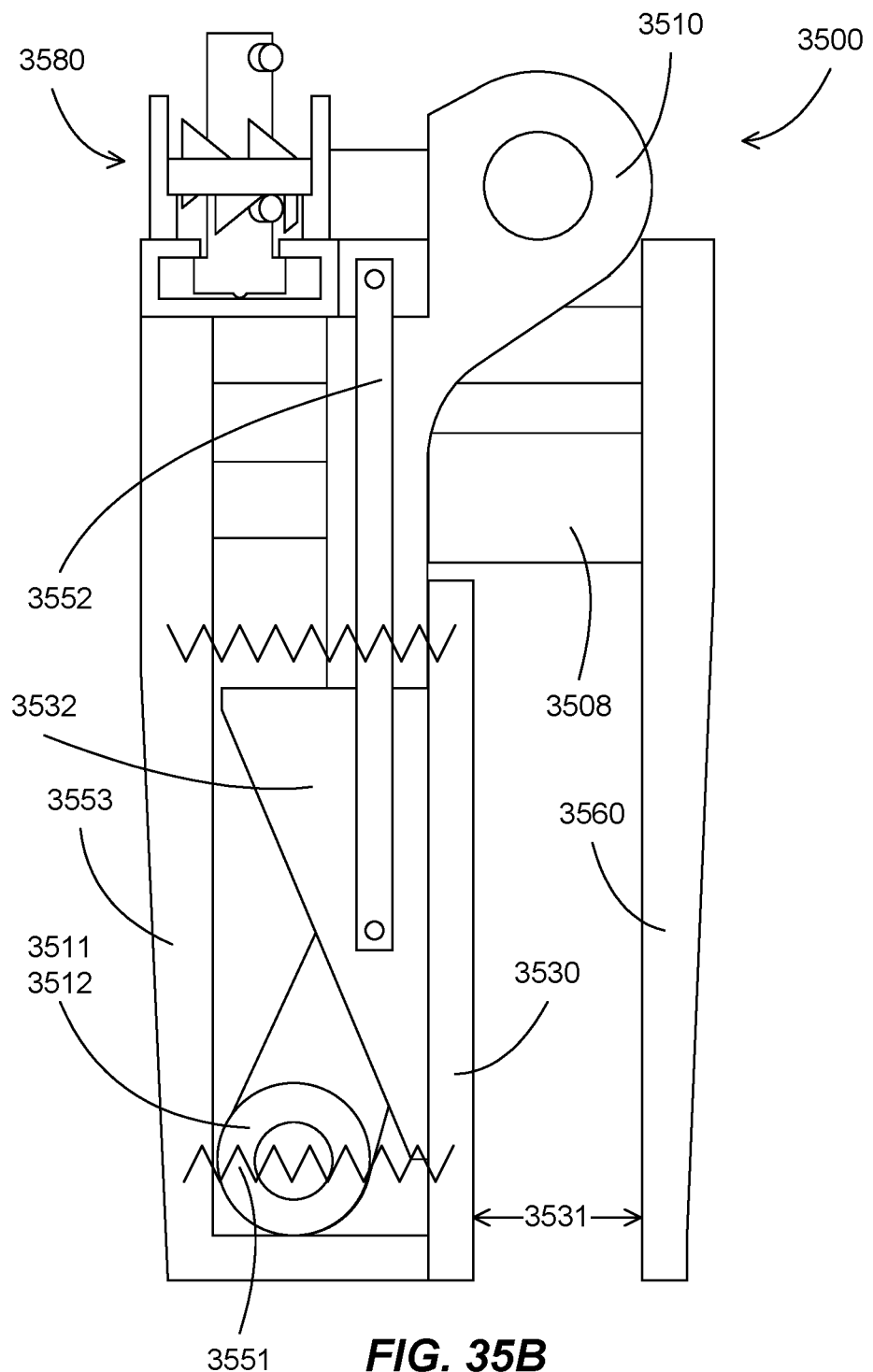

FIGS. 35A-35B illustrate cross section views of a clamping device according to some embodiments. FIG. 35A shows an exploded cross section view. And FIG. 35B shows a cross section view. The clamping device 3500 can include a fixed jaw 3560 fixedly coupled to a jaw support 3553 of a clamping mechanism (or linkage mechanism for the clamping device) 3550 through one or more clamp bars 3508. The fixed jaw 3560 can have a small portion for coupling with the clamp bars, and a larger portion for clamping on an object. The multiple clamp bars can provide strength to the clamping device with reduced weight. The jaw support 3553 can have a small portion, together with a shell body for light weight, while providing strength for the clamping mechanism.

The clamping device 3500 can include a movable jaw 3530 disposed opposite the fixed jaw 3560. The movable jaw 3530 can have an area having the same size as the large portion of the fixed jaw 3560, e.g., the jaw movable 3530 and the large portion of the fixed jaw 3560 are configured for clamping on the object. The movable jaw 3530 can include a flat plate for reducing weight, together with reinforced ridges for strength.

The movable jaw 3530 can be movably coupled to the jaw support 3553. For example, the movable jaw 3530 can be coupled to the jaw support 3553 through a set of springs 3551. The springs can be biased to pull the movable jaw 3530 toward the jaw support 3553.

The movable jaw 3530 can be rotatably coupled to the jaw support 3553 through a set of connecting bars 3588. The connecting bars 3588 can be rotatably coupled to the jaw support at a top portion, and also rotatably coupled to the movable jaw at a lower portion. Thus, the movable jaw 3530 can swing away from the jaw support when the pulling element 3510 pushing on the movable jaw, and can swing back to the jaw support when the springs pulling the movable jaw back to the jaw support.

The movable jaw can include protruded elements 3532. The protrude elements 3532 can include slanting surfaces 3533 for rollers 3511 in the pulling element 3510. The protruded elements can include coupling features for coupling with the connecting bars 3588, to limit the movements of the movable jaw.

The jaw support 3553 can be configured to house the clamping mechanism, including the linkage mechanism between a pulling element 3510 and the movable jaw 3530. The jaw support can have a smaller surface area than that of the movable jaw, in order to reduce the weight of the clamping device. Thus, the clamping mechanism can be configured to push on a middle portion of the movable jaw, with the movable jaw including reinforced ridges for distributing the clamping force to all areas of the movable jaw.

The jaw support can be formed with a shell body, e.g., the inside of the jaw support can be hollow to reduce weight. Reinforced features together with hollowed portions of the jaw support can also be used.

The clamping device 3500 can include a pulling element 3510 disposed between the jaw support 3553 and the movable jaw 3530. The pulling element 3510 can include a handle 3510A coupled to rollers 3511 and 3512. Two outer rollers 3511 are configured to roll on slanting surfaces of the protruded elements of the movable jaw. One inner roller 3512 is configured to roll on a shell surface of the jaw support.

When the pulling element moves away relative to the jaw support, such as being pulled up, the rollers 3511 can roll from a smaller protruded portion to a higher protruded portion of the protruded elements 3532. With the roller 3512 rolls on a flat surface 3555 of the jaw support, the difference in height of the portions of the protruded portion 3532 can push the moveable jaw away from the jaw support and toward the fixed jaw 3560.

When the pulling element moves toward the jaw support, such as being lowered when the jaw support (and the jaws) contacts the ground or the object, the springs 3551 can pull the movable jaw toward the jaw support.

The clamping device 3500 can include an automatic locking mechanism 3580, which is configured to enable or to disable the clamping mechanism or the linkage between the pulling element and the jaw support. The automatic locking mechanism can toggle between an unlocked state in which the pulling element is separatable from the jaw support and a locked state in which the pulling element is not separatable from the jaw support. When the pulling element is separatable from the jaw support, the pulling element can roll on the slanting surfaces 3533, and can move the movable jaw toward the fixed jaw for clamping on an object. When the pulling element is not separatable from the jaw support, the pulling element cannot roll on the slanting surfaces 3533, and thus the movable jaw remains at a fixed distance from the fixed jaw.

Figure 36A:
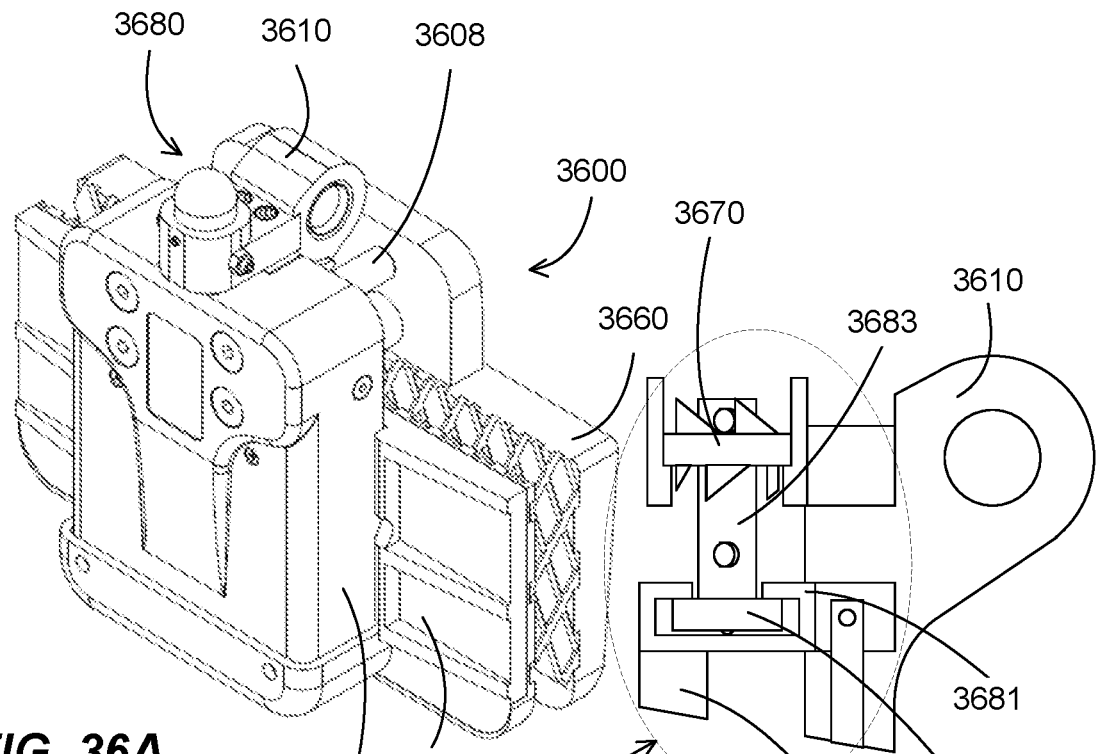
FIGS. 36A-36B illustrate a clamping device according to some embodiments.
Figure 36B:
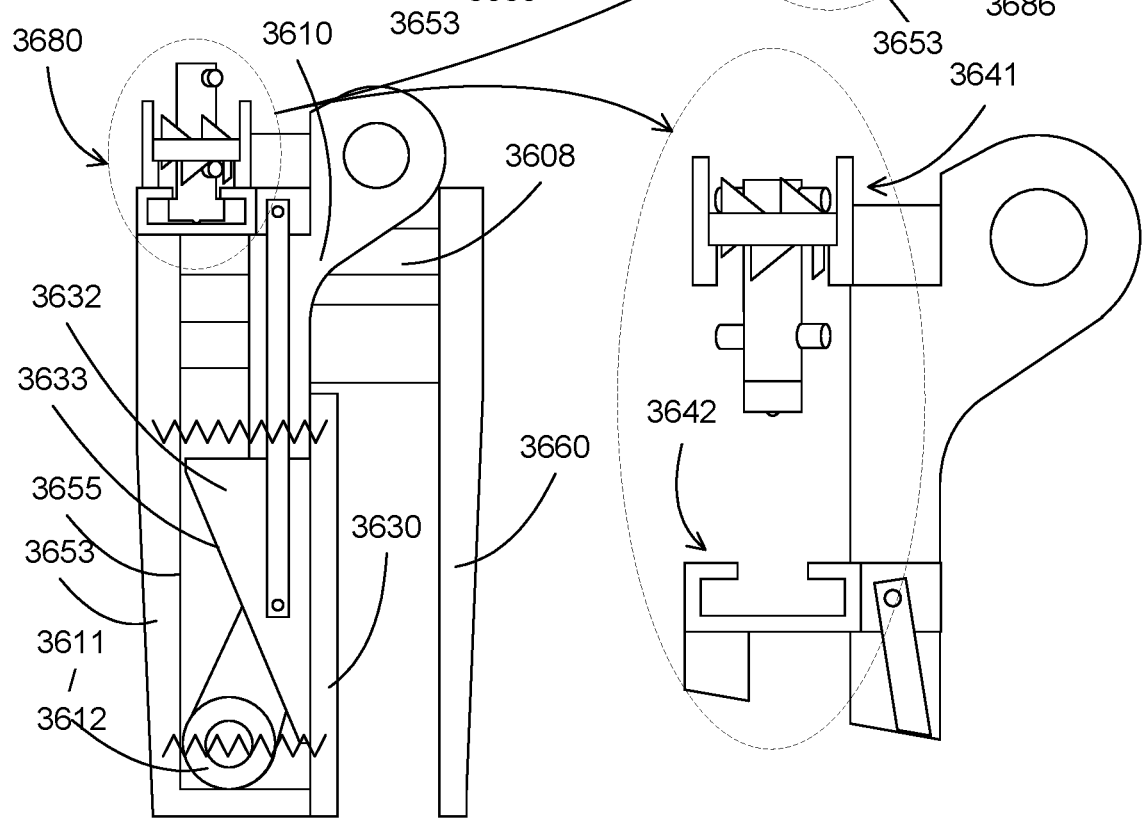

FIGS. 36A-36B illustrate a clamping device according to some embodiments. The clamping device 3600 can use a slanting interface mechanism, e.g., a pulling element having a roller for rolling on a slanting surface of a jaw support. For example, the pulling element can be disposed between a jaw and a jaw support. When the pulling element rolls of the slanting surface of the jaw support, the jaw can move away from or toward the jaw support.

The clamping device 3600 can be configured for lifting large fragile objects. The clamping device can include a first jaw 3660 coupled to a clamp bar 3608. The clamping device can include a second jaw assembly, which can be movably and lockably coupled to the clamp bar. The second jaw assembly can include a second jaw 3630 disposed opposite the first jaw. The second jaw assembly can include a jaw support 3653, which can slide along the clamp bar for movably coupled to the clamp bar. The second jaw assembly can be lockable to the clamp bar. The second jaw assembly can include stretchable elements, such as springs, which can be coupled to the second jaw and the jaw support, for pulling the second jaw toward the jaw support. The stretchable elements can allow the second jaw to move away from the jaw support, for a limited distance, such as a distance equal or smaller than a distance between the discrete locking locations of the discrete locking mechanism.

The clamping device can include a pulling element 3610, which can be configured to be pulled on for lifting the clamped object. The pulling element can freely move in an up direction. The pulling element can be configured to exert a clamping force on the object when being pulled, for example, by rollers 3612 rolling on slanting surface 3633 of the protruded portion 3632 of the movable jaw 3630, and by roller 3611 rolling on flat surface 3655 of the jaw support 3652.

A locking mechanism 3680 can be included, for hand-free actuating the slanting interface mechanism. The locking mechanism can allow or prevent the engagement of the linkage mechanism between the pulling element and the jaw. When the locking mechanism is activated or locked, the linkage mechanism is prevented or disable, meaning pulling on the pulling element does not move the pulling element. When the locking mechanism is deactivated or unlocked, the linkage mechanism is allowed or enable, meaning pulling on the pulling element move the pulling element for moving the jaw toward the other jaw.

The locking mechanism can include a top part 3641, which can be locked to or release from the bottom part 3642. The top part 3641 can be secured to the pulling element 3610. The bottom part 3642 can be secured to the jaw support 3652. The top part can include a movable rod having an elongated head, which can be locked to or released from a mated hook in the bottom part.

The automatic locking mechanism can be coupled to different portions of the clamping device, such as another automatic locking mechanism coupled to the rollers 3611 or 3612 and the jaw support body 3653.

The top part 3641 can include a rod 3683 having an elongated head 3686. The top part can include an annular element 3670 having slanting surfaces on both sides of the annular element, which can be mated with protruded pins on the rod. The annular element and the protruded pins can be configured so that when the rod is pushed into and released out of the annular element, the rod can rotate an angle such as 90 degrees, to toggle between longer side and shorter side, e.g., toggle between a lock status and an unlock status.

When the locking mechanism is engaged, meaning the top part is locked into the bottom part, the pulling element is fixedly coupled to the body of the clamping device. Thus the pulling element cannot move to activate the linkage mechanism, and the jaws are stationary when pulling on or lowering the pulling element.

When the locking mechanism is disengaged, meaning the top part is unlocked from the bottom part, the pulling element is separatable with respect to the body of the clamping device. Thus the pulling element can move to activate the linkage mechanism, and the jaws can move toward or away from each other when pulling on or lowering the pulling element, respectively.

FIGS. 37A-37F illustrate another clamping device configuration according to some embodiments. The clamping device 3700 can use a slanting interface mechanism, e.g., a pulling element 3710 having a roller for rolling on a slanting surface of a jaw support.

The clamping device can include a first jaw 3760 coupled to clamp bars 3708. The clamping device can include a second jaw assembly, which can be movably and lockably coupled to the clamp bar. The second jaw assembly can include a second jaw 3730 disposed opposite the first jaw. The second jaw assembly can include a jaw support 3753, which can slide along the clamp bars for movably coupled to the clamp bar. The second jaw 3730 can be movable relative to the jaw support 3753, such as a function of the pulling element positions.

A locking mechanism 3780 can be included, for hand-free actuating the slanting interface mechanism.

The locking mechanism can include a top part, which can be locked to or release from the bottom part. The bottom part can include a hook receptacle 3781, which can be secured to a stationary portion of the clamping device, such as to the body of the clamping device, for example, to the jaw support 3753.

The top part can include a shell 3785, which can be secured to a movable portion of clamping device, such as to the pulling element 3710. An annular element 3770 can be disposed inside the shell 3785, and can be secured to the shell, for example, by a set of nuts and bolts 3770A. The shell 3785 can have a support 3787A, such as a step, to support the annular element 3770, e.g., against a downward force acting on the annular element. The annular element 3770 can include teeth 3772 and 3777, disposed on two opposite sides. A movable rod 3783 with protruded pins can be disposed inside the annular element. The rod 3783 can have an elongated head 3786 for releasably mating with the hook receptacle 3781.

FIG. 38 illustrates a configuration for a clamping device according to some embodiments. The clamping device can be configured to handle light weight, large and fragile panels. The clamping device can have a movable jaw facing a fixed jaw for clamping on the panels with enlarged jaw surface areas for reducing the pressure exerted on the panels, thus allowing the handling of fragile panels. The fixed jaw can be fixed to a body of the clamping device, with the body including a set of clamp bars coupled to a jaw support for supporting the movable jaw.

The clamping device can have a small clamping mechanism for light weight, thus providing ease of handling for the workers. The small clamping mechanism can include a small pulling element, having rollers on two sides of the pulling element to roll on slanting surfaces of two protruded portions on the movable jaw. The protruded portions can be in a middle portion of the movable jaw. Thus the rollers, when rolling on the protruded portions, can push on a small area of the large clamp area movable jaw. The small clamping mechanism can include a set of springs disposed at or near the protruded portions for pulling the movable jaw back toward the jaw support.

The clamping device can be configured to provide multiple purpose components, such as the set of clamp bars and the protruded portions can also function as a linear guide for the pulling element. The clamps bars can have enlarged portions to further enclose the pulling element, to limit the pulling element from moving in unwanted directions, such as in directions toward or away from the clamp panel.

The clamping device can include a small and hollow jaw support. The jaw support can be configured to house the pulling element and the set of springs. Thus, the jaw support can be small, e.g., just large enough for the assembled pulling element, e.g., the pulling element having the attached rollers. The jaw support can be hollow, e.g., having a thin shell configuration to reduce weight. The thin shell configuration can provide a roller surface at the back of the jaw support for the pulling element to roll against. The hollow jaw support can have reinforced features and additional hollow portions to minimize the weight while providing adequate strength for supporting the clamping mechanism.

The clamping device can include other features to be light weight, such as having a small maximum separation between the movable jaw and the fixed jaw, thin rods for the clamp bars, and thin plate for the jaws, together with reinforced ridge for strength.

The clamping device can include an autolock feature, which can be operated by a worker away from the clamping device, such as at a control area of a hoist, which is coupled to the clamping device for lifting and for moving the clamping device.

The autolock feature can include a receptacle coupled to the jaw support. The autolock mechanism can include a hook coupled to the pulling element. The hook can be a rotatable rod, having a hook end that can be hooked with the receptacle in a hooked rotation state. The hook end can be configured to be releasable from the receptacle in an unhooked rotation state.

The rotatable rod can include one or more pins interfacing with rotatable slanting surfaces. The interfaces can be configured so that when the rod moves in one direction, such as upward, the pins contact the rotatable slanting surface to rotate the rod. When the rod moves in an opposite direction, such as downward, the pins contact the rotatable slanting surface to further rotate the rod. The combination of the rotation of the rod causes the rod to toggle between the hooked and unhooked rotation angle. Thus, by moving the clamping device up and down, the locking mechanism can toggle between the states of engaged and disengaged, which can make the jaws of the clamping device stationary or moving together to clamp on the panel.

Operation 3800 forms a clamping device. The clamping device can include a first jaw having a first clamping area having a first width. A portion of the first jaw can include the clamping area, which is the area on which a panel is clamped up on. The width of the clamping area is the direction parallel to the ground, when the clamp device is suspended from a hoist and is ready for picking up, transferring, and releasing the panels. The width of the clamping area is the direction perpendicular to the thickness of the panel, and also perpendicular to the gravitational force.

The clamping device can include a set of clamp bars. For example, the set of clamp bars can include 4 bars disposed in a rectangular shape. The bars can be round bars.

The clamping device can include a jaw support having a second width. The width of the jaw support is in the same direction as the width of the clamping area of the first jaw. The first jaw, the jaw support, and the set of clamp bars are fixedly coupled together to form a body of the clamping device. The first jaw and the jaw support are coupled to the set of clamp bars at both ends of the set of clamp bars. The set of clamp bars is coupled to the first jaw at an area outside the first clamping area. The first jaw can has two portions. A first portion can be the portion having the clamping area. The second portion can be the area that the set of clamp bars is coupled to. The second portion can be smaller than the first portion.

The width of the clamping area is larger than the width of the jaw support, such as at least 2× larger, or between 2× and 4× larger. The larger width is configured to reduce pressure on the panel. The smaller width is configured to make a compact, lightweight, and small clamping device.

In some embodiments, the jaw support can have a shell body having a flat surface portion along a length of the jaw support. The shell body can reduce the weight of the jaw support, which can make the clamping device lighter, which can make the clamping device easier to be handled by a worker. The flat surface portion can be configured as a surface for a pulling element to travel, such as for a roller of the pulling element to roll on. The flat surface can be formed on the inner thin shell portion, thus can maintain the light weight characteristic of the jaw support.

The clamping device can include a second jaw having a second clamping area disposed between the jaw support and the first jaw. The second jaw is disposed facing the first jaw, so that the first and second jaw can clamp on the panel. The second jaw is a movable jaw, e.g., the second jaw can move toward the first jaw for clamping on the panel, and can move away from the first jaw for releasing the panel. The movement of the second jaw can be relative to the jaw support, e.g., a pulling element can push on the jaw support to move the second jaw toward the first jaw, and a set of springs can be coupled between the jaw support and the second jaw to pull the second jaw away from the first jaw.

In some embodiments, the second clamping area can be similar to the first clamping area, such as having the same area within the tolerance of the fabrication process. Since the first and second jaws are configured to clamp on the panel with the clamping areas, the optimal configuration is the two clamping areas at the two jaws are the same. However, the clamping device can still operate with one clamping area larger than the other.

The second jaw has two protruded portions each having a slanting surface. The protruded portion can be in the direction of gravity, and can serve as a guide for the pulling element, since the pulling element is configured to move in the same direction. The protruded portions can have a thickness wide enough to accommodate rollers of the pulling element, e.g., the rollers can roll on the top surfaces of the protruded portions. The protruded portions can have a top surface slanted, such as thicker near the clamp bars and thinner away from the clamp bars at the bottom of the jaw support. That way, a same thickness pulling element can push the second jaw away from the jaw support when the pulling element rolls on the slanting surfaces.

The second jaw is coupled to the jaw support through a set of springs. The set of springs is biased to pull the second jaw toward the jaw support. In some embodiments, the springs can be disposed surrounding or inside two slidable tubes. A slidable tube can be coupled at one end to the jaw support. Another slidable tube can be coupled at an opposite end to the second jaw. The two slidable tubes can fit inside each other, so that the length of the two tubes can be extended or shortened. The slidable tubes can assist in maintaining the springs, e.g., preventing the springs from sagging, which can lower the second jaw in positions not matching with the first jaw.

In some embodiments, two rotatable connecting bars can be used to couple the jaw support to the second jaw. The connecting bars can prevent the second jaw from moving too far away from the position that matches with the first jaw.

The clamping device can include a pulling element disposed between the jaw support and the second jaw. The pulling element is configured to move the second jaw against the jaw support. For example, the pulling element can be pull up by connecting to a hoist. When being pulled up, the pulling element can push on the second jaw so that the second jaw moves away from the jaw support. The pulling element can have rollers for ease of moving up and down.

The pulling element can include a first roller for rolling against the jaw support. For example, the pulling element can have a first set of rollers, which can include a center roller, for rolling on the flat surface portion of the shell jaw support.

The pulling element can include two second rollers on two sides of the first roller for rolling on the slanting surfaces of the protruded portions. For example, the pulling element can have a second set of rollers, which can include rollers on both sides of the center roller, for rolling on the slanting top surfaces of the protruded portions of the second jaw. By rolling on the slanting surfaces, the pulling element can push the second jaw away from the jaw support and toward the first jaw when the pulling element is pulled up. The slanting surfaces are configured so that when the pulling element moves in a direction from the first and second rollers toward the set of clamp bars, the second jaw moves toward the first jaw.

In some embodiments, the pulling element is disposed between the two protruded portions for restricting side movements of the pulling element. The pulling element is also disposed between the set of clamp bars for restricting the side movements of the pulling element. In some embodiments, the clamp bars can have enlarged portions surrounding the pulling element to restrict movements of the pulling element in directions parallel to the clamp bars. Thus, the pulling element can be constrained to move only up and down.

The clamping device can include a locking mechanism. The locking mechanism is configured so that the locking mechanism is toggled between locked and unlocked configurations when an operator moving the clamping device down and up. The locking mechanism can be considered as an automatic locking mechanism, since the mechanism can be activated and deactivated remotely, such as by moving the clamping device down and up. For example, a hoist can be coupled to the pulling element of the clamping device. A worker can operate the hoist, away from the clamping device. By moving the hoist downward so that the clamping device encounters resistance from the ground, and then moving the hoist upward to lift the clamping device up, the locking mechanism can be toggled between a locked configuration and an unlock configuration. In the unlocked configuration of the locking mechanism, the pulling element is separatable from the jaw support for moving the movable jaw. The separation between the pulling element and the jaw support can be a separation distance larger than a few millimeters, such as larger than 5 mm, larger than 10 mm, larger than 15 mm, larger than 20 mm, or larger than 30 mm. The pulling element and the jaw support are components of the clamping device, thus the pulling element and the jaw support can be coupled together, so that the separation between the pulling element and the jaw support can be a separation distance smaller than a meter, such as smaller than 0.5 m, smaller than 0.4 m, smaller than 0.3 m, or smaller than 0.2 m.

In the locked configuration of the locking mechanism, the pulling element is not separatable from the jaw support for keeping the movable jaw from moving to clamp on a panel or to contact the first jaw. There can be internal movements within the locking mechanism, so the pulling element can move a little relative to the jaw support. The pulling element and the jaw support are coupled together though the locking mechanism, subjected to the internal movements of the components of the locking mechanism. Thus, in the locked configuration, the pulling element is coupled to the jaw support, with a maximum separation distance determined by the internal movements of the locking mechanism. The maximum separation distance can be smaller than 50 mm, smaller than 45 mm, smaller than 40 mm, smaller than 35 mm, smaller than 30 mm, smaller than 25 mm, smaller than 20 mm, or smaller than 15 mm.

The locking mechanism can include a first portion coupled to the pulling element, and a second portion coupled to the jaw support. The second portion comprises a receptacle. The first portion comprises a rod having a hook end. The hook end and the receptacle are configured to be rotatably toggled between the unlocked configuration in which the hook end is separable from the receptacle and the locked configuration in which the hook end is not separatable from the receptacle.

The first portion can also include an annular element having slanting surfaces, such as teeth, above and below the annular element. The rod can have pins which are configured to rest on the slanting surfaces. The rod can move inside the annular element, and can be rotated when the pins slide along the slanting surfaces. The sliding of the pins can rotate the rod, which can toggle the mating of the rod end with the receptacle.

FIGS. 39A-39F illustrate a clamping operation of a clamping device according to some embodiments. In FIG. 39A, the autolock mechanism 3980 is in the locked state 3980A. The clamping device can be suspended by the hoist, for example, by coupling to the pulling element. The rod can go down, by gravity, so that the top pin can rest on the valley of the top rotating slanting surface. In the locked state, the hook end of the rod is latched to the receptacle. The pulling element 3910 is not separatable from the jaw support 3960, e.g., the pulling element and the jaw support can move as a unit. Thus, the clamping device can move around with the jaws separated.

As shown, the clamping device is at the locked state, with the rollers of the pulling element can contact the slanting surfaces of the protruded portions of the movable jaw. Alternatively, the rollers can be further up or further down, which can determine the separation of the jaws. The rollers can be separated 3913A from the bottom of the jaw support, so that the pulling element can move down, e.g., for a maximum distance 3913A. This separation distance 3913A between the bottom of the rollers and the jaw support is needed for the pulling element to be able to move relative to the rod.

The clamping device can be transferred to a top of a panel 3903. With the jaws separated, the clamping device can be positioned above the panel, so that the panel is located in the space between the jaws. The clamping device can be lowered.

In FIG. 39B, the clamping device is lowered so that the clamping device contacts the panel 3903, e.g., the panel is positioned between the jaws and contacting the clamp bars of the clamping device. The rod can be pushed up until the bottom pin contacts the bottom slanting surface. The rollers are lowered to be separated from the protruded portions.

The rod has contacted the receptacle, so the rod cannot move down further. Since the pulling element goes down relative to the rod, the rod can be seen to go up relative to the pulling element. The separation distance 3913B between the rollers and the jaw support is smaller than the maximum separation distance 3913A. The clamping device can be further lowered.

In FIG. 39C, the clamping device is further lowered so that the bottom pin moves along the bottom slanting surface to rest at a valley area. The movement of the pin can cause the rod to rotate an angle, to be in an intermediate locked state 3980B. The angle is not large enough to cause the hook end of the rod to be released from the receptacle, thus the rod is still hooked to the receptacle. The rollers are further lowered to have a small separation 3913C (or zero separation) with the protruded portions. The clamping device can now be raised.

In FIG. 39D, the clamping device is raised up until the top pin contacts the top slanting surface. The rollers are raised up to a separation distance 3913D (which is between 3913C and 3913A) from the protruded portions. The clamping device can be further raise up.

In FIG. 39E, the clamping device is further raised up so that the top pin moves along the top slanting surface to rest at a valley area. The movement of the pin can cause the rod to further rotate an angle, to be in an unlocked state 3980C. In the unlocked state, the hook end of the rod is releasable from the receptacle, thus the rod can move relative to the receptacle. The rollers are further raised up to the separation distance 3913A from the protruded portions. The clamping device can be further raise up.

In FIG. 39F, the clamping device is raised up. The rod can move relative to the receptacle, and thus, the pulling element can move relative to the jaw support. The rollers can roll on the protruded portions to move the movable clamp to clamp on the panel. The separation distance 3913F can be larger than 3913A. The clamping device can be further raise up and then move to a destination.

FIGS. 40A-40F illustrate a release operation of a clamping device according to some embodiments. In FIG. 40A, the autolock mechanism 4080 is in the unlocked state 4080C. The clamping device can be suspended by the hoist, for example, by coupling to the pulling element. The rod can go down, by gravity, but since the rod is separatable from the receptacle, the rod can be suspended with the top pin rested at a valley of the top slanting surface.

In the unlocked state, the hook end of the rod is separate from the receptacle. The pulling element is also separatable from the jaw support, e.g., the rollers of the pulling element can roll on the slanting surfaces of the protruded portions and on the flat surface of the jaw support. Thus, the jaws of the clamping device can move toward each other to clamp on the panel 4003. As shown, the rollers of the pulling element can be at a top portion of the slanting surfaces of the protruded portions of the movable jaw, at a separation distance 4013F.

The clamping device with the clamped panel can be transferred to a destination. After reaching the destination, the clamping device can be lowered until the panel contacts the ground. After the panel contacts the ground, the clamping device is continued lowered. The pulling element can roll on the slanting surfaces and on the flat surface, to move the movable jaw away from the panel. The clamping device is lowered until the movable jaw reaches the separation limit, e.g., when the rollers no longer contact the slanting surface. The clamping device can be configured so that at this position, the rod starts contacting the receptacle. Since the rod is in a separable configuration with the receptacle, e.g., the hook end of the rod is not in a hooked configuration with the receptacle, the rod can enter the receptacle.

In FIG. 40B, the clamping device is further lowered so that the rod contacts the receptacle. After contacting, the rod can be pushed up until the bottom pin contacts the bottom slanting surface. The rollers are lowered to be separated from the protruded portions. The separation distance 4013B between the rollers and the jaw support is smaller than the maximum separation distance 4013A. The clamping device can be further lowered.

In FIG. 40C, the clamping device is further lowered so that the bottom pin moves along the bottom slanting surface to rest at a valley area. The movement of the pin can cause the rod to rotate an angle, to be in an intermediate locked state 4080B. The angle is not large enough to cause the hook end of the rod to be completely mated to the receptacle, but the rod is already hooked to the receptacle. The rollers are further lowered to have a small separation 4013C (or zero separation) with the protruded portions. The clamping device can now be raised.

In FIG. 40D, the clamping device is raised up until the top pin contacts the top slanting surface. The rollers are raised up to a separation distance 4013D (which is between 4013C and 4013A) from the protruded portions. The clamping device can be further raise up.

In FIG. 40E, the clamping device is further raised up so that the top pin moves along the top slanting surface to rest at a valley area. The movement of the pin can cause the rod to further rotate an angle, to be in a locked state 4080A. In the locked state, the hook end of the rod is hooked to the receptacle, thus the rod is not separatable from the receptacle. The rollers are further raised up to the separation distance 4013A from the protruded portions. The clamping device can be further raise up.

In FIG. 40F, the clamping device is raised up. The rod and the receptacle are coupled together, and thus, the pulling element is not separatable from the jaw support. The rollers stay at the previous separation, e.g., the separation distance 4013A. The movable jaw is thus fixedly separated from the fixed jaw. The clamping device can be further raise up and then move to pick up a new panel.

With the jaws separated, the clamping device can be lowered on a new panel, e.g., placing the new panel between the jaws. The autolock mechanism can be toggled, and the jaws can be clamped on the new panel for transferring the new panel to a destination.

In some embodiments, the jaw support, the rollers of the pulling element, and the slanting surfaces of the protruded portions of the movable jaw are configured so that there is a backlash, e.g., a maximum separation distance between the bottom of the rollers and the top surface of the jaw support. The pulling element can move within the maximum separation distance without moving the movable jaw. The maximum separation distance can be at least the vertical distance between the two pins on the rod, minus the vertical distance between the two valleys of the top and bottom slanting surfaces. The maximum distance can at least accommodate the movement of the rod, so that the top pin moves from the valley of the top slanting surface until the bottom pin reaches the valley of the bottom slanting surface.

In some embodiments, the present invention discloses a clamping device for large and fragile objects, together with an automatic locking mechanism. A clamping device can include a first body portion and a second body portion, with a first jaw coupled to the first body portion and a second jaw coupled to the second body portion. For example, the first body portion can include a set of clamp bars, such as one or more clamp bars. The second body portion can include a jaw support, with the first and second portions integrated or assembled together.

A first jaw can be coupled to the first body portion, such as fixedly coupled to the first portion. A second jaw can be movably coupled to the second body portion, e.g., the second jaw can move toward the first jaw, relative to the second portion, for clamping on an object. The second jaw can move away from the first jaw, relative to the second portion, for releasing an object that has been clamped between the first and second jaws.

A pulling element can be disposed between the second jaw and the second body portion, e.g., the jaw support. The pulling element can be configured to contact the second jaw and the second body portion. A contacting surface with the pulling element, such as the contacting surface between the pulling element and the second body portion, or the contacting surface between the pulling element and the second jaw, can include a slanting surface. For example, the pulling element can have one or more rollers for rolling on the surfaces of the second jaw and the second portion. The second jaw can have a slanting surface for the rollers to roll on. Alternatively, the second body portion can have a slanting surface for the rollers to roll on.

The slanting surface can be configured so that, when a force is applied to the pulling element in a direction comprising a vertical direction, a second force is generated pushing the second jaw in a direction comprising a direction from the second jaw to the first jaw.

The slanting surface can be configured so that, when the pulling element moves in a direction toward the first body portion, e.g., toward the set of clamp bars, the second jaw moves toward the first jaw.

The slanting surface can be configured so that, in one direction, a hollow space between the second jaw and the second body portion (e.g., the jaw support) is smaller nearer the first body portion (e.g., nearer the set of clamp bars), and larger away from the first body portion.

Thus, when the pulling element rolls of the slanting surface, the second jaw can move away from or toward the second body portion, e.g., toward or away from, respectively, the first body portion or the first jaw.

In some embodiments, the first jaw and the second jaw can have comparable dimensions for clamping surfaces for clamping on an object. The comparable dimension can be within fabrication tolerance, such as having less than 1 or 2% difference. The comparable dimension can be based on the clamping requirements, such as having less than 20%, less than 15%, less than 10%, or less than 5% difference.

The first and second jaws can be larger than the first and second body portion of the clamping device. For example, the second body portion can be disposed between two edges of the second jaw with the two edges of the second jaw extended outside the second body portion. The second body portion can be coupled to the second jaw at a portion between two edges of the second jaw with the two edges of the second jaw extended outside the second body portion. The first and second jaws can have a comparable first width. The second body portion can have a second width smaller than the first width. For example, the first width can be between 1× and 4×, between 1× and 3×, or between 1× and 2×, of the second width. The first jaw can be coupled to the first body portion outside the clamping area of the first jaw.

In some embodiments, the second jaw can be configured to accept a force from the second body portion. The second jaw can be configured to somewhat evenly spread the force from the second body portion to the whole clamping area of the second jaw support, e.g., to the extended areas of the second jaw outside the second body portion. For example, the second jaw can include reinforced ridges at the extended areas outside the second body portion. The extended areas outside the second body portion are configured to have at least 80% of a force applied from the second body portion to the portion of the second jaw coupled to the second body portion.

In some embodiments, the clamping device can include an automatic locking mechanism which can allow the clamping device to be operated by a single operator operating the clamping device from afar, such as from a hoist moving the clamping device.

The auto lock mechanism can automatically disable or enable the coupling or the linkage between the pulling element and the jaw or jaws. The automatic disabling or enabling can simplify the actions of the clamping device, such as allowing operating the clamping device with a single operator.

In some embodiments, the clamping device can have an automatic trigger mechanism, such as an automatic locking mechanism to prevent the jaws from moving toward each other when the clamping device is lifted up. The locking mechanism can allow the jaws to remain open when desired, even during the lifting and moving of the clamping device. Normally, the clamping device is configured so that when one end of the clamping arm is pulled up, the jaws of the clamping device will clamp on the object. Thus when the empty clamping device is lifted up, the jaws are clamped together. This can be detrimental, since the clamped jaws will need to be open to accept the object. The locking mechanism can force the jaws open when there is no clamped object. Thus the empty clamping device with the open jaws can be lifted up and moved to the location of the object, at which the open jaws can accept the object. The mechanism is then released, and the jaws can be clamped together when lifted up to hold the object for moving.

The locking mechanism can be activated when the jaws are separated. For example, after bringing an object to a destination, a pulling element of the clamping device can be lowered while the clamping device is stationary, e.g., the pulling element moves down relative to the clamping device. The lowering of the pulling element can move the jaws opened, e.g., separating the jaws apart. Thus the locking mechanism can be activated when the jaws are separated at a predetermined distance, such as a maximum separation distance or a distance close to the maximum distance. For example, the jaws can be separated to a maximum distance to partially activate the locking mechanism. When the pulling element reverses direction, e.g., starts pulling up, the jaws can move closer together. The closing movement of the jaws can complete the locking mechanism, preventing the jaws from moving further toward each other, and essentially keeping the jaws opened at a distance less than the maximum distance.

The locking mechanism can be partially deactivated by lowering the pulling element relative to the clamping device. The lowering of the pulling element can separate the jaws a little. Then the pulling element can be pulled up, complete the deactivation process. The jaws can move toward each other, for clamping on the object.

In some embodiments, the auto lock mechanism can be partially activated by lowering the pulling element so that the jaws can pass a certain separation distance. The pulling element is lowered relative to other elements of the clamping device, thus in some embodiments, the clamping device is rested against something, such as on the object that the clamp device is carried and the object is placed on the ground. Thus, the auto lock mechanism can be partially activated by lowering a hoist coupled to the clamping device carrying the object so that the object contacts the ground. The hoist can then be further lowered so that the jaws can be separated passing a certain separation distance, for example, by moving a pulling element down relative to the rest of the clamping device.

The auto lock mechanism can then be completely activated by pulling up the pulling element, which can secure the jaws open, at the previously separation distance or at a separation distance smaller or slightly smaller than the previously separation distance, for example, due to the possibility that the jaws can move together a little after the pulling element is pulled up.

In some embodiments, the auto lock mechanism can be partially deactivated by lowering the pulling element. The pulling element can be previously not pullable up, due to the activation of the auto lock mechanism. Thus, the pulling element can partially be released from the activation of the auto lock mechanism by reversing the movement, e.g., by lowering the pulling element. The lowering of the pulling element can keep the jaws at the previous separation distance, or can enlarge the separation distance, such as increasing the separation distance by a small amount, for example, due to the possibility that the jaws can move away from each other a little after the pulling element is lowered.

The pulling element is lowered relative to other elements of the clamping device, thus in some embodiments, the clamping device is rested against something, such as on the object that the clamp device is ready to pick up and the object is placed on the ground. Thus, the auto lock mechanism can be partially deactivated by lowering a hoist coupled to the empty clamping device so that the clamping device contacts the object. The hoist can then be further lowered so that the pulling element can move down relative to the rest of the clamping device.

The auto lock mechanism can then be completely deactivated by pulling up the pulling element, which can allow the jaws to move toward each other.

FIGS. 41A-41E illustrate a release operation of a clamping device according to some embodiments. A clamping device 4100 can use a slanting interface mechanism, e.g., a pulling element 4110 having a roller for rolling on a slanting surface of a body portion of the clamping device. A locking mechanism 4180 can be included, for hand-free actuating the slanting interface mechanism. When the locking mechanism is activated or locked, the pulling element 4110 is coupled with a body portion 4153 of the clamping device. Thus pulling on the pulling element 4110 does not move the pulling element. When the locking mechanism is deactivated or unlocked, the pulling element 4110 can be separated from the body portion 4153. Thus, pulling on the pulling element 4110 moves the pulling element. The moving of the pulling element can push a jaw toward the other jaw for clamping on an object.

The locking mechanism can include a top part 4141, which can be locked to or release from the bottom part 4142. The top part 4141 can be secured to the pulling element 4110. The bottom part 4142 can be secured to the jaw support 4153. The top part 4141 can include a rotatable hook end 4186, e.g., a rotatable elongated head, which can be coupled to or be separatable from a mated hookable feature 4181 in the bottom part 4142.

The top part 4141 can include a rod 4183 having an elongated head 4186. The top part can optionally include an annular element 4170 having slanting surfaces 4171 and 4176 on both sides of the annular element, which can be mated with protruded pins 4184A and 4184B on the rod. The top part can optionally include a sleeve 4185 for house the annular element 4170.

FIG. 41D shows a configuration of the locking mechanism. The top part can include the rod 4183 having an elongated head and two protruded pins 4184A and 4184B. The annular element 4170 can be mounted on a sleeve 4185, with both the annular element and the sleeve integrated to, or assembled on, a component of the clamping device, such as the pulling element. In installation, a protruded pin, such as the top protruded pin 4184A, can be assembled on the rod. The rod then can be inserted into the annular element 4170. The bottom protruded pin 4184B can be assembled on the rod, e.g., to ensure that the annular element is disposed between the two protruded pins.

FIG. 41E shows another configuration of the locking mechanism. The top part can include the rod 4183 assembled with the annular element 4170. In installation, a protruded pin, such as the top protruded pin 4184A, can be assembled on the rod. The rod then can be inserted into the annular element 4170. The bottom protruded pin 4184B can be assembled on the rod, e.g., to ensure that the annular element is disposed between the two protruded pins. The sleeve 4185 can be integrated to, or assembled on, a component of the clamping device, such as the pulling element. The top part, e.g., the annular element with the rod assembled along the axis of rotation of the annular element, can be assembled in the sleeve.

In FIG. 41A, the autolock mechanism 4180 is in the unlocked state. The clamping device can be suspended by the hoist, for example, by coupling to the pulling element. In the unlocked state, the hook end of the rod is separate from the receptacle. The pulling element is also separatable from the body of the clamping device. Thus, the jaws of the clamping device can move toward each other to clamp on the panel.

In FIG. 41B, the clamping device with the clamped panel can be transferred to a destination. After reaching the destination, the clamping device can be lowered until the rod contacts and push on the receptacle. The bottom pin moves along the bottom slanting surface to rest at a valley area. The movement of the pin can cause the rod to rotate an angle.

In FIG. 41C, the clamping device is raised up until the top pin contacts and pushes on the top slanting surface. The top pin moves along the top slanting surface to rest at a valley area. The movement of the pin can cause the rod to further rotate an angle to be in a locked state.

FIGS. 42A-42D illustrate a release operation of a clamping device according to some embodiments. A clamping device 4200 can use a slanting interface mechanism, e.g., a pulling element 4210 having a roller for rolling on a slanting surface of a body portion of the clamping device. A locking mechanism 4280 can be included, for hand-free actuating the slanting interface mechanism.

The locking mechanism can include a top part 4241, which can be locked to or release from the bottom part 4242. The top part 4241 can be secured to the pulling element 4210. The bottom part 4242 can be secured to the jaw support 4253. The top part 4241 can include a rotatable hook end 4286, e.g., a rotatable elongated head, which can be coupled to or be separatable from a mated hookable feature 4281 in the bottom part 4242.

The top part 4241 can include a rod 4283 having an elongated head 4286. The top part can optionally include an annular element 4270 having slanting surfaces 4271 and 4276 on both sides of the annular element, which can be mated with protruded pins 4284A and 4284B on a sleeve 4285 mounted on a component of the clamping device, such as mounted on the pulling element 4210.

FIG. 42D shows a configuration of the locking mechanism. The top part can include the rod 4283 securely assembled with the annular element 4270, e.g., the rod and the annular element are configured to function as a unit. Alternatively, the rod can be integrated with the annular element. The sleeve 4285 can be integrated to, or assembled on, a component of the clamping device, such as the pulling element. The top part, e.g., the annular element integrated with the rod, can be placed in the sleeve. Protruded pins 4284A and 4284B can be assembled on both sides of the annular element.

In FIG. 42A, the autolock mechanism 4280 is in the unlocked state. The clamping device can be suspended by the hoist, for example, by coupling to the pulling element. In the unlocked state, the hook end of the rod is separate from the receptacle. The pulling element is also separatable from the body of the clamping device. Thus, the jaws of the clamping device can move toward each other to clamp on the panel. The bottom pins are resting on a valley area of the bottom slanting surface.

In FIG. 42B, the clamping device with the clamped panel can be transferred to a destination. After reaching the destination, the clamping device can be lowered until the rod contacts and push on the receptacle. The annular element moves up until reaching the top pins. The annular element then rotates so that the top slanting surface slides on the top pins to rest at a valley area. The annular element can rotate an angle.

In FIG. 42C, the clamping device is raised up until the annular element contacts the bottom pins. The annular element then rotates so that the bottom slanting surface slides on the bottom pins to rest at a valley area. The annular element can rotate further an angle to be in a locked state.

FIGS. 43A-43E illustrate a release operation of a clamping device according to some embodiments. A clamping device 4300 can use a slanting interface mechanism, e.g., a pulling element 4310 having a roller for rolling on a slanting surface of a body portion of the clamping device. A locking mechanism 4380 can be included, for hand-free actuating the slanting interface mechanism. When the locking mechanism is activated or locked, the pulling element 4310 is coupled with a body portion 4353 of the clamping device. Thus pulling on the pulling element 4310 does not move the pulling element. When the locking mechanism is deactivated or unlocked, the pulling element 4310 can be separated from the body portion 4353. Thus, pulling on the pulling element 4310 moves the pulling element. The moving of the pulling element can push a jaw toward the other jaw for clamping on an object.

The locking mechanism can include a top part 4341, which can be locked to or release from the bottom part 4342. The top part 4341 can be secured to the pulling element 4310. The bottom part 4342 can be secured to the jaw support 4353. The top part 4341 can include a rotatable hook end 4386, e.g., a rotatable elongated head, which can be coupled to or be separatable from a mated hookable feature 4381 in the bottom part 4342.

The top part 4341 can include a rod 4383 having an elongated head 4386. The top part can optionally include a first annular element 4371 having slanting surfaces and a second annular element 4376 having slanting surfaces, which can be mated with a protruded pin 4384 on the rod. The top part can optionally include a sleeve 4385 for house the annular elements 4371 and 4376.

FIG. 43D shows a configuration of the locking mechanism. The top part can include the rod 4383 having an elongated head and a protruded pin 4384. The annular elements 4371 and 4376 can be mounted on a sleeve 4385, with the annular elements and the sleeve integrated to, or assembled on, a component of the clamping device, such as the pulling element. In installation, the rod then can be inserted into the annular elements 4371 and 4376. The protruded pin 4384 can be assembled on the rod, e.g., to ensure that the protruded pin is disposed between the two annular elements.

FIG. 43E shows another configuration of the locking mechanism. The top part can include the rod 4383 assembled with the annular elements 4371 and 4376 in a sleeve 4385. In installation, the annular elements 4371 and 4376 can be inserted in the sleeve 4385. The rod then can be inserted into the annular elements 4371 and 4376. The protruded pin 4384 can be assembled on the rod, e.g., to ensure that the protruded pin is disposed between the two annular elements. A second sleeve 4385* can be integrated to, or assembled on, a component of the clamping device, such as the pulling element. The top part, e.g., the annular elements in the sleeve with the rod, can be assembled in the second sleeve.

In FIG. 43A, the autolock mechanism 4380 is in the unlocked state. The clamping device can be suspended by the hoist, for example, by coupling to the pulling element. In the unlocked state, the hook end of the rod is separate from the receptacle. The pulling element is also separatable from the body of the clamping device. Thus, the jaws of the clamping device can move toward each other to clamp on the panel. The protruded pin rests on a valley of the bottom slanting surface of the bottom annular element 4376.

In FIG. 43B, the clamping device with the clamped panel can be transferred to a destination. After reaching the destination, the clamping device can be lowered until the rod contacts and push on the receptacle. The protruded pin moves along the top slanting surface of the top annular element 4371 to rest at a valley area. The movement of the pin can cause the rod to rotate an angle.

In FIG. 43C, the clamping device is raised up until the protruded pin contacts and pushes on the bottom slanting surface. The protruded pin moves along the bottom slanting surface to rest at a valley area. The movement of the pin can cause the rod to further rotate an angle to be in a locked state.

FIGS. 44A-44D illustrate a release operation of a clamping device according to some embodiments. A clamping device 4400 can use a slanting interface mechanism, e.g., a pulling element 4410 having a roller for rolling on a slanting surface of a body portion of the clamping device. A locking mechanism 4480 can be included, for hand-free actuating the slanting interface mechanism.

The locking mechanism can include a top part 4441, which can be locked to or release from the bottom part 4442. The top part 4441 can be secured to the pulling element 4410. The bottom part 4442 can be secured to the jaw support 4453. The top part 4441 can include a rotatable hook end 4486, e.g., a rotatable elongated head, which can be coupled to or be separatable from a mated hookable feature 4481 in the bottom part 4442.

The top part 4441 can include a rod 4483 having an elongated head 4486. The top part can optionally include annular elements 4471 and 4476 each having slanting surfaces, which can be mated with one or more protruded pin 4484 on a sleeve 4485 mounted on a component of the clamping device, such as mounted on the pulling element 4410.

FIG. 44D shows a configuration of the locking mechanism. The top part can include the rod 4483 securely assembled with the annular elements 4471 and 4476, e.g., the rod and the annular elements are configured to function as a unit. Alternatively, the rod can be integrated with the annular elements. The sleeve 4485 can be integrated to, or assembled on, a component of the clamping device, such as the pulling element. The top part, e.g., the annular element integrated with the rod, can be placed in the sleeve. Protruded pins 4484 can be assembled between the annular elements.

In FIG. 44A, the autolock mechanism 4480 is in the unlocked state. The clamping device can be suspended by the hoist, for example, by coupling to the pulling element. In the unlocked state, the hook end of the rod is separate from the receptacle. The pulling element is also separatable from the body of the clamping device. Thus, the jaws of the clamping device can move toward each other to clamp on the panel. The pins are resting on a valley area of the top slanting surface.

In FIG. 44B, the clamping device with the clamped panel can be transferred to a destination. After reaching the destination, the clamping device can be lowered until the rod contacts and push on the receptacle. The annular elements move up until reaching the pins. The annular elements then rotate so that the bottom slanting surface slides on the pins to rest at a valley area. The annular elements can rotate an angle.

In FIG. 44C, the clamping device is raised up until the annular elements contact the pins at the top slanting surface. The annular elements then rotate so that the top slanting surface slides on the pins to rest at a valley area. The annular elements can rotate further an angle to be in a locked state.

Figures 45A, 45B:
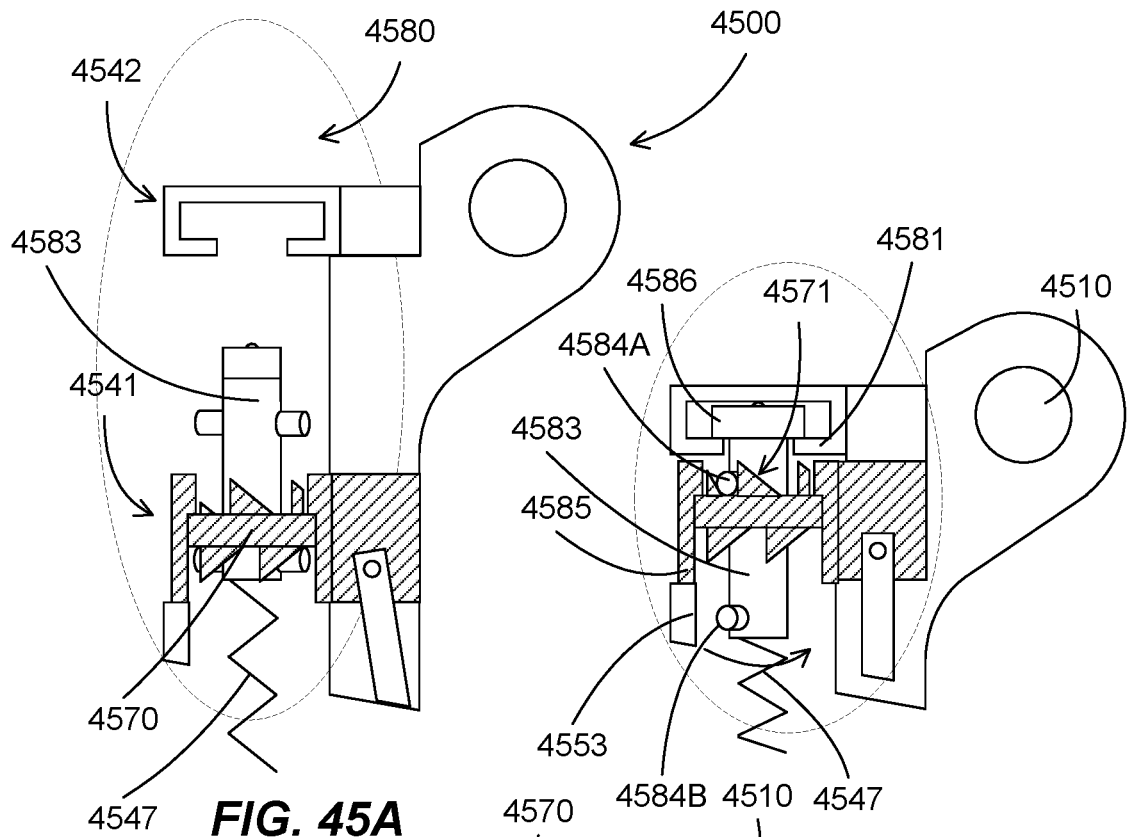
FIGS. 45A-45C illustrate a release operation of a clamping device according to some embodiments.
Figure 45C:
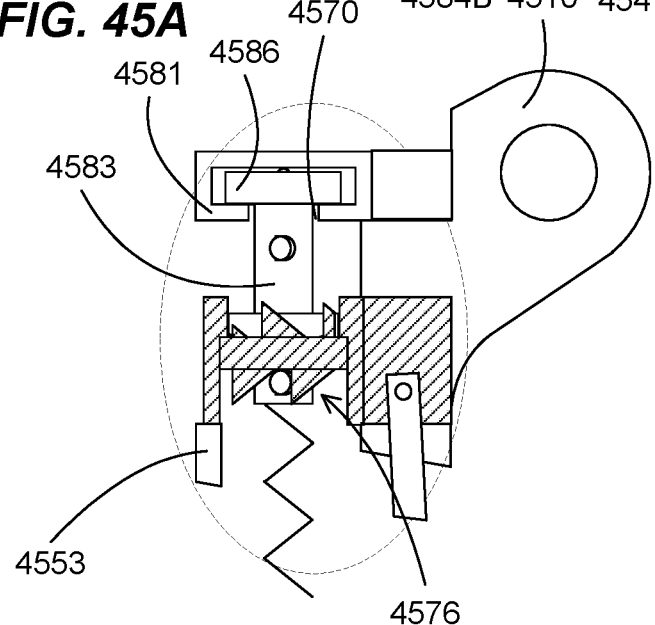

FIGS. 45A-45C illustrate a release operation of a clamping device according to some embodiments. A clamping device 4500 can use a slanting interface mechanism, e.g., a pulling element 4510 having a roller for rolling on a slanting surface of a body portion of the clamping device. A locking mechanism 4580 can be included, for hand-free actuating the slanting interface mechanism. When the locking mechanism is activated or locked, the pulling element 4510 is coupled with a body portion 4553 of the clamping device. Thus pulling on the pulling element 4510 does not move the pulling element. When the locking mechanism is deactivated or unlocked, the pulling element 4510 can be separated from the body portion 4553. Thus, pulling on the pulling element 4510 moves the pulling element. The moving of the pulling element can push a jaw toward the other jaw for clamping on an object.

The locking mechanism can include a top part 4541, which can be locked to or release from the bottom part 4542. The top part 4541 can be secured to the jaw support 4553. The bottom part 4542 can be secured to the pulling element 4510. The top part 4541 can include a rotatable hook end 4586, e.g., a rotatable elongated head, which can be coupled to or be separatable from a mated hookable feature 4581 in the bottom part 4542. A spring 4547 can be used to bias the rod 4583, e.g., to push the rod up toward the bottom part 4542.

The top part 4541 can include a rod 4583 having an elongated head 4586. The top part can optionally include an annular element 4570 having slanting surfaces 4571 and 4576 on both sides of the annular element, which can be mated with protruded pins 4584A and 4584B on the rod. The top part can optionally include a sleeve 4585 for house the annular element 4570.

The locking mechanism can be similar to other locking mechanisms described above, with the exception of a reverse mounting, e.g., the top part 4541 is mounted on a fixed body portion, such as on the jaw support, and the bottom part 4542 mounted on a moving portion, such as on the pulling element. In addition, a biasing element, such as a spring 4547, can be used to bias the rod.

The configuration is described for a locking mechanism having a rod disposed in an annular element, with protruded pins surrounding the annular element. Other configurations can be used for other locking mechanisms.

In FIG. 45A, the autolock mechanism 4580 is in the unlocked state. The clamping device can be suspended by the hoist, for example, by coupling to the pulling element. In the unlocked state, the hook end of the rod is separate from the receptacle. The pulling element is also separatable from the body of the clamping device. Thus, the jaws of the clamping device can move toward each other to clamp on the panel. The rod 4583 can be pushed up by the spring 4547, so that the bottom pin 4584B rest on the bottom slating surface.

In FIG. 45B, the clamping device with the clamped panel can be transferred to a destination. After reaching the destination, the clamping device can be lowered until the rod contacts and push on the receptacle. The top pin moves along the top slanting surface to rest at a valley area. The movement of the pin can cause the rod to rotate an angle.

In FIG. 45C, the clamping device is raised up. Under the biasing element, the rod is pushed up until the bottom pin contacts and pushes on the bottom slanting surface. The bottom pin moves along the bottom slanting surface to rest at a valley area. The movement of the pin can cause the rod to further rotate an angle to be in a locked state.

What is claimed is:

1. A clamping device comprising
   a body comprising a first body portion and a second body portion;
   a first jaw coupled to the first body portion;
   a second jaw coupled to the second body portion,
      wherein the second body portion is disposed between two edges of the second jaw with the two edges of the second jaw extended outside the second body portion,
      wherein the first jaw comprises a comparable dimension as the second jaw for clamping on an object;
   a pulling element disposed between the second body portion and the second jaw and contacting the second body portion and the second jaw,
      wherein at least one of a contacting surface between the pulling element and the second body portion or a contacting surface between the pulling element and the second jaw comprises a slanting surface,
      wherein the slanting surface is configured so that when a force is applied to the pulling element in a direction comprising a vertical direction, a second force is generated pushing the second jaw in a direction comprising a direction from the second jaw to the first jaw,
   a mechanical toggling mechanism,
      wherein the toggling mechanism comprises a first element and a second element,
      wherein the first element of the toggling mechanism is movably coupled to a first component of the clamping device,
      wherein the second element of the toggling mechanism is coupled to a second component of the clamping device, wherein the first element and the second element are configured to be either in a coupled configuration or in a separatable configuration, wherein, in the coupled configuration, the first element is coupled to the second element so that the first component is coupled to the second component, wherein, in the separatable configuration, the first element is separatable from the second element so that the first component is separatable from the second component, wherein the movably coupling of the first element to the first component comprises a slanting surface interaction to convert linear movements in two opposite directions of the first component to rotational movements in one direction of the first element to toggle the first element between the coupled configuration and the separable configuration with the second element.

2. A clamping device as in claim 1,
wherein the second jaw is configured to accept a force from the second body portion.

3. A clamping device as in claim 1,
wherein the second jaw comprises reinforced ridges at extended areas outside the second body portion.

4. A clamping device as in claim 1,
wherein the second jaw is configured so that a force applied from the second body portion to the second jaw spreads to extended areas of the second jaw outside the second body portion.

5. A clamping device as in claim 1,
wherein extended areas of the second jaw outside the second body portion are less than 2× the portion of the second jaw coupled to the second body portion.

6. A clamping device, comprising
a body comprising a first body portion and a second body portion;
a first jaw coupled to the first body portion;
a second jaw coupled to the second body portion,
wherein the second body portion is disposed between two edges of the second jaw with the two edges of the second jaw extended outside the second body portion,
wherein the first jaw comprises a comparable dimension as the second jaw for clamping on an object;
a pulling element disposed between the second body portion and the second jaw and contacting the second body portion and the second jaw,
wherein at least one of a contacting surface between the pulling element and the second body portion or a contacting surface between the pulling element and the second jaw comprises a slanting surface,
wherein the slanting surface is configured so that when a force is applied to the pulling element in a direction comprising a vertical direction, a second force is generated pushing the second jaw in a direction comprising a direction from the second jaw to the first jaw,
wherein extended areas outside the second body portion are configured to have at least 80% of a force applied from the second body portion to the portion of the second jaw coupled to the second body portion.

7. A clamping device comprising
a body comprising a first body portion and a second body portion;
a first jaw coupled to the first body portion;
a second jaw coupled to the second body portion,
wherein the second body portion is disposed between two edges of the second jaw with the two edges of the second jaw extended outside the second body portion,
wherein the first jaw comprises a comparable dimension as the second jaw for clamping on an object;
a pulling element disposed between the second body portion and the second jaw and contacting the second body portion and the second jaw,
wherein at least one of a contacting surface between the pulling element and the second body portion or a contacting surface between the pulling element and the second jaw comprises a slanting surface,
wherein the slanting surface is configured so that when a force is applied to the pulling element in a direction comprising a vertical direction, a second force is generated pushing the second jaw in a direction comprising a direction from the second jaw to the first jaw,
a mechanical toggling mechanism,
wherein the toggling mechanism comprises a first element and a second element,
wherein the first element of the toggling mechanism is movably coupled to a first component of the clamping device,
wherein the second element of the toggling mechanism is coupled to a second component of the clamping device,
wherein the first element and the second element are configured to be either in a coupled configuration or in a separatable configuration,
wherein, in the coupled configuration, the first element is coupled to the second element so that the first component is coupled to the second component,
wherein, in the separatable configuration, the first element is separatable from the second element so that the first component is separatable from the second component,
wherein the first component comprises multiple first teeth arranged around an axis of rotation, wherein each first tooth of the multiple first teeth comprises a first valley area formed with a neighbor first tooth and a first slanting surface rising from the first valley area,
wherein the first component comprises multiple second teeth arranged around the axis of rotation, wherein each second tooth of the multiple second teeth comprises a second valley area formed with a neighbor second tooth and a second slanting surface rising from the second valley area,
wherein the multiple first and second multiple teeth are spaced apart,
wherein the first element is disposed along the axis of rotation,
wherein the first element comprises at least a protruded element for interfacing with the first and second slanting surfaces,
wherein the interfacing of the at least a protruded element with the first and second slanting surfaces is configured so that under a first force causing the at least a protruded element to contact the first slanting surface, the at least a protruded element moves along the first slanting surface to rest at the first valley area, which causes the second element to rotate a first angle in a rotating direction,
wherein the interfacing of the at least a protruded element with the first and second slanting surfaces is configured so that under a second force causing the at least a protruded element to contact the second slanting surface, the at least a protruded element moves along the second slanting surface to rest at the second valley area, which causes the second element to rotate a second angle in the rotating direction, wherein a combination of the first angle and the second angle toggles a hook end of the first element between the coupled configuration and the separatable configuration with a hookable element of the second element.

8. A clamping device as in claim 7,
wherein at least a tooth of the multiple first teeth or the multiple second teeth is rounded or chamfered in a direction parallel to the angle of the facing slanting surface.

9. A clamping device as in claim 7,
wherein the first and second slanting surfaces comprise sections of helical curves around the axis of rotation, wherein tangent lines of the helical curves make an angle between 40 and 50 degrees with the axis of rotation.

10. A clamping device as in claim 7,
wherein the multiple first teeth and the multiple second teeth are spaced at a fixed distance and configured so that the multiple first teeth face the multiple second teeth,
wherein the at least a protruded element is disposed between the multiple first teeth and the multiple second teeth.

11. A clamping device as in claim 7,
wherein the multiple first teeth face away the multiple second teeth,
wherein the at least a protruded element comprises two protruded elements,
wherein the multiple first teeth and the multiple second teeth are disposed between the two protruded elements.

12. A clamping device comprising
a body comprising a first body portion and a second body portion;
a first jaw coupled to the first body portion;
a second jaw coupled to the second body portion,
wherein the second body portion is disposed between two edges of the second jaw with the two edges of the second jaw extended outside the second body portion,
wherein the first jaw comprises a comparable dimension as the second jaw for clamping on an object;
a pulling element disposed between the second body portion and the second jaw and contacting the second body portion and the second jaw,
wherein at least one of a contacting surface between the pulling element and the second body portion or a contacting surface between the pulling element and the second jaw comprises a slanting surface,
wherein the slanting surface is configured so that when a force is applied to the pulling element in a direction comprising a vertical direction, a second force is generated pushing the second jaw in a direction comprising a direction from the second jaw to the first jaw,
a mechanical toggling mechanism,
wherein the toggling mechanism comprises a first element and a second element,
wherein the first element of the toggling mechanism is movably coupled to a first component of the clamping device,
wherein the second element of the toggling mechanism is coupled to a second component of the clamping device,
wherein the first element and the second element are configured to be either in a coupled configuration or in a separatable configuration,
wherein, in the coupled configuration, the first element is coupled to the second element so that the first component is coupled to the second component,
wherein, in the separatable configuration, the first element is separatable from the second element so that the first component is separatable from the second component,
wherein the first element is movably disposed along an axis of rotation of a third element of the mechanical toggling mechanism, with the third element coupled to the first component so that the first element is movably coupled to the first component through the third element,
wherein the third element comprises multiple first teeth arranged around the axis of rotation, wherein each first tooth of the multiple first teeth comprises a first valley area formed with a neighbor first tooth and a first slanting surface rising from the first valley area,
wherein the third element comprises multiple second teeth arranged around the axis of rotation, wherein each second tooth of the multiple second teeth comprises a second valley area formed with a neighbor second tooth and a second slanting surface rising from the second valley area,
wherein the multiple first and second multiple teeth are spaced apart,
wherein the first element comprises at least a protruded element for interfacing with the first and second slanting surfaces,
wherein the interfacing of the at least a protruded element with the first and second slanting surfaces is configured so that under a first force causing the at least a protruded element to contact the first slanting surface, the at least a protruded element moves along the first slanting surface to rest at the first valley area, which causes the second element to rotate a first angle in a rotating direction,
wherein the interfacing of the at least a protruded element with the first and second slanting surfaces is configured so that under a second force causing the at least a protruded element to contact the second slanting surface, the at least a protruded element moves along the second slanting surface to rest at the second valley area, which causes the second element to rotate a second angle in the rotating direction,
wherein a combination of the first angle and the second angle toggles a hook end of the first element between the coupled configuration and the separatable configuration with a hookable element of the second element.

13. A clamping device as in claim 12,
wherein the multiple first teeth and the multiple second teeth are spaced at a fixed distance and configured so that the multiple first teeth face the multiple second teeth,
wherein the at least a protruded element is disposed between the multiple first teeth and the multiple second teeth.

14. A clamping device as in claim 12,
wherein the multiple first teeth face away the multiple second teeth, wherein the at least a protruded element comprises two protruded elements,
wherein the multiple first teeth and the multiple second teeth are disposed between the two protruded elements.

15. A clamping device comprising
a body comprising a first body portion and a second body portion;
a first jaw coupled to the first body portion;
a second jaw coupled to the second body portion,
   wherein the second body portion is disposed between two edges of the second jaw with the two edges of the second jaw extended outside the second body portion,
   wherein the first jaw comprises a comparable dimension as the second jaw for clamping on an object;
a pulling element disposed between the second body portion and the second jaw and contacting the second body portion and the second jaw,
   wherein at least one of a contacting surface between the pulling element and the second body portion or a contacting surface between the pulling element and the second jaw comprises a slanting surface,
   wherein the slanting surface is configured so that when a force is applied to the pulling element in a direction comprising a vertical direction, a second force is generated pushing the second jaw in a direction comprising a direction from the second jaw to the first jaw,
a mechanical toggling mechanism,
   wherein the toggling mechanism comprises a first element and a second element,
   wherein the first element of the toggling mechanism is movably coupled to a first component of the clamping device,
   wherein the second element of the toggling mechanism is coupled to a second component of the clamping device,
   wherein the first element and the second element are configured to be either in a coupled configuration or in a separatable configuration,
   wherein, in the coupled configuration, the first element is coupled to the second element so that the first component is coupled to the second component,
   wherein, in the separatable configuration, the first element is separatable from the second element so that the first component is separatable from the second component,
   wherein the first component comprises a cavity,
   wherein the first component comprises one more protruded elements protruding into the cavity,
   wherein the first element comprises multiple first teeth arranged around an axis of rotation, wherein each first tooth of the multiple first teeth comprises a first valley area formed with a neighbor first tooth and a first slanting surface rising from the first valley area,
   wherein the first element comprises multiple second teeth arranged around the axis of rotation, wherein each second tooth of the multiple second teeth comprises a second valley area formed with a neighbor second tooth and a second slanting surface rising from the second valley area,
   wherein the multiple first and second multiple teeth are spaced apart,
   wherein the first element is disposed inside the cavity with the one or more protruded elements configured for interfacing with the first and second slanting surfaces,
   wherein the interfacing of the at least a protruded element with the first and second slanting surfaces is configured so that under a first force causing the at least a protruded element to contact the first slanting surface, the at least a protruded element moves along the first slanting surface to rest at the first valley area, which causes the second element to rotate a first angle in a rotating direction,
   wherein the interfacing of the at least a protruded element with the first and second slanting surfaces is configured so that under a second force causing the at least a protruded element to contact the second slanting surface, the at least a protruded element moves along the second slanting surface to rest at the second valley area, which causes the second element to rotate a second angle in the rotating direction,
   wherein a combination of the first angle and the second angle toggles a hook end of the first element between the coupled configuration and the separatable configuration with a hookable element of the second element.

16. A clamping device as in claim 15,
wherein the multiple first teeth and the multiple second teeth are spaced at a fixed distance and configured so that the multiple first teeth face the multiple second teeth,
wherein the one or more protruded elements are disposed between the multiple first teeth and the multiple second teeth.

17. A clamping device as in claim 15,
wherein the multiple first teeth face away the multiple second teeth,
wherein the one or more protruded elements comprise at least two protruded elements,
wherein the multiple first teeth and the multiple second teeth are disposed between the at least two protruded elements.

18. A clamping device comprising
a first jaw having a first clamping area having a first width;
a set of clamp bars;
a jaw support having a second width,
   wherein the first jaw and the jaw support are coupled to the set of clamp bars at both ends of the set of clamp bars,
   wherein the set of clamp bars is coupled to the first jaw at an area outside the first clamping area,
   wherein the first width is larger than the second width,
   wherein the first width is less than 4× larger of the second width;
a second jaw having a second clamping area disposed between the jaw support and the first jaw,
   wherein the second clamping area is similar to the first clamping area,
   wherein the second jaw comprises two protruded portions each having a slanting surface,
   wherein the second jaw is coupled to the jaw support through a set of springs,
   wherein the set of springs is biased to pull the second jaw toward the jaw support;
a pulling element disposed between the jaw support and the second jaw,
   wherein the pulling element comprises a first roller for rolling against the jaw support,
   wherein the pulling element comprises two second rollers on two sides of the first roller for rolling on the slanting surfaces of the protruded portions, wherein the slanting surfaces are configured so that when the pulling element moves in a direction from the first and second rollers toward the set of clamp bars, the second jaw moves toward the first jaw;
a mechanical toggling mechanism,
wherein the toggling mechanism comprises a first element and a second element,
wherein the first element of the toggling mechanism is movably coupled to a first component of the clamping device,
wherein the second element of the toggling mechanism is coupled to a second component of the clamping device,
wherein the first element and the second element are configured to be either in a coupled configuration or in a separatable configuration,
wherein, in the coupled configuration, the first element is coupled to the second element so that the first component is coupled to the second component,
wherein, in the separatable configuration, the first element is separatable from the second element so that the first component is separatable from the second component,
wherein the first element is movably disposed along an axis of rotation of a third element of the mechanical toggling mechanism, with the third element coupled to the first component so that the first element is movably coupled to the first component through the third element,
wherein the third element comprises multiple first teeth arranged around the axis of rotation, wherein each first tooth of the multiple first teeth comprises a first valley area formed with a neighbor first tooth and a first slanting surface rising from the first valley area,
wherein the third element comprises multiple second teeth arranged around the axis of rotation, wherein each second tooth of the multiple second teeth comprises a second valley area formed with a neighbor second tooth and a second slanting surface rising from the second valley area,
wherein the multiple first and second multiple teeth are spaced apart,
wherein the first element comprises at least a protruded element for interfacing with the first and second slanting surfaces,
wherein the interfacing of the at least a protruded element with the first and second slanting surfaces is configured so that under a first force causing the at least a protruded element to contact the first slanting surface, the at least a protruded element moves along the first slanting surface to rest at the first valley area, which causes the second element to rotate a first angle in a rotating direction,
wherein the interfacing of the at least a protruded element with the first and second slanting surfaces is configured so that under a second force causing the at least a protruded element to contact the second slanting surface, the at least a protruded element moves along the second slanting surface to rest at the second valley area, which causes the second element to rotate a second angle in the rotating direction,
wherein a combination of the first angle and the second angle toggles a hook end of the first element between the coupled configuration and the separatable configuration with a hookable element of the second element.

19. A clamping device comprising
a clamp bar;
a first jaw assembly coupled to the clamp bar,
wherein the first jaw assembly comprises a first jaw;
a second jaw assembly coupled to the clamp bar,
wherein the second jaw assembly comprises a second jaw,
wherein the second jaw assembly comprises a jaw support,
wherein the jaw support is coupled to the second jaw at a portion between two edges of the second jaw with the two edges of the second jaw extended outside the jaw support,
wherein the first jaw comprises a comparable dimension as the second jaw for clamping on an object,
wherein the second jaw and the jaw support are configured to form a hollow space between the second jaw and the jaw support,
wherein, in one direction, the hollow space is smaller nearer the clamp bar, and larger away from the clamp bar;
a pulling element disposed between the jaw support and the second jaw,
wherein the element comprises one or more rollers,
wherein the one or more rollers are disposed in the hollow space,
a mechanical toggling mechanism,
wherein the toggling mechanism comprises a first element and a second element,
wherein the first element of the toggling mechanism is movably coupled to a first component of the clamping device,
wherein the second element of the toggling mechanism is coupled to a second component of the clamping device,
wherein the first element and the second element are configured to be either in a coupled configuration or in a separatable configuration,
wherein, in the coupled configuration, the first element is coupled to the second element so that the first component is coupled to the second component,
wherein, in the separatable configuration, the first element is separatable from the second element so that the first component is separatable from the second component,
wherein the first component comprises a cavity,
wherein the first component comprises one more protruded elements protruding into the cavity,
wherein the first element comprises multiple first teeth arranged around an axis of rotation, wherein each first tooth of the multiple first teeth comprises a first valley area formed with a neighbor first tooth and a first slanting surface rising from the first valley area,
wherein the first element comprises multiple second teeth arranged around the axis of rotation, wherein each second tooth of the multiple second teeth comprises a second valley area formed with a neighbor second tooth and a second slanting surface rising from the second valley area,
wherein the multiple first and second multiple teeth are spaced apart,
wherein the first element is disposed inside the cavity with the one or more protruded elements configured for interfacing with the first and second slanting surfaces,
wherein the interfacing of the at least a protruded element with the first and second slanting surfaces is configured so that under a first force causing the at least a protruded element to contact the first slanting surface, the at least a protruded element moves along the first slanting surface to rest at the first valley area, which causes the second element to rotate a first angle in a rotating direction, wherein the interfacing of the at least a protruded element with the first and second slanting surfaces is configured so that under a second force causing the at least a protruded element to contact the second slanting surface, the at least a protruded element moves along the second slanting surface to rest at the second valley area, which causes the second element to rotate a second angle in the rotating direction, wherein a combination of the first angle and the second angle toggles a hook end of the first element between the coupled configuration and the separatable configuration with a hookable element of the second element.

20. A clamping device comprising a body comprising a first body portion and a second body portion;

a first jaw coupled to the first body portion;

a second jaw coupled to the second body portion,
   wherein the second body portion is disposed between two edges of the second jaw with the two edges of the second jaw extended outside the second body portion,
   wherein the first jaw comprises a comparable dimension as the second jaw for clamping on an object;

a pulling element disposed between the second body portion and the second jaw and contacting the second body portion and the second jaw,
   wherein at least one of a contacting surface between the pulling element and the second body portion or a contacting surface between the pulling element and the second jaw comprises a slanting surface,
   wherein the slanting surface is configured so that when a force is applied to the pulling element in a direction comprising a vertical direction, a second force is generated pushing the second jaw in a direction comprising a direction from the second jaw to the first jaw, a mechanical toggling mechanism,
   wherein the toggling mechanism comprises a first element and a second element,
   wherein the first element of the toggling mechanism is movably coupled to a first component of the clamping device,
   wherein the second element of the toggling mechanism is coupled to a second component of the clamping device,
   wherein the first element and the second element are configured to be either in a coupled configuration or in a separatable configuration,
   wherein, in the coupled configuration, the first element is coupled to the second element so that the first component is coupled to the second component,
   wherein, in the separatable configuration, the first element is separatable from the second element so that the first component is separatable from the second component,
   wherein the first element comprises multiple first teeth arranged around an axis of rotation, wherein each first tooth of the multiple first teeth comprises a first valley area formed with a neighbor first tooth and a first slanting surface rising from the first valley area,
   wherein the first element comprises multiple second teeth arranged around the axis of rotation, wherein each second tooth of the multiple second teeth comprises a second valley area formed with a neighbor second tooth and a second slanting surface rising from the second valley area,
   wherein the multiple first and second multiple teeth are spaced apart,
   wherein the first element is movably disposed inside a third element of the mechanical toggling mechanism, with the third element coupled to the first component so that the first element is movably coupled to the first component through the third element,
   wherein the third element comprises one or more protruded elements protruding toward the first element, with the one or more protruded elements configured for interfacing with the first and second slanting surfaces,
   wherein the interfacing of the at least a protruded element with the first and second slanting surfaces is configured so that under a first force causing the at least a protruded element to contact the first slanting surface, the at least a protruded element moves along the first slanting surface to rest at the first valley area, which causes the second element to rotate a first angle in a rotating direction,
   wherein the interfacing of the at least a protruded element with the first and second slanting surfaces is configured so that under a second force causing the at least a protruded element to contact the second slanting surface, the at least a protruded element moves along the second slanting surface to rest at the second valley area, which causes the second element to rotate a second angle in the rotating direction,
   wherein a combination of the first angle and the second angle toggles a hook end of the first element between the coupled configuration and the separatable configuration with a hookable element of the second element.

* * * * *